(12) United States Patent
Fink et al.

(10) Patent No.: US 12,385,318 B2
(45) Date of Patent: Aug. 12, 2025

(54) ELECTRONIC DOOR SYSTEM

(71) Applicant: Therma-Tru Corporation, Maumee, OH (US)

(72) Inventors: Nicholas Fink, Maumee, OH (US); May Russell, Maumee, OH (US); Brett Finley, Maumee, OH (US); Jacob Weil, Maumee, OH (US); Daniel Schneider, Maumee, OH (US); Keith Butcher, Maumee, OH (US); Logan Harvey, Maumee, OH (US); Brandon Knoll, Maumee, OH (US); Andrew Waite, Maumee, OH (US); Ben Kowalski, Maumee, OH (US); Ryan Starling, Maumee, OH (US); Frances Wang, Maumee, OH (US); Joseph Gonzalez, Maumee, OH (US); David Hezlep, Maumee, OH (US); Steven Orchosky, Maumee, OH (US); Hidekazu Saegusa, Maumee, OH (US); Videl Smith, Maumee, OH (US); Bill Klein, Maumee, OH (US); Adam Allmandinger, Maumee, OH (US); Tim Quirin, Maumee, OH (US); Jon Klein, Maumee, OH (US); John Burleson, Maumee, OH (US); Kevin Anderson, Maumee, OH (US); Brian Frackelton, Maumee, OH (US); Todd Whitaker, Maumee, OH (US); George Polly, Maumee, OH (US); Arlber Chang, Maumee, OH (US); Derek Fielding, Maumee, OH (US)

(73) Assignee: Therma-Tru Corporation, Maumee, OH (US)

( * ) Notice: Subject to any disclaimer, the term of this patent is extended or adjusted under 35 U.S.C. 154(b) by 0 days.

(21) Appl. No.: 18/579,838

(22) PCT Filed: Jun. 30, 2023

(86) PCT No.: PCT/US2023/026767
§ 371 (c)(1),
(2) Date: Jan. 16, 2024

(87) PCT Pub. No.: WO2024/006540
PCT Pub. Date: Jan. 4, 2024

(65) Prior Publication Data
US 2025/0116154 A1   Apr. 10, 2025

Related U.S. Application Data

(60) Provisional application No. 63/430,280, filed on Dec. 5, 2022, provisional application No. 63/357,709, filed on Jul. 1, 2022.

(51) Int. Cl.
*E06B 7/28* (2006.01)
*E05F 15/71* (2015.01)
*E05F 15/73* (2015.01)

(52) U.S. Cl.
CPC ............... *E06B 7/28* (2013.01); *E05F 15/71* (2015.01); *E05F 15/73* (2015.01); *E05Y 2900/132* (2013.01)

(58) Field of Classification Search
CPC ... E06B 7/28; E06B 9/24; E06B 1/528; E06B 1/52; E06B 3/7001; E05F 15/71; E05F 15/73; E05Y 2900/132
See application file for complete search history.

(56) References Cited

U.S. PATENT DOCUMENTS 3,793,500 A   2/1974   Gerber
4,332,429 A   6/1982   Frick et al.
(Continued)

FOREIGN PATENT DOCUMENTS

CN   103223896 B   7/2013
CN   106711688 A   5/2017
(Continued)

OTHER PUBLICATIONS

Final Office Action on U.S. Appl. No. 16/530,957 DTD Jul. 22, 2022, 13 pages.
(Continued)

*Primary Examiner* — Justin B Rephann
(74) *Attorney, Agent, or Firm* — Foley & Lardner LLP

(57) ABSTRACT

An electronic door system includes a door frame, a door hingedly coupled to the door frame, an electrically-control-
(Continued)

lable component coupled to or disposed within the door, a door wiring harness, and a cover. The door defines a channel extending along at least a portion of a peripheral edge thereof. The door wiring harness includes a wire extending along and within the channel. The wire is coupled to the electrically-controllable component. The cover extends along the peripheral edge and covers the channel.

28 Claims, 52 Drawing Sheets

(56) References Cited

U.S. PATENT DOCUMENTS

| | | | |
|---|---|---|---|
| 5,063,711 A * | 11/1991 | Huelin | E06B 1/18 |
| | | | 49/504 |
| 5,398,175 A | 3/1995 | Pea | |
| 5,541,585 A | 7/1996 | Duhame et al. | |
| 5,586,895 A | 12/1996 | Zehrung | |
| 6,049,287 A | 4/2000 | Yulkowski | |
| 6,058,635 A * | 5/2000 | Morris | G09F 13/04 |
| | | | 52/28 |
| 6,064,316 A | 5/2000 | Glick et al. | |
| 7,125,136 B1 * | 10/2006 | Dedic | G08B 7/062 |
| | | | 362/152 |
| 8,539,717 B2 | 9/2013 | Speyer et al. | |
| 8,772,970 B2 | 7/2014 | Lambrou | |
| 9,265,115 B1 * | 2/2016 | Dunn | F21S 9/022 |
| 9,644,399 B2 | 5/2017 | Johnson et al. | |
| 9,683,391 B2 | 6/2017 | Johnson et al. | |
| 9,685,015 B2 | 6/2017 | Johnson | |
| 9,685,017 B2 | 6/2017 | Johnson | |
| 9,691,198 B2 | 6/2017 | Cheng et al. | |
| 9,691,203 B1 | 6/2017 | Shen | |
| 9,702,168 B2 | 7/2017 | Jadallah et al. | |
| 9,704,320 B2 | 7/2017 | Johnson et al. | |
| 9,727,328 B2 | 8/2017 | Johnson | |
| 9,761,073 B2 | 9/2017 | Yu et al. | |
| 9,761,074 B2 | 9/2017 | Cheng et al. | |
| 9,767,632 B2 | 9/2017 | Johnson | |
| 9,916,746 B2 | 3/2018 | Johnson et al. | |
| 10,017,963 B2 | 7/2018 | Johnson et al. | |
| 10,304,273 B2 | 5/2019 | Johnson et al. | |
| 10,328,900 B1 | 6/2019 | Yakovenko et al. | |
| 10,361,880 B1 | 7/2019 | Marcinkowski et al. | |
| 10,388,094 B2 | 8/2019 | Johnson | |
| 10,443,266 B2 | 10/2019 | Johnson et al. | |
| 10,445,999 B2 | 10/2019 | Johnson et al. | |
| 10,616,721 B2 | 4/2020 | Theurer et al. | |
| 10,691,953 B2 | 6/2020 | Johnson et al. | |
| 10,927,591 B1 * | 2/2021 | Brychell | F21V 33/006 |
| 11,268,300 B2 | 3/2022 | Langenberg et al. | |
| 11,739,583 B2 | 8/2023 | Sorice et al. | |
| 2004/0085205 A1 | 5/2004 | Yeh | |
| 2005/0068629 A1 | 3/2005 | Fernando et al. | |
| 2006/0007005 A1 | 1/2006 | Yui et al. | |
| 2006/0010793 A1 | 1/2006 | Martino | |
| 2006/0156361 A1 | 7/2006 | Wang et al. | |
| 2006/0164205 A1 | 7/2006 | Buckingham et al. | |
| 2008/0013303 A1 | 1/2008 | Guarino | |
| 2009/0313790 A1 | 12/2009 | Schau | |
| 2010/0283579 A1 | 11/2010 | Kraus et al. | |
| 2012/0280783 A1 | 11/2012 | Gerhardt et al. | |
| 2013/0186001 A1 | 7/2013 | Cui et al. | |
| 2015/0027178 A1 | 1/2015 | Scalisi | |
| 2016/0049025 A1 | 2/2016 | Johnson | |
| 2016/0105650 A1 | 4/2016 | Carter | |
| 2016/0239001 A1 | 8/2016 | Chin et al. | |
| 2016/0275781 A1 | 9/2016 | Nold | |
| 2016/0284181 A1 | 9/2016 | Johnson | |
| 2016/0319569 A1 | 11/2016 | Johnson et al. | |
| 2016/0319571 A1 | 11/2016 | Johnson | |
| 2017/0040827 A1 | 2/2017 | Weber | |
| 2017/0143136 A1 * | 5/2017 | Gierens | B32B 17/10541 |
| 2017/0193724 A1 | 7/2017 | Johnson et al. | |
| 2017/0228603 A1 | 8/2017 | Johnson | |
| 2017/0265124 A1 | 9/2017 | Seemann et al. | |
| 2017/0284129 A1 | 10/2017 | King | |
| 2018/0073274 A1 | 3/2018 | Johnson et al. | |
| 2018/0088431 A1 | 3/2018 | Holt et al. | |
| 2018/0135337 A1 | 5/2018 | Johnson et al. | |
| 2018/0179786 A1 | 6/2018 | Johnson | |
| 2018/0189117 A1 | 7/2018 | Shrivastava et al. | |
| 2018/0268675 A1 | 9/2018 | Johnson et al. | |
| 2018/0283049 A1 | 10/2018 | Shiner et al. | |
| 2018/0364662 A1 | 12/2018 | Meganathan et al. | |
| 2019/0019364 A9 | 1/2019 | Cheng et al. | |
| 2019/0130686 A1 | 5/2019 | Cheng et al. | |
| 2019/0130687 A1 | 5/2019 | Johnson | |
| 2019/0130712 A1 | 5/2019 | Johnson et al. | |
| 2020/0236509 A1 | 7/2020 | Theurer et al. | |
| 2020/0250946 A1 | 8/2020 | Johnson et al. | |
| 2021/0035394 A1 | 2/2021 | Anderson et al. | |
| 2021/0207419 A1 | 7/2021 | Sorice et al. | |
| 2021/0207420 A1 | 7/2021 | Sorice et al. | |
| 2021/0207421 A1 | 7/2021 | Sorice et al. | |
| 2022/0108228 A1 | 4/2022 | Salter et al. | |
| 2022/0170623 A1 * | 6/2022 | Hutton | F21V 29/70 |
| 2022/0263297 A1 * | 8/2022 | Bodurka | E06B 7/28 |

FOREIGN PATENT DOCUMENTS

| | | |
|---|---|---|
| CN | 206283038 U | 6/2017 |
| CN | 206283075 U | 6/2017 |
| CN | 206865208 U | 1/2018 |
| JP | 10-102907 A | 4/1998 |
| KR | 1020020088996 A | 11/2002 |
| KR | 101632944 B1 | 7/2016 |
| WO | WO-2007/082959 A1 | 7/2007 |
| WO | WO-2019/102502 A1 | 5/2019 |

OTHER PUBLICATIONS

International Preliminary Report on Patentability on PCT PCT/US2019/045010 dated Feb. 18, 2021, 7 pages.
International Search Report and Written Opinion dated Oct. 20, 2023, from PCT/US2023/026767, 21 pages.
International Search Report and Written Opinion received for PCT application No. PCT/US2019/045010, 11 pages.
Non-Final Office Action on U.S. Appl. No. 16/530,957 dated Dec. 15, 2021, 12 pages.
Non-Final Office Action on U.S. Appl. No. 16/530,960 DTD Jun. 16, 2020, 20 pages.
Notice of Allowance on U.S. Appl. No. 16/530,957 DTD Oct. 12, 2022, 9 pages.
US Office Action on U.S. Appl. No. 17/072,950 dated Aug. 18, 2021, 15 pages.

* cited by examiner

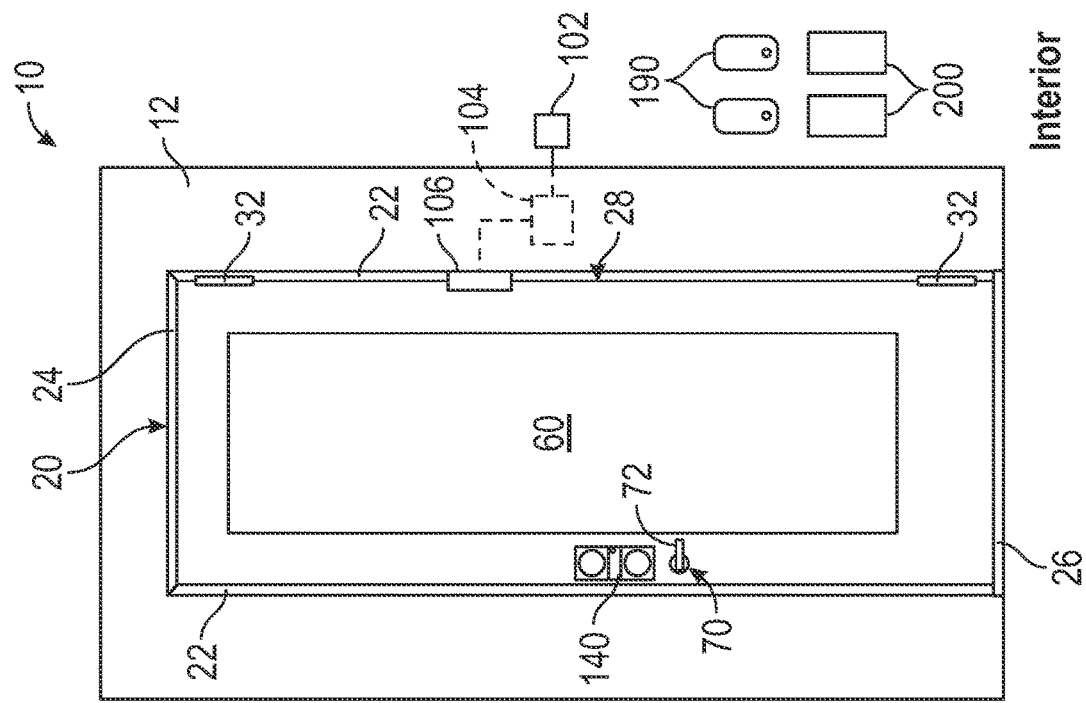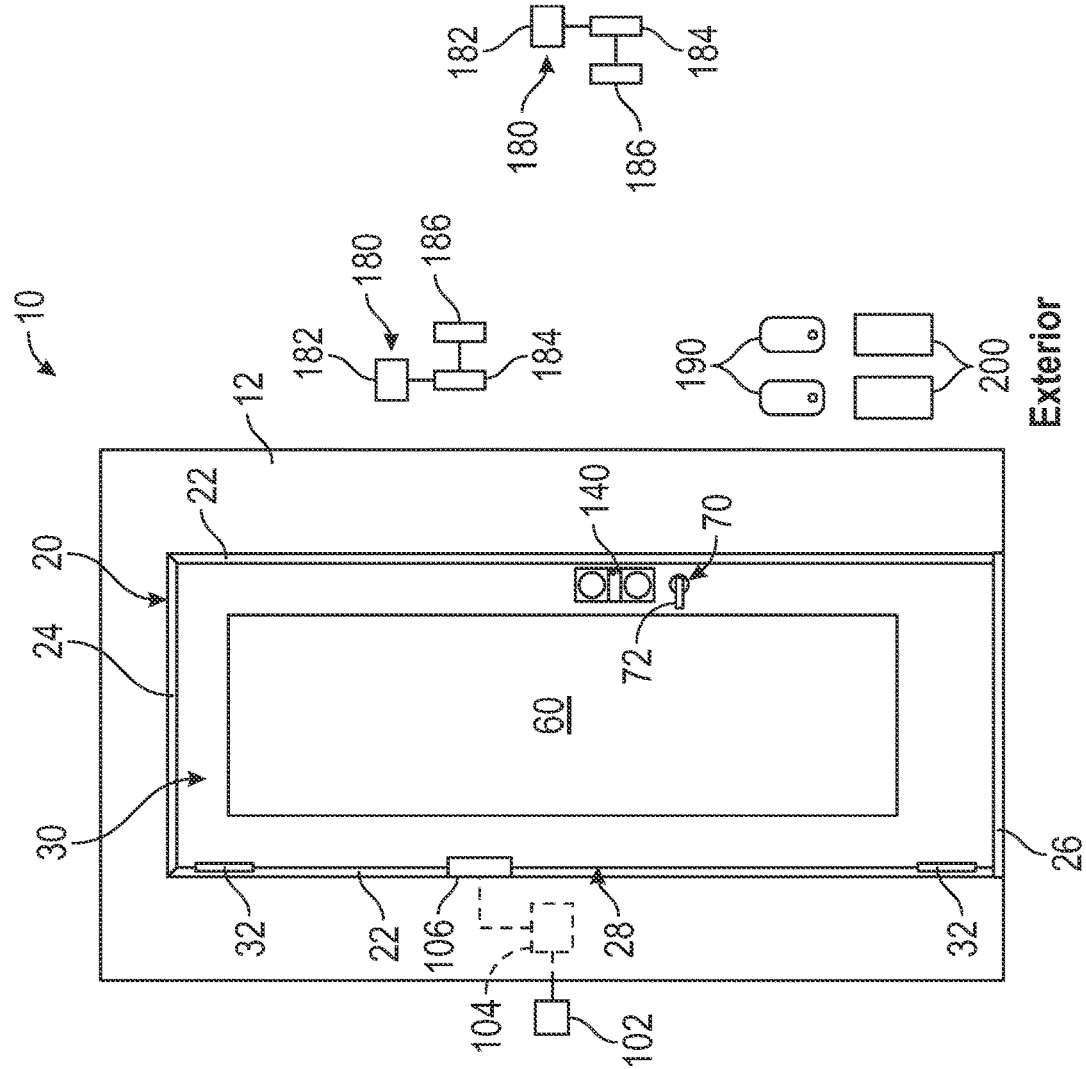

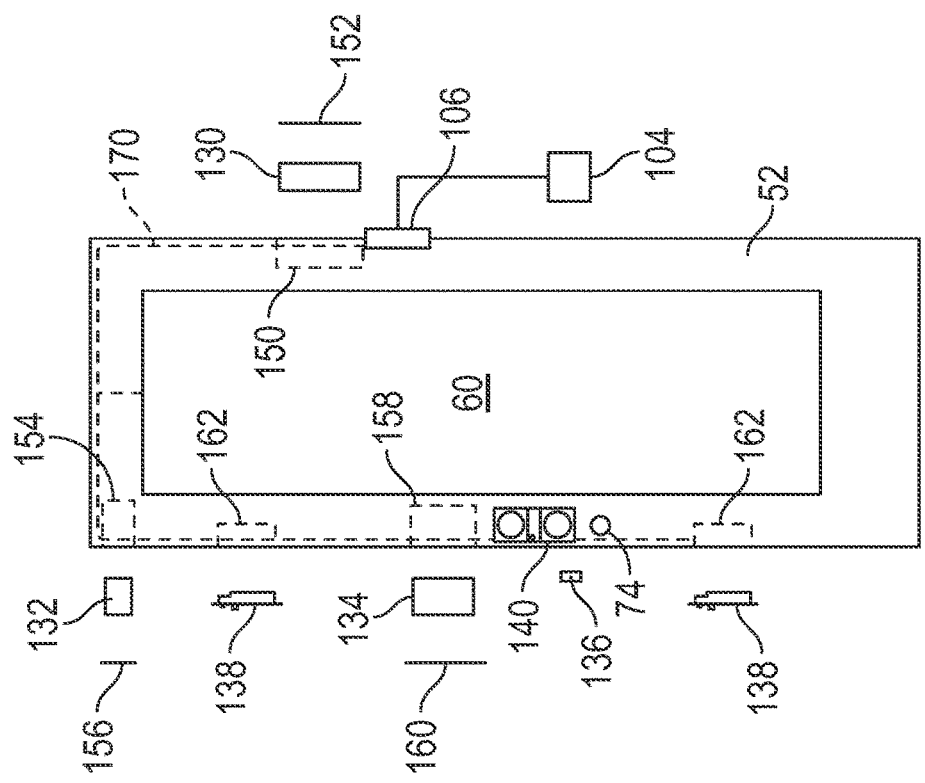
FIG. 4 Interior
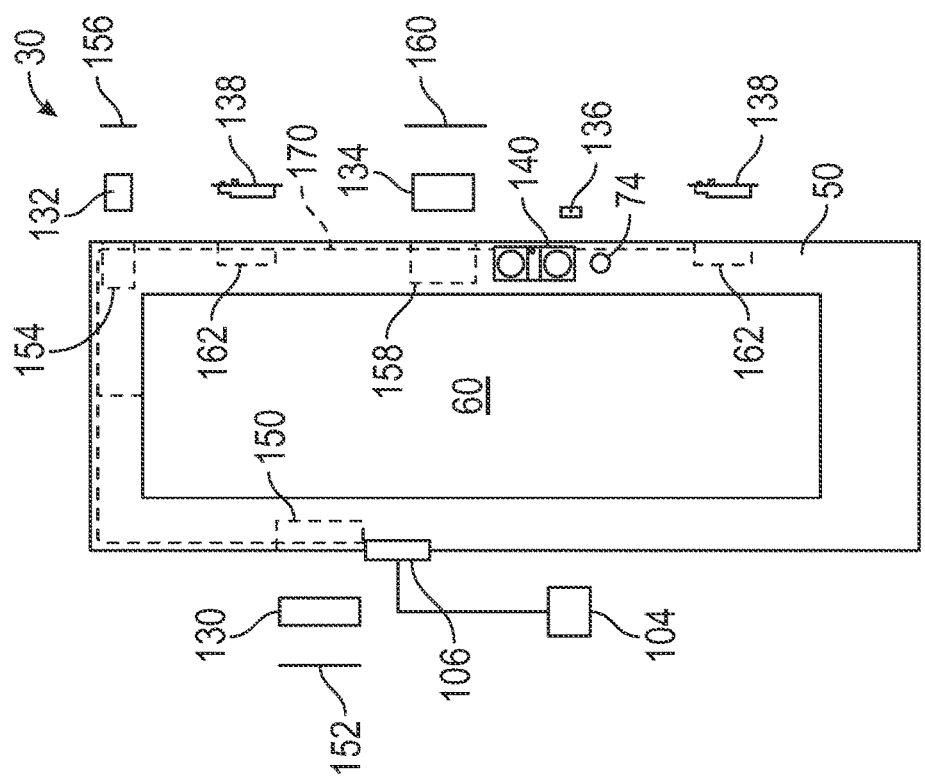
FIG. 3 Exterior

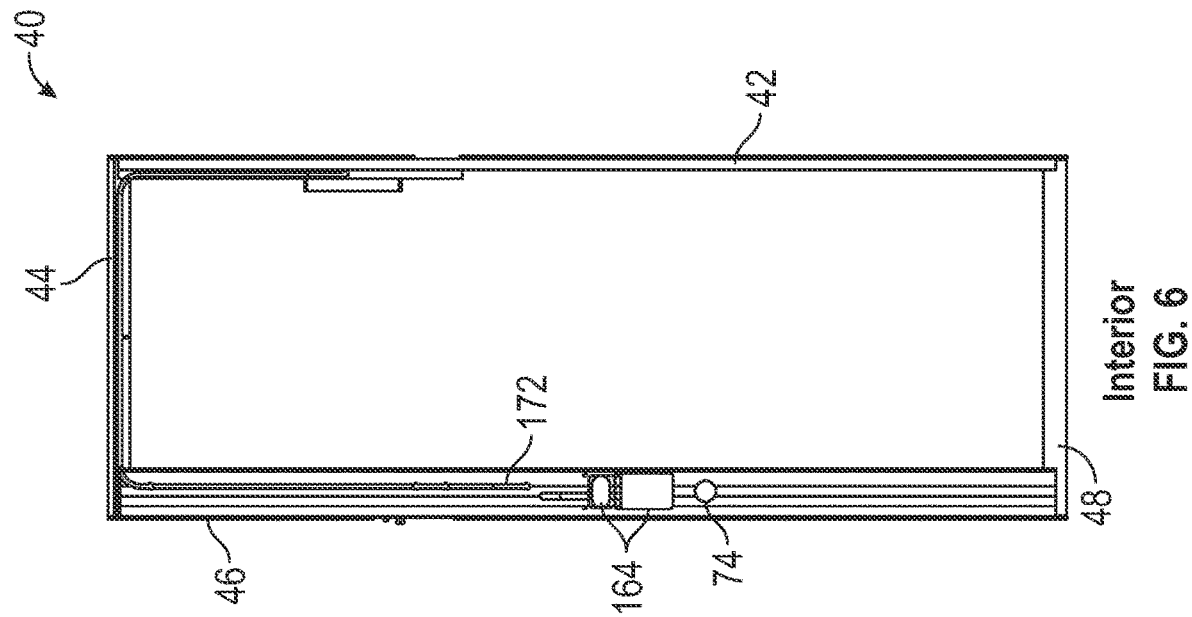
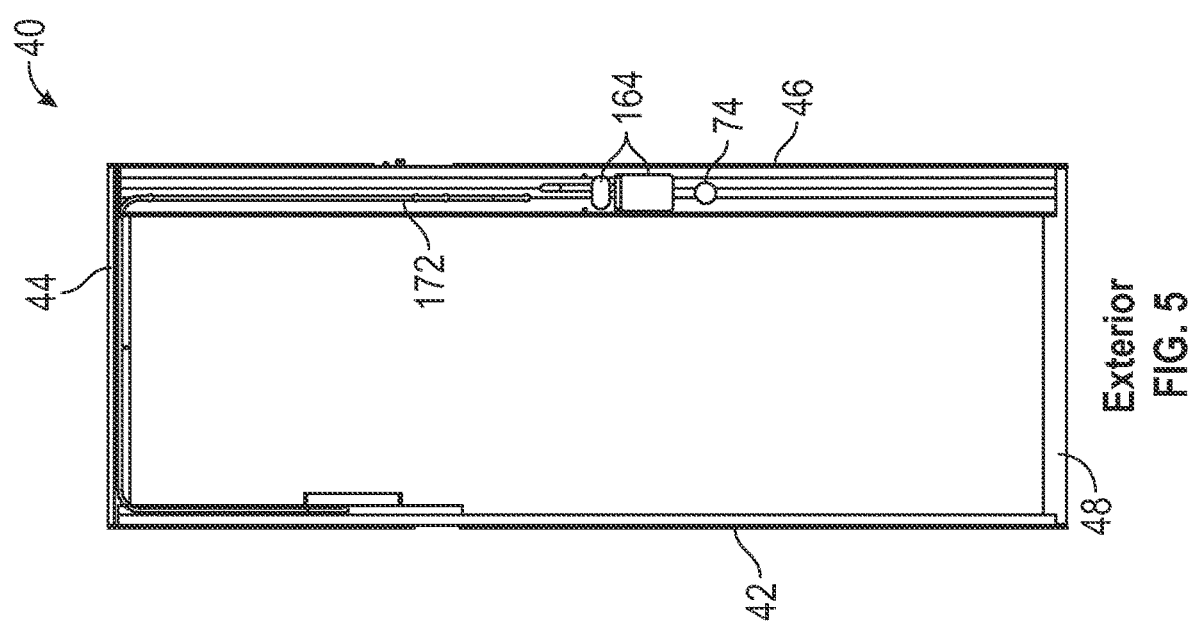

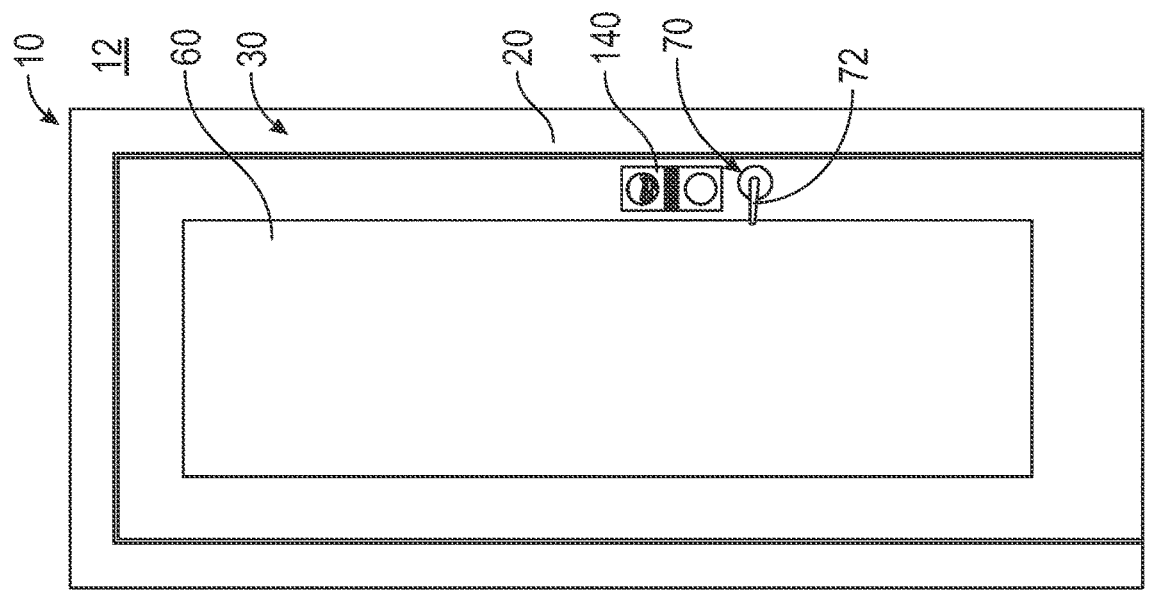
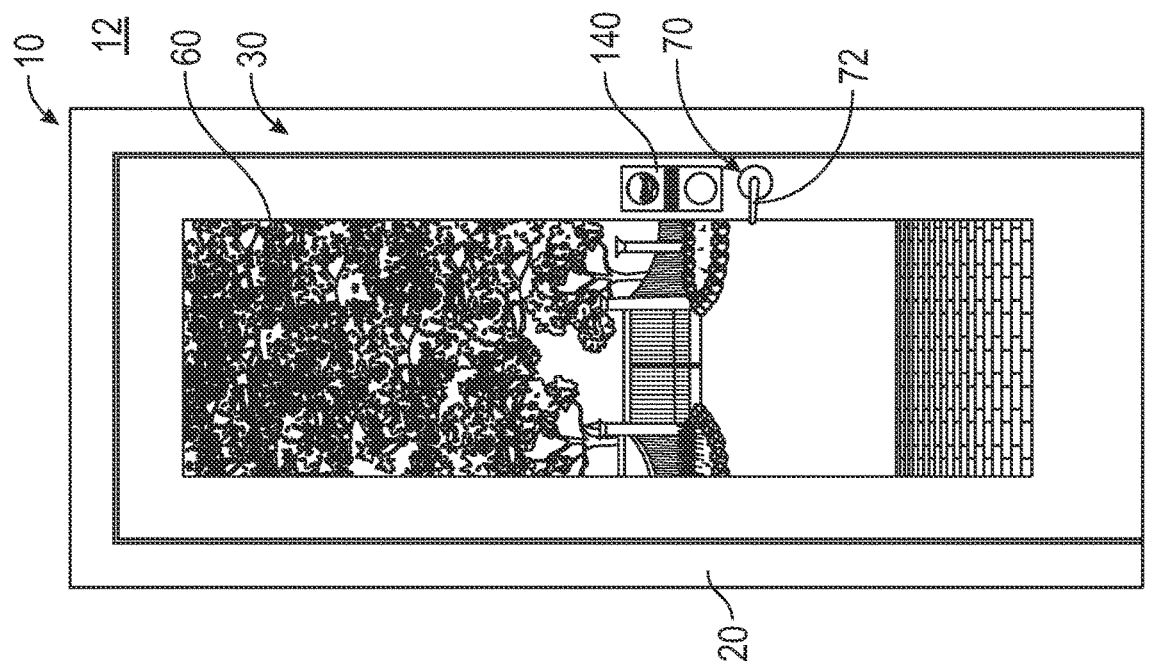

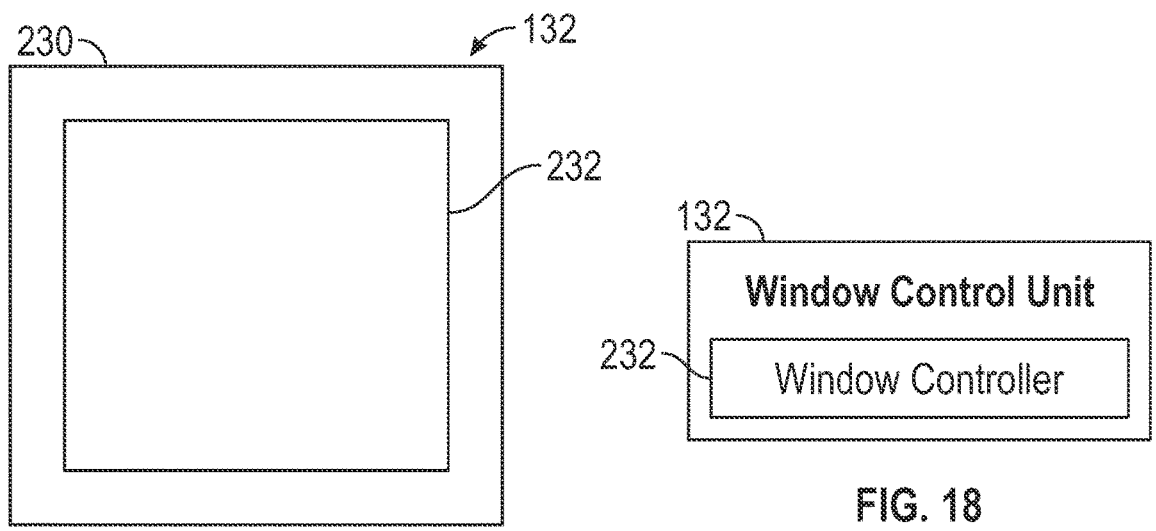
FIG. 17
FIG. 18
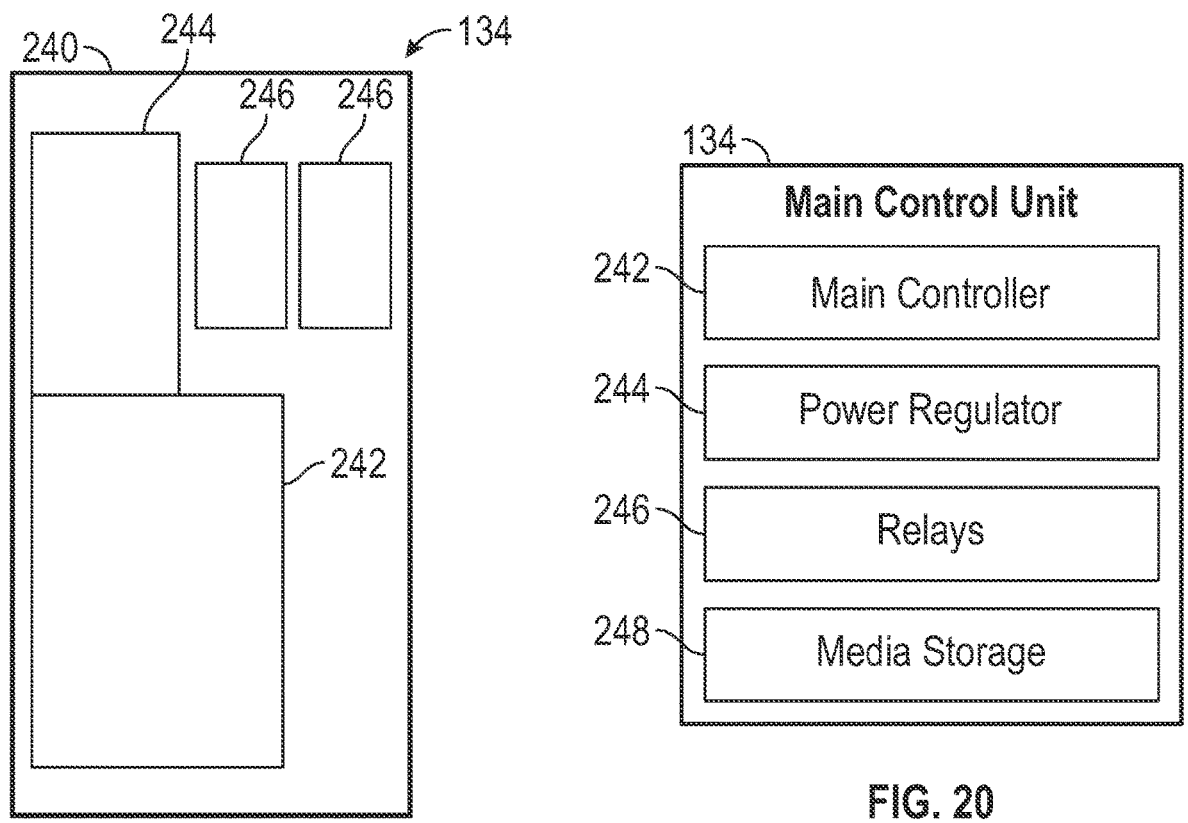
FIG. 19
FIG. 20

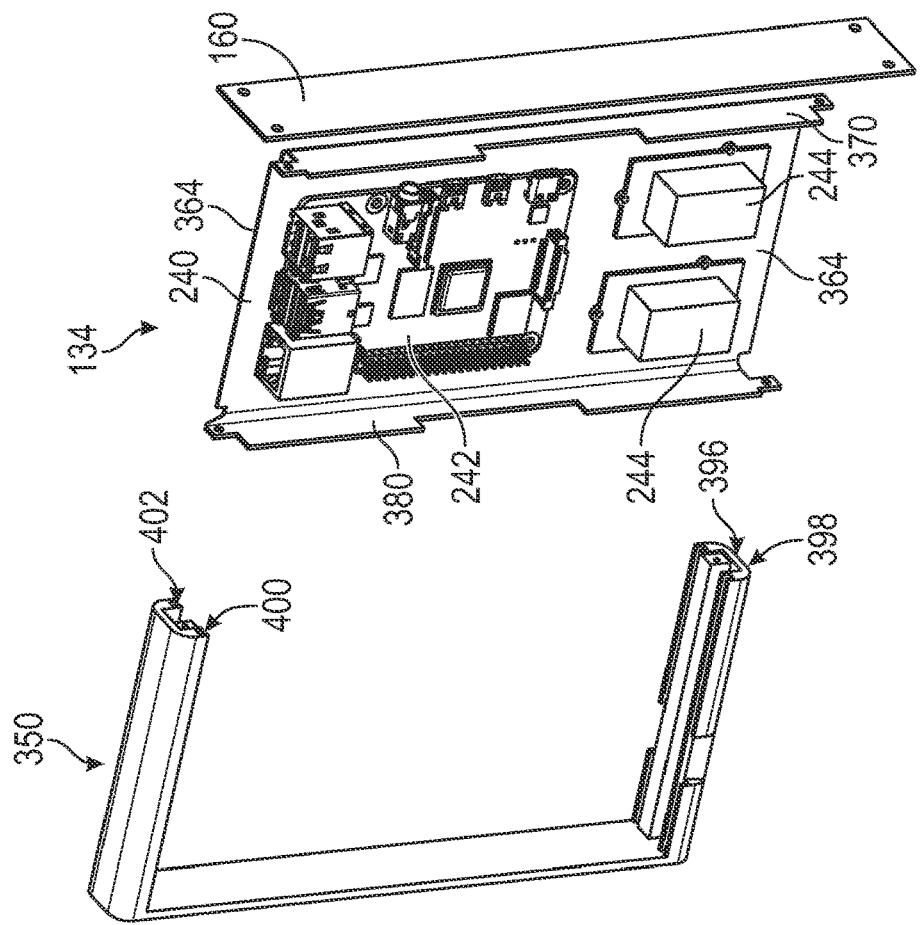
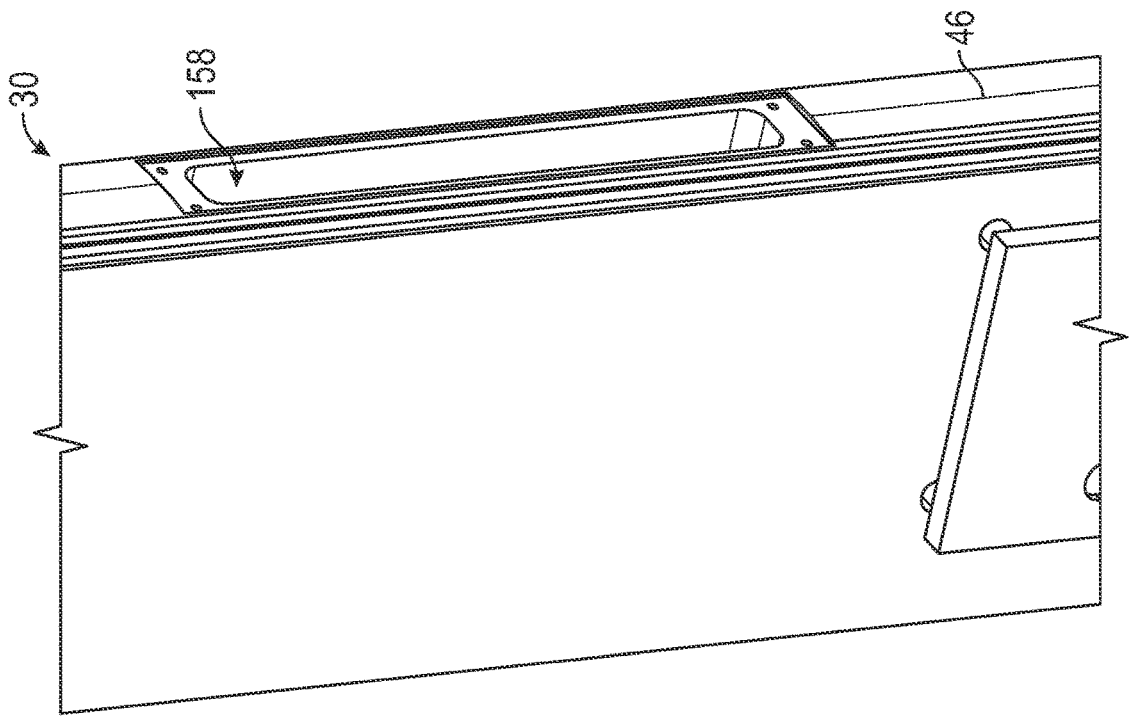
FIG. 26

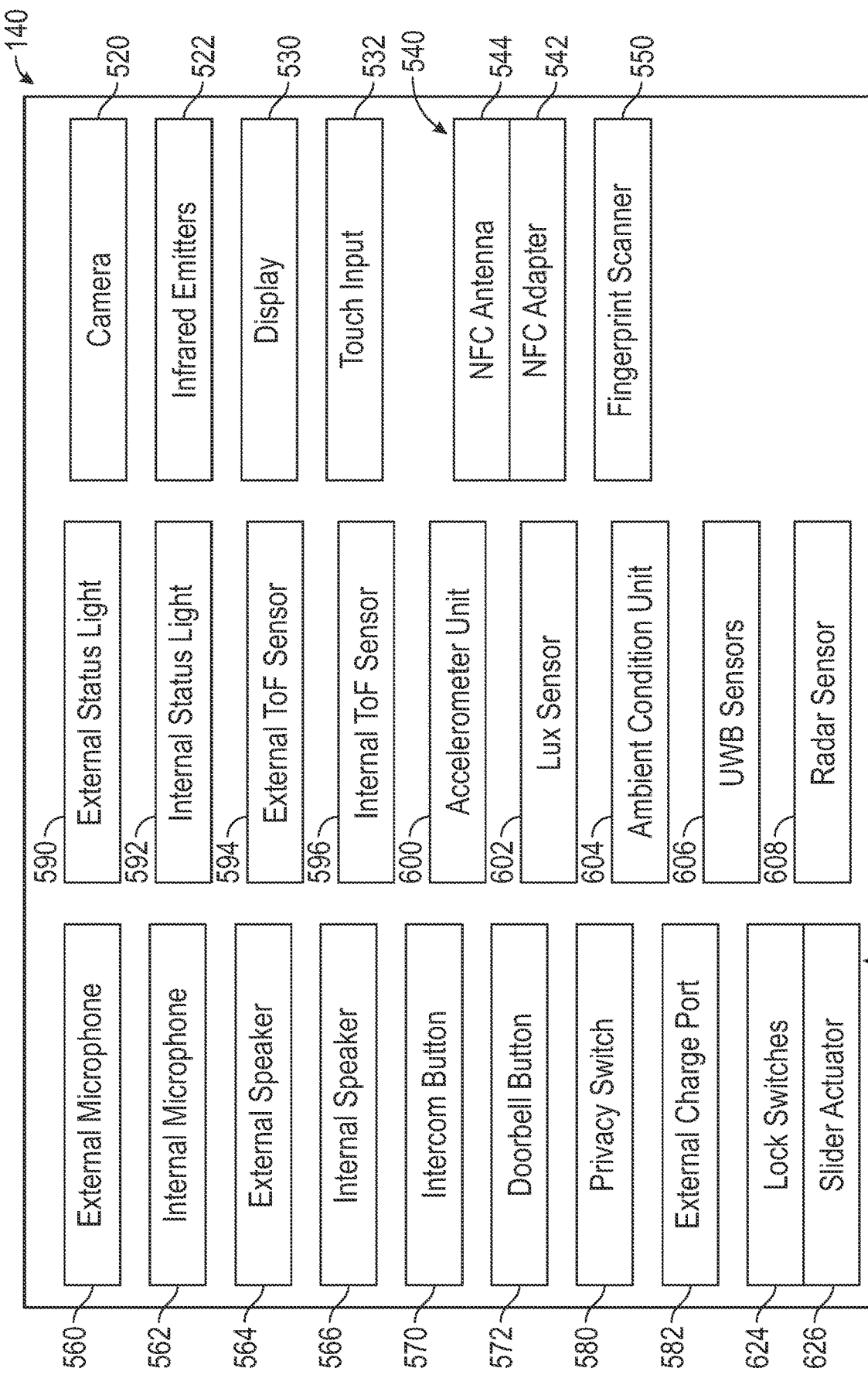

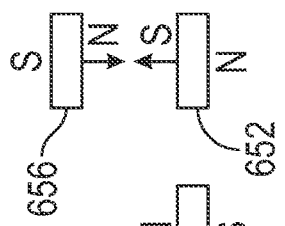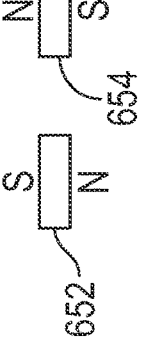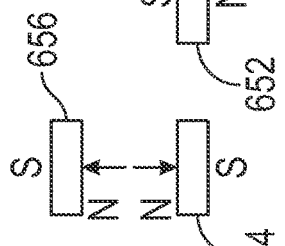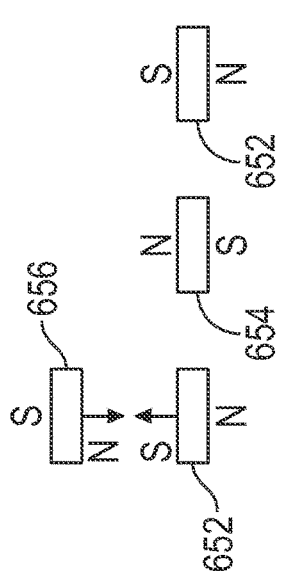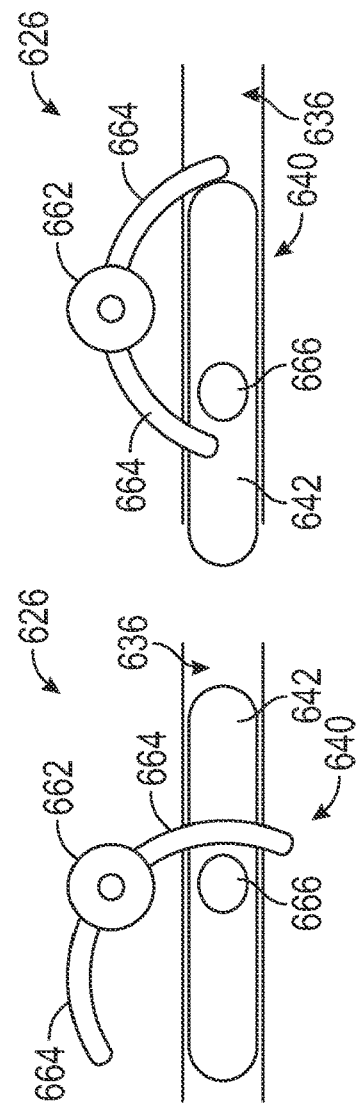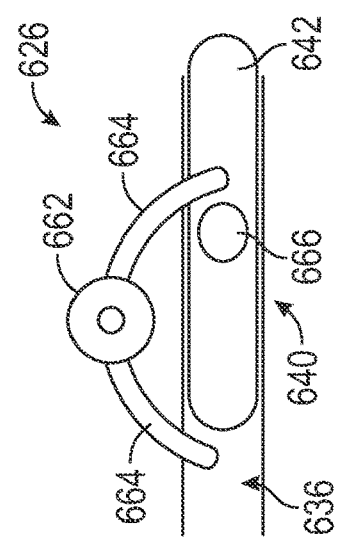

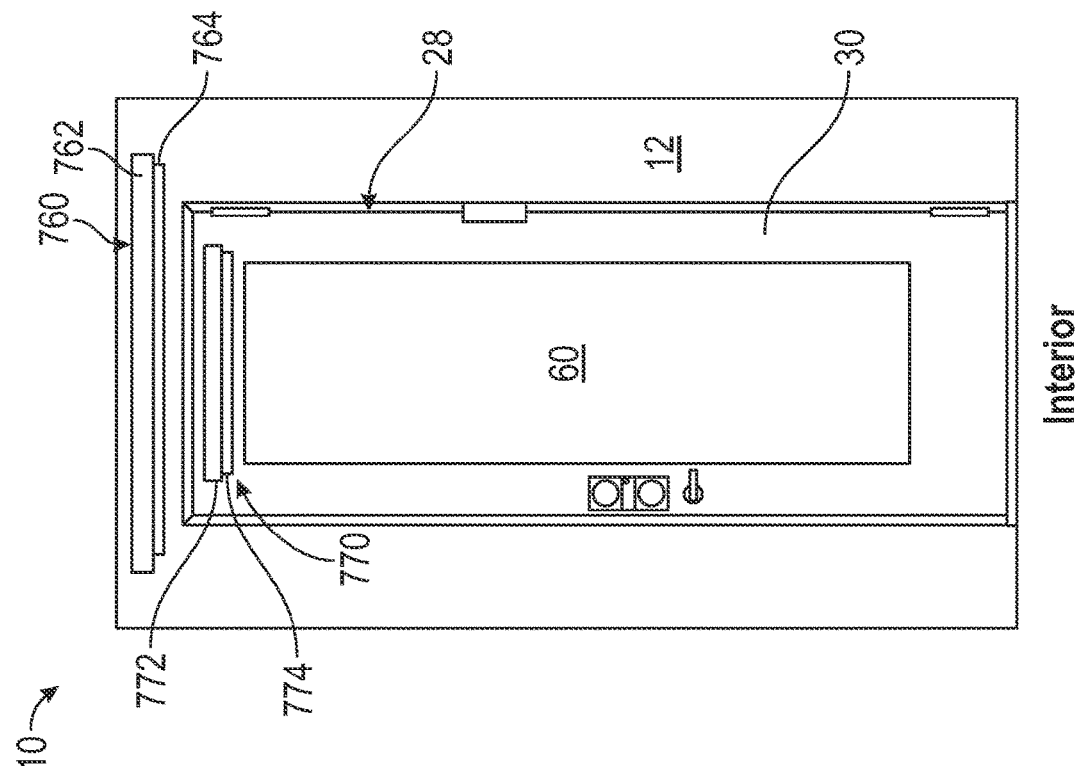
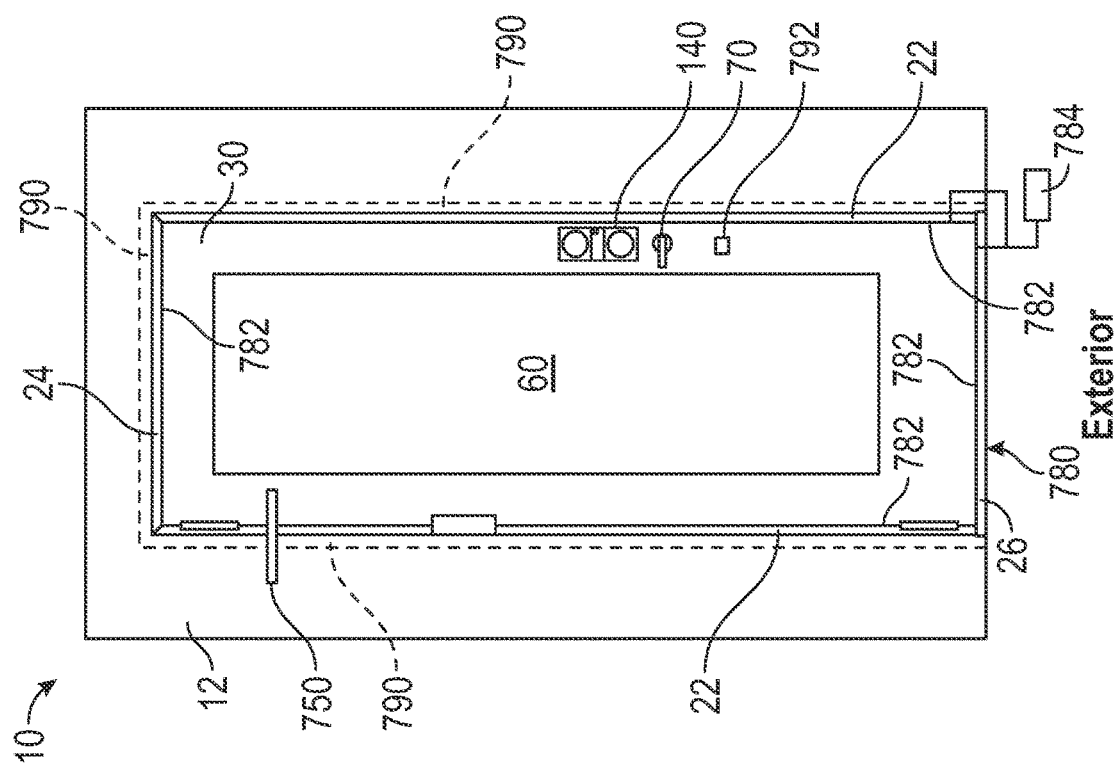

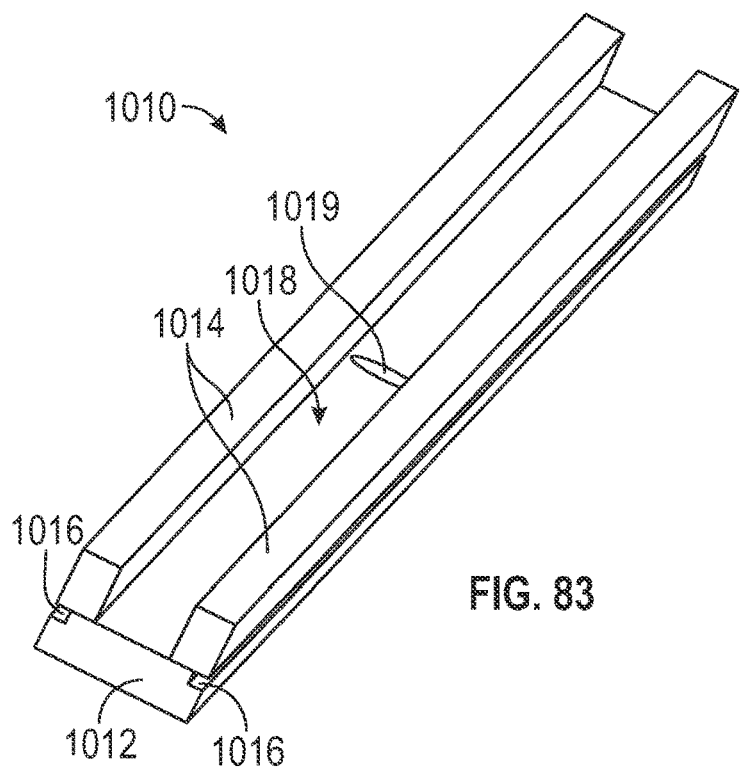
FIG. 83
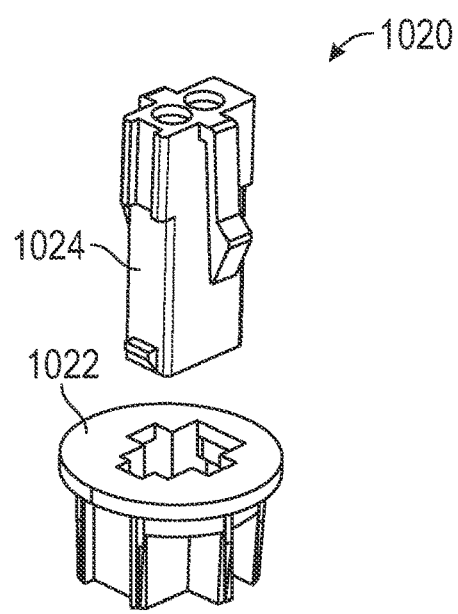
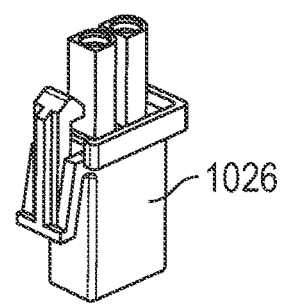
FIG. 84

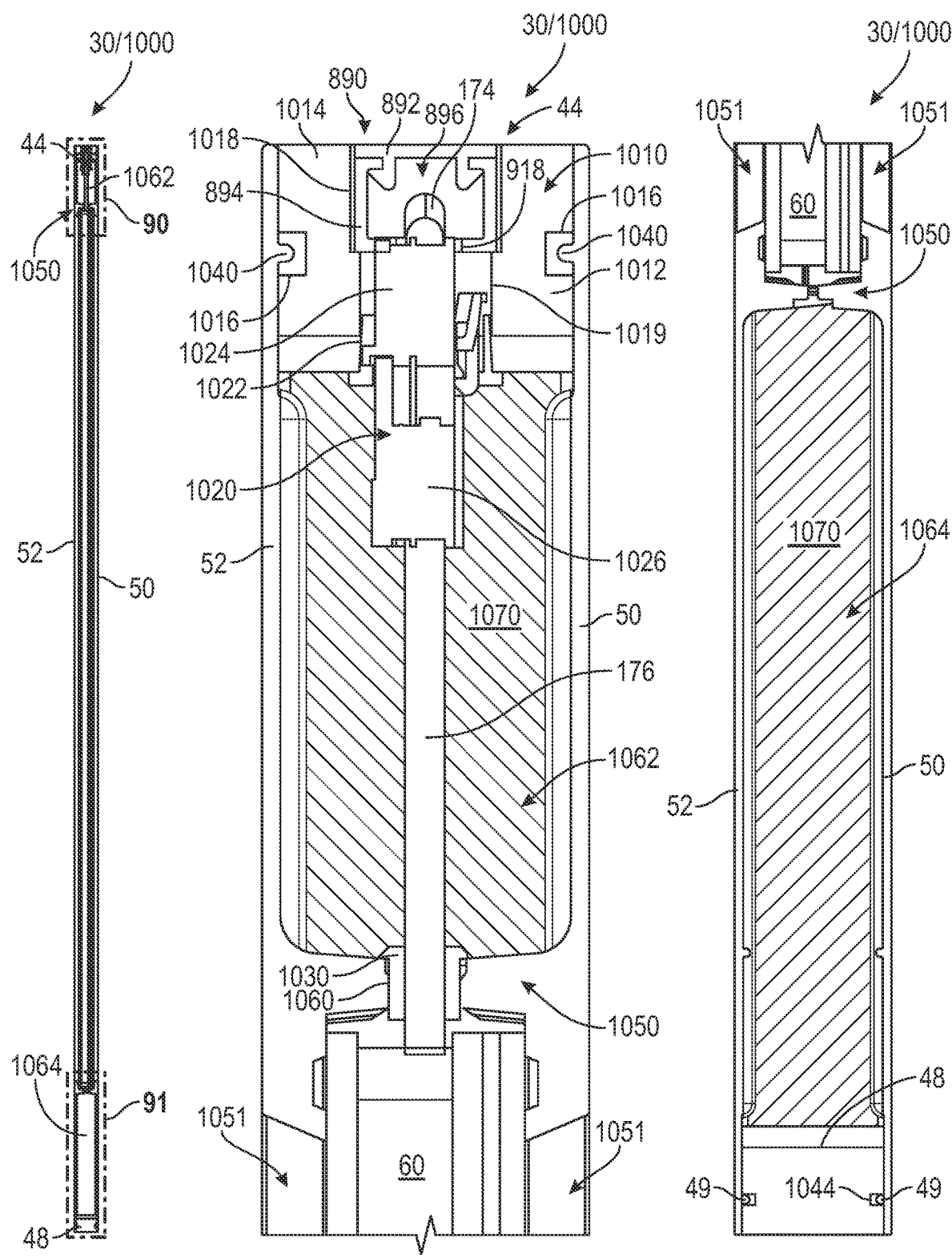

ELECTRONIC DOOR SYSTEM

CROSS-REFERENCE TO RELATED PATENT APPLICATIONS

This application is a National Stage filing of International Application No. PCT/US2023/026767, filed Jun. 30, 2023, which claims the benefit and priority of (a) U.S. Provisional Patent Application No. 63/357,709, filed Jul. 1, 2022, and (b) U.S. Provisional Patent Application No. 63/430,280, filed Dec. 5, 2022, both of which are incorporated herein by reference in their entireties.

BACKGROUND

The present disclosure relates generally to systems for monitoring and controlling entry into a structure. More specifically, the present disclosure relates to a system for electronically controlling a door.

SUMMARY

One embodiment relates to an electronic door system. The electronic door system includes a door frame, a door hingedly coupled to the door frame, an electrically-controllable component coupled to or disposed within the door, a door wiring harness, and a cover. The door defines a channel extending along at least a portion of a peripheral edge thereof. The door wiring harness includes a wire extending along and within the channel. The wire is coupled to the electrically-controllable component. The cover extends along the peripheral edge and covers the channel.

Another embodiment relates to an electronic door system. The electronic door system includes a door frame, a frame wiring harness extending through the door frame, a light strip, a light cover, a door hingedly coupled to the door frame, an electrically-controllable component coupled to or disposed within the door, a door wiring harness coupled to the frame wiring harness and the electrically-controllable component, a channel cover, an access panel configured to be positioned in a location spaced from the door and the door frame, a power converter disposed within the access panel, a backup battery disposed within the access panel, a power management controller disposed within the access panel and coupled to the power converter and the backup battery, and an access panel wiring harness coupled to the power management controller and the frame wiring harness. The door frame includes a first side jamb, a second side jamb, a head jamb, and a sill. At least one of the first side jamb or the second side jamb defines a light channel extending substantially along an entire longitudinal length thereof. The light strip is disposed within and extends along the light channel. A portion of the light strip extends into the head jamb and is connected to the frame wiring harness. The light cover encloses the light strip within the light channel. The door defines a wire channel extending along at least a portion of a peripheral edge thereof. The door wiring harness includes one or more wires extending along and within the wire channel. The channel cover extends along the peripheral edge and covers the channel. The power converter is configured to receive AC power from a mains power source and convert the AC power to DC power.

Still another embodiments relates to an electronic door system. The electronic door system includes a door frame, a door hingedly coupled to the door frame, an electronic locking mechanism coupled to the door and configured to secure the door to the frame in a closed position, one or more first sensors, at least one of (a) a second sensor or (b) a capacitive touch doorknob or handle, and a controller. The controller is configured to determine a location of the user relative to the door based on one or more first signals acquired from the one or more first sensors, determine an access intent of the user based on a second signal acquired from the at least one of (a) the second sensor or (b) the capacitive touch doorknob or handle, and make a door access decision to unlock the electronic locking mechanism at least partially based on the location of the user indicating that the user is outside and not inside of a building within which the electronic door system is installed and the access intent indicating that the user is attempting to enter the building.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE FIGURES

The disclosure will become more fully understood from the following detailed description, taken in conjunction with the accompanying figures, wherein like reference numerals refer to like elements, in which:

FIG. 1 is a front view showing an exterior side of a door system, according to an exemplary embodiment.

FIG. 2 is a rear view showing an interior side of the door system of FIG. 1, according to an exemplary embodiment.

FIG. 3 is an exploded view of an exterior side of a door of the door system of FIG. 1, according to an exemplary embodiment.

FIG. 4 is an exploded view of an interior side of the door of FIG. 3, according to an exemplary embodiment.

FIG. 5 is a front view showing an exterior side of a subframe of the door of FIG. 3, according to an exemplary embodiment.

FIG. 6 is a rear view showing an interior side of the subframe of FIG. 5, according to an exemplary embodiment.

FIG. 7 is a rear view showing the interior side of the door system of FIG. 1 with a window of the door system in a viewing state, according to an exemplary embodiment.

FIG. 8 is another rear view showing the interior side of the door system of FIG. 1 with the window of the door system in a privacy state, according to an exemplary embodiment.

FIG. 17 is a top view of a window control unit of the control system of FIG. 9B, according to an exemplary embodiment.

FIG. 18 is a block diagram of the window control unit of FIG. 17, according to an exemplary embodiment.

FIG. 19 is a top view of a main control unit of the control system of FIG. 9B, according to an exemplary embodiment.

FIG. 20 is a block diagram of the main control unit of FIG. 19, according to an exemplary embodiment.

FIG. 26 is an exploded perspective view of the door of FIG. 3 showing the main control unit of FIG. 19, according to an exemplary embodiment.

FIG. 39 is a block diagram of an interactive unit of the control system of FIG. 9B, according to an exemplary embodiment.

FIGS. 50-52 are top views of a magnet arrangement of the lock control interface of FIG. 48 in various configurations, according to an exemplary embodiment.

FIGS. 53-55 are rear views of a slider actuator of the lock control interface of FIG. 48 in various configurations, according to an exemplary embodiment.

FIG. 62 is another front view showing the exterior side of the door system of FIG. 1.

FIG. 63 is another rear view showing the interior side of the door system of FIG. 1.

FIG. 83 is a detailed view of a support of a top rail of the door assembly of FIG. 82, according to an exemplary embodiment.

FIG. 84 is a detailed view of an electrical connector of the door assembly of FIG. 82, according to an exemplary embodiment.

FIG. 89 is a cross-sectional view of the door assembly of FIG. 82, according to an exemplary embodiment.

FIGS. 90 and 91 are detailed views of the door assembly of FIG. 89, according to an exemplary embodiment.

DETAILED DESCRIPTION

Figure 9A:
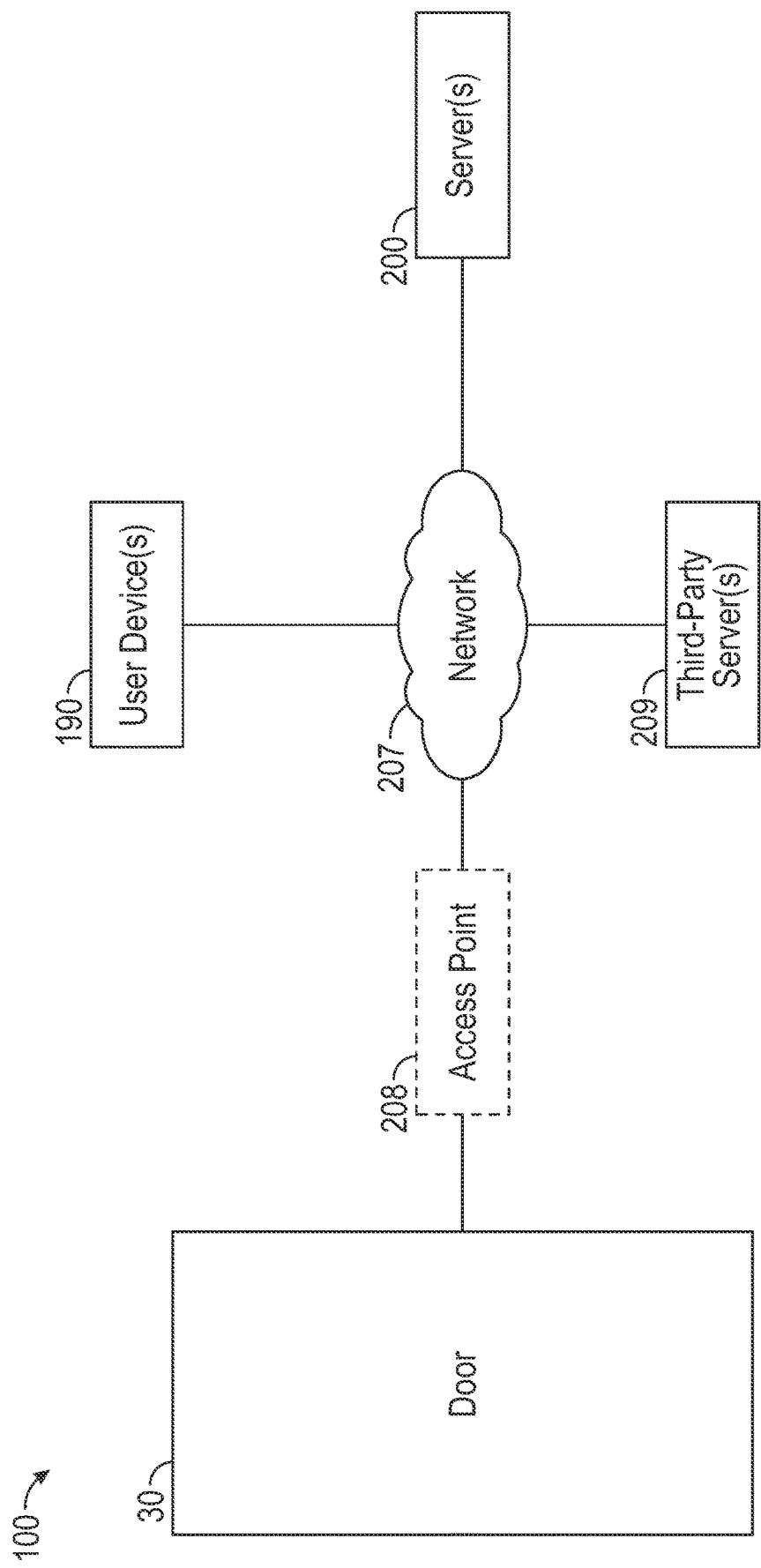
FIG. 9A is a block diagram of a control system of the door system of FIG. 1, according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the figures, an electronic door system includes a door that is hingedly coupled to a door frame. In some embodiments, the door includes a series of modules that each facilitate certain functionalities within the door. The door may include a main control module that handles general processing within the door system. The door may include a power supply module that controls the transfer, conversion, and distribution of electrical energy throughout the door. The door may include a window control module that controls the operation of an electrochromic or electrically-operated privacy window. The door may include one or more deadbolt modules that each electronically control the operation of a respective deadbolt. The door may include a bridge module that controls communication with devices outside of the door. Each of these modules may be mounted on a tray that is received within a recess defined by the door. The trays may be mounted in a forward orientation or a reverse orientation to facilitate converting the door between a right hand configuration and a left hand configuration. The door system may further include a doorbell module positioned outside of the door and configured to control an external doorbell.

In some embodiments, the modules of the door system each include a controller, such that the modules can perform their respective functions independently. The modules may communicate data wirelessly between one another, forming a wireless mesh network. The mesh network can wirelessly accept communication with new modules, such that a module can be easily added or replaced by simply supplying power to the new module.

In some embodiments, the bridge module and the main control module both communicate with a user interface. The user interface may include a camera and/or a touchscreen display that displays image data from the camera. The user interface may be modular such that the display can be added or removed by the end user. When a user removes the display, the image data from the camera may be viewed remotely on a user device.

Overview of Door System

Referring to FIGS. 1 and 2, an electronic door system or electronic door assembly is shown as door system 10, according to an exemplary embodiment. The door system 10 may facilitate selective access to a structure or building, such as a home, an apartment, a garage, or a commercial building, having one or more walls 12. While the door system 10 may be discussed herein as being used with a home, it should be understood that the door system 10 may alternatively be used with any other type of structure. By way of example, the door system 10 may prevent access to an interior of the structure by unauthorized users and permit access to the interior of the structure by authorized users (e.g., homeowners, residents, invited guests, etc.). The door system 10 may provide one or more electronic systems that facilitate control over access to the interior of the structure.

The door system 10 includes a stationary portion or door frame 20 coupled to or installed within the wall 12. The door frame 20 includes a series of frame sections, shown as side jambs 22, head jamb 24, and sill 26. The side jambs 22 extend substantially vertically and are laterally offset from one another. The head jamb 24 extends substantially horizontally between the top end portions of the side jambs 22. The sill 26 extends substantially horizontally between the bottom end portions of the side jambs 22. Together, the side jambs 22, the head jamb 24, and the sill 26 define a passage, aperture, or opening, shown as doorway 28 therebetween. The doorway 28 may be sized to facilitate the passage of one or more users through the doorway 28.

The door system 10 further includes a movable portion, body, door slab, or door leaf, shown as door 30. The door 30 is movably coupled to the door frame 20 by one or more hinges, shown as hinges 32. Specifically, the hinges 32 are each coupled to a side jamb 22 and to the door 30. As shown, the hinges 32 pivotally couple the door 30 to the door frame 20 such that the door is pivotable or rotatable about a substantially vertical axis. In other embodiments, the door 30 is otherwise movably coupled to the door frame 20 (e.g., slidably coupled).

The door 30 is selectively repositionable between (a) a blocking position, shut position, or closed position and (b) an unobstructed position or open position. In the closed position, the door 30 extends across the doorway 28, preventing movement of a user through the doorway 28. In the open position, the door 30 is moved out of the doorway 28, permitting movement of the user through the doorway 28. The door 30 may swing inward (e.g., into the structure) and/or outward (e.g., away from the structure). In some configurations, the door 30 is coupled to a first one of the side jambs 22. In other configurations, the door 30 is coupled to the other of the side jambs 22. In some embodiments, the door 30 can be coupled to either of the side jambs 22 according to a preference of the user. Accordingly, the door 30 can be configured as a right hand door or a left hand door.

Referring to FIGS. 1-6, the door 30 includes a frame or door substructure, shown as subframe 40. The subframe 40 includes a series of frame members or structural members including (a) a first stile or vertical member, shown as hinge stile 42, (b) a first rail or horizontal member, shown as top rail 44, (c) a second stile or vertical member, shown as lock stile 46, and (d) a second rail or horizontal member, shown as bottom rail 48. The hinge stile 42, the top rail 44, the lock stile 46, and the bottom rail 48 are fixedly coupled to one another to form the subframe 40. The lock stile 46 extends substantially vertically and is positioned adjacent a first one of the side jambs 22. The hinges 32 may be directly coupled to the hinge stile 42. The lock stile 46 extends substantially vertically and is positioned adjacent the other side jamb 22. The top rail 44 extends substantially horizontally between the hinge stile 42 and the lock stile 46 and is positioned adjacent the head jamb 24. The bottom rail 48 extends substantially horizontally between the hinge stile 42 and the lock stile 46 and is positioned adjacent the sill 26. In some embodiments, the subframe 40 is made from wood, such as engineered wood or hardwood. In other embodiments, the subframe 40 is made from another material, such as metal, plastic, or a composite material (e.g., fiberglass).

The door further includes a first panel, front panel, or door skin, shown as exterior skin 50, and a second panel, rear panel, or door skin, shown as interior skin 52. The exterior skin 50 extends along a first side (e.g., a front side or exterior side) of the subframe 40. The interior skin 52 extends along a second side (e.g., a rear side or interior side) of the subframe 40. The exterior skin 50 and/or the interior skin 52 may be fixedly coupled to the subframe 40. In some embodiments, the exterior skin 50 and the interior skin 52 may be removably coupled to the subframe 40 (e.g., to facilitate access to the interior of the door 30 for maintenance or assembly). In some embodiments, the exterior skin 50 and the interior skin 52 are made from a composite material, such as fiberglass. In other embodiments, the exterior skin 50 and the interior skin 52 are made from another material, such as plastic, wood, or metal. While described herein as being a door assembly including the subframe 40, the exterior skin 50, and the interior skin 52, in some embodiments, the door 30 is configured as a solid core door.

The door 30 further includes one or more panes of transparent material (e.g., glass, polycarbonate, etc.) or privacy windows, shown as window 60. As shown, the window 60 is positioned adjacent the center of the door 30, such that the window 60 is surrounded on the top, bottom, left, and right sides by the subframe 40. The window 60 provides a line of sight through the door 30. The window 60 may be held in place by (e.g., fixedly coupled to) the subframe 40, the exterior skin 50, and/or the interior skin 52. In some embodiments, the door 30 includes a single, uninterrupted window 60 (e.g., as shown in FIG. 1). In other embodiments, the door 30 includes multiple windows 60. In yet other embodiments, the window 60 is omitted.

In some embodiments, the window 60 is operable (e.g., electrically) to vary a visibility level through the window 60. By way of example, the window 60 may be made from and/or coated with an electrochromic material that changes opacity in response to an applied voltage. In some embodiments, the visibility level of the window 60 is varied in response to a user input, permitting the user to control the visibility level of the window 60. This variable visibility level may facilitate a clear line of sight through the door 30 when desired by the user and obscuring the line of sight through the door 30 when the user desires additional privacy.

In a first state, transparent state, or viewing state (e.g., as shown in FIG. 7), the window 60 is clear, such that a line of sight is permitted through the window 60. Specifically, in the viewing state, the window 60 may provide (a) a first line of sight through the window 60 from the exterior side of the door 30 toward the interior side of the door 30 and/or (b) a second line of sight through the window 60 from the interior side of the door 30 toward the exterior side of the door 30. By way of example, the viewing state may be used when a user on the interior side of the door 30 wishes to permit an individual on the exterior side of the door 30 to see through the door 30. By way of another example, the viewing state may be used when a user on the interior side of the door 30 wishes to let light through the window 60 to brighten the inside of the home or when the user wishes to see an object on the opposite side of the door.

In a second state, translucent state, opaque state, tinted state, or privacy state (e.g., as shown in FIG. 8), an opacity of the window 60 increases relative to the viewing state such that the line of sight through the window 60 is at least partially obscured (e.g., the window 60 becomes tinted or otherwise changes opacity). In the privacy state, the window 60 may partially obscure the line of sight such that some light still passes through the window 60 (e.g., the window 60 is translucent or partially tinted). In the privacy state, the window 60 may be completely opaque (e.g., heavily tinted), preventing any line of sight through the window 60. In some embodiments, the window 60 has multiple privacy states, each with differing levels of opacity. By way of example, the privacy state or privacy states may be utilized when a user wishes to prevent individuals on the exterior of the door 30 from looking through the window 60, when the user wishes to limit the amount of light passing through the window 60 (e.g., to control the brightness of a room), and/or when the user wishes to prevent an individual on the interior of the door 30 from looking through the window 60 (e.g., to reduce visual distractions from passersby).

In other embodiments, the window 60 is made from a material having a constant opacity (e.g., a non-variable opacity). In yet other embodiments, the window 60 permits a first line of sight through the window 60 from the interior side of the door 30 toward the exterior side of the door 30 and prevents a second line of sight through the window 60 from the exterior side of the door 30 toward the interior side of the door 30. By way of example, the window 60 may be constructed as a two-way mirror.

Referring to FIGS. 1, 2, 7, and 8, the door 30 includes an interface assembly, lockset, or handle assembly, shown as handle assembly 70. The handle assembly 70 serves as an interface through with the user can control opening and closing of the door 30. The handle assembly 70 includes a pair of interfaces (e.g., handles, knobs, pulls, push plates, etc.), shown as handles 72, configured to interface with a hand of a user. Specifically, a first handle 72 is positioned on the exterior side of the door 30, and a second handle 72 is positioned on the interior side of the door. The user may apply a pushing or pulling force onto the handle 72 to move the door 30 toward the open position or the closed position, as desired.

In some embodiments, the handle assembly 70 includes a latch and/or main deadbolt that extends outward from the door 30 to be received within a corresponding pocket or pockets defined by the door frame 20 to hold the door 30 in the closed position and/or locked configuration. In some such embodiments, the latch may be retracted by moving (e.g., rotating) one or both of the handles 72 relative to the rest of the door 30 and/or the main deadbolt may be retracted by turning a deadbolt thumb turn. Once retracted, the door 30 may be moved out of the closed position. In some embodiments, components of the handle assembly 70 operates mechanically and/or electromechanically (e.g., the handle assembly 70 includes an electromechanical locking mechanism such as an electronic main deadbolt). In some embodiments, the handle assembly 70 can be operated by either handle 72.

Referring to FIGS. 3-6, the door 30 defines a passage or recess, shown as handle bore 74. The handle bore 74 extends through the door 30 from an exterior face to an interior face. Specifically, the handle bore 74 is defined by and extends through the exterior skin 50, the lock stile 46, and the interior skin 52. The handle bore 74 may receive the handle assembly 70, coupling the handle bore 74 to the subframe 40. In some embodiments, the handle bore 74 is vertically positioned on the door 30 to place the handle assembly 70 at waist height for a user.

Referring to FIGS. 3, 4, 9A, and 9B, the door system 10 includes an electronic control system, modular control system, or intelligent control system, shown as control system 100. The control system 100 may provide one or more features or functions that facilitate operation of the door system 10. The control system 100 may receive one or more inputs (e.g., sensor inputs, user commands, etc.) and provide one or more outputs (e.g., lights, sounds, movement of actuators, etc.). The control system 100 may provide certain features that are not available on other doors, such as remote operation, autonomous operation, and/or improved intrusion resistance, among other features.

Referring to FIGS. 1-4 and 9B, the control system 100 may be at least partially powered by an external power source or external power supply, shown as power source 102. The power source 102 is configured to supply electrical energy to power operation of the door 30 and the electronic components thereof. By way of example, the power source 102 may supply electrical energy from a power grid (e.g., a municipal power grid), generators, solar panels, wind turbines, batteries, capacitors, fuel cells, or other sources. The power source 102 may be positioned inside and/or outside of the structure having the walls 12.

The control system 100 further includes one or more power converters or power conditioners (e.g., transformers, alternating current (AC) to direct current (DC) rectifiers, DC to AC inverters, etc.), shown as power converter 104. As shown, the power converter 104 is positioned within the wall 12 and adjacent the doorway 28. The power converter 104 may condition the electrical energy prior to the electrical energy being transferred into the door 30. By way of example, the power converter 104 may change the electrical energy between AC and DC, vary a voltage or current of the electrical energy, or otherwise condition or convert the electrical energy. In one example, the power converter 104 receives electrical energy from the power source 102 at 120V AC and converts the electrical energy to 24V DC. In other embodiments, the power converter 104 is omitted, and the electrical energy is delivered directly from the power source 102 (e.g., to the power transfer assembly 106).

The control system 100 further includes a power transfer device or power transfer unit, shown as power transfer assembly 106, that is coupled to the door 30 and the door frame 20. The power transfer assembly 106 is configured to transfer electrical energy from the power converter 104 (or directly from the power source 102) to the door 30. In order to facilitate operation of door 30 by a user, the power transfer assembly 106 facilitates movement of the door 30 (e.g., by bending, sliding, rotating, or otherwise moving with the door 30). In some embodiments, the power converter 104 converts the electrical energy to a format that the power transfer assembly 106 is configured to transfer. By way of example, the power transfer assembly 106 may be rated to transfer electrical energy at 24V DC, and the power converter 104 may convert the electrical energy form the power source 102 to 24V DC prior to the electrical energy reaching the power transfer assembly 106.

Figure 10:
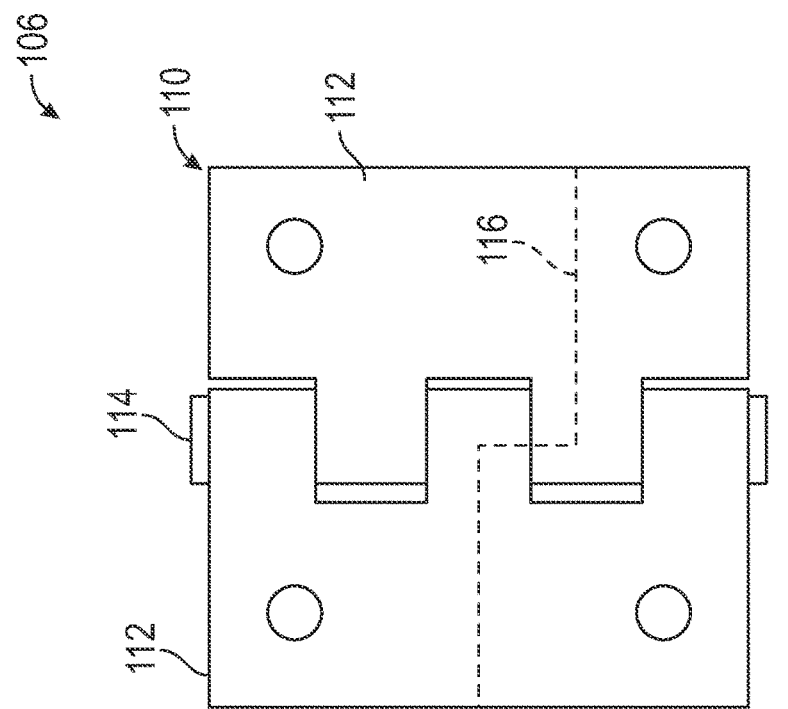

In some embodiments, the power transfer assembly 106 includes an electric power transfer hinge. FIG. 10 illustrates a power transfer hinge 110 of the power transfer assembly 106, according to an exemplary embodiment. The power transfer hinge 110 includes a pair of hinge bodies, shown as hinge leaves 112, that are movably (e.g., pivotally) coupled to one another by a pin 114. One of the hinge leaves 112 may be coupled to a side jamb 22, and the other hinge leaf 112 may be coupled to the hinge stile 42. Wires or cables, shown as wires 116, pass through a passage or raceway defined through the hinge leaves 112. Beneficially, the power transfer hinge 110 may completely obscure the wires 116 from view (e.g., to prevent tampering and exposure to contaminants). The wires 116 may be electrically coupled to the power converter 104. In some embodiments, the power transfer hinge 110 is configured to transfer electrical energy at 24V DC. In other embodiments, the power transfer hinge 110 has a different mechanical arrangement.

Figure 11:
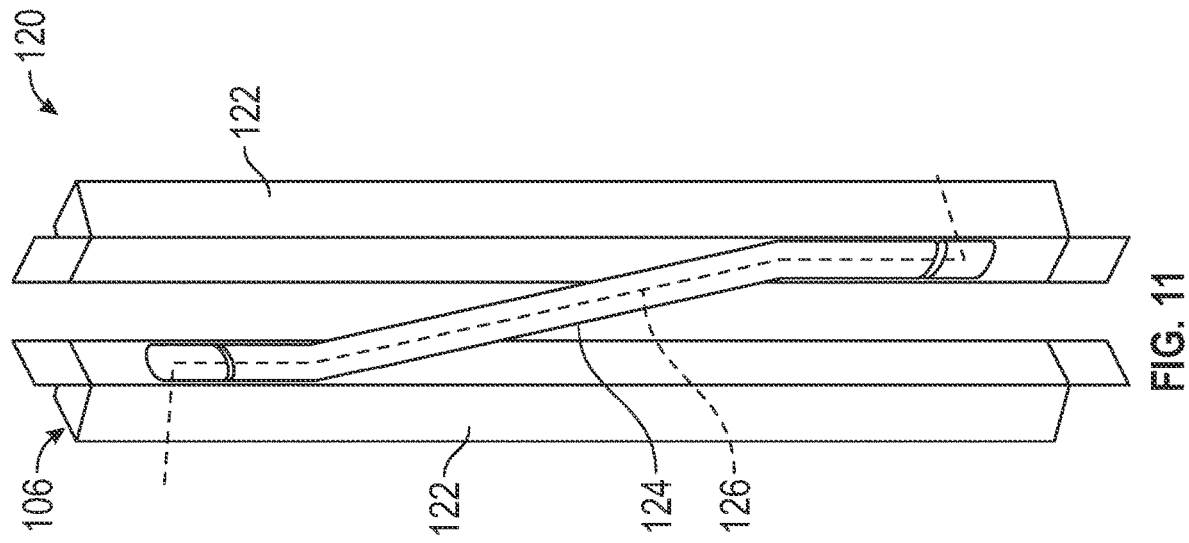
FIGS. 10-13 are various views of power transfer assemblies of the door system of FIG. 1, according to various exemplary embodiments.

In some embodiments, the power transfer assembly 106 includes an electric power transfer cable. FIG. 11 illustrates a power transfer cable 120 of the power transfer assembly 106, according to an exemplary embodiment. The power transfer cable 120 includes a pair of base members, shown as mounts 122. One of the mounts 122 may be coupled to a side jamb 22. The other mount 122 may be coupled to hinge stile 42. A flexible conduit (e.g., a tube, a pipe, a hose, a sleeve, etc.), shown as conduit 124, has a first end portion coupled to one mount 122 and a second, opposite end portion coupled to the other mount 122. The conduit 124 defines a passage containing one or more wires or cables, shown as wires 126. Beneficially, the power transfer cable 120 may completely obscure the wires 126 from view. The wires 126 may be electrically coupled to the power converter 104. The conduit 124 may be flexible and/or flexibly mounted such that the conduit 124 can move and flex to accommodate motion of the door 30 without disconnecting the wires 126.

Figure 12:
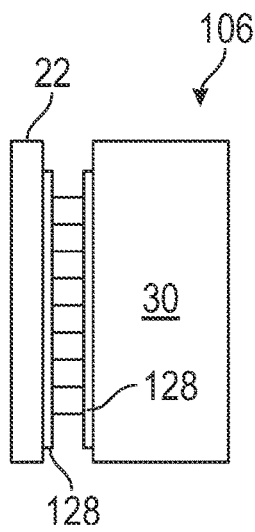

In some embodiments, the power transfer assembly 106 is configured to transfer energy wirelessly. One such example is shown in FIG. 12. In this embodiment, the power transfer assembly 106 includes a pair of wireless power transfer pads, panels, or coils, shown as power transfer panels 128. As shown, one of the power transfer panels 128 is coupled to a side jamb 22, and the other power transfer panel 128 is coupled to the hinge stile 42. The power transfer panels 128 are positioned such that, when the door 30 is in the closed position, the power transfer panels 128 are facing one another, in close proximity with one another, and substantially aligned with one another. The power transfer panels 128 may be configured to transfer electrical energy wirelessly (e.g., through induction). Accordingly, one of the power transfer panels 128 may be configured to receive AC electrical energy from the power converter 104 (or directly from the power source 102). Although the power transfer may be more efficient when the door 30 is in the closed position (e.g., due to the arrangement of the power transfer panels 128), the power transfer panels 128 may still transfer energy between one another even when the door 30 is in the open position.

Figure 13:
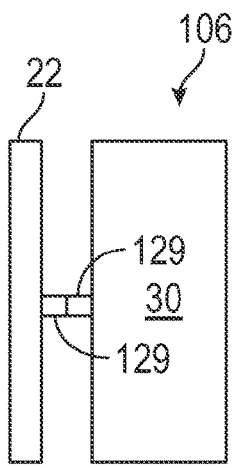

Referring to FIG. 13, another embodiment of the power transfer assembly 106 in which the power transfer assembly 106 includes a pair of electrical contacts or electrical connectors, shown as connectors 129. As shown, one of the connectors 129 is coupled to a side jamb 22, and the other connector 129 is coupled to the hinge stile 42. The connectors 129 are positioned such that, when the door 30 is in the closed position, the connectors 129 engage one another to form an electrical connection. The connectors 129 may disconnect from one another when the door 30 is moved to the open position. Each of the connectors 129 may include one or more electrical contacts that each are configured to engage a corresponding electrical contact of the other connector 129. One of the connectors 129 may be electrically coupled to the power converter 104. The connectors 129 may be configured to transfer AC or DC electrical energy. In one embodiment, one of the connectors 129 is recessed and the other connector 129 protrudes outward. In some embodiments, at least one of the connectors 129 is spring biased, and/or selectively extendable and/or retractable.

Referring to FIGS. 3 and 4, the control system 100 includes a series of modular control sections or modules: a first module or power supply module (e.g., a power management unit), shown as power supply unit 130; a second module or window control module, shown as window control unit 132; a third module or main control module, shown as main control unit 134; a fourth module, communication unit, or wireless bridge, shown as bridge module 136; and one or more fifth modules or lock modules, shown as deadbolt units 138. Each module may be configured to perform one or more dedicated functions. The modules may communicate between one other (e.g., wirelessly). The deadbolt units 138 may be auxiliary or supplementary to a main deadbolt of the handle assembly 70.

The power supply unit 130 may control distribution of electrical energy throughout the door 30. The window control unit 132 may control operation of the window 60 (e.g., changing the configuration of the window 60 between the viewing state and the privacy state). The main control unit 134 may control the overall operation of the door system 10. The bridge module 136 may facilitate communication between the modules/components of the door 30 and one or more external devices (e.g., a user device, a server, a doorbell module, etc.). The deadbolt units 138 each include a lock member that selectively engages the door frame 20 to prevent movement of the door 30 out of the closed position (e.g., in addition to the main deadbolt of the handle assembly 70, etc.).

The control system 100 further includes a first user interface, a first operator interface, a first interface module, or a first interactive unit, shown as interactive unit 140. The interactive unit 140 may act as a user interface to provide information to a user or to receive information (e.g., commands) from a user. The interactive unit 140 may be accessed from the interior side and/or the exterior side of the door 30. In embodiments where the interactive unit 140 is accessible from both the interior side and the exterior side of the door 30, the interactive unit 140 may permit utilizing different functions depending upon which side of the interactive unit 140 is being accessed. In some embodiments, the interactive unit 140 is in wired communication with both the main control unit 134 and the bridge module 136. The main control unit 134 and the bridge module 136 may include controllers that control operation of the interactive unit 140.

Referring to FIGS. 3 and 4, the door 30 defines a series of pockets, recesses, passages, chambers, or receivers each configured to receive one or more of the modules. The recesses permit the modules to be contained within the door 30 while still being accessible (e.g., to facilitate maintenance, upgrades, assembly, etc.).

The door 30 defines a first pocket, recess, passage, chamber, or receiver, shown as power supply recess 150. Specifically, the power supply recess 150 is defined by the hinge stile 42 and extends laterally into the hinge stile 42. The power supply recess 150 receives the power supply unit 130. The power supply recess 150 is sealed by a cover, shown as plate 152, that is removably coupled to the hinge stile 42. When assembled, the power supply unit 130 is fully contained within the door 30 by the hinge stile 42 and the plate 152. The plate 152 may prevent ingress of debris (e.g., water, dust, etc.) into the power supply recess 150.

The door 30 defines a second pocket, recess, passage, chamber, or receiver, shown as window controller recess 154. Specifically, the window controller recess 154 is defined by the lock stile 46 and extends laterally into the lock stile 46. The window controller recess 154 receives the window control unit 132. The window controller recess 154 is sealed by a cover, shown as plate 156, that is removably coupled to the lock stile 46. When assembled, the window control unit 132 is fully contained within the door 30 by the lock stile 46 and the plate 156. The plate 156 may prevent ingress of debris (e.g., water, dust, etc.) into the window controller recess 154.

The door 30 defines a third pocket, recess, passage, chamber, or receiver, shown as main controller recess 158. Specifically, the main controller recess 158 is defined by the lock stile 46 and extends laterally into the lock stile 46. The main controller recess 158 receives the main control unit 134. The main controller recess 158 is sealed by a cover, shown as plate 160, that is removably coupled to the lock stile 46. When assembled, the main control unit 134 is fully contained within the door 30 by the lock stile 46 and the plate 160. The plate 160 may prevent ingress of debris (e.g., water, dust, etc.) into the main controller recess 158.

The door 30 defines a pair of fourth pockets, recesses, passages, chambers, or receivers, shown as deadbolt recesses 162. Specifically, the deadbolt recesses 162 are defined by the lock stile 46 and extend laterally into the lock stile 46. In some embodiments, the deadbolt recesses 162 are additionally or alternatively defined by the top rail 44 and/or the bottom rail 48. The deadbolt recesses 162 each receive one of the deadbolt units 138. The deadbolt units 138 may each engage the lock stile 46 to prevent ingress of debris (e.g., water, dust, etc.) into the deadbolt recesses 162. In other embodiments, the door 30 defines only one deadbolt recess 162 and only receives one deadbolt unit 138. In still other embodiments, the door 30 defines three or more deadbolt recesses 162 and receives three or more deadbolt unites 138.

Referring to FIGS. 5 and 6, the door 30 defines a pair of passages or recesses, shown as interface bores 164. The interface bores 164 extend through the door 30 from an exterior face to an interior face. Specifically, the interface bores 164 are defined by and extend through the exterior skin 50, the lock stile 46, and the interior skin 52. The interactive unit 140 extends through the interface bores 164 to couple the interactive unit 140 to the subframe 40. The interactive unit 140 extends completely through the interface bores 164, such that the interactive unit 140 is exposed on both the interior side and the exterior side of the door 30.

Referring to FIGS. 1-4, the door 30 further includes a first power distribution system or bus, shown as door wiring harness 170, that distributes electrical energy between the modules within the door 30. The door wiring harness 170 is electrically coupled to the power supply unit 130, the window control unit 132, the main control unit 134, the interactive unit 140, the bridge module 136, and the deadbolt units 138. In operation, electrical energy passes from the power source 102 into the power converter 104, which conditions the electrical energy (e.g., to a different voltage or current, to DC, etc.). The converted electrical energy passes through the power transfer assembly 106 to the power supply unit 130. The power supply unit 130 further conditions the electrical energy for use with each of the individual modules and provides the electrical energy to the door wiring harness 170. The door wiring harness 170 then distributes the electrical energy to the window control unit 132, the main control unit 134, the interactive unit 140, the bridge module 136, and the deadbolt units 138.

Referring to FIGS. 3-6, the door wiring harness 170 is contained within the door 30. As shown, the subframe 40 defines one or more paths, recesses, grooves, or passages, shown as wire passage 172, containing the door wiring harness 170. The door wiring harness 170 passes along the wire passage 172 to reach each of the modules. The wire passage 172 is defined by the hinge stile 42, the top rail 44, and the lock stile 46. The wire passage 172 is covered by the exterior skin 50 and the interior skin 52. In some embodiments, the wire passage 172 is sufficiently covered by the exterior skin 50 and the interior skin 52 for the door wiring harness 170 to not be visible from outside of the door 30. As shown, the wire passage 172 is arranged such that the door wiring harness 170 extends at least partway around the window 60.

Referring to FIGS. 1 and 2, the door system 10 further includes an annunciation system or notification system, shown as doorbell system 180. The doorbell system 180 includes an input device or user interface (e.g., a button, a switch, knob, a level, a pull cord, etc.), shown as external doorbell 182, positioned on an exterior surface of a wall 12. By way of example, the external doorbell 182 may be positioned adjacent a side door of a home separate from the door 30. The external doorbell 182 is configured to receive a user input or command (e.g., a button press, etc.) and output a doorbell signal indicating that the user wishes to provide a notification inside of the home. The external doorbell 182 is operatively coupled to a doorbell control module, shown as doorbell module 184, of the control system 100. The doorbell module 184 may be positioned outside of the door 30 (e.g., elsewhere within the home or structure) while remaining in communication with the modules of the door 30 (e.g., wirelessly). The doorbell module 184 is operatively coupled to a notifier, shown as doorbell speaker 186 (which may be already installed within the structure to which the door system 10 is being installed). The doorbell speaker 186 may be configured to provide a notification (e.g., an auditory notification, such as a ringing bell or siren). In other embodiments, the doorbell speaker 186 is replaced by or supplemented with a device configured to provide another type of notification (e.g., a visual notification, such as a flashing light). By way of example, a lamp may be operatively coupled to the doorbell module 184. The doorbell system 180, and particularly, the doorbell module 184, may be configured to facilitate retrofitting the door system 10 to a structure that already has a doorbell system installed. In some embodiments, one or more components of the doorbell system 180 are omitted. By way of example, the interactive unit 140 may include a doorbell, a speaker, etc. to perform the functionality of the doorbell system 180 described herein. By way of another example, the interactive unit 140 may include a doorbell that transmits a wireless signal to the doorbell module 184 (e.g., via a wireless mesh communication network) to activate the doorbell speaker 186 installed in the structure.

A user may initiate operation of the doorbell system 180 by interacting with the external doorbell 182, causing the external doorbell 182 to provide a doorbell signal to the doorbell module 184. Additionally or alternatively, another component of the control system 100, such as the main control unit 134, may provide a doorbell signal to the doorbell module 184 (e.g., wirelessly through a mess communication network described herein). In response to receiving the doorbell signal, the doorbell module 184 may provide a command signal (e.g., an electrical current) to the doorbell speaker 186, causing the doorbell speaker 186 to provide a notification to an occupant of the home. The notification may indicate to an occupant of the home that a user is awaiting permission to access the home.

Referring to FIG. 9A, the control system 100 may include one or more external devices that communicate with the door 30. It should be understood that the door 30 in FIG. 9A may represent any module of the door 30 (e.g., the power supply unit 130, the window control unit 132, the main control unit 134, the bridge module 136, the deadbolt unit(s) 138, the doorbell module 184, etc.). The door 30 may communicate with the external devices through a network (e.g., a wired and/or wireless network, a local area network, a wide area network, a cellular network, etc.), shown as network 207. In some embodiments, the control system 100 includes a network interface, shown as access point 208, that facilitates communication between the door 30 and the network 207 (e.g., a router, etc.). By way of example, the door 30 may be part of a local area network, and the access point 208 may facilitate communication between the local area network and a wide area network (e.g., the Internet). In other embodiments, the door 30 communicates directly with the network 207, and the access point 208 is omitted. By way of example, the network 207 may be a cellular network, and the door 30 may communicate directly with the network 207 (e.g., through a cellular receiver integrated into the bridge module 136).

As shown in FIG. 9A, the control system 100 may communicate with one or more user devices (e.g., smartphones, tablets, laptop computers, desktop computers, key fob, etc.), shown as user devices 190. Each user device 190 may be associated with (e.g., owned by, registered to, etc.)

one or more users. A user may utilize the user device 190 to issue commands to the control system 100 and/or review information provided by the control system 100.

Referring still to FIG. 9A, the control system 100 may additionally or alternatively include one or more external computing units or remote systems, shown as server(s) 200. The server(s) 200 may be associated with a homeowner, a manufacturer of the door 30, and/or a third party service. The server(s) 200 may store information and/or perform processing to facilitate operation of the door system 10.

One or more of the servers 200 may be designated as third-party servers 209. The third-party servers 209 may be associated with (e.g., operated by) a third party. By way of example, the third party may be a service provider that offers Internet-based hosting services or cloud infrastructure. By way of example, the third-party servers 209 may be operated by Amazon Web Services, Google Cloud, Microsoft Azure, IBM Cloud, Oracle Cloud, or another cloud hosting service.

Figure 9B:
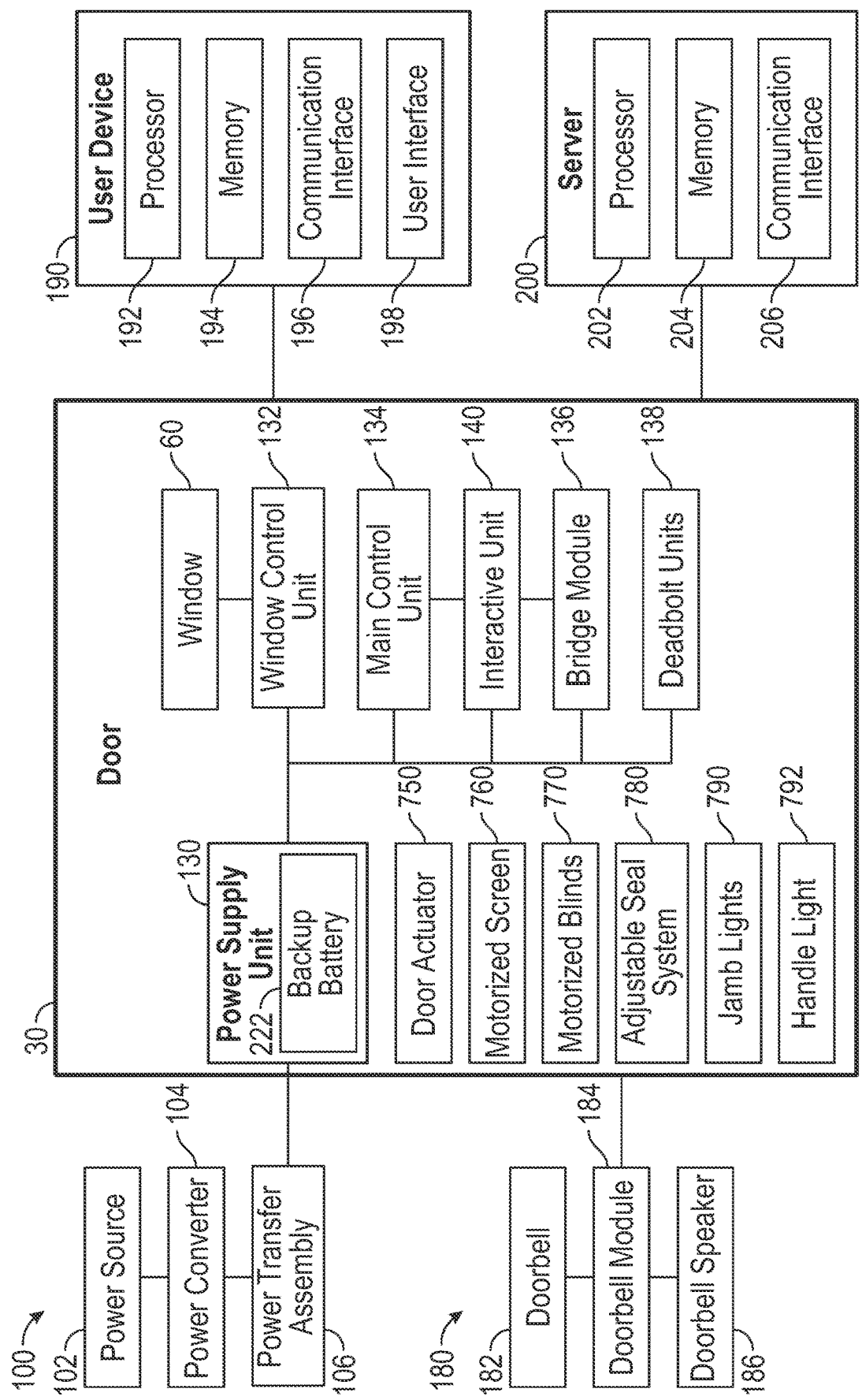
FIG. 9B is a block diagram of the control system of FIG. 9A illustrating the transfer of electrical energy throughout the control system, according to an exemplary embodiment.

As shown in FIG. 9B, each user device 190 includes a processing circuit, shown as processor 192, operatively coupled to a memory device, shown as memory 194. The memory 194 may store one or more instructions that are executed by the processor 192 to perform the processes described herein. The user device 190 further includes a network interface or communication adapter, shown as communication interface 196. The communication interface 196 is configured to facilitate communication between the user device 190 and the other components of the control system 100 (e.g., through the network 207). The communication interface 196 may be configured to perform wired and/or wireless configuration. By way of example, the communication interface 196 may communicate using near-field communication (NFC), radio-frequency identification (RFID), Bluetooth low energy (BLE), Bluetooth, Wi-Fi, Zigbee, over a cellular network, or through another communication protocol. The communication interface 196 may communicate directly with other devices or over a local area network or a wide area network (e.g., the Internet). The user device 190 includes a user interface 198, which communicates information to a user and/or receives information (e.g., commands) from the user. By way of example, the user interface 198 may include microphones, speakers, touch-screens, buttons, switches, knobs, or other input devices and/or output devices.

As shown in FIG. 9B, each server 200 includes a processing circuit, shown as processor 202, operatively coupled to a memory device, shown as memory 204. The memory 204 may store one or more instructions that are executed by the processor 202 to perform the processes described herein. The server 200 further includes a network interface or communication adapter, shown as communication interface 206. The communication interface 206 is configured to facilitate communication between the server 200 and the other components of the control system 100 (e.g., through the network 207). The communication interface 206 may be configured to perform wired and/or wireless configuration. By way of example, the communication interface 206 may communicate using NFC, RFID, BLE, Bluetooth, Wi-Fi, Zigbee, over a cellular network, or through another communication protocol. The communication interface 206 may communicate directly with other devices or over a local area network or a wide area network (e.g., the Internet).

Modular Control System
Module Features

Figure 14:
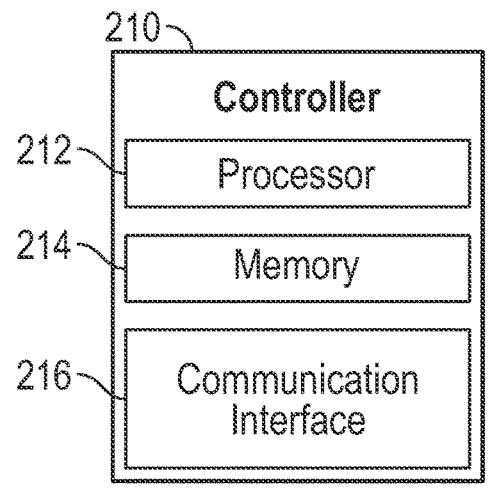
FIG. 14 is a block diagram of a controller for use within a module of the control system of FIGS. 9A and 9B, according to an exemplary embodiment.
Figure 15:
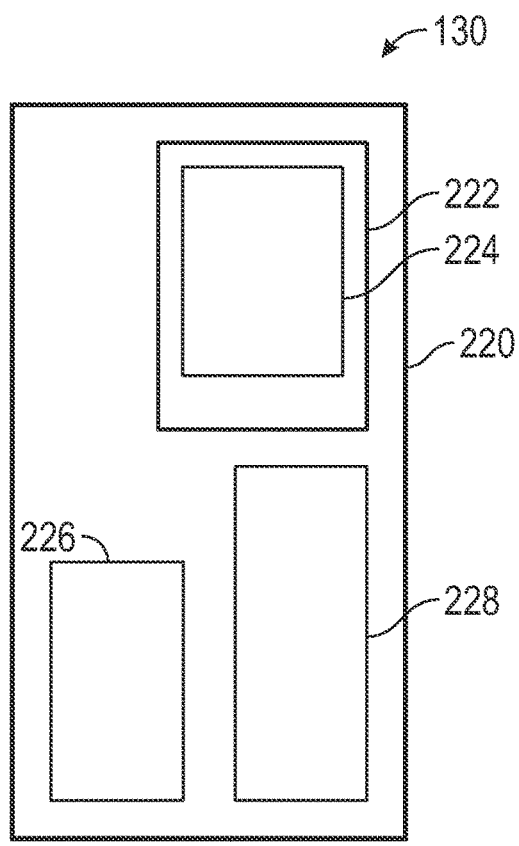
FIG. 15 is a top view of a power supply unit of the control system of FIG. 9B, according to an exemplary embodiment.
Figure 16:
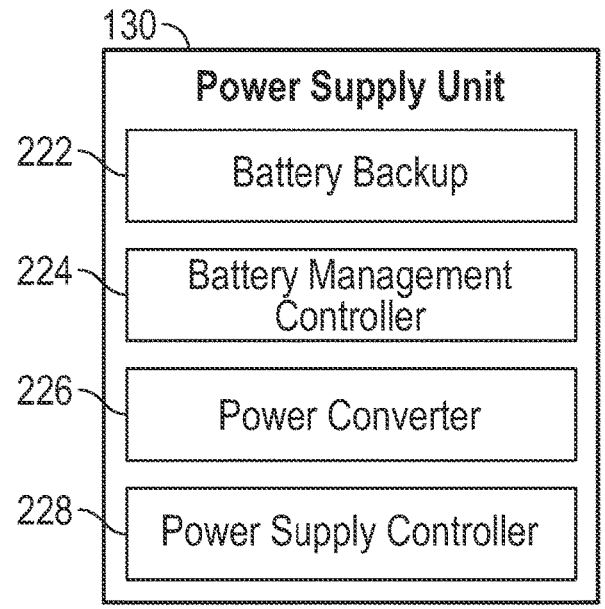
FIG. 16 is a block diagram of the power supply unit of FIG. 15, according to an exemplary embodiment.

The modules described herein may each include one or more controllers. For the sake of compact description, an exemplary controller is shown in FIG. 14 as controller 210.

In some embodiments, the controller 210 is formed on a printed circuit board. The controller 210 may represent the functional components of any of the controllers of any of the modules. As shown in FIG. 14, the controller 210 includes a processing circuit, shown as processor 212, operatively coupled to a memory device, shown as memory 214. The memory 214 may store one or more instructions that are executed by the processor 212 to perform the processes described herein.

The controller 210 further includes a network interface or communication adapter, shown as communication interface 216. The communication interface 216 is configured to facilitate communication between the controller 210, the other components of the corresponding module, and the controllers 210 of the other modules. The communication interface 216 may be configured to perform wired communication. Additionally or alternatively, the communication interface 216 may be configured to perform wireless configuration. By way of example, the communication interface 216 may communicate using NFC, RFID, Bluetooth, Wi-Fi, Zigbee, over a cellular network, or through another type of wireless communication. The communication interface 216 communicate directly with other device or over a local area network or a wide area network (e.g., the Internet). By way of example, the communication interface 216 may communicate through the network 207 and/or the access point 208.

In some embodiments, each of the modules is configured as a single, self-contained assembly. By way of example, each module may include a chassis, frame, base member, base plate, or mounting tray to which each of the components of the module are attached. By coupling the components of the module to a mounting tray, the entire module may be moved or otherwise manipulated as a single structure (e.g., for transport, for maintenance, etc.). By way of example, if the main control unit 134 malfunctions or needs to be upgraded, the main control unit 134 can be removed and replaced with another main control unit 134 with minimal effort.

Power Supply Unit

Referring to FIGS. 3, 4, 9B, 15, and 16, the power supply unit 130 is shown according to an exemplary embodiment. The power supply unit 130 includes a chassis, frame, base member, or base plate, shown as mounting tray 220, that is configured to support the components of the power supply unit 130.

The power supply unit 130 further includes an energy storage device, shown as backup battery 222, coupled to the mounting tray 220. The backup battery 222 may be configured to store energy and release the stored energy as electrical energy to power one or more functions of the door 30. The backup battery 222 may include one or more batteries (e.g., lithium-ion batteries, nickel-cadmium batteries, lead-acid batteries, etc.). In other embodiments, the backup battery 222 additionally or alternatively includes a different type of energy storage device, such as capacitors or supercapacitors. The backup battery 222 may be electrically coupled to the power transfer assembly 106 and/or to the door wiring harness 170 (e.g., through the power converter 226). The backup battery 222 may be charged by electrical energy supplied from the power source 102. Alternatively, the backup battery 222 may be a disposable battery that is replaced when depleted. In some embodiments, the backup battery 222 is a 24V battery. In some embodiments, the backup battery 222 is a 12V battery, a 5V battery, and/or has still another voltage.

The backup battery 222 may be used to power one or more operations of the door 30 when the electrical energy from the power source 102 is interrupted or otherwise insufficient to meet the power demand of the door 30. By way of example, the backup battery 222 may be used during a power outage that disables the power source 102 or a brownout that reduces the power supplied by the power source 102. By way of another example, the backup battery 222 may be used in a state where the power transfer assembly 106 is unable to transfer electrical energy to the door 30 (e.g., when the door 30 is opened and connectors 129 of FIG. 13 are disengaged from one another). Accordingly, the backup battery 222 may beneficially ensure that a user can actuate or otherwise control components of the door system 10 even if the supply of external power to the door 30 is interrupted. In some embodiments, the backup battery 222 is capable of supplying the power required to operate the door 30 for at least two days. In some embodiments, the backup battery 222 only provides power to a subset of the electrical component of the door system 10 (e.g., when the state of charge thereof falls below a threshold, does not provide power to the window 60, only provides power to one of the deadbolt units 138, etc.), as described in more detail herein.

The power supply unit 130 includes a controller or control unit, shown as battery management controller 224, that is coupled to the mounting tray 220 and operatively coupled to the backup battery 222. The battery management controller 224 may utilize the controller 210 of FIG. 14. The battery management controller 224 may be configured to manage charging and discharging of the backup battery 222. By way of example, the battery management controller 224 may control when and how much electrical energy is discharged from the backup battery 222. By way of another example, the battery management controller 224 may monitor a charge level of the backup battery 222 (e.g., through a voltage sensor). The battery management controller 224 may manage the amount of electrical energy that is supplied to charge the backup battery 222 (e.g., to maximize the charge level of the backup battery 222 and/or to improve a health of the backup battery 222).

The power supply unit 130 further includes more power converters or power conditioners (e.g., transformers, alternating current (AC) to direct current (DC) rectifiers, DC to AC inverters, etc.), shown as power converter 226. As shown, the power converter 226 is directly coupled to the mounting tray 220. The power converter 226 may be electrically coupled to the power transfer assembly 106 and/or the backup battery 222 such that the power converter 226 converts or conditions a portion of the electrical energy supplied by the power transfer assembly 106 and/or the backup battery 222 for use with certain components of the door 30. In one embodiment, the power transfer assembly 106 supplies electrical energy at 24V DC, and the power converter 226 includes a DC to DC converter that converts a portion of the 24V electrical energy to 5V DC. A first subset of components of the door 30 (e.g., the window control unit 132, the deadbolt units 138) operate on 24V DC power, and a second subset of the components of the door 30 (e.g., the main control unit 134, the interactive unit 140, and the bridge module 136) operate on 5V DC power. Accordingly, the power converter 226 permits the use of components within the door 30 having different input power requirements. In some embodiments, the power converter 226 additionally or alternatively performs a different conversion operation on some or all of the electrical energy from the power transfer assembly 106. By way of example, the power converter 226 may receive AC electrical energy from the power transfer assembly 106 and convert the electrical energy to DC.

The power supply unit 130 includes a second controller or control unit (e.g., a power management controller or unit), shown power supply controller 228, that is coupled to the mounting tray 220. The power supply controller 228 may utilize the controller 210 of FIG. 14. The power supply controller 228 is electrically coupled to the power transfer assembly 106, the backup battery 222, the power converter 226, and the door wiring harness 170. The power supply controller 228 is configured to monitor, manage, and control the distribution of electrical energy throughout the door 30. The power supply controller 228 may include one or more sensors (e.g., voltage sensors, current sensors, etc.) that monitor electrical state of the control system 100 (e.g., how much current or voltage is being supplied at different locations throughout the control system 100). The power supply controller 228 may control what portion of the electrical energy demand of the door 30 is satisfied by the power source 102 and what portion of the electrical energy demand of the door 30 is satisfied by the backup battery 222 (e.g., by increasing or decreasing the flow of electrical energy supplied by the backup battery 222). The power supply controller 228 may control the amount of electrical energy that is supplied directly (e.g., at 24V DC) and the amount of electrical energy that is converted by the power converter 226 (e.g., to 5V DC). In some embodiments, the power supply controller 228 and the battery management controller 224 are integrated into a single controller.

Window Control Unit

Referring to FIGS. 17 and 18, the window control unit 132 is shown according to an exemplary embodiment. The window control unit 132 includes a chassis, frame, base member, or base plate, shown as mounting tray 230, that is configured to support the components of the window control unit 132. The window control unit 132 further includes a controller or control unit, shown as window controller 232. The window controller 232 may utilize the controller 210 of FIG. 14. The window controller 232 is electrically coupled to the power supply unit 130 and the window 60 (e.g., through the door wiring harness 170). The window controller 232 is configured to selectively supply electrical energy to the window 60 to reconfigure the window 60 between the viewing state and the privacy state. By way of example, the window controller 232 may apply a first voltage (e.g., 0V) to the window 60 to configure the window 60 into the viewing state and apply a second voltage to the window (e.g., 24V) to configure the window 60 into the privacy state. In some embodiments, the window controller 232 applies a range of different voltages to the window 60 in the privacy state to permit control over a degree of tinting or opacity of the window 60 in the privacy state (e.g., to change between a low tint or opacity setting, a medium tint or opacity setting, and a high tint or opacity setting).

Main Control Unit

Referring to FIGS. 19 and 20, the main control unit 134 is shown according to an exemplary embodiment. The main control unit 134 includes a chassis, frame, base member, or base plate, shown as mounting tray 240, that is configured to support the components of the main control unit 134. The main control unit 134 further includes a controller or control unit, shown as main controller 242. The main controller 242 may utilize the controller 210 of FIG. 14. The main controller 242 is configured to control the overall operation of the door system 10 (e.g., by receiving information from or providing information to the other modules of the door system 10).

The main controller 242 may provide information (e.g., commands, data, etc.) to each of the other modules to control operation of the door system 10. By way of example, the main controller 242 may provide commands to control operation of the power supply unit 130, the window control unit 132, the interactive unit 140, the bridge module 136, the deadbolt units 138, and/or the doorbell module 184. The main controller 242 may receive information (e.g., user commands, sensor data, operational states, etc.) from the power supply unit 130, the window control unit 132, the interactive unit 140, the bridge module 136, the deadbolt units 138, and/or the doorbell module 184. The main controller 242 may receive information from and/or provide information to the user devices 190 and/or the servers 200 (e.g., through the bridge module 136).

The main controller 242 may make determinations regarding the operation of the door system 10 based on received information and provide one or more commands based on the results of the determinations. By way of example, the main controller 242 may receive a doorbell signal from the interactive unit 140, the doorbell signal indicating that a user wishes to provide a notification within a home. In response to receiving the doorbell signal, the main controller 242 may send a command to the doorbell module 184 indicating that the doorbell module 184 should activate the doorbell speaker 186 to provide a notification.

The main control unit 134 includes a power converter or power conditioner, shown as power regulator 244, that is coupled to the mounting tray 240. The power regulator 244 may receive electrical energy (e.g., from the power supply unit 130) and condition the electrical energy for use within the main control unit 134. By way of example, the power regulator 244 may convert 24V DC electrical energy to 12V DC electrical energy for use by the main control unit 134. By way of another example, the power regulator 244 may convert AC electrical energy to DC electrical energy for use by the main control unit 134.

The main control unit 134 further includes one or more switches, contactors, transistors, or relays, shown as relays 246, that are coupled to the mounting tray 240. In some embodiments, the relays 246 are metal-oxide-semiconductor field-effect transistors (MOSFETs). The relays 246 may be operatively coupled to the main controller 242 such that operation of the relays 246 is controlled by the main control unit 134. The relays 246 may be configured to selectively electrically couple or decouple two components in response to receiving a signal from the main control unit 134. By way of example, each relay 246 may be positioned to selectively electrically couple one or more of the deadbolt units 138 to the power supply unit 130. In such an example, activation of the relay 246 may cause a latch or deadbolt of the deadbolt unit 138 to be extended or retracted.

In some embodiments, the main control unit 134 includes a memory device, memory, or data storage, shown as media storage 248. The media storage 248 may be used to store image data (e.g., still images), video data (e.g., video clips), and/or audio data (e.g., standalone audio or audio corresponding to the video data). By way of example, video, still images, and/or audio may be recorded by the door 30 (e.g., by the camera 520, via a microphone, etc.) during operation of the door 30. The main control unit 134 may store some or all of the recorded video data, image data, and audio data in the media storage 248 for later playback (e.g., by the user device 190) or for transmission and/or analysis (e.g., by the main controller 242, by the server 200, etc.).

Deadbolt Unit

Figure 21:
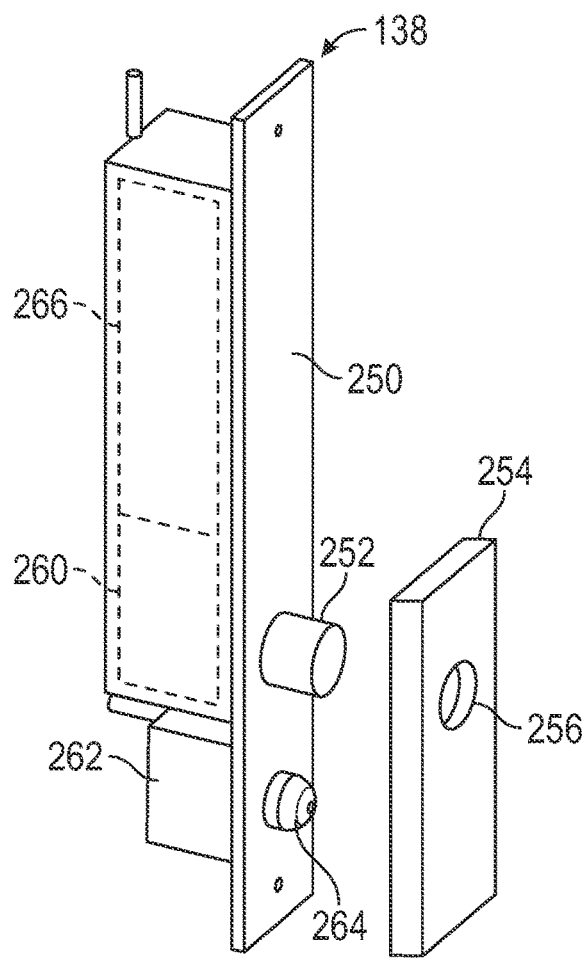
FIG. 21 is a perspective view of a deadbolt unit of the control system of FIG. 9 and a corresponding strike plate, according to an exemplary embodiment.
Figure 22:
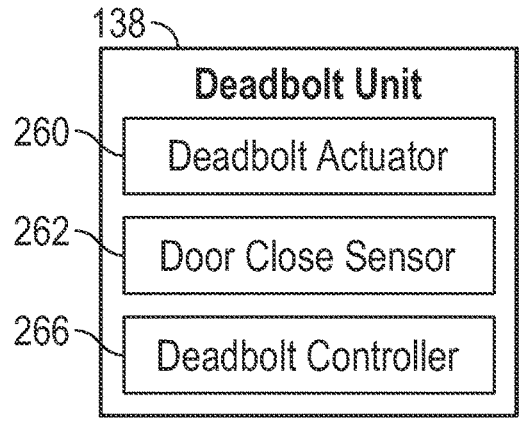
FIG. 22 is a block diagram of the deadbolt unit of FIG. 21, according to an exemplary embodiment.

Referring to FIGS. 21 and 22, one of the deadbolt units 138 is shown according to an exemplary embodiment. Each of the deadbolt units 138 may have similar components in a similar arrangement. In other embodiments, the door 30 includes more or fewer than two deadbolt units 138 (e.g., one, three, four, etc.). As shown, each deadbolt unit 138 includes a chassis, frame, base member, or base plate, shown as plate 250, that is configured to support the components of the deadbolt unit 138. The plate 250 may engage the lock stile 46 (and/or the top rail 44 and/or the bottom rail 48) to form a seal and prevent ingress of contaminants into the corresponding deadbolt recess 162. In some embodiments, the plate 250 is removably coupled to the lock stile 46 (and/or the top rail 44 and/or the bottom rail 48) (e.g., to facilitate removal or replacement of the deadbolt unit 138).

The deadbolt unit 138 includes a movable member or latch, shown as deadbolt 252, that is movably coupled to the plate 250. As shown, the deadbolt 252 extends through an aperture defined by the plate 250. The deadbolt 252 is repositionable relative to the plate 250 between an extended position, shown in FIG. 21, and a retracted position in which the deadbolt 252 is retracted into the plate 250. Accompanying each deadbolt unit 138 is a corresponding plate, shown as strike plate 254. The strike plate 254 may be fixedly coupled to one of the side jambs 22 (and/or the head jamb 24 and/or the sill 26). The strike plate 254 defines an aperture, shown as deadbolt aperture 256, that is sized to receive the deadbolt 252. The strike plate 254 is positioned such that the deadbolt aperture 256 receives the deadbolt 252 when the door 30 is in the closed position and the deadbolt 252 is in the extended position. This condition may be referred to as a locked state of the door 30. In the locked state, engagement between the strike plate 254 and the deadbolt 252 prevents the door 30 from being moved out of or opened from the closed position. When the deadbolt 252 is in the retracted position, the deadbolt 252 disengages from the strike plate 254, and the door 30 can swing freely without interference from the deadbolt unit 138. This condition may be referred to as an unlocked state of the door 30. In other embodiments, the strike plate 254 is omitted, and the side jamb 22 (and/or the head jamb 24 and/or the sill 26) defines the deadbolt aperture 256.

The deadbolt unit 138 further includes a linear actuator (e.g., an electric motor, a solenoid, etc.), shown as deadbolt actuator 260, that is coupled to the plate 250 and to the deadbolt 252. The deadbolt actuator 260 is configured to move the deadbolt 252 relative to the plate 250 between the extended position and the retracted position. Accordingly, the deadbolt actuator 260 may be used to reconfigure the door 30 between the locked state and the unlocked state.

In some embodiments, the deadbolt actuator 260 is an electric actuator. By way of example, the deadbolt unit 138 may include a solenoid that is activated in response to receiving electrical energy. The solenoid may generate a magnetic force that extends or retracts the deadbolt 252. By way of example, the deadbolt 252 may be biased into the extended position by a biasing member of the deadbolt actuator 260, such as a compression spring. The solenoid may be activated to overcome the biasing force of the biasing member and retract the deadbolt 252. In other embodiments, the deadbolt actuator 260 utilizes a different type of electric actuator, such as an electric motor. In other embodiments, the deadbolt actuator 260 is a different type of actuator, such as a hydraulic cylinder or pneumatic cylinder.

In other deadbolt arrangements, a deadbolt is positioned adjacent a mechanical knob that transfers a mechanical force supplied by a user to reposition the deadbolt. Accordingly, the deadbolt must be positioned adjacent to this knob in order to function. This limits the range of locations where the deadbolt can be placed without introducing difficulty in accessing the knob. In contrast, the deadbolt unit 138 can be placed anywhere along the perimeter of the door 30 due to the deadbolt actuator 260. As the deadbolt actuator 260 is electrically actuated, the deadbolt actuator 260 is not required to be positioned near a user interface. This permits the deadbolt actuators 260 to be spaced such that the door 30 can include multiple deadbolt units 138, increasing the security of the door 30. As shown, two deadbolt units 138 are positioned along the lock stile 46 vertically spaced apart from one another. Additionally or alternatively, the door 30 could include (a) a deadbolt unit 138 positioned along the top rail 44 and configured to engage the head jamb 24, (b) a deadbolt unit 138 positioned along the hinge stile 42 and configured to engage the corresponding side jamb 22, and/or (c) a deadbolt unit 138 positioned along the bottom rail 48 and configured to engage the sill 26.

In other embodiments, the door 30 includes a deadbolt 252 that is mechanically actuated by a user in addition to a deadbolt 252 that is actuated by a deadbolt actuator 260. A mechanically-actuated deadbolt arrangement may include an interface, such as a knob or slider, that is mechanically linked to a deadbolt 252 by a lever, linkage, or other mechanical coupler. Movement of the interface by a user may cause a corresponding movement of the deadbolt 252 due to the application of a mechanical force by the interface. A sensor may detect movement of the mechanically-actuated deadbolt 252, and deadbolt actuator 260 may electrically actuate a second deadbolt 252 in tandem with the mechanically-actuated deadbolt 252.

Each deadbolt unit 138 further includes a sensor (e.g., a button, a switch, a limit switch, etc.), shown as door close sensor 262, coupled to the plate 250. The door close sensor 262 includes an interface, rod, or protrusion, shown as button 264, that is movable relative to the plate 250. The button 264 is positioned to engage the strike plate 254 when the door 30 is in the closed position. In this position, the button 264 is forced to retract into the plate 250. The button 264 is biased to extend (e.g., by a biasing member such as a compression spring), such that when the door 30 is in the open position, the button 264 comes out of contact with the strike plate 254 and extends back out of the plate 250. When the button 264 is retracted, the door close sensor 262 supplies a door closed signal indicating that the door 30 is in the closed position. When the button 264 is extended, the door close sensor 262 supplies a door open signal indicating that the door 30 is in the open position. Accordingly, the door close sensor 262 provides information indicating whether or not the door 30 is closed. In other embodiments, the door close sensor 262 is otherwise constructed. By way of example, the door close sensor 262 may include a Hall effect sensor that is configured to detect the presence of a magnet coupled to the door frame 20.

Each deadbolt unit 138 further includes a controller or control unit, shown as deadbolt controller 266. The deadbolt controller 266 may utilize the controller 210 of FIG. 14. The deadbolt controller 266 is operatively coupled to the deadbolt actuator 260 and the door close sensor 262. The deadbolt controller 266 may provide an actuation signal to command the deadbolt actuator 260 to extend or retract the deadbolt 252. The deadbolt controller 266 may receive the door close signal and the door open signal from the door close sensor 262 and determine, based on the received signal, if the door 30 is in the open position or the closed position.

In some embodiments, the deadbolt controller 266 is in communication (e.g., wirelessly) with the main controller 242. By way of example, the deadbolt controller 266 may provide the actuation signal to the deadbolt actuator 260 in response to receiving a command from the main controller 242. By way of another example, the deadbolt controller 266 may provide the door close signal and the door open signal to the main controller 242. In other embodiments, the deadbolt controller 266 is omitted, and the deadbolt actuator 260 and the door close sensor 262 are in direct communication with the main controller 242 (e.g., through the door wiring harness 170). By way of example, one of the relays 246 may be used to provide the actuation signal to the deadbolt actuator 260.

Bridge Module

Figure 23:
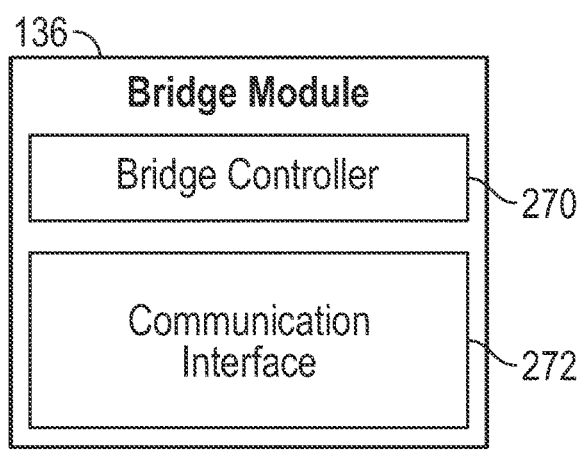
FIG. 23 is a block diagram of a bridge module of the control system of FIG. 9B, according to an exemplary embodiment.

Referring to FIG. 23, the bridge module 136 is shown according to an exemplary embodiment. The bridge module 136 includes a controller or control unit, shown as bridge controller 270. The bridge controller 270 may utilize the controller 210 of FIG. 14. The bridge controller 270 may act as a wireless bridge to control or otherwise facilitate communication between (i) the modules of the door system 10 (e.g., the power supply unit 130, the window control unit 132, the main control unit 134, the interactive unit 140, the deadbolt units 138, the doorbell module 184, etc.) and (ii) the user devices 190 and/or the servers 200. Further details regarding the wireless bridge functionality of the bridge module 136 may be found in U.S. Patent Publication No. 2022/0319264, filed Jun. 17, 2022, which is incorporated herein by reference in its entirety.

In some embodiments, the bridge module 136 further includes a communication interface 272 operatively coupled to the bridge controller 270. The communication interface 216 of the bridge controller 270 and the communication interface 272 may be configured to communicate using different communication protocols. By way of example, the communication interface 216 may communicate using a first communication protocol that is utilized by the other modules (e.g., the power supply unit 130, the window control unit 132, the main control unit 134, the interactive unit 140, the deadbolt units 138, etc.). The communication interface 272 may communicate using a second communication protocol utilized by other external devices (e.g., the user devices 190, the servers 200, etc.). In some embodiments, the first communication protocol is a short-range communication protocol, and the second communication protocol is a long-range communication protocol). Possible communication protocols usable by the communication interface 216 and/or the communication interface 272 include, but are not limited to: Bluetooth, BLE, NFC, RFID, Wi-Fi, cellular, infrared, radiofrequency, and/or ZigBee.

Doorbell Module

Figure 24:
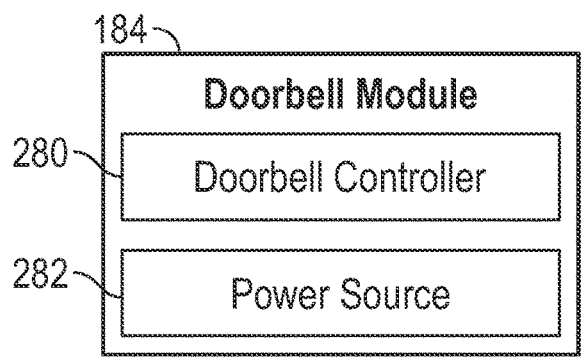
FIG. 24 is a block diagram of a doorbell unit of the control system of FIG. 9B, according to an exemplary embodiment.

Referring to FIGS. 9B and 24, the doorbell module 184 is shown according to an exemplary embodiment. The doorbell module 184 includes a controller or control unit, shown as doorbell controller 280. The doorbell controller 280 may utilize the controller 210 of FIG. 14. The doorbell controller 280 may be operatively coupled to the external doorbell 182 and the doorbell speaker 186. The doorbell controller 280 is configured to facilitate operation of the doorbell system 180. By way of example, the doorbell controller 280 may receive a doorbell signal from the external doorbell 182 and/or a doorbell signal from the door 30 (e.g., from the main control unit 134 in response to a user interacting with the interactive unit 140). In response to receiving a doorbell signal, the doorbell controller 280 may command the doorbell speaker 186 to provide a notification (e.g., an audible chime or alarm, a flashing light, etc.). In some embodiments, the external doorbell 182 and/or the doorbell speaker 186 are existing elements in a home or structure that are installed separately from the door 30. The doorbell controller 280 may facilitate connecting the external doorbell 182 and/or the doorbell speaker 186 to the control system 100 such that the doorbell system 180 is seamlessly integrated into operation of the door 30.

The doorbell module 184 may be positioned separate from the door 30. Accordingly, the doorbell module 184 may include another power source or power supply, shown as power source 282. The power source 282 is operatively coupled to the doorbell controller 280 and configured to supply electrical energy to power operation of the doorbell module 184, the external doorbell 182, and/or the doorbell speaker 186. In some embodiments, the power source 282 is external to the doorbell module 184. By way of example, the power source 282 may supply electrical energy from a power grid (e.g., a municipal power grid), generators, solar panels, wind turbines, fuel cells, or other external sources. In some embodiments, the power source 282 is internal to the doorbell module 184. By way of example, the power source 282 may include batteries, capacitors, or other internal sources.

Module Mesh Network

Figure 25:
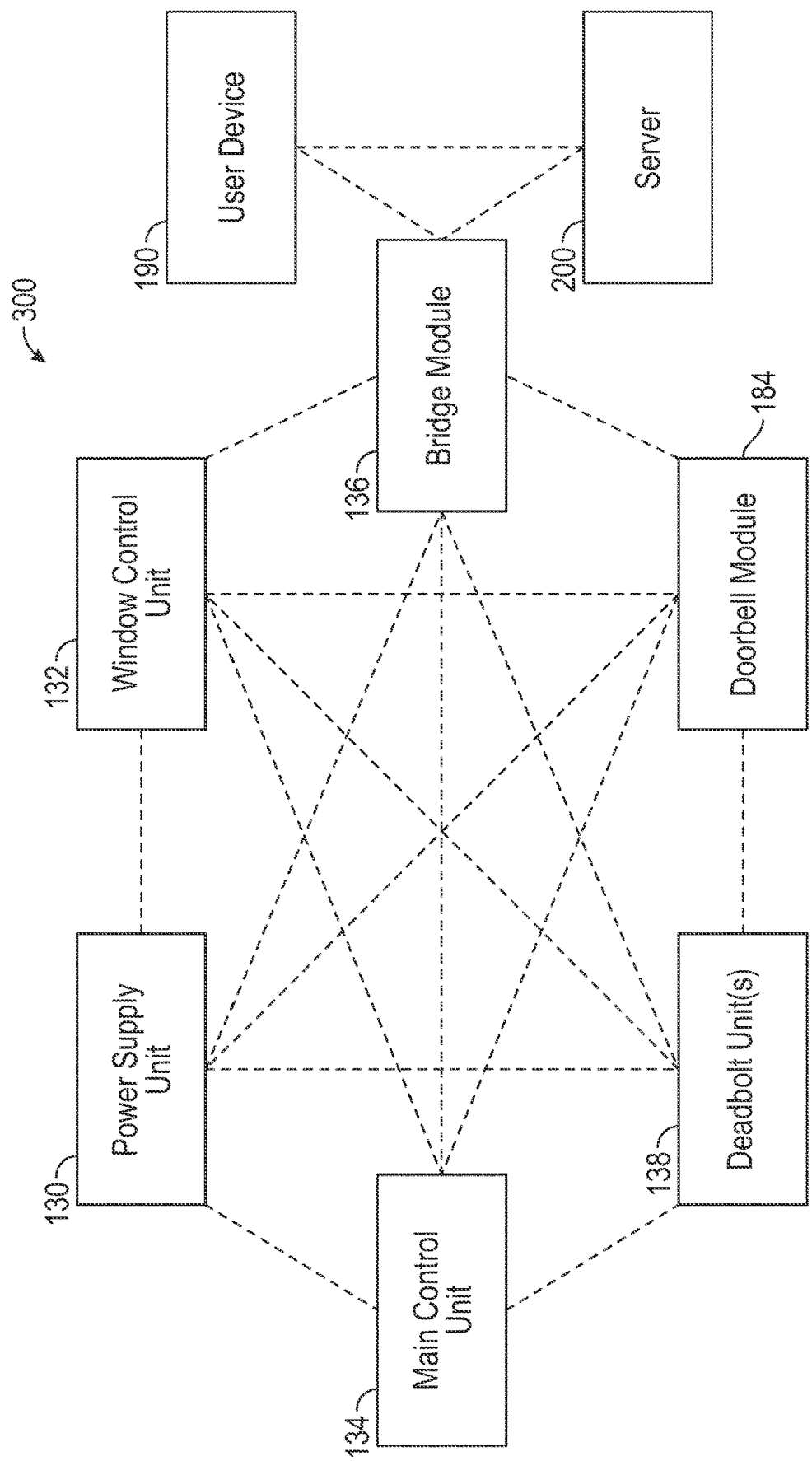
FIG. 25 is a block diagram of a mesh network of the control system of FIG. 9B, according to an exemplary embodiment.

Referring to FIG. 25, the modules (e.g., the power supply unit 130, the window control unit 132, the main control unit 134, the bridge module 136, the deadbolt unit(s) 138, the doorbell module 184, etc.) communicate with one another to form an Internet of Things (IoT) wireless mesh network, shown as mesh network 300. In FIG. 25, exemplary of some possible lines of communication between the modules are illustrated as dashed lines. By way of example, a dashed line between the main control unit 134 and a deadbolt unit 138 may indicate that the main control unit 134 is communicating directly with the deadbolt unit 138.

The mesh network 300 may communicate data between any of the modules. In some embodiments, the modules communicate wirelessly. The modules may communicate using various wireless communication protocols. In some such embodiments, the modules communicate using the MQTT communication protocol. In other embodiments, the modules communicate using another communication protocol. By way of example, the modules may communicate using NFC, RFID, BLE, Bluetooth, Wi-Fi, Zigbee, over a cellular network, or through another communication protocol.

As shown in FIG. 25, each of the modules can communicate directly with any of the other modules. By way of example, the main control unit 134 may communicate directly with the power supply unit 130, the window control unit 132, the bridge module 136, the deadbolt unit(s) 138, and/or the doorbell module 184. By way of another example, the bridge module 136 may communicate directly with the power supply unit 130, the window control unit 132, the main control unit 134, the deadbolt unit(s) 138, and/or the doorbell module 184.

In some embodiments, the modules communicate indirectly through one another. By way of example, the main control unit 134 may communicate with a deadbolt unit 138 through the bridge module 136. In such an example, the main control unit 134 may transfer a packet of information (e.g., a command to extend a deadbolt 252) to the bridge module 136. The bridge module 136 may then transfer the packet to the deadbolt unit 138.

Communicating indirectly through another module may be more advantageous than direct communication under certain circumstances. By way of example, a first module may attempt to transfer a packet of information to a second module. However, the first module may determine that the strength of the connection between the first module and the second module is insufficient to transfer the information. For example, the first module may determine that a transfer speed of the connection between the first module and the second module is below a predetermined threshold speed. The connection between the first module and the second module may deteriorate due to a source of interference being positioned between the first module and the second module (e.g., a metallic portion of the door 30, external interference, etc.). In response to such a determination, the first module may identify a third module with which a stronger connection can be formed. After identifying the third module, the first module may transfer the packet to the third module along with a command for the third module to transfer the packet to the second module. In response to receiving the command, the third module may transfer the packet to the second module.

In some embodiments, each of the modules acts independently to determine how to communicate data to other modules of the mesh network 300. By way of example, when the main control unit 134 needs to transfer a packet of information to the window control unit 132, the main control unit 134 may determine if the packet should be transferred directly to the window control unit 132 or indirectly through another module. In other embodiments, one of the modules (e.g., the main control unit 134, the bridge module 136, etc.) acts as a master controller, and the other modules act as slave controllers. The master controller may communicate with each of the slave controllers to identify what information needs to be communicated, and the master controller may dictate how each of the slave controllers communicate the information between one another.

In some embodiments, the bridge module 136 is configured to communicate with one or more external devices (e.g., a user device 190, a server 200, etc.). In some embodiments, the modules communicate with one another using a first communication protocol (e.g., a short-range communication protocol), and the bridge module 136 communicates with the external devices using a second communication protocol (e.g., a long-range communication protocol). In this way, the bridge module 136 acts as a bridge between the mesh network 300 and the external devices. The external devices may communicate between one another (e.g., user device 190 to server 200, server 200 to user device 190, user device 190 to user device 190, server 200 to server 200, etc.).

In one example, the modules communicate wirelessly with one another within the door 30 using the MQTT communication protocol. The bridge module 136 may communicate with a user device 190 over the Internet (e.g., through a Wi-Fi or cellular connection). When communication between one of the modules and an external device is desired, the module may transfer a packet of information to the bridge module 136 over the mesh network 300. The bridge module 136 may then transfer the packet to the user device 190. Alternatively, the bridge module 136 may transfer the packet to a server 200, which may subsequently transfer the packet to the user device 190.

The mesh network 300 may provide a variety of advantages relative to other control system arrangements. When assembling the door 30, the control system 100 requires only a door wiring harness 170 that provides power. Because the modules communicate wirelessly with one another, wired data transfer connections between the modules are not necessary. Eliminating the need for wired data connections reduces the complexity of the assembly process of the door 30, reduces the number of components within the door 30, and eliminates potential points of failure.

When a module is added to the door 30, the module may connect to the mesh network 300 without a user having to connect the module to a wired data connection. By way of example, when supplied with power (e.g., from a connection to the door wiring harness 170, from an external power source, etc.), a module may automatically begin seeking to pair with a nearby mesh network 300. The modules of the mesh network 300 may search to determine if any nearby modules are attempting to pair. By way of example, the modules of the mesh network 300 may perform this search periodically (e.g., once per minute, once per second, etc.). By way of another example, the modules of the mesh network 300 may perform this search in response to a command from the interactive unit 140, a user device 190, or a server 200.

When a module of the mesh network 300 identifies a new module that is seeking to pair with the mesh network 300, the new module may be added automatically. Alternatively, the mesh network 300 may require an authorized user or device to approve addition of the new module to the mesh network 300. By way of example, the mesh network 300 may provide a first packet of information (e.g., a request packet) to a user device 190 or the interactive unit 140 that causes the user device 190 or the interactive unit 140 to display an authentication prompt. In response to the user device 190 receiving a command from a user to approve the authentication, the user device 190 may transmit a second packet (e.g., an approval packet) back to the mesh network 300. In response to the interactive unit 140 receiving a command (e.g., a key code, a biometric input, a fob swipe, etc.) from the user, the interactive unit 140 may provide the second packet back to the mesh network 300. In response to a module of the mesh network 300 receiving the approval packet, the new module may be added to the mesh network 300.

New modules may be quickly and easily added to the mesh network 300 by an end user (e.g., a homeowner). By way of example, if a user determines that a module of the mesh network 300 is malfunctioning, the malfunctioning module may be disconnected from the door wiring harness 170 and removed from the door 30. A replacement module may be connected to the door wiring harness 170, inserted into the door 30, and paired with the mesh network 300. By way of another example, the end user may desire to upgrade a module of the door 30 (e.g., to provide new features that were not originally present in the door 30, to permit the door system 10 to communicate over a new communication protocol, etc.). The end user may acquire (e.g., purchase) a module having the desired functionality. The upgraded module may be connected to the door wiring harness 170, inserted into the door 30, and paired with the mesh network 300. By way of another example, an end user may desire to add a doorbell module 184 to the mesh network 300. The user may acquire the doorbell module 184, connect the doorbell module 184 to an external doorbell 182 and/or a doorbell speaker 186 within their home, and wirelessly pair the doorbell module 184 with the mesh network 300. In some embodiments, the process of adding a module to the mesh network 300 or replacing an existing module may be performed without specialized tools, permitting the end user to maintain or upgrade the door system 10 without requiring specialized training or assistance from a service professional.

Module Mounting

Referring to FIGS. 26-30, the mounting arrangement of the main control unit 134 within the door 30 is shown according to an exemplary embodiment. As discussed with reference to FIGS. 3-6, the main control unit 134 is inserted into the main controller recess 158 defined by the lock stile 46, and the main controller recess 158 is sealed by the plate 160. By way of example, the plate 160 may be positioned to extend across the main controller recess 158, and the plate 160 may be secured to the lock stile 46 by one or more fasteners. In some embodiments, the plate 160 forms a seal against the lock stile 46 to prevent the ingress of debris or moisture into the main controller recess 158. The components of the main control unit 134 are supported by the mounting tray 240, such that the entire main control unit 134 can slide into and out of the main controller recess 158 at once. To further support the main control unit 134, the door 30 includes a support or insert, shown as insert 350, that is positioned within the main controller recess 158. The insert 350 may be fixedly coupled to the lock stile 46. The mounting tray 240 may slidingly engage the insert 350 to slidably and removably couple the mounting tray 240, and therefore the main control unit 134, to the lock stile 46.

Figure 27:
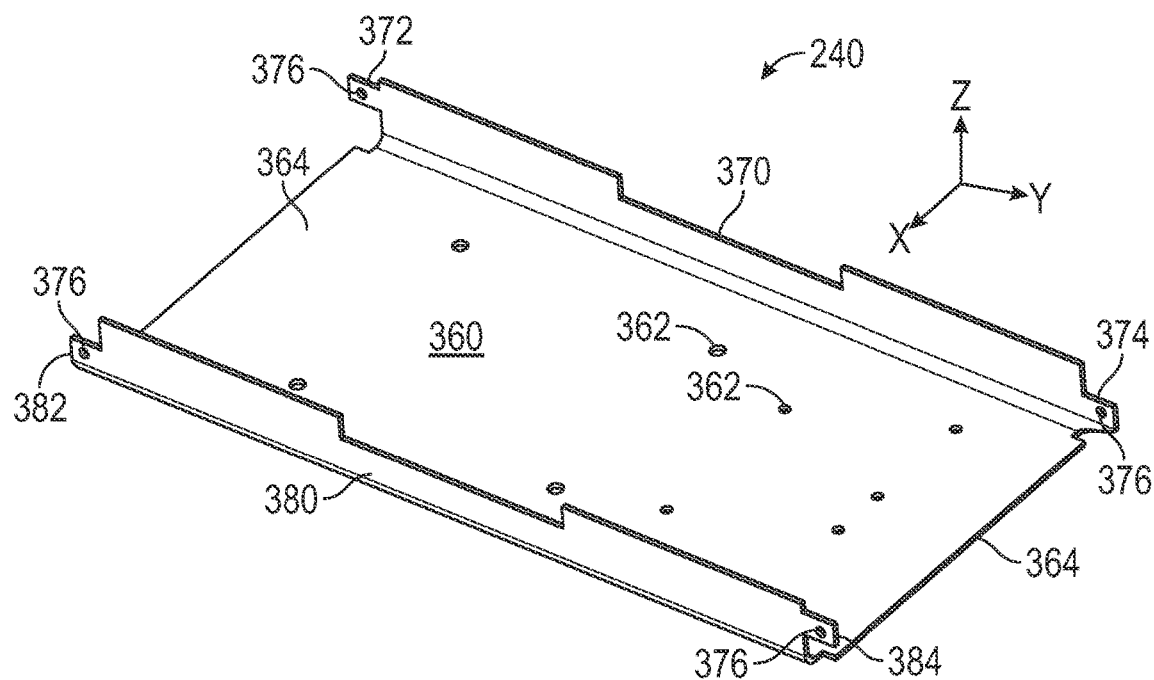
FIG. 27 is a perspective view of a mounting tray of the main control unit of FIG. 19, according to an exemplary embodiment.
Figure 30:
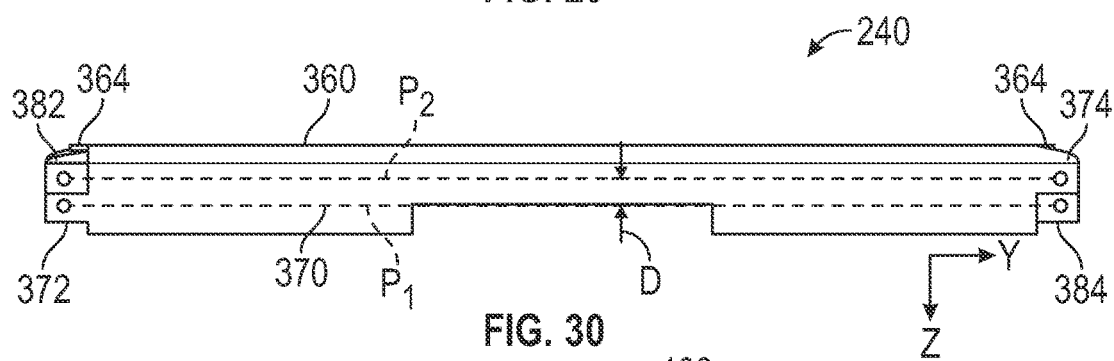
FIG. 30 is a side view of the mounting tray of FIG. 27, according to an exemplary embodiment.

Referring to FIGS. 27 and 30, the mounting tray 240 is shown according to an exemplary embodiment. For ease of description, a coordinate system is defined relative to the mounting tray 240 in FIGS. 27 and 30. The coordinate system includes a lateral X axis, a vertical Y axis, and a longitudinal Z axis.

The mounting tray 240 includes a base, panel, or main body, shown as baseplate 360. The baseplate 360 is generally flat and rectangular. As shown, the baseplate 360 extends within a lateral and vertical plane. The baseplate 360 defines a series of apertures or passages, shown as mounting holes 362, extending longitudinally through the baseplate 360. The mounting holes 362 may each be configured to receive a fastener to couple a component (e.g., the main controller 242, the power regulator 244, the relays 246, etc.) to the baseplate 360. The baseplate 360 includes a pair of opposing edges (e.g., a top edge and a bottom edge), shown as rails 364. The rails 364 extend laterally along the baseplate 360 from a front side of the mounting tray 240 to a rear side of the mounting tray 240. In some embodiments, the rails 364 are substantially parallel to one another. The rails 364 may slidably engage the insert 350 to constrain motion of the mounting tray 240 relative to the insert 350.

The mounting tray 240 further includes a pair of flanges, protrusions, or walls, shown as flange 370 and flange 380, each extending in the same direction longitudinally outward from the baseplate 360. The flange 370 is positioned on a left side of the baseplate 360 and extends substantially vertically. The flange 380 is positioned on a right side of the baseplate 360 and extends substantially vertically. In some embodiments, the flange 370, the baseplate 360, and the flange 380 are formed as a single, continuous piece. By way of example, the flange 370 and the flange 380 may be bent portions of a piece of sheet metal containing the baseplate 360.

The flange 370 extends within a substantially vertical and longitudinal plane. A first vertical end portion of the flange 370 (e.g., an upper end portion) includes a first protrusion, shown as mounting tab 372. A vertical end portion of the flange 370 (e.g., a lower end portion) includes a second protrusion, shown as mounting tab 374. The mounting tab 372 and the mounting tab 374 may each define a laterally-extending aperture, passage, or mounting hole 376 configured to receive a fastener. The mounting tab 372 is substantially centered longitudinally about a plane $P_1$ that extends laterally and vertically. The mounting tab 374 is substantially centered longitudinally about a plane $P_2$ that extends laterally and vertically. The plane $P_2$ is offset longitudinally forward from the baseplate 360. The plane $P_1$ is offset a distance D longitudinally forward from the plane $P_2$. Accordingly, the mounting tab 372 is offset the distance D longitudinally forward from the mounting tab 374. A longitudinal width of the mounting tab 372 is approximately equal to a longitudinal width of the mounting tab 374.

The flange 380 extends within a substantially vertical and longitudinal plane that is offset laterally from the flange 370. A first vertical end portion of the flange 380 (e.g., an upper end portion) includes a first protrusion, shown as mounting tab 382. A vertical end portion of the flange 380 (e.g., a lower end portion) includes a second protrusion, shown as mounting tab 384. The mounting tab 382 and the mounting tab 384 may each define a laterally-extending aperture, passage, or mounting hole 376 configured to receive a fastener. The mounting tab 382 is substantially centered longitudinally about the plane $P_2$. The mounting tab 384 is substantially centered longitudinally about the plane $P_1$. Accordingly, the mounting tab 384 is offset the distance D longitudinally forward from the mounting tab 382. The mounting tab 382 is located at approximately the same longitudinal position as the mounting tab 374. The mounting tab 384 is located at approximately the same longitudinal positon as the mounting tab 372. A longitudinal width of the mounting tab 382 is approximately equal to a longitudinal width of the mounting tab 384.

Figure 28:
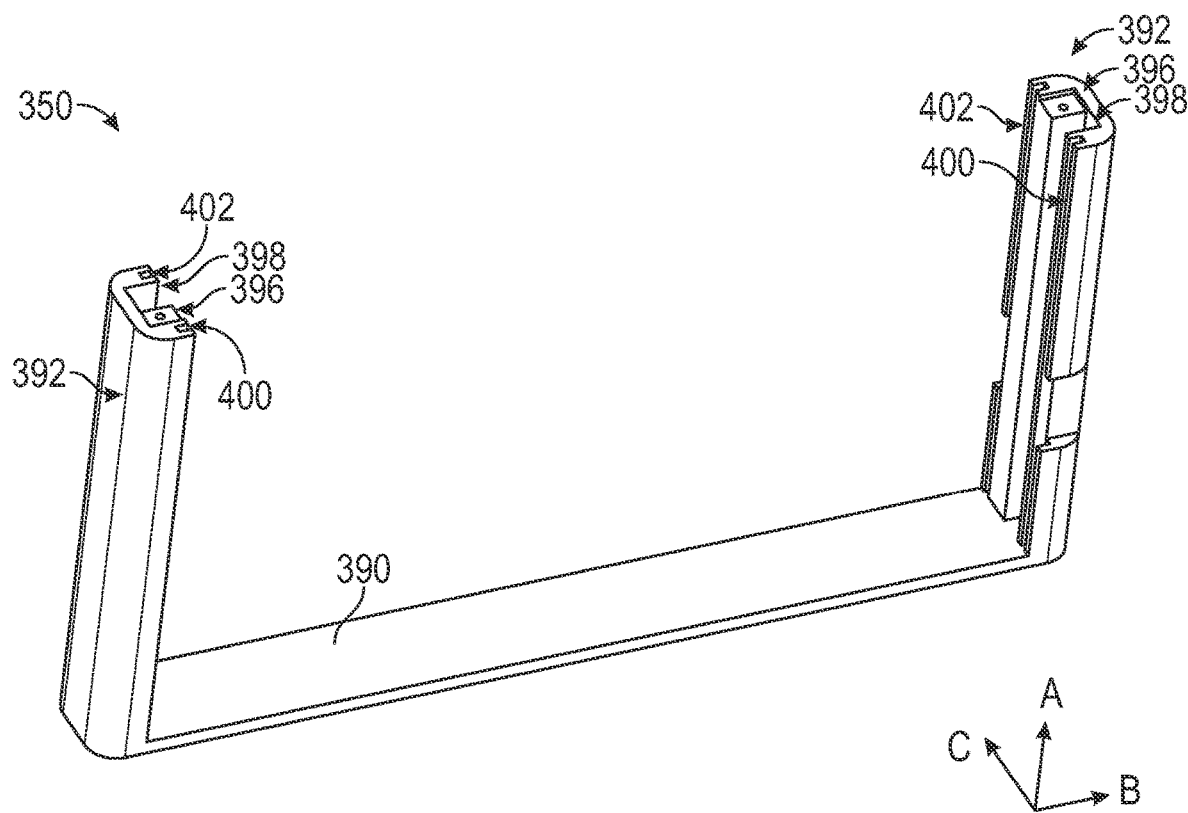
FIG. 28 is a perspective view of an insert of the door of FIG. 3 used to mount the main control unit of FIG. 19, according to an exemplary embodiment.
Figure 29:
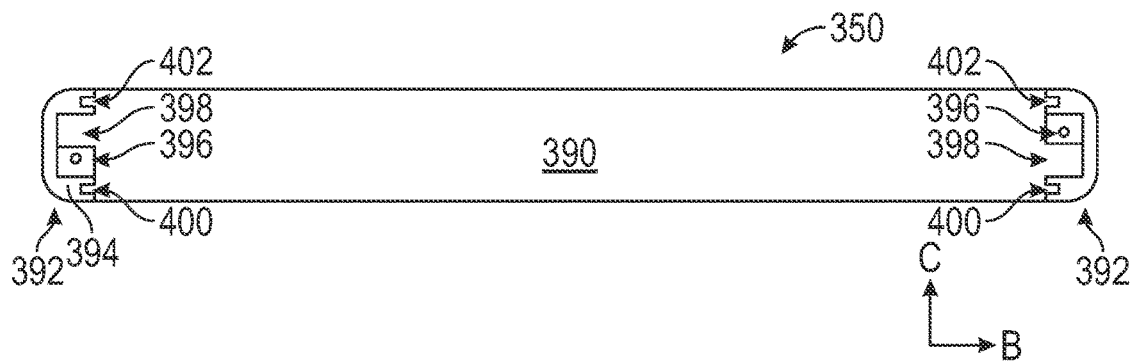
FIG. 29 is a side view of the insert of FIG. 29, according to an exemplary embodiment.

Referring to FIGS. 28 and 29, the insert 350 is shown according to an exemplary embodiment. For ease of description, a coordinate system is defined relative to the insert in FIGS. 28 and 29. The coordinate system includes a lateral A axis, a vertical B axis, and a longitudinal C axis.

The insert 350 includes a base portion or main body, shown as base 390, extending vertically between a pair of columns, shown as posts 392. The posts 392 are vertically offset from one another and extend laterally outward from the base 390. A space defined between the posts 392 is sized to receive the mounting tray 240.

Each of the posts 392 defines a recess, shown as mounting tab recess 396, that extends laterally into the post 392. Each mounting tab recess 396 is sized to receive one of the mounting tabs (e.g., the mounting tab 372, the mounting tab 374, the mounting tab 382, the mounting tab 384). Each of the posts 392 further defines a slot, groove, or recess, shown as mounting tab slot 398, that extends laterally through the post 392 to the base 390. In each post 392, the mounting tab slot 398 is positioned adjacent the mounting tab recess 396. Each mounting tab slot 398 is sized to receive one of the mounting tabs (e.g., the mounting tab 372, the mounting tab 374, the mounting tab 382, the mounting tab 384).

Each of the posts 392 further defines a pair of slots, grooves, or recesses, shown as rail slot 400 and rail slot 402. The rail slots 400 and the rail slots 402 are each sized and shaped to receive one of the rails 364. In each post 392, the rail slot 400 and the rail slot 402 are positioned on opposite sides of the mounting tab recess 396 and the mounting tab slot 398 (i.e., the mounting tab recess 396 and the mounting tab slot 398 are positioned between the rail slot 400 and the rail slot 402).

As shown in FIG. 29, the mounting tab slot 398 of one of the posts 392 is aligned with (e.g., positioned in a common lateral and vertical plane with) the mounting tab recess 396 of the other post 392. In some embodiments, the mounting tab recess 396 of a post 392 is offset from the mounting tab slot 398 of the same post 392 by the distance D. The rail slots 400 of the posts 392 are aligned with one another (e.g., positioned in a common lateral and vertical plane). The rail slots 402 of the posts 392 are aligned with one another (e.g., positioned in a common lateral and vertical plane).

Referring to FIGS. 26-30, during the initial assembly of the door 30, the insert 350 is inserted into the main controller recess 158 and fixedly coupled to the lock stile 46. In some embodiments, the insert 350 interlocks with the lock stile 46 (e.g., a protrusion of the lock stile 46 engages a corresponding portion of the insert 350) to limit movement of the insert 350. In some embodiments, the insert 350 is fastened to the lock stile 46 (e.g., using one or more fasteners) and/or adhered to the lock stile 46 (e.g., using an adhesive, such as epoxy).

The mounting tray 240 may be slidably received within the insert 350. The insert 350 may be configured to receive the mounting tray 240 in multiple different orientations or configurations, as selected by the user. For example, it may be advantageous to have a single door 30 that can be reconfigured between a right hand configuration (e.g., in which the door 30 is coupled to a first side jamb 22) and a left hand configuration (e.g., in which the door 30 is coupled to an opposing, second side jamb 22). When reconfiguring the door 30 between the right hand configuration and the left hand configuration, it may be desirable to invert or flip the interactive unit 140 (e.g., between a forward orientation and a reverse orientation) such that the interactive unit 140 faces outward regardless of which face of the door 30 is the exterior side. By way of example, this may ensure that a camera (e.g., the camera 520) of the interactive unit 140 faces outward from the door 30. To accommodate an inversion of the interactive unit 140 without requiring a different door wiring harness 170 (e.g., due to a change in the distance between connectors on each module), it may advantageous to invert or flip each of the modules when the interactive unit 140 is inverted. The arrangement of the mounting tray 240 and the insert 350 may facilitate such an inversion.

The rails 364 of the mounting tray 240 can be received by the rail slots 400 or by the rail slots 402 of the insert 350. When the rail slots 400 or the rail slots 402 receive the rails 364, engagement between the rails 364 and the posts 392 limits vertical and longitudinal movement of the mounting tray 240 relative to the insert 350 while permitting free lateral movement (e.g., sliding) of the mounting tray 240 (e.g., to facilitate insertion or removal of the mounting tray 240). When the rail slots 400 receive the rails 364, the mounting tray 240 faces in a first direction (e.g., a forward direction). When the rail slots 402 receive the rails 364, the mounting tray 240 faces in a second direction opposite the first direction (e.g., a rearward direction). Accordingly, the orientation of the mounting tray 240 may be inverted by changing which pair of the rails slots receive the rails 364. This feature permits a user to easily invert the main control unit 134 when reconfiguring the door 30 between the right hand configuration and the left hand configuration.

The mounting flanges (e.g., the mounting tab 372, the mounting tab 374, the mounting tab 382, the mounting tab 384) facilitate selectively limiting lateral movement of the mounting tray 240 relative to the insert 350. By way of example, when the mounting tray 240 is in the desired position, a fastener may be inserted through the mounting hole 376 in one or more of the mounting flanges and engaged with (e.g., threaded into) one of the posts 392. Contact between the mounting flange and the post 392 may limit lateral movement of the mounting tray 240 in a first direction, and contact between the mounting flange and the fastener may limit lateral movement of the mounting tray 240 in a second direction.

The longitudinally offset positions of the mounting flanges, the mounting tab recesses 396, and the mounting tab slots 398 facilitate installing the mounting tray 240 in a variety of different orientations. Specifically, this offset arrangement ensures that the two mounting flanges farthest from the base 390 are received by the mounting tab recesses 396 and engage the posts 392. The offset arrangement also prevents the two mounting flanges closest to the base 390 from interfering with insertion of the mounting tray 240. Accordingly, the mounting tray 240 can be received by the insert 350 after the mounting tray 240 is inverted (e.g., rotated 180 degrees) about a vertical axis, a lateral axis, or a longitudinal axis. To illustrate this reconfigurability, four permitted configurations of the mounting tray 240 are now described by way of non-limiting example.

In a first configuration (e.g., an upright, forward-facing configuration or forward orientation) shown in FIG. 26, the rails 364 of the mounting tray 240 are received within the rail slots 402 of the insert 350. The mounting tabs 382 and 384 are received within the mounting tab slots 398, permitting the mounting tray 240 to be inserted into the insert 350 without interference. The mounting tabs 372 and 374 are received within the mounting tab recesses 396, and the mounting tabs 372 and 374 engage the posts 392 to limit lateral movement of the mounting tray 240.

The mounting tray 240 is reconfigurable into a second configuration (e.g., an upright, rearward-facing configuration or rearward orientation) in which the mounting tray 240 is inverted about a vertical axis relative to the first configuration. In the second configuration, the rails 364 of the mounting tray 240 are received within the rail slots 400 of the insert 350. The mounting tabs 372 and 374 are received within the mounting tab slots 398, permitting the mounting tray 240 to be inserted into the insert 350 without interference. The mounting tabs 382 and 384 are received within the mounting tab recesses 396, and the mounting tabs 382 and 384 engage the posts 392 to limit lateral movement of the mounting tray 240.

The mounting tray 240 is reconfigurable into a third configuration (e.g., an upside down, forward-facing configuration or forward orientation) in which the mounting tray 240 is inverted about a longitudinal axis relative to the first configuration. In the third configuration, the rails 364 of the mounting tray 240 are received within the rail slots 402 of the insert 350. The mounting tabs 372 and 374 are received within the mounting tab slots 398, permitting the mounting tray 240 to be inserted into the insert 350 without interference. The mounting tabs 382 and 384 are received within the mounting tab recesses 396, and the mounting tabs 382 and 384 engage the posts 392 to limit lateral movement of the mounting tray 240.

The mounting tray 240 is reconfigurable into a fourth configuration (e.g., an upside down, rearward-facing configuration or rearward orientation) in which the mounting tray 240 is inverted about a lateral axis relative to the first configuration. In the fourth configuration, the rails 364 of the mounting tray 240 are received within the rail slots 400 of the insert 350. The mounting tabs 382 and 384 are received within the mounting tab slots 398, permitting the mounting tray 240 to be inserted into the insert 350 without interference. The mounting tabs 372 and 374 are received within the mounting tab recesses 396, and the mounting tabs 372 and 374 engage the posts 392 to limit lateral movement of the mounting tray 240.

Figure 31:
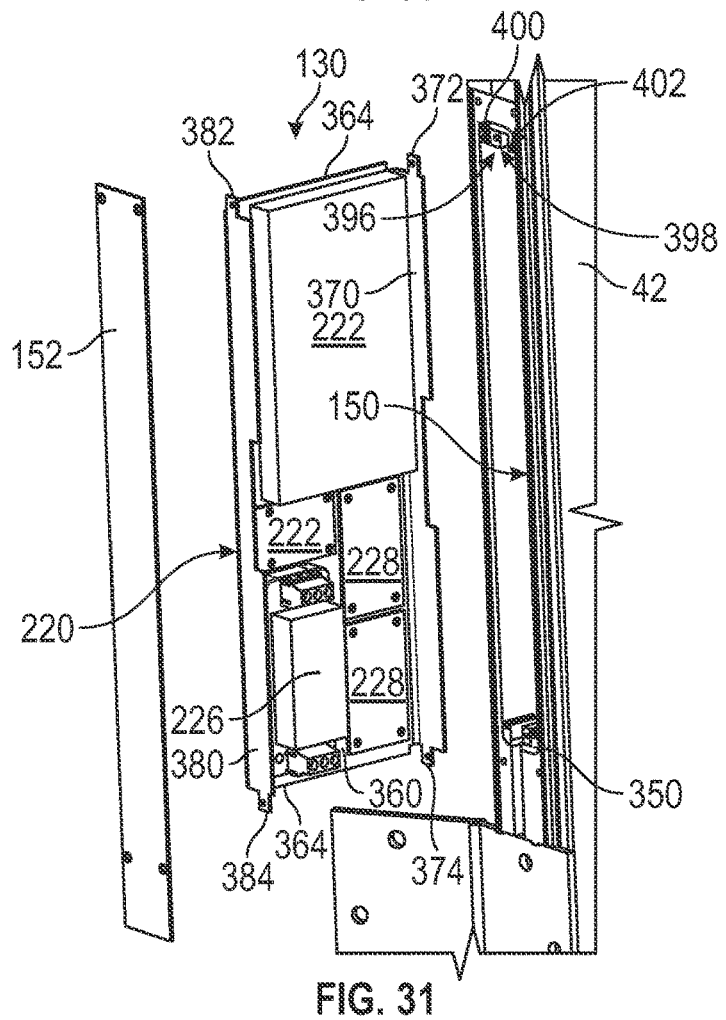
FIG. 31 is an exploded perspective view of the door of FIG. 3 showing the power supply unit of FIG. 15, according to an exemplary embodiment.

Referring to FIG. 31, the power supply unit 130 utilizes a similar mounting arrangement to the main control unit 134. Accordingly, the mounting tray 220 of the power supply unit 130 may be substantially similar to the mounting tray 240 of the main control unit 134 except as otherwise specified. An insert 350 is inserted into the power supply recess 150 and fixedly coupled to the hinge stile 42. The insert 350 is configured to slidably receive the mounting tray 220 within the power supply recess 150. The mounting tray 220 includes a baseplate 360 including a pair of rails 364, a flange 370 including mounting tabs 372 and 374, and a flange 380 including mounting tabs 382 and 384. The rails 364 and the mounting tabs 372, 374, 382, and 384 facilitate engagement of the mounting tray 220 with the insert 350 within the power supply recess 150 to secure the power supply unit 130 to the hinge stile 42.

Figure 32:
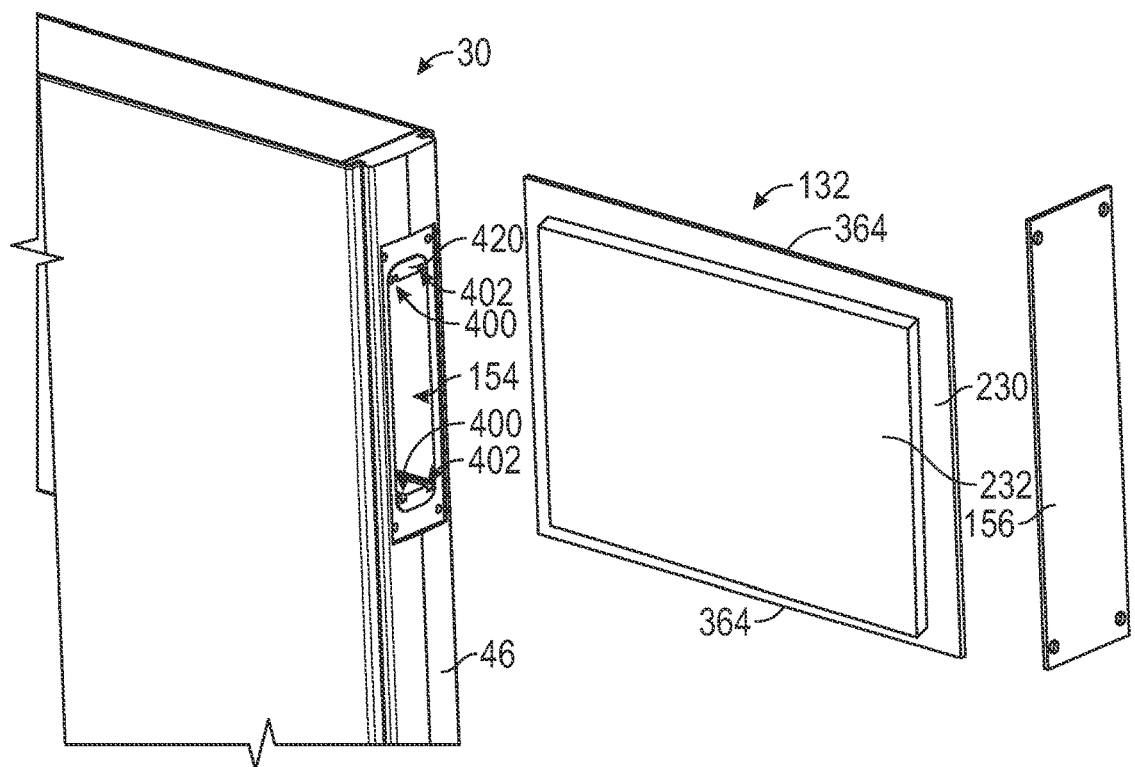
FIG. 32 is an exploded perspective view of the door of FIG. 3 showing the window control unit of FIG. 17, according to an exemplary embodiment.
Figure 33:
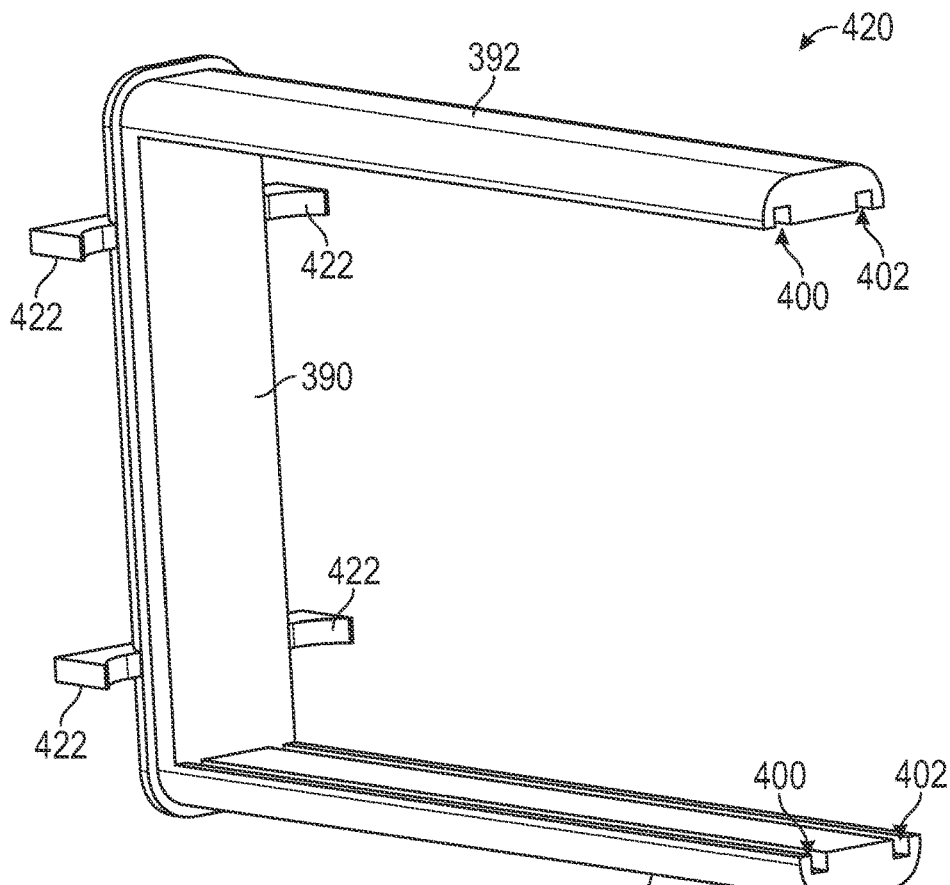
FIG. 33 is a perspective view of an insert of the door of FIG. 3 used to mount the window control unit of FIG. 17, according to an exemplary embodiment.
Figure 34:
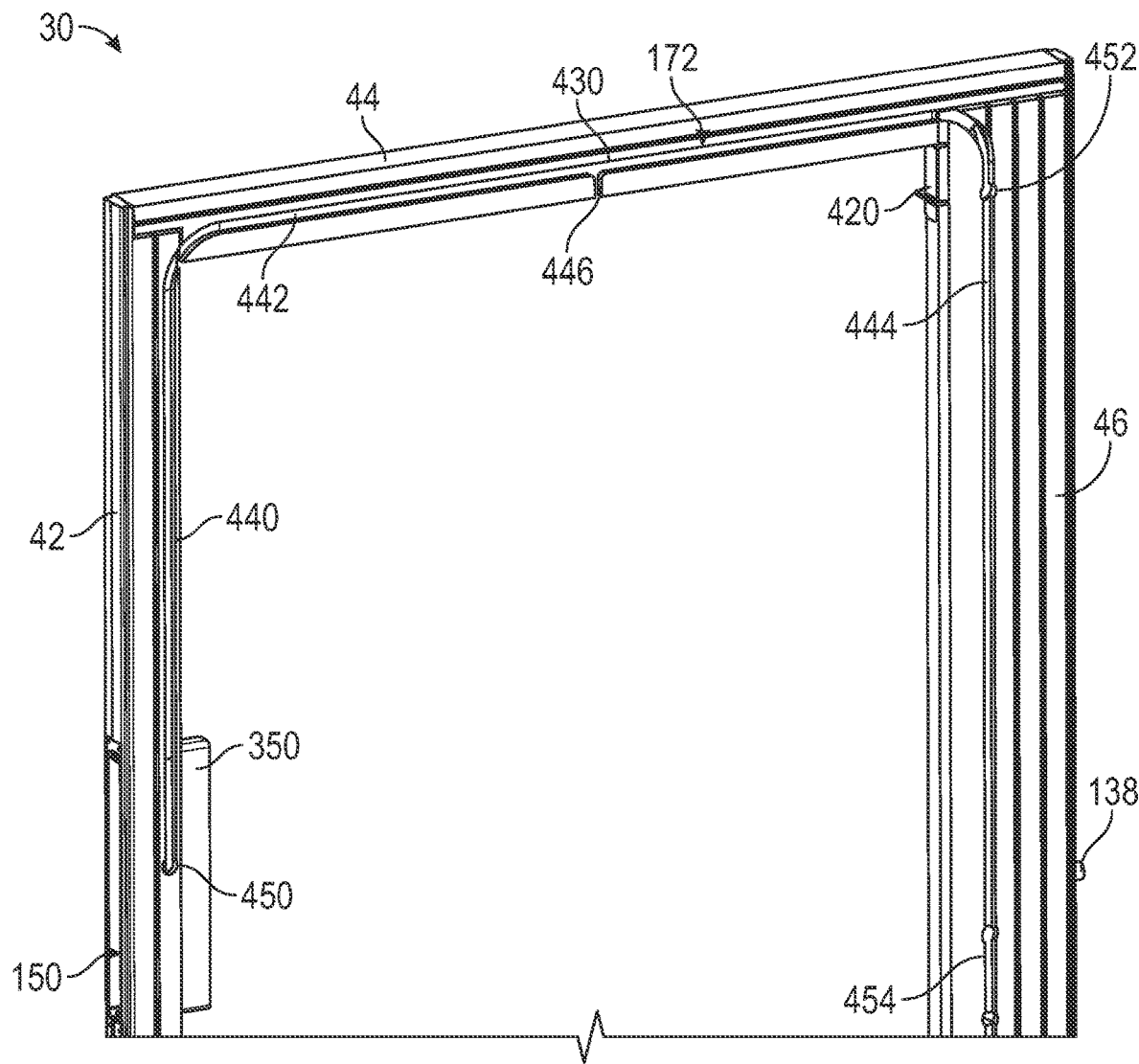
FIG. 34 is a front perspective view showing the exterior side of the subframe of FIG. 5, according to an exemplary embodiment.
Figure 35:
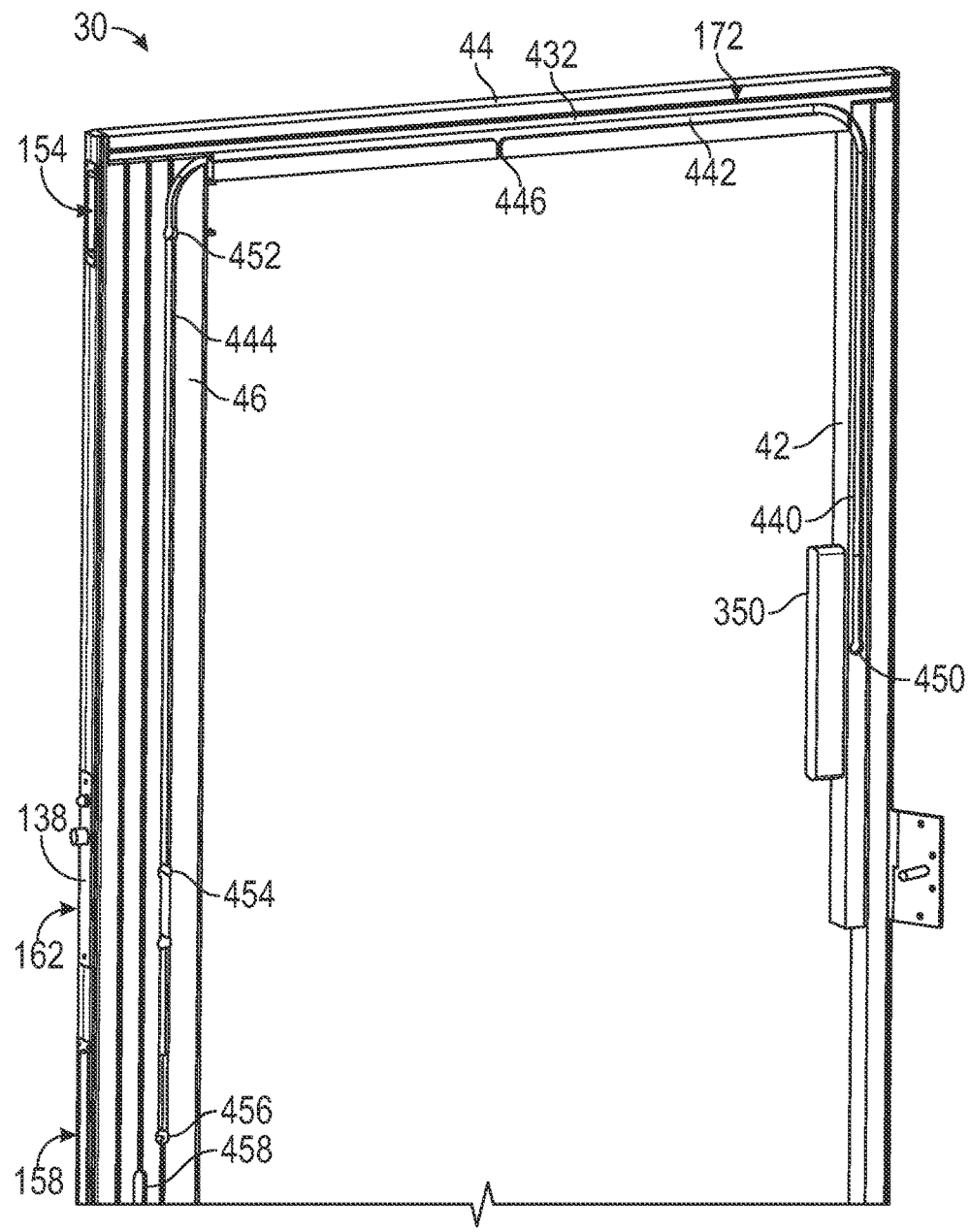
FIG. 35 is a rear perspective view showing the interior side of the subframe of FIG. 5, according to an exemplary embodiment.

Referring to FIGS. 32 and 33, the window control unit 132 utilizes a similar mounting arrangement to the main control unit 134. Accordingly, the mounting tray 230 of the window control unit 132 may be substantially similar to the mounting tray 240 of the main control unit 134 except as otherwise specified. The mounting tray 230 omits the flange 370 and the flange 380. Instead, the mounting tray 230 is flat, including a baseplate 360 having two rails 364.

The mounting tray 230 is received within an insert 420 that is inserted into the window controller recess 154. The insert 420 may be substantially similar to the insert 350 except as otherwise specified. As shown in FIG. 33, the insert 420 includes a series of longitudinal protrusions or fingers, shown as keys 422, that extend longitudinally outward from a base 390. The keys 422 engage the lock stile 46 to fixedly couple the insert 420 to the lock stile 46. The insert 420 includes a pair of posts 392 extending from the base 390. Each of the posts 392 defines a rail slot 400 and a rail slot 402 that receive the rails 364 of the mounting tray 230. Because the mounting tray 230 omits the flanges 370 and 380, the posts 392 can omit the mounting tab recesses 396 and the mounting tab slots 398 while still slidably receiving the mounting tray 230.

Wire Routing

Referring to FIGS. 3-6 and 34-38, the wire passage 172 that contains the door wiring harness 170 is shown according to an exemplary embodiment. The wire passage 172 includes a first groove, slot, notch, or passage, shown as wire groove 430, and a second groove, slot, notch, or passage, shown as wire groove 432, each defined by the subframe 40. The wire groove 430 is defined on a first side of the subframe 40 (e.g., an exterior side) and extends into the subframe 40 toward an opposing second side of the subframe 40 (e.g., an interior side). The wire groove 432 is defined on the second side of the subframe 40 and extends into the subframe 40 toward the first side. Accordingly, the wire groove 430 and the wire groove 432 are positioned on opposite sides of the subframe 40. The wire groove 430 is covered by the exterior skin 50 to define a first enclosed space that can receive the door wiring harness 170. The wire groove 432 is covered by the interior skin 52 to define a second enclosed space that can receive the door wiring harness 170. A user may position the door wiring harness 170 in the wire groove 430 or the wire groove 432, depending upon the desired arrangement of the door 30 (e.g., as a right hand door or a left hand door).

The wire groove 430 is defined by and extends through the hinge stile 42, the top rail 44, and the lock stile 46.

Specifically, the wire groove 430 includes a first vertical portion, shown as hinge portion 440. The hinge portion 440 is defined by the hinge stile 42 and extends substantially vertically. The wire groove 430 includes a horizontal portion or top portion, shown as head portion 442. The head portion 442 is defined by the top rail 44 and extends laterally through the top rail 44 from the hinge stile 42 to the lock stile 46. The wire groove 430 includes a second vertical portion, shown as lock portion 444. The lock portion 444 is defined by the lock stile 46 and extends substantially vertically. The hinge portion 440, the head portion 442, and the lock portion 444 connect to one another to form a continuous groove. The ends of each portion may be curved to facilitate a smooth, gradual transition between each portion. The top rail 44 further defines a third vertical portion of the wire groove 430, shown as connecting portion 446. The connecting portion 446 is connected to the head portion 442 and extends downward from the head portion 442. The connecting portion 446 may facilitate connecting the door wiring harness 170 to the window 60.

The wire groove 432 may be substantially symmetrical with the wire groove 430 about a center plane of the door 30 (e.g., a vertical and lateral plane). Accordingly, the wire groove 432 may include a hinge portion 440, a head portion 442, a lock portion 444, and a connecting portion 446. In some embodiments, the hinge portion 440, the head portion 442, the lock portion 444, and the connecting portion 446 of the wire groove 432 are the same shape and size as the hinge portion 440, the head portion 442, the lock portion 444, and the connecting portion 446 of the wire groove 430. This symmetrical arrangement of the wire grooves 430 and 432 may facilitate a single door wiring harness 170 being compatible with both the wire groove 430 and the wire groove 432.

The subframe 40 further defines a series of apertures, passages, or paths that extend longitudinally through the door 30 to connect the wire groove 430 and the wire groove 432. These passages connect the wire groove 430 and the wire groove 432 to the recesses that receive the modules and other electrical components of the door 30. Accordingly, the passages facilitate the door wiring harness 170 extending from the wire groove 430 or the wire groove 432 to the modules and other electrical components of the door 30.

Figure 36:
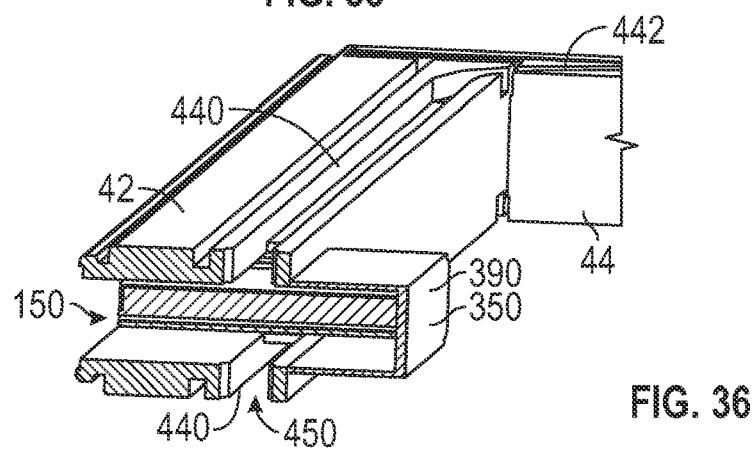
FIG. 36 is a bottom section view of the subframe of FIG. 5, according to an exemplary embodiment.
Figure 37:
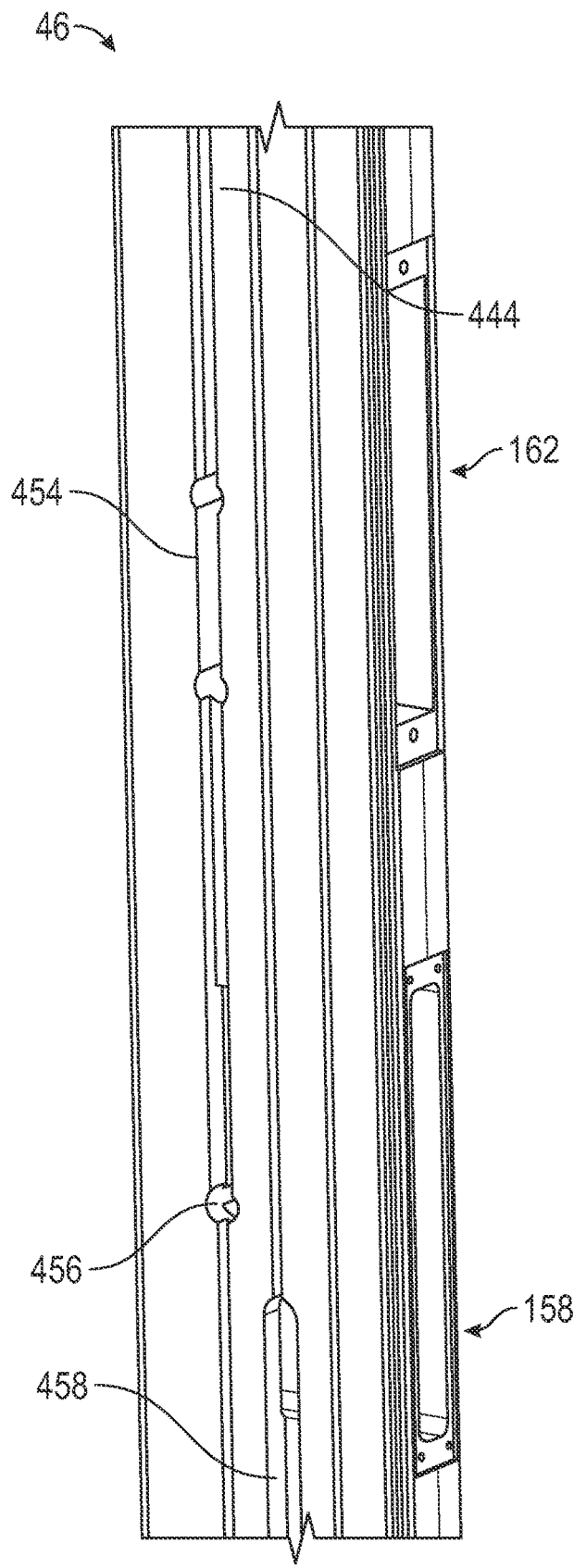
FIG. 37 is a front perspective view showing the exterior side of an upper portion of a lock stile of the subframe of FIG. 5, according to an exemplary embodiment.
Figure 38:
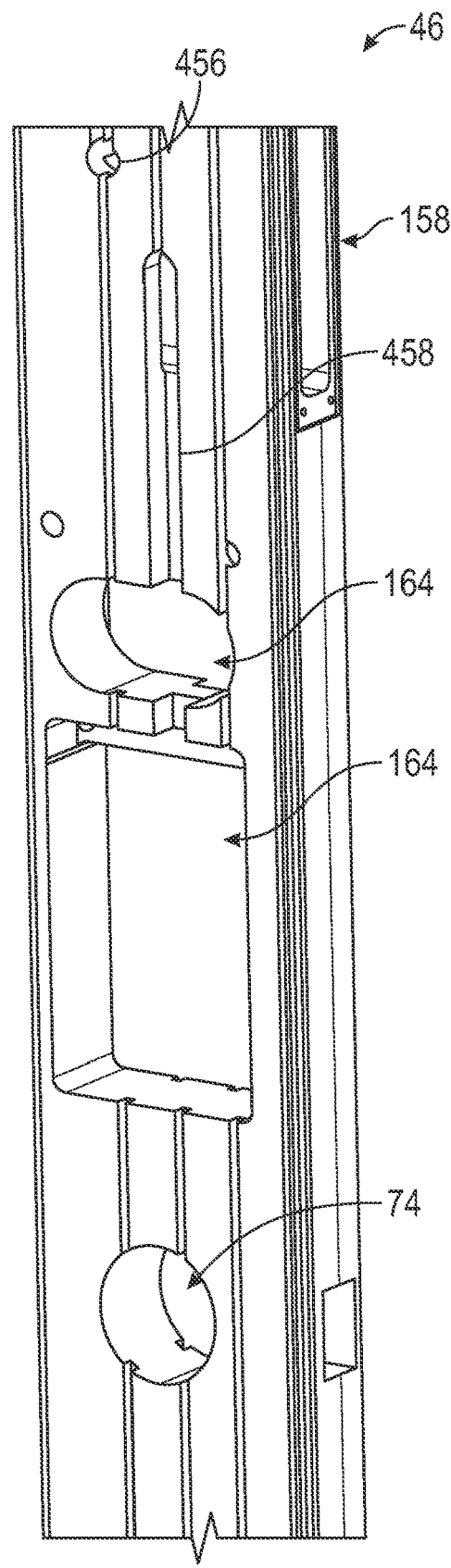
FIG. 38 is a front perspective view showing the exterior side of a lower portion of the lock stile of FIG. 37, according to an exemplary embodiment.

A first passage, shown as power supply passage 450, is defined by the hinge stile 42. The power supply passage 450 extends from the wire groove 430, through the power supply recess 150, to the wire groove 432. As shown in FIG. 36, the power supply passage 450 extends longitudinally through the entire hinge stile 42, connecting the hinge portion 440 of the wire groove 430 to the hinge portion 440 of the wire groove 432. The power supply passage 450 facilitates connecting the door wiring harness 170 to the power supply unit 130.

A second passage, shown as window control passage 452, is defined by the lock stile 46. The window control passage 452 extends from the wire groove 430, through the window controller recess 154, to the wire groove 432. The window control passage 452 extends longitudinally through the entire lock stile 46, connecting the lock portion 444 of the wire groove 430 to the lock portion 444 of the wire groove 432. The window control passage 452 facilitates connecting the door wiring harness 170 to the window control unit 132.

A third passage, shown as deadbolt unit passage 454, is defined by the lock stile 46. The deadbolt unit passage 454 extends from the wire groove 430, through a deadbolt recess 162, to the wire groove 432. The deadbolt unit passage 454 extends longitudinally through the entire lock stile 46, connecting the lock portion 444 of the wire groove 430 to the lock portion 444 of the wire groove 432. The deadbolt unit passage 454 facilitates connecting the door wiring harness 170 to one of the deadbolt units 138. The subframe 40 may include one of the deadbolt unit passages 454 for each of the deadbolt units 138. By way of example, a door 30 having two deadbolt units 138 may have two deadbolt unit passages 454.

A fourth passage, shown as main controller passage 456, is defined by the lock stile 46. The main controller passage 456 extends from the wire groove 430, through the main controller recess 158, to the wire groove 432. The main controller passage 456 extends longitudinally through the entire lock stile 46, connecting the lock portion 444 of the wire groove 430 to the lock portion 444 of the wire groove 432. The main controller passage 456 facilitates connecting the door wiring harness 170 to the main control unit 134.

In some embodiments, the lock stile 46 further defines a pair of vertical groves or passages, shown as interface grooves 458. Similar to the wire grooves 430 and 432, the interface grooves 458 are defined on an interior side and an exterior side of the subframe 40, respectively. The interface grooves 458 extend substantially vertically through the lock stile 46, connecting the main controller recess 158 with the interface bores 164. The interface grooves 458 facilitate connecting the main control unit 134 with the interactive unit 140. In other embodiments, the interface grooves 458 are extensions of the wire groove 430 and the wire groove 432.

Changing Between Left Hand Configuration and Right Hand Configuration

In some embodiments, the door 30 is reconfigurable between a right hand configuration (e.g., in which the door 30 is a right hand door) and a left hand configuration (e.g., in which the door 30 is a left hand door). In the right hand configuration, the hinges 32 are coupled to a first side jamb 22. In the left hand configuration, the hinges 32 are coupled to the other side jamb 22. Reconfiguring the door 30 between the right hand configuration and the left hand configuration exchanges the exterior side and the interior side of the door 30, such that the interactive unit 140 is inverted (front-to-back, reversed). It may be advantageous to maintain a consistent orientation of the interactive unit 140 relative to the wall 12 in both the right hand configuration and the left hand configuration. In order to achieve this consistent orientation, the interactive unit 140 may be inverted relative to the door 30 when the door 30 is reconfigured between the right hand configuration and the left hand configuration.

When the interactive unit 140 is inverted, the position of the connection between the door wiring harness 170 and the interactive unit 140 shifts within the door 30. If the door wiring harness 170 were to remain in the same position, the connection between the door wiring harness 170 and the interactive unit 140 could be strained, or the door wiring harness 170 could be unable to reach the interactive unit 140. To ensure that the door wiring harness 170 can form all of the desired connections when the interactive unit 140 is inverted, the door wiring harness 170 may also be inverted within the door 30. One or more of the modules may be inverted within the door 30 to place the modules into a better position to reach the door wiring harness 170.

Referring to FIGS. 34-38, to invert the door wiring harness 170, the exterior skin 50 and the interior skin 52 may be removed to expose the door wiring harness 170. The door wiring harness 170 may be disconnected from each of the modules and removed from the door 30. If the door wiring harness 170 was originally positioned in the wire groove 430, the door wiring harness 170 may then be inserted into the wire groove 432. If the door wiring harness 170 was originally positioned in the wire groove 432, the door wiring harness 170 may then be inserted into the wire groove 430. Accordingly, the door wiring harness 170 is inverted by changing which of the wire grooves receives the door wiring harness 170.

Referring to FIG. 26, to invert the main control unit 134, the plate 160 may be removed, and the main control unit 134 may be removed from the insert 350. The main control unit 134 may be rotated about a vertical axis and replaced back into the insert 350. The main control unit 134 may be coupled to the door wiring harness 170, and the plate 160 may be coupled to the lock stile 46.

Referring to FIG. 31, to invert the power supply unit 130, the plate 152 may be removed, and the power supply unit 130 may be removed from the insert 350. The power supply unit 130 may be rotated about a vertical axis and replaced back into the insert 350. The power supply unit 130 may be coupled to the door wiring harness 170, and the plate 152 may be coupled to the hinge stile 42.

Referring to FIG. 32, to invert the window control unit 132, the plate 156 may be removed, and the window control unit 132 may be removed from the insert 420. The window control unit 132 may be rotated about a vertical axis and replaced back into the insert 420. The window control unit 132 may be coupled to the door wiring harness 170, and the plate 156 may be coupled to the lock stile 46. With one or more of the modules and the door wiring harness 170 inverted, the exterior skin 50 and the interior skin 52 may be coupled to the subframe 40.

Interactive Unit

Referring to FIGS. 39-47, the interactive unit 140 is shown according to an exemplary embodiment. In some embodiments, the interactive unit 140 utilizes the bridge controller 270 as a controller for the interactive unit 140. Additionally or alternatively, the interactive unit 140 may utilize the main controller 242 as a controller for the interactive unit 140. By way of example, the bridge controller 270 and the main controller 242 may be operatively coupled to the various input devices (e.g., sensors, user inputs, microphones, etc.) and output devices (e.g., lights, speakers, displays, etc.) of the interactive unit 140. As shown in FIGS. 44-47, the bridge module 136 is positioned within the interactive unit 140. In some embodiments, the main controller 242 is additionally or alternatively positioned within the interactive unit 140. In some embodiments, the bridge module 136 is received within a recess of the door 30 (e.g., the window controller recess 154, one of the rail slots 400 or 402 that is free, a separate bridge recess, etc.). The bridge controller 270 and the main controller 242 may receive information from the input devices and/or provide commands to the output devices. Alternatively, the interactive unit 140 may include a dedicated controller separate from the bridge controller 270 and the main controller 242. However, for simplicity, the functions of the interactive unit 140 described herein are described as being performed or controlled by the bridge controller 270.

Structure

As shown in FIGS. 40-47, the interactive unit 140 includes a first structural component, chassis, frame, or base, shown as exterior plate 500. The exterior plate 500 is positioned on the exterior side of the door 30 and coupled to the subframe 40. The exterior plate 500 serves as a structure to support various exterior side components of the interactive unit 140. A perimeter of the exterior plate 500 is covered by a trim piece or cover, shown as exterior trim 502. The exterior trim 502 is removably coupled to the exterior plate 500 (e.g., to facilitate swapping for different types of trim). The exterior trim 502 may facilitate sealing the exterior side of the interactive unit 140.

Figure 43:
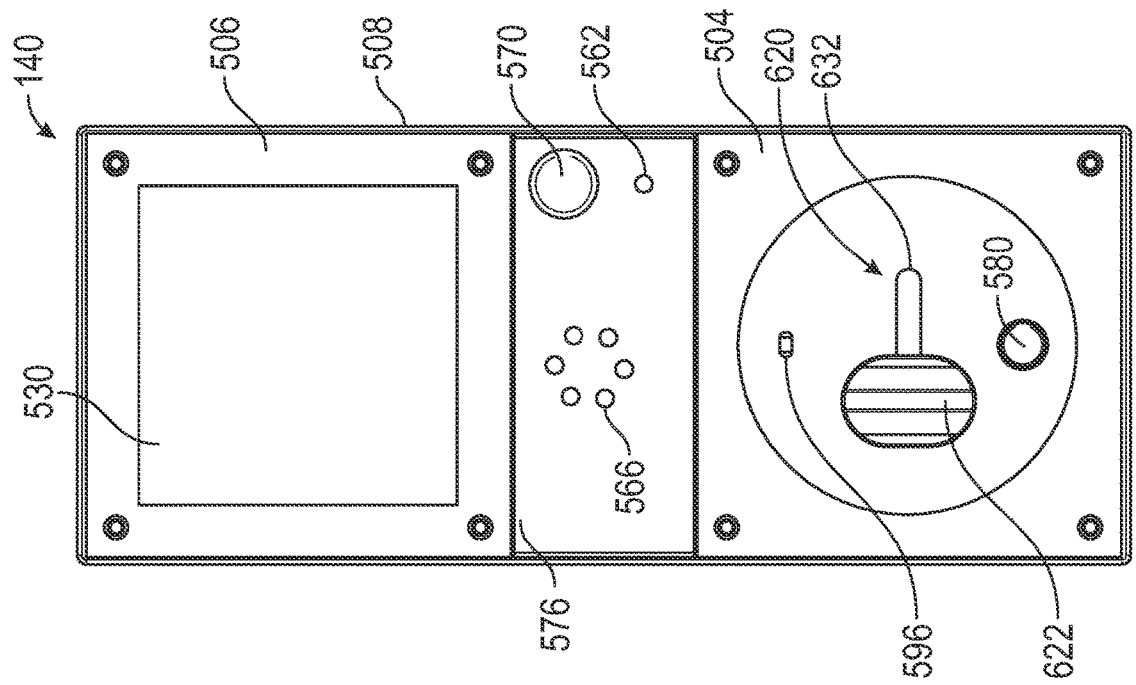
FIG. 43 is a rear partial section view showing the interior side of the interactive unit of FIG. 39, according to an exemplary embodiment.

The interactive unit 140 includes a second structural component, chassis, frame, or base, shown as interior core plate 504, and a third structural component, chassis, frame, or base, shown as interior top plate 506. The interior core plate 504 and the interior top plate 506 are positioned on the interior side of the door 30 and coupled to the subframe 40. The interior core plate 504 and the interior top plate 506 may be removably coupled to one another. The interior core plate 504 and the interior top plate 506 serve as a structure to support various interior side components of the interactive unit 140. A perimeter of the interior core plate 504 and the interior top plate 506 is covered by a trim piece or cover, shown as interior trim 508. As shown in FIG. 43, the interior trim 508 surrounds the interior core plate 504 and the interior top plate 506. The interior trim 508 is removably coupled to the interior core plate 504 and the interior top plate 506. The interior trim 508 may facilitate sealing the interior side of the interactive unit 140.

As shown, the exterior plate 500 includes a series of protrusions, shown as standoffs 510, that extend through the subframe 40 toward the interior side of the door 30. The interior core plate 504 and the interior top plate 506 are each removably coupled to one or more of the standoffs 510. By way of example, a fastener (e.g., a bolt) may pass through the interior core plate 504 and threadedly engage one of the standoffs 510 to couple the interior core plate 504 to the exterior plate 500. Similarly, a fastener (e.g., a bolt) may pass through the interior top plate 506 and threadedly engage one of the standoffs 510 to couple the interior top plate 506 to the exterior plate 500. When assembled, the exterior skin 50, the subframe 40, and the interior skin 52 are positioned between (e.g., sandwiched by) (a) the exterior plate 500 and (b) the interior core plate 504 and the interior top plate 506.

Figure 44:
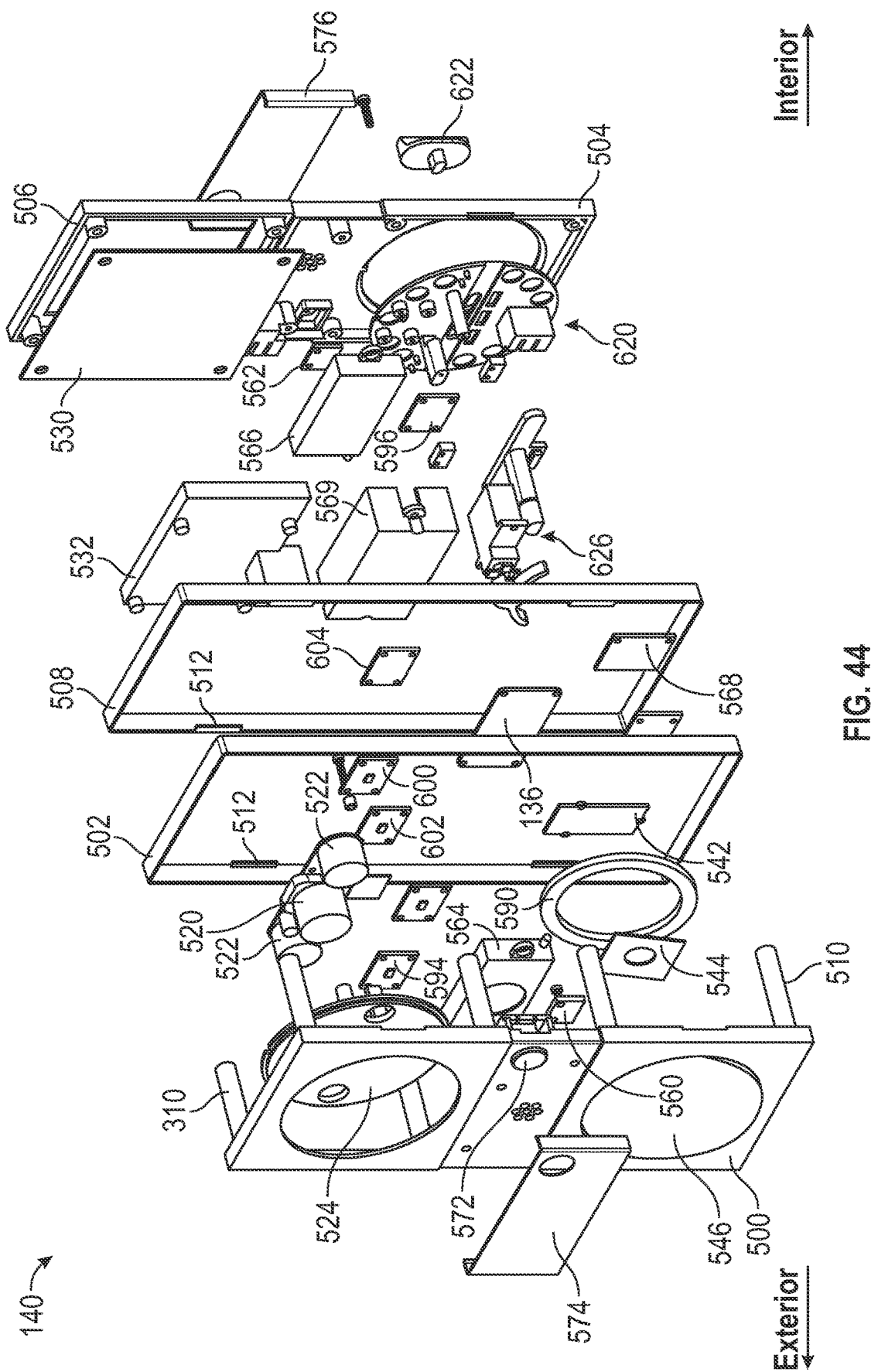
FIGS. 44 and 45 are exploded perspective views of the interactive unit of FIG. 39, according to an exemplary embodiment.
Figure 45:
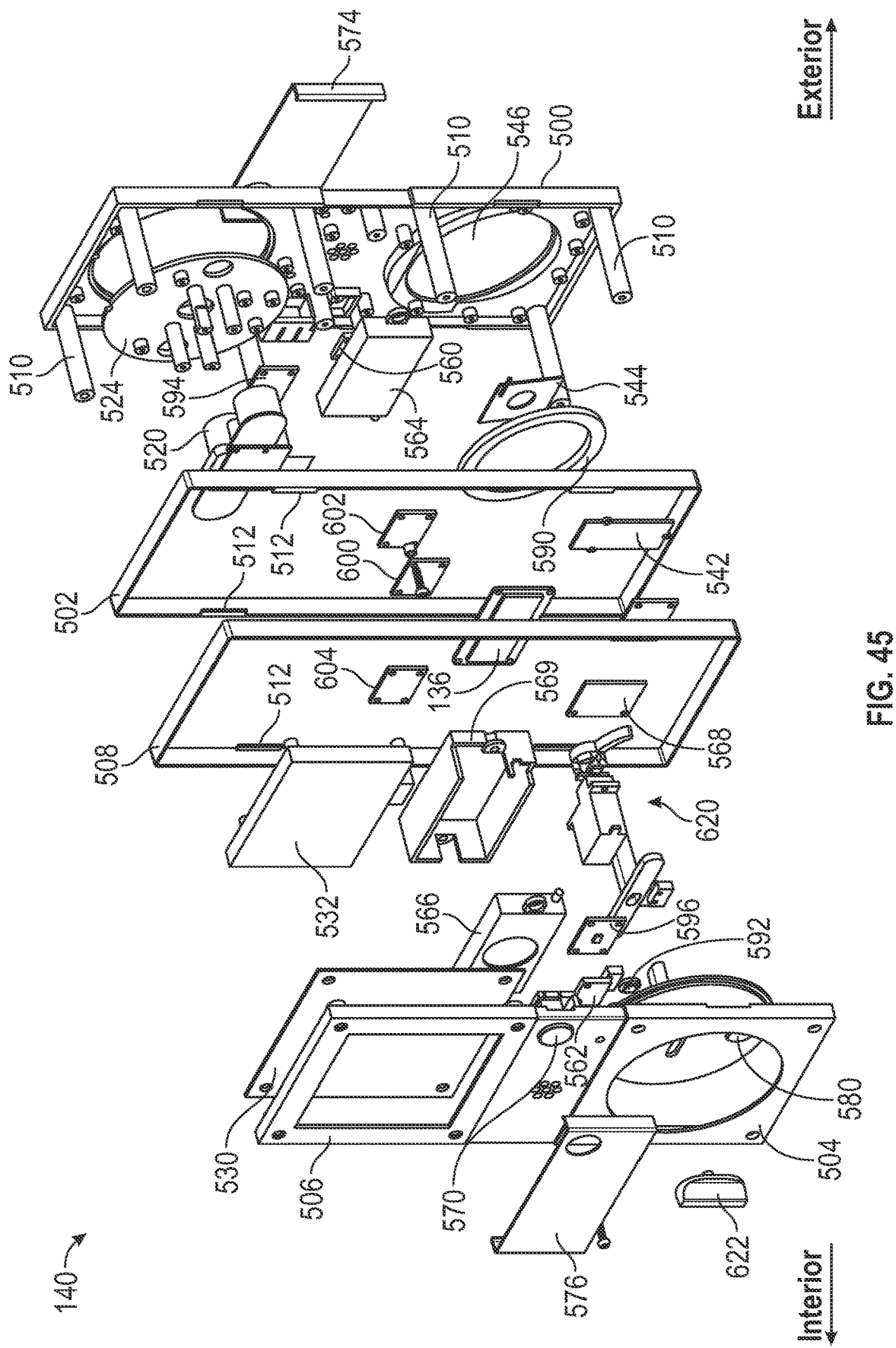
Figure 46:
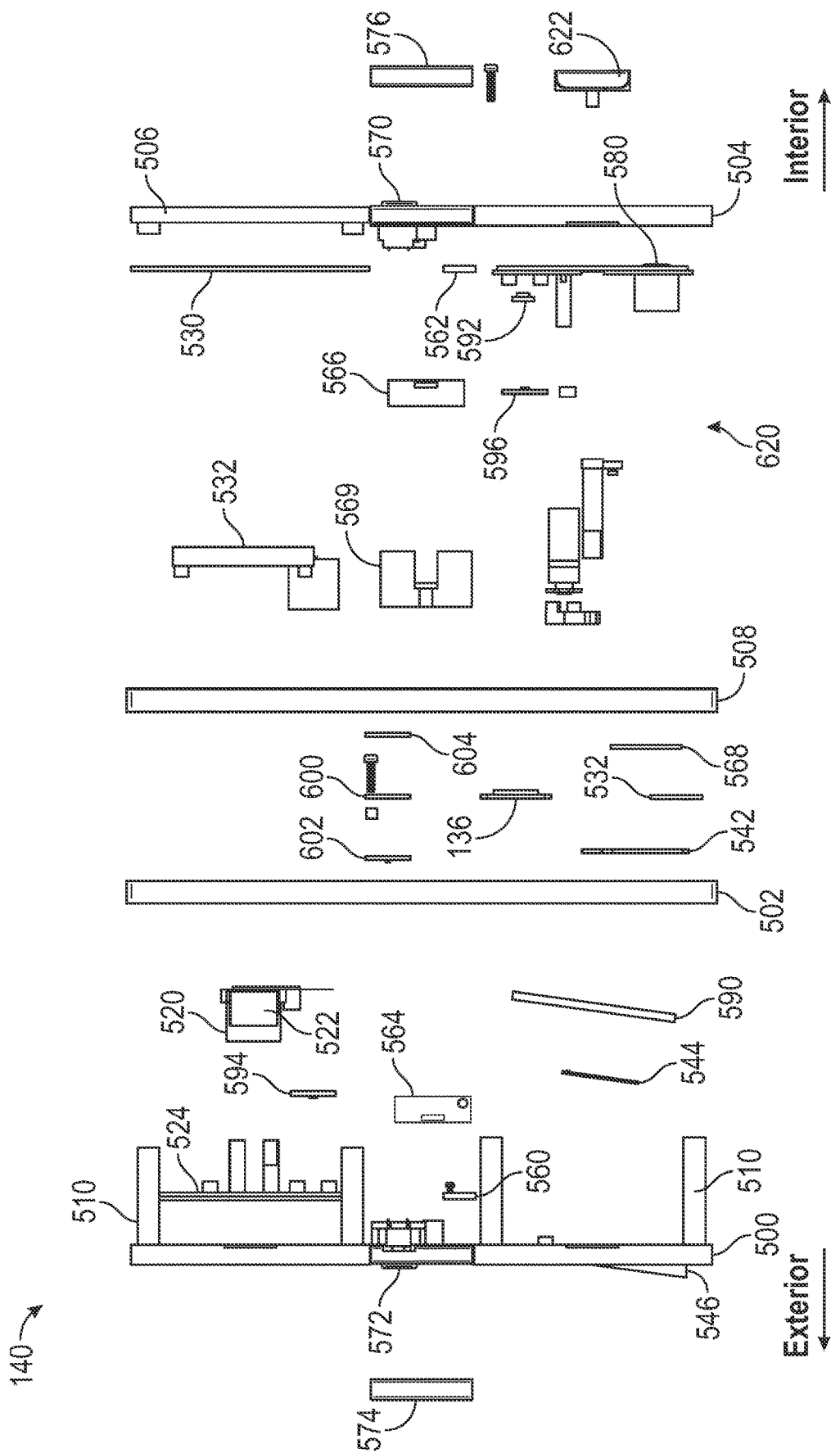
FIGS. 46 and 47 are exploded side views of the interactive unit of FIG. 39, according to an exemplary embodiment.
Figure 47:
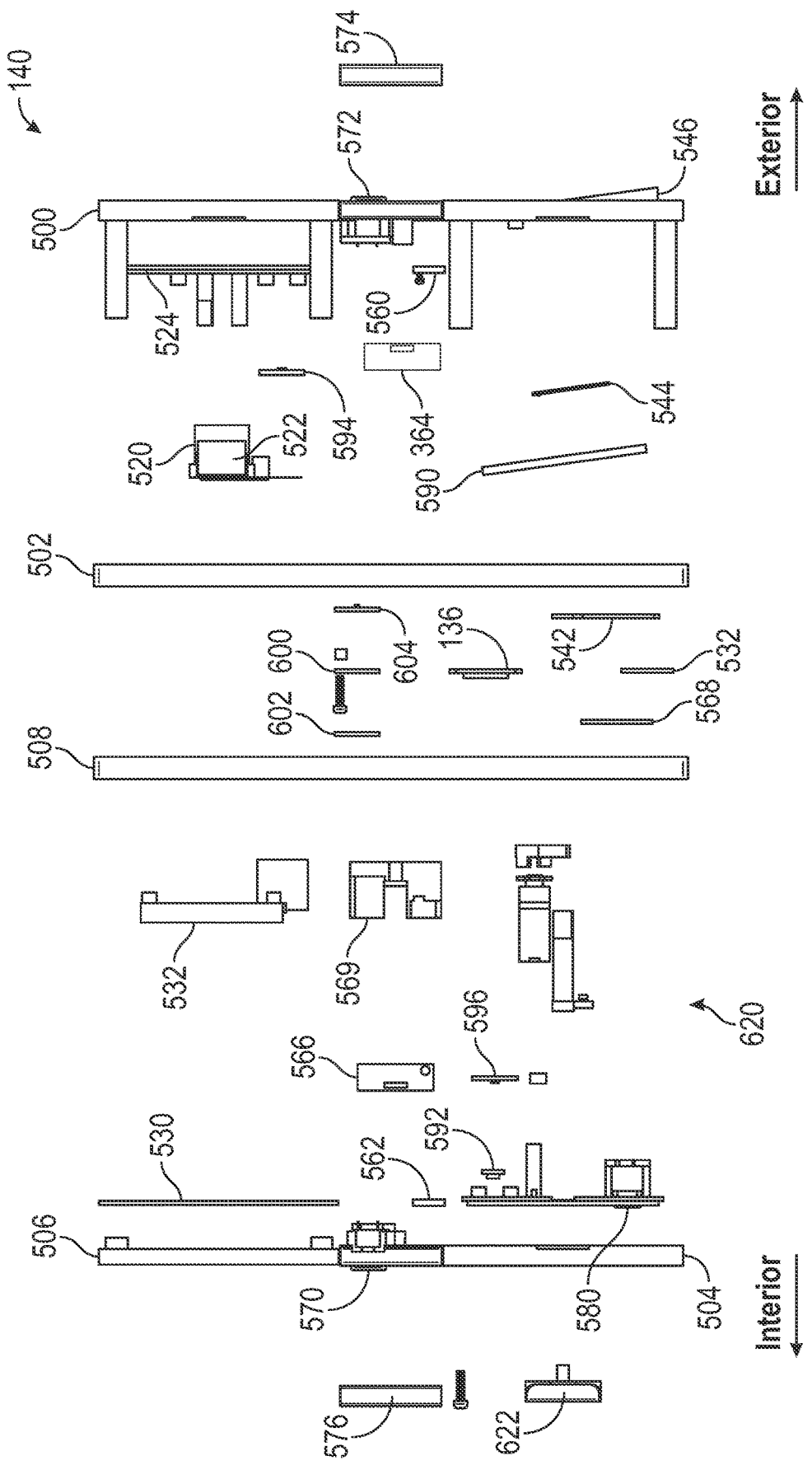

In some embodiments, the exterior trim 502 and the interior trim 508 may be removed and replaced with another piece of exterior trim 502 or interior trim 508, respectively. By way of example, the exterior trim 502 and/or the interior trim 508 may be replaced when damaged or worn. By way of another example, the exterior trim 502 and/or the interior trim 508 may be replaced with a trim piece having a different aesthetic or appearance (e.g., having a different material, having a different surface finish, having a different color, etc.). As shown in FIGS. 44 and 45, the exterior trim 502 and the interior trim 508 each include a series of protrusions, shown as tabs 512, extending inward to couple the exterior trim 502 and the interior trim 508 to the subframe 40. The tabs 512 of exterior trim 502 are captured between the exterior plate 500 and the exterior skin 50. The tabs 512 of the interior trim 508 are captured between (a) the interior core plate 504 and the interior top plate 506 and (b) the interior skin 52. The exterior trim 502 and the interior trim 508 may be removed by first removing the exterior plate 500, the interior core plate 504, and the interior top plate 506 from the door 30 to free the tabs 512. Alternatively, the exterior trim 502 and the interior trim 508 may be removed by bending the exterior trim 502 and the interior trim 508 outward until the tabs 512 are freed.

Camera

The interactive unit 140 further includes an image capture device or image sensor, shown as camera 520, coupled to the exterior plate 500 and positioned on the exterior side of the door 30. In some embodiments, the camera 520 is separate from the interactive unit 140 and otherwise positioned and/or the door 30 includes a second camera. By way of example, the camera 520 or the second camera may be positioned along the door frame 20 (e.g., one of the side jambs 22, the head jamb 24, etc.). The camera 520 is configured to capture image data (e.g., still images, video, etc.) of an area within a line of sight of the camera 520. The camera 520 may be positioned facing outward such that the line of sight captures the exterior surroundings of the door 30. By way of example, the camera 520 may capture image data regarding activity outside the door 30 such as a user standing in front of the door 30, an animal nearby the door 30, and/or a package positioned in front of the door 30. In some embodiments, the camera 520 includes an actuator (e.g., an electric motor) that moves the camera 520 to vary the field of view, a direction of view, zoom in, and/or zoom out.

The camera 520 may capture image data based on received light in a variety of different wavelengths. In some embodiments, the camera 520 captures image data based on visible light (e.g., light of the wavelength range that is visible to the human eye). Such a configuration may be useful during the day when the field of view is illuminated by the sun or at night when the field of view is artificially illuminated. In some embodiments, the camera 520 captures image data based on light that is not visible to the human eye, such as infrared light. Such as configuration may be useful at night when visible light is scarce. To facilitate capturing image data based on infrared light, the interactive unit 140 includes a pair of lamps (e.g., light-emitting diodes (LEDs)), shown as infrared emitters 522. The infrared emitters 522 may be operatively coupled to and controlled by the bridge controller 270. The infrared emitters 522 may be positioned to emit infrared light outward toward the field of view of the camera 520. This infrared light may be reflected back toward the camera 520 by objects within the field of view of the camera 520. As infrared light is not visible to the human eye, the infrared light may be used to capture image data at night without generating light pollution that would be considered undesirable by a user. In some embodiments, the camera 520 can capture image data based on visible light and image data based on infrared light such that the camera 520 can be used throughout the entire day.

As shown, the camera 520 and the infrared emitters 522 are coupled to the exterior plate 500 by a plate or cover, shown as camera cover 524. The camera cover 524 may surround the camera 520 without covering the view of the camera 520, thereby avoiding interference with the field of view of the camera 520. The camera cover 524 may be made from a material (e.g., plastic) that is permeable to a predetermined range of light wavelengths (e.g., infrared permeable, permitting infrared light to pass through the camera cover 524). In such an embodiment, the camera cover 524 may obscure the infrared emitters 522 from view without hindering the performance of the infrared emitters 522. The camera cover 524 may protect the infrared emitters 522 from external contaminants and reduce visual clutter on the interactive unit 140.

Display and Touch Inputs

The interactive unit 140 further includes a display screen, shown as display 530, positioned on the interior side of the door 30. The display 530 is coupled to the interior top plate 506, and the interior top plate 506 defines a cutout or aperture such that the display 530 is visible. The display 530 is configured to reproduce image data, displaying the corresponding image to a user positioned on the interior side of the door 30. In some embodiments, the display 530 is configured to reproduce the image data captured by the camera 520. The display 530 may provide a live video feed of the field of view of the camera 520, providing the user on the interior side of the door 30 with visual information regarding the surroundings of the door 30 without requiring the window 60 to be changed to the viewing state. The display 530 may provide a relatively large reproduction of the field of view of the camera 520 that is visible at a distance from the door 30.

In some embodiments, the camera 520 and the display 530 are operatively coupled to the main control unit 134. By way of example, the camera 520 and/or the display 530 may be coupled to the main control unit 134 by the door wiring harness 170. Processing image data may require significant processing power and relatively large amounts of data. The use of a wired connection may facilitate transferring large amounts of data more quickly than a wireless connection. Additionally, the main controller 242 may have more processing power than the bridge controller 270, such that the main controller 242 may be better suited to image processing than the bridge controller 270. The main control unit 134 may receive image data from the camera 520. The main control unit 134 may command the display 530 to display an image (e.g., representing the image data captured by the camera 520, a logo, a time, a date, daily weather, a selectable menu for updating settings, an authentication interface to receive manually entered credentials to changes settings and/or to approve installation of a new module, etc.).

Referring to FIGS. 39, 44, and 45, the interactive unit 140 further includes an input device, shown as touch input 532. The touch input 532 is configured to register a location of a contact with a human (e.g., where contact with a user's finger occurs) and provide corresponding touch input data. In some embodiments, the touch input 532 utilizes a capacitive touch sensor that is configured to identify human contact based on a measured change in capacitance. As shown in FIG. 44, the touch input 532 is positioned behind the display 530 and is in engagement with the display 530 such that the touch input 532 registers when a user contacts the display 530. Accordingly, the touch input 532 and the display 530 may cooperate together form a touchscreen or touch panel. The touchscreen may act as a user interface, displaying information to the user (e.g., footage from the camera 520, a graphical user interface, etc.) and receiving inputs (e.g., a selection of an object on the display 530, a command, a settings change, a key code to facilitate authorizing a settings change, etc.) from the user.

User Authentication Inputs

The interactive unit 140 may require a user to successfully perform an authentication prior to enabling one or more functions of the door system 10. By way of example, the door system 10 may require a user to be authenticated prior to changing the door 30 from the locked state to the unlocked state or from the unlocked state to the locked state. By way of another example, the door system 10 may require a user to be authenticated prior to changing certain settings of the door system 10.

The interactive unit 140 may include components that are able to receive various types of user authentication inputs. By way of example, the interactive unit 140 may receive a passcode, a biometric input, or a communication from a fob or a user device 190. These user authentication inputs may be evaluated to determine if the associated user or device has permission to access the door 30. A user or device may be granted access over a predetermined time period (e.g., for one week, from October $1^{st}$ to December $14^{th}$, etc.). Alternatively, a user or device may have permission to access the door 30 until their permissions are manually revoked (e.g., by a homeowner user through a user device 190, by an owner using the touchscreen of the interactive unit 140). The process of permitted users and evaluating user authentication inputs may be performed by components of the door 30, user devices 190, and/or servers 200. Further details regarding the user authentication functionality of the door system 10 may be found in U.S. Patent Publication No. 2022/0319264, filed Jun. 17, 2022, which is incorporated herein by reference in its entirety.

Keypad

Figure 41:
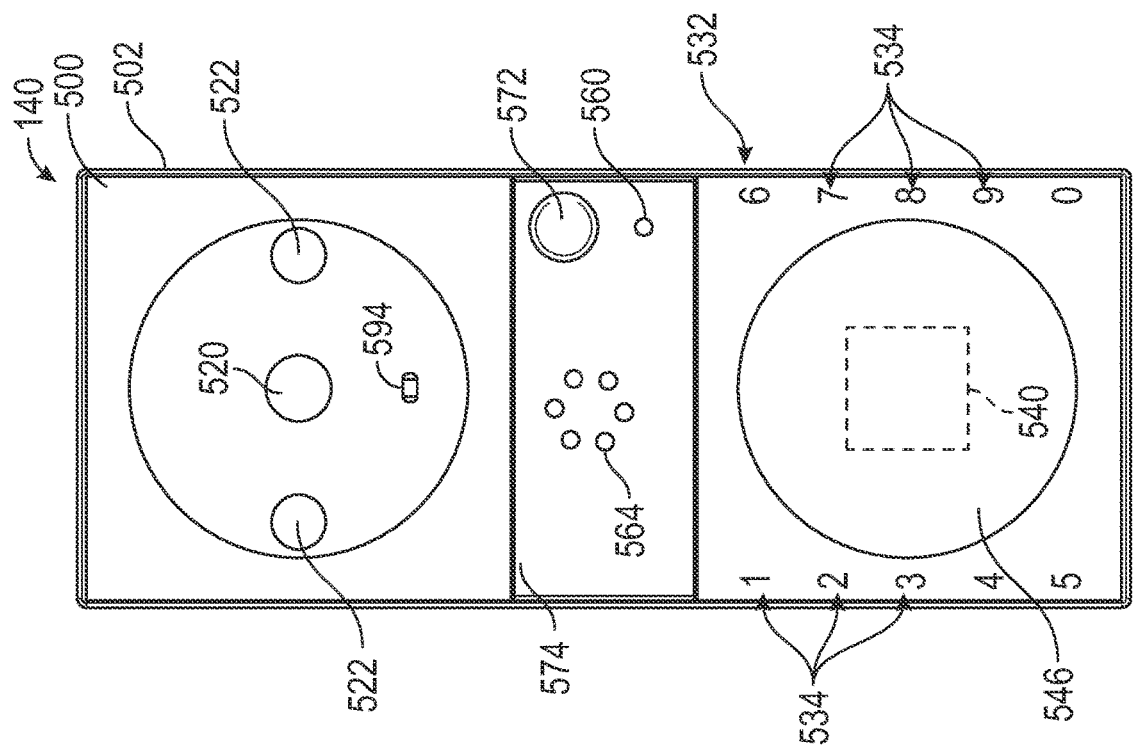
FIG. 41 is a front partial section view showing the exterior side of the interactive unit of FIG. 39, according to an exemplary embodiment.
Figure 40:
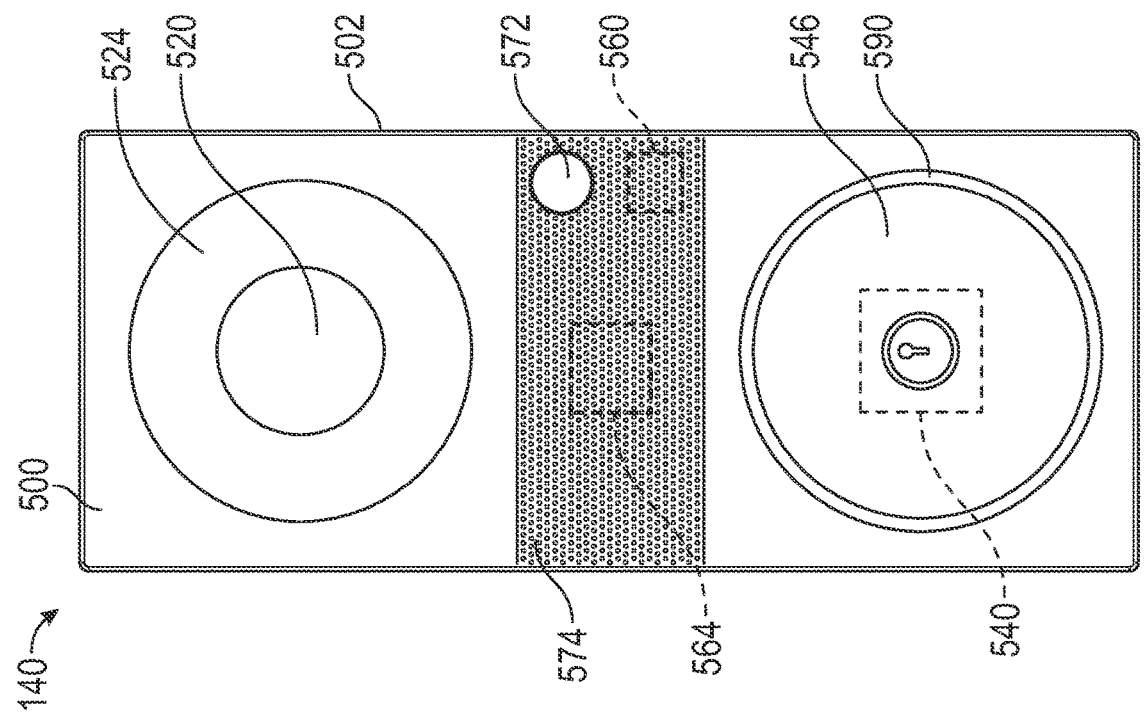
FIG. 40 is a front view showing an exterior side of the interactive unit of FIG. 39, according to an exemplary embodiment.

Referring to FIGS. 40 and 41, an additional touch input 532 (e.g., a keypad) is usable by a user positioned on the exterior side of the interactive unit 140. In such a configuration, the touch input 532 may be utilized to authenticate a user (e.g., to confirm that the user is permitted to unlock the door 30). The touch input 532 defines a series of touch zones 534 on the exterior plate 500. The touch input 532 is capable of identifying when each touch zone 534 is contacted by a user. The touch inputs 532 may be used as a keypad to authenticate a user. By way of example, an authorized user may be associated with (e.g., provided with) a predetermined contact pattern of the touch inputs 532 (e.g., corresponding to a passcode). By contacting the touch inputs 532 in the predetermined contact pattern, the user confirms their identity as an authorized user. In response to such a confirmation, the control system 100 may permit user to access the door 30 (e.g., by unlocking the door 30).

As shown in FIG. 41, each touch zone 534 has an identifier or symbol (e.g., letters, numbers, etc.), shown as a number. The identifiers may facilitate the user accurately identifying and contacting the touch zones 534 in the predetermined contact pattern. By way of example, an authorized user may be provided with a passcode (e.g., a series of symbols such as 8490, 0933, etc.) corresponding to the predetermined contact pattern. By pressing the touch zones 534 with the identifiers of the passcode in the order of the passcode, the user may contact the touch zones 534 in the predetermined contact pattern. Advantageously, the passcode may be easier to transmit to the user or easier for the user to remember than the shape of the predetermined contact pattern.

In some embodiments, each touch zone 534 includes an associated light or illuminator that selectively illuminates the identifiers such that the numbers are selectively visible. By way of example, the lights may be disabled to put the interactive unit 140 into a "sleep mode" (e.g., as shown in FIG. 40) in which the interactive unit 140 is minimally visible and consumes minimal energy. In response to a user interaction (e.g., motion sensed outside the door, the user touching the touch input 532, etc.), the lights may illuminate to put the interactive unit 140 into a "wake mode" (e.g., as shown in FIG. 41), in which the identifiers are visible. In other embodiments, the identifiers are printed, embossed, individual buttons, or otherwise permanently visible on the surface of the exterior plate 500.

NFC Radio

Referring to FIGS. 39 and 44-47, the interactive unit 140 further includes a short range communication module or radio, shown as near-field communication (NFC) radio 540. The NFC radio 540 is configured to communicate wirelessly with one or more external devices (e.g., user devices 190, key fobs, etc.). The NFC radio 540 may be configured to communicate through NFC. In other embodiments, the NFC radio 540 is configured to communicate through another type of communication protocol, such as another type of radio-frequency identification (RFID).

The NFC radio 540 includes a controller, adapter, driver, or receiver, shown as NFC adapter 542, and a broadcast device or antenna, shown as NFC antenna 544. The NFC antenna 544 is operatively coupled to the NFC adapter 542 such that the NFC adapter 542 communicates through the NFC antenna 544. The NFC adapter 542 may send and/or receive wireless signals through the NFC antenna 544. The NFC adapter 542 may be operatively coupled to the bridge controller 270 such that the bridge controller 270 controls operation of the NFC radio 540.

The exterior plate 500 includes a protrusion or disc, shown as NFC cover 546. The NFC radio 540 is positioned directly behind the NFC cover 546 and aligned with the NFC cover 546. Accordingly, a user may align an external device (e.g., a fob, a user device 190, etc.) with the NFC radio 540 by placing the external device adjacent the NFC cover 546. The NFC cover 546 may be made from a material (e.g., plastic) that minimizes interference with the wireless communication of the NFC radio 540.

The NFC radio 540 may communicate with one or more external devices to authenticate a user. By way of example, the NFC adapter 542 may control the NFC antenna 544 to emit a first signal. The first signal may contain information identifying one or more components of the door 30 (e.g., a device identifier, a device key, etc.). In response to receiving the first signal, an external device (e.g., a fob, a user device 190, etc.) may emit a second signal back to the NFC radio 540. The second signal may contain information identifying the external device (e.g., a device indicator, a device key, etc.) and/or information identifying a user associated with the external device (e.g., a user indicator, a user key, etc.). The NFC antenna 544 may receive the second signal and transfer the second signal to the NFC adapter 542. The NFC adapter 542 may transfer the information from the second signal to the bridge controller 270 and/or the main controller 242. The user device 190, the bridge module 136, the main control unit 134, and/or a server 200 may cooperate to authenticate the user and/or the external device. In response to successfully confirming that the user is an authenticated user and/or that the external device is an authenticated device, the control system 100 may permit the user to access the door 30 (e.g., by unlocking the door 30).

In some embodiments, the NFC radio 540 is configured to communicate with a key fob. By way of example, a first user (e.g., a homeowner) may provide a second user (e.g., a guest) with a key fob (e.g., an RFID tag) containing a device indicator. In some embodiments, the NFC radio 540 is configured to communicate with a user device 190. By way of example, a first user (e.g., a homeowner) may authenticate their own user device 190 and/or a user device 190 of a second user (e.g., a guest). Each user device could be associated with a device indicator.

Through a user device 190, the first user may set a device indicator (e.g., associated with a key fob or user device 190) as being an authorized device for a predetermined period of time (e.g., one day, one week, one month, etc.), after which the permission will expire. Such a configuration may be useful when the second user will be occupying the home for a short period of time (e.g., as a short term rental), after which the second user should not be able to access the home. Alternatively, the first user may set the device indicator as being an authorized device until the first user manually revokes the permission.

Biometric Input

Referring to FIG. 39, the interactive unit 140 includes a biometric input device or biometric device, shown as fingerprint scanner 550. The fingerprint scanner 550 is operatively coupled to the bridge module 136. The fingerprint scanner 550 is configured to acquire a biometric credential of a user (e.g., a biological characteristic or trait unique to a user). By way of example, the biometric credential may include a fingerprint scan (e.g., an image of a user's fingerprint or the relative positions of key portions of a user's fingerprint). In other embodiments, the fingerprint scanner 550 is replaced by another type of biometric sensor (e.g., a camera, a microphone, etc.) that receives a different type of biometric credential, such as a retinal scan (e.g., an image of a user's eye or the relative positions of key portions of a user's eye), a voice command, or a facial scan.

The fingerprint scanner 550 may be used to authenticate a user. By way of example, the biometric credential retrieved by the fingerprint scanner 550 may be used to authenticate the user. As the biometric credential is unique to each user, the biometric credential may be used as a user identifier. The biometric credential may be compared to a database of biometric credentials of known users to determine if the biometric credential provided by the fingerprint scanner 550 matches a biometric credential of an authenticated user. This process may be performed by a user device 190, a server 200, the bridge module 136, the main control unit 134, and/or another controller. In response to successfully confirming that biometric credential matches an authenticated user, the control system 100 may permit the user to access the door 30 (e.g., by unlocking the door 30).

Acoustic Components

Referring to FIGS. 39-47, the interactive unit 140 includes various components that facilitate auditory, acoustic, or verbal communication through the door 30. By way of example, such components may facilitate communication between a user positioned on the interior side of the door 30 and a user positioned on the exterior side of the door 30. In such an example, the components permit two users to speak clearly to one another without having to open the door 30 (e.g., which may be undesirable due to security concerns). By way of another example, the components may facilitate communication between a remote user and a user positioned on the exterior side of the door 30. In such an example, the components may facilitate communication even if a user (e.g., a homeowner) is not nearby the door 30.

The interactive unit 140 includes a pair of receivers or sound recorders, shown as external microphone 560 and internal microphone 562. The external microphone 560 is coupled to and positioned behind the exterior plate 500. Specifically, the external microphone 560 is positioned to be exposed to sounds originating on the exterior side of the door 30. The exterior plate 500 may define one or more apertures to facilitate the transfer of sound (e.g., voices, ambient sounds, etc.) to the external microphone 560. The external microphone 560 may record these sounds and generate a corresponding external audio signal representing the recorded sounds. The external microphone 560 may be operatively coupled to the bridge module 136 such that the external microphone 560 provides the external audio signal to the bridge controller 270.

The internal microphone 562 is coupled to and positioned behind the interior core plate 504. Specifically, the internal microphone 562 is positioned to be exposed to sounds originating on the interior side of the door 30. The interior core plate 504 may define one or more apertures to facilitate the transfer of sound (e.g., voices, ambient sounds, etc.) to the internal microphone 562. The internal microphone 562 may record these sounds and generate a corresponding internal audio signal representing the recorded sounds. The internal microphone 562 may be operatively coupled to the bridge module 136 such that the internal microphone 562 provides the internal audio signal to the bridge controller 270.

The interactive unit 140 further includes a pair of monitors, speakers, or sound generators, shown as external speaker 564 and internal speaker 566. The external speaker 564 and the internal speaker 566 may be electrically coupled to an amplifier 568 that provides electrical energy to power the external speaker 564 and the internal speaker 566. The external speaker 564 is coupled to and positioned behind the exterior plate 500 and operatively coupled to the bridge controller 270. The external speaker 564 may receive an external sound output signal from the bridge controller 270, the external sound output signal representing a desired sound. In response to receiving the external sound output signal, the external speaker 564 may generate the corresponding desired sound. The external speaker 564 may be positioned and oriented to direct the generated sound away from the door 30 on the exterior side of the door 30. The exterior plate 500 may define one or more apertures to facilitate the transfer of sound from the external speaker 564 to the surrounding environment.

The internal speaker 566 is coupled to and positioned behind the interior core plate 504 and operatively coupled to the bridge controller 270. The internal speaker 566 may receive an internal sound output signal from the bridge controller 270, the internal sound output signal representing a desired sound. In response to receiving the internal sound output signal, the internal speaker 566 may generate the corresponding desired sound. The internal speaker 566 may be positioned and oriented to direct the generated sound away from the door 30 on the interior side of the door 30. The interior core plate 504 may define one or more apertures to facilitate the transfer of sound from the internal speaker 566 to the surrounding environment.

In some embodiments, the exterior plate 500 includes one or more baffles or chambers that limit or prevent the sound generated by the external speaker 564 from reaching the external microphone 560. In some embodiments, the interior core plate 504 includes one or more baffles or chambers that limit or prevent the sound generated by the internal speaker 566 from reaching the internal microphone 562. Referring to FIGS. 44-47, the interactive unit 140 includes a divider, shown as baffle 569, that divides the internal volume of the interactive unit 140. Specifically, the baffle 569 separates (a) the external microphone 560 and the external speaker 564 from (b) the internal microphone 562 and the internal speaker 566. The baffle 569 may acoustically isolate the external components from the internal components, preventing the generated and received sounds from bleeding between components unintentionally.

In a first mode of operation, the external microphone 560, the internal microphone 562, the external speaker 564, and the internal speaker 566 can be utilized to facilitate verbal communication between a first user on the interior side of the door 30 and a second user on the exterior side of the door 30. In this first mode, the external microphone 560 records the speech of the second user, and the bridge controller 270 uses the corresponding external audio signal to generate an internal sound output signal. The bridge controller 270 sends the internal sound output signal to the internal speaker 566, which replicates the speech of the second user. Similarly, the internal microphone 562 records the speech of the first user, and the bridge controller 270 uses the corresponding internal audio signal to generate an external sound output signal. The bridge controller 270 sends the external sound output signal to the external speaker 564, which replicates the speech of the first user. In this way, the first user and the second user may have a verbal conversation through the door 30.

In some embodiments, the interactive unit 140 includes an input device or user interface element (e.g., a button, a switch, etc.), shown as intercom button 570. The intercom button 570 may be coupled to the interior core plate 504 and accessible from the interior side of the door 30. In an embodiment including the intercom button 570, the bridge controller 270 may be configured to prevent the replication of the speech of the first user by the internal microphone 562 and the external speaker 564 unless the intercom button 570 is pressed (e.g., by the first user). The first user may therefore utilize the intercom button 570 to control when the second user is permitted to hear the speech of the first user.

In a second mode of operation, the external microphone 560 and the external speaker 564 can be utilized to facilitate verbal communication between a first user positioned remotely from the door 30 and a second user on the exterior side of the door 30. By way of example, this communication may occur through a network (e.g., Internet, cellular, etc.) connection between the bridge controller 270 and a user device 190. In this second mode, the external microphone 560 records the speech of the second user, and the bridge controller 270 instructs the user device 190 to reproduce the speech of the second user for the first user. The user device 190 records the speech of the first user, and the bridge controller 270 commands the external speaker 564 to reproduce the speech of the first user. This second mode of operation may be useful when the first user is positioned in a different room of the home away from the door 30 or outside of or away from the home entirely.

Referring to FIGS. 39-41, the interactive unit 140 includes an input device or user interface element (e.g., a button, a switch, etc.), shown as doorbell button 572. The doorbell button 572 may be coupled to the exterior plate 500 and accessible from the exterior side of the door 30. The doorbell button 572 is operatively coupled to the bridge controller 270. When pressed, the doorbell button 572 generates a doorbell signal indicating that a user wishes to provide a notification inside of the home. In response to receiving the doorbell signal, the bridge controller 270 may cause the internal speaker 566 to provide a notification (e.g., an auditory notification, such as a ringing bell or siren). Additionally or alternatively, the bridge module 136 may transmit the doorbell signal to the doorbell module 184, and the doorbell module 184 may cause the doorbell speaker 186 to provide a notification. In some embodiments, pressing the doorbell button 572 initiates recording of sound by the external microphone 560 (e.g., for reproduction by the internal speaker 566 and/or the user device 190). By way of example, in response to a user pressing the doorbell button 572, the door system 10 may initiate a telephone call between the interactive unit 140 and a user device 190 of a homeowner. The doorbell button 572 may replace the external doorbell 182, when included. In some embodiments, the interactive unit 140 does not include the doorbell button 572.

Referring to FIGS. 40-47, the interactive unit 140 includes a pair of removable covers or speaker grills, shown as mesh cover 574 and mesh cover 576, that protect the speakers and microphones of the interactive unit 140. The mesh cover 574 and the mesh cover 576 may define a series of apertures or perforations that facilitate the flow of sound and/or air through the mesh cover 574 and the mesh cover 576. The mesh cover 574 is removably coupled to the exterior plate 500. The mesh cover 574 covers the external microphone 560 and the external speaker 564, obscuring the external microphone 560 and the external speaker 564 from sight. The mesh cover 574 defines an aperture through which the doorbell button 572 extends. The mesh cover 576 is removably coupled to the interior core plate 504. The mesh cover 576 covers the internal microphone 562 and the internal speaker 566, obscuring the internal microphone 562 and the internal speaker 566 from sight. The mesh cover 576 defines an aperture through which the intercom button 570 extends.

Privacy Button

Referring to FIGS. 39, 42, 43, and 45-47, the interactive unit 140 includes an input device or user interface element (e.g., a button, a switch, etc.), shown as privacy button 580. The privacy button 580 may be coupled to the interior core plate 504 and accessible from the interior side of the door 30. The privacy button 580 is operatively coupled to the bridge controller 270. When pressed by a user, the privacy button 580 provides an indication to the bridge controller 270 that the user wishes to change a state of the window 60 (e.g., to the privacy state, to the viewing state, etc.). In response to the indication, the bridge controller 270 may command the window control unit 132 to change a state of the window 60. By way of example, the window control unit 132 may change the window 60 from the privacy state to the viewing state. By way of another example, the window control unit 132 may change the window 60 from the viewing state to the privacy state. Accordingly, pressing the privacy button 580 multiple times may cycle the window 60 between the privacy state and the viewing state, or various states therebetween (e.g., partially tinted, partially opaque, etc.).

External Charge Port

Referring to FIG. 39, the interactive unit 140 includes a port (e.g., a USB-C port, a micro-USB port, a power port, etc.), shown as external power port 582. The external power port 582 may be defined along the exterior plate 500 or the exterior trim 502. According to an exemplary embodiment, the external power port 582 is configured to facilitate connecting an external power source (e.g., a portable battery pack, bank, etc.) to the interactive unit 140. By way of example, the power source 102 may be disconnected from the door 30 (e.g., a power outage, the door 30 has not been hardwired into the building grid, etc.) and the backup battery 222 may be dead. Accordingly, by connecting the external power source to the external power port 582, the user can power the interactive unit 140 and, therefore, the unlocking capabilities of the door 30. Therefore, the user can gain entry through the door 30 during a power outage even if the backup battery 222 is also dead.

Status Lights

Referring to FIGS. 39, 40, 42, and 44-47, the interactive unit 140 includes a pair of indicators, status lights, or output devices, shown as external status light 590 and internal status light 592, that generate and emit visible light to visually convey information to a user. The external status light 590 is coupled to the exterior plate 500. The external status light 590 is positioned on an exterior face of the interactive unit 140 such that the external status light 590 emits first, exterior light in an outward, external direction. Accordingly, the exterior light emitted by the external status light 590 may be visible to a user positioned on the exterior side of the door 30. According to an exemplary embodiment, the external status light 590 is annular and surrounds the NFC cover 546. Accordingly, the external status light 590 provides a visual indication guiding a user toward the NFC antenna 544. The external status light 590 may illuminate one or more components on the exterior side of the interactive unit 140 (e.g., to facilitate visibility by a user).

The internal status light 592 is coupled to the interior core plate 504. The internal status light 592 is positioned on an interior face of the interactive unit 140 such that the internal status light 592 emits second, interior light in an inward, internal direction. Accordingly, the interior light emitted by the internal status light 592 may be visible to a user positioned on the interior side of the door 30. According to an exemplary embodiment, the internal status light 592 is annular and surrounds the privacy button 580 and lock control interface 620. Accordingly, the internal status light 592 provides a visual indication guiding a user toward the privacy button 580 and the lock control interface 620. The internal status light 592 may illuminate one or more components on the interior side of the interactive unit 140 (e.g., to facilitate visibility by a user).

The external status light 590 and the internal status light 592 may each include one or more light generators, such as LEDs or incandescent bulbs. In some embodiments, the external status light 590 and/or the internal status light 592 include multiple generators that are positioned in a ring to provide the annular shapes of the external status light 590 and the internal status light 592. In some embodiments, the external status light 590 and/or the internal status light 592 include a diffuser or light guide that guides the exterior light and the interior light in annular patterns.

The external status light 590 and the internal status light 592 are operatively coupled to the bridge controller 270. The bridge controller 270 may control the operation of the external status light 590 and the internal status light 592. By way of example, the bridge controller 270 may change a color, an on/off state, a flashing pattern, a flashing speed, or other characteristics of the exterior light and the interior light. The bridge controller 270 may control the external status light 590 and the internal status light 592 together (e.g., such that the external status light 590 and the internal status light 592 emit the same color light simultaneously). The bridge controller 270 may control the external status light 590 and the internal status light 592 independent of one another (e.g., such that the external status light 590 emits light while the internal status light 592 is switched off, such that the external status light 590 and the internal status light 592 emit light of different colors, etc.).

In some embodiments, the external status light 590 and/or the internal status light 592 are utilized to provide status information regarding a status of the door system 10. In some embodiments, the external status light 590 and/or the internal status light 592 provide information regarding a locked status or unlocked status of the door 30. By way of example, the external status light 590 and/or the internal status light 592 may provide a first visual indication (e.g., light of a certain color, turn on, turn off, flash in a certain pattern, etc.) to indicate that the door 30 is in a locked state and provide a different visual indication to indicate that the door is in the unlocked state. By way of another example, the external status light 590 and/or the internal status light 592 may provide a visual indication when the door 30 changes between the locked state and the unlocked state to provide a visual confirmation of the change. In some embodiments, the external status light 590 and/or the internal status light 592 provide information regarding an operational status of the door 30. By way of example, the external status light 590 and/or the internal status light 592 may provide a first visual indication (e.g., light of a certain color, turn on, turn off, flash in a certain pattern, etc.) to indicate that the door 30 is in an operational state and provide a different visual indication to indicate that the door 30 has experienced an error. In some embodiments, the external status light 590 and/or the internal status light 592 provide information regarding the presence of a user on the opposite side of the door 30. By way of example, the internal status light 592 may provide a visual indication in response to an input (e.g., from the camera 520, from the doorbell button 572, from contact with the touch zones 534, from the NFC radio 540, etc.) indicating that a user is positioned on the exterior side of the door 30.

Time of Flight Sensors

Referring to FIGS. 39, 41, and 43-47, the interactive unit 140 includes a pair of presence sensors, distance sensors, time of flight (TOF) sensors, or input devices, shown as external TOF sensor 594 and internal TOF sensor 596. The external TOF sensor 594 is coupled to the exterior plate 500 and faces in an outward, exterior direction. The internal TOF sensor 596 is coupled to the interior core plate 504 and faces in an inward, interior direction. The external TOF sensor 594 and the internal TOF sensor 596 are operatively coupled to the bridge controller 270. The external TOF sensor 594 and the internal TOF sensor 596 communicate sensor data to the bridge controller 270.

The external TOF sensor 594 and the internal TOF sensor 596 provide sensor data (e.g., a signal, information, etc.) indicating a distance between the sensor and an object in the environment. Specifically, the external TOF sensor 594 provides distance data indicating a distance between the external TOF sensor 594 and an object on an exterior side of the door 30 (e.g., a user, an animal, a box, a vehicle, etc.). The internal TOF sensor 596 provides distance data indicating a distance between the internal TOF sensor 596 and an object on an interior side of the door 30.

In some embodiments, the external TOF sensor 594 and the internal TOF sensor 596 are each time of flight sensors that measure a distance to an object by releasing a pulse of light, waiting for the light to be reflected by the object, and recording the time delay between when the initial pulse is released and the reflected light is received. Based on this measured delay, the TOF sensor calculates the distance. In other embodiments, the external TOF sensor 594 and/or the internal TOF sensor 596 utilize a different type of distance sensor, such as a LiDAR sensor or an ultrasonic sensor. In other embodiments, the external TOF sensor 594 and/or the internal TOF sensor 596 use a camera or another type of sensor to detect the presence, location, or motion of an object.

The bridge controller 270 may utilize the sensor data from the external TOF sensor 594 and the internal TOF sensor 596 to identify the presence of a user. The bridge controller 270 may determine if a user is present on the exterior side of the door 30 based on sensor data from the external TOF sensor 594. The bridge controller 270 may determine if a user is present on the interior side of the door 30 based on sensor data from the internal TOF sensor 596. By way of example, the bridge controller 270 may determine that a user is present near the door 30 in response to the external TOF sensor 594 or the internal TOF sensor 596 detecting an object within a threshold distance of the door 30. By way of another example, the bridge controller 270 may determine that a user is present near the door 30 in response to the external TOF sensor 594 or the internal TOF sensor 596 detecting that an object is moving.

In response to determining that an object is present, the bridge controller 270 may activate one or more parts of the door system 10. This may facilitate automatic activation of certain functions as soon as a user approaches the door 30 rather than requiring the user to interact with the door (e.g., by pushing buttons). By way of example, in response to a user being detected on the exterior side of the door 30, the bridge controller 270 may (a) activate the external status light 590 (e.g., illuminate, flash, etc.) to provide light and guide the user, (b) activate the camera 520 to begin recording images or video, (c) provide a notification to a user device 190, (d) provide the recorded images or video for display on the user device 190 and/or the display 530, (e) activate the external microphone 560 and the internal speaker 566 to begin transferring sound from the exterior side of the door 30 to the interior side of the door 30, (f) activate the internal status light 592 to visually indicate the presence of someone or something outside the door 30, and/or (g) control other functions. By way of another example, in response to a user being detected on the interior side of the door 30, the bridge controller 270 may (a) activate the internal status light 592 to provide light and guide the user, (b) activate the camera 520 to begin recording images or video, (c) provide the recorded images or video for display on the display 530, (d) activate the external microphone 560 and the internal speaker 566 to begin transferring sound from the exterior side of the door 30 to the interior side of the door 30, and/or (e) control other functions.

Accelerometer Unit

Referring to FIGS. 39 and 44-47, the interactive unit 140 includes a movement sensor or input device, shown as accelerometer unit 600. The accelerometer unit 600 is positioned between the exterior plate 500 and the interior core plate 504 and coupled to the exterior plate 500. The accelerometer unit 600 is operatively coupled to the bridge controller 270. The accelerometer unit 600 provides sensor data to the bridge controller 270. Specifically, the accelerometer unit 600 is configured to provide sensor data describing a movement of the accelerometer unit 600. Due to the coupling of the accelerometer unit 600 to the exterior plate 500, the sensor data from the accelerometer unit 600 describes the movement of the door 30.

The accelerometer unit 600 may measure movement along one or more axes (e.g., a lateral axis, a vertical axis, a longitudinal axis). The accelerometer unit 600 may measure rotation about one or more axes. The accelerometer unit 600 may measure or be used to determine position, velocity, and/or acceleration. The accelerometer unit 600 may include one or more accelerometers, gyroscopes, or inertial measurement units (IMUs).

The bridge controller 270 may use the sensor data from the accelerometer unit 600 to determine if the door is being moved (e.g., opened or closed). By way of example, if the velocity of the door 30 is over a threshold velocity (e.g., 0 m/s, 10 degrees/s, etc.), the bridge controller 270 may determine that the door 30 is being moved. By way of example, if the acceleration of the door 30 is over a threshold acceleration (e.g., 0 m/s$^2$, 1 degree/s$^2$, etc.), the bridge controller 270 may determine that the door 30 is being moved. In response to a determination that the door 30 is being moved, the bridge controller 270 may provide a notification. By way of example, the bridge controller 270 may command a user device 190 to provide a push notification indicating that the door 30 is being moved. By way of another example, the bridge controller 270 may command the doorbell module 184 and/or a user device 190 to provide an alarm indicating that a break in may be occurring in response to a determination that the door 30 is moving while the door is in the locked state.

Lux Sensor

Referring to FIGS. 39 and 44-47, the interactive unit 140 includes a light sensor, luminosity sensor, lux sensor, or input device, shown as lux sensor 602. The lux sensor 602 is positioned between the exterior plate 500 and the interior core plate 504 and coupled to the exterior plate 500. The lux sensor 602 is operatively coupled to the bridge controller 270. The lux sensor 602 provides sensor data (e.g., light data) to the bridge controller 270. Specifically, the lux sensor 602 is configured to provide light data describing a light level (e.g., intensity, brightness, etc.) of light in the environment surrounding the door 30.

In some embodiments, the lux sensor 602 is positioned to be exposed to the exterior side of the door 30, such that light from the exterior side of the door 30 reaches the lux sensor 602. Accordingly, the light data from the lux sensor 602 varies based on a light level of the environment surrounding the exterior side of the door 30. The lux sensor 602 may provide an indication of the level of visibility on the exterior side of the door 30. By way of example, when the light data indicates a light level below a threshold light level, the bridge controller 270 may determine that the exterior environment has low visibility conditions. By way of another example, when the light data indicates a light level above the threshold light level, the bridge controller 270 may determine that the exterior environment has high visibility conditions. In some embodiments, the light data indicates the time of day and/or the presence of a storm.

The bridge controller 270 may control operation of the door system 10 based on the light data. By way of example, if the bridge controller 270 determines that the exterior environment has high visibility conditions based on the light data, the bridge controller 270 may disable the external status light 590. By way of another example, if the bridge controller 270 determines that the exterior environment has low visibility conditions based on the light data, the bridge controller 270 may activate the infrared emitters 522 whenever the camera 520 is activated. By way of another example, if the bridge controller 270 determines that the exterior environment has high visibility conditions based on the light data, the bridge controller 270 may change the window 60 to the privacy state to prevent people from looking into the home through the window 60.

Ambient Condition Unit

Referring to FIGS. 39 and 44-47, the interactive unit 140 includes a temperature sensor, humidity sensor, ambient condition sensor, or input device, shown as ambient condition unit 604. The ambient condition unit 604 is positioned between the exterior plate 500 and the interior core plate 504 and coupled to the exterior plate 500. The ambient condition unit 604 is operatively coupled to the bridge controller 270. The ambient condition unit 604 provides sensor data (e.g., ambient condition data) to the bridge controller 270. Specifically, the ambient condition unit 604 provides ambient condition data describing an ambient condition, such as temperature and/or humidity, in the environment surrounding the door 30. The ambient condition data may include temperature data, humidity data, or data relating to another ambient condition.

The ambient condition unit 604 may be exposed to (e.g., fluidly coupled to) the environment surrounding the door 30. In some embodiments, the ambient condition unit 604 is fluidly coupled to the atmosphere on the exterior side of the door 30 (e.g., through an aperture defined by the exterior plate 500). In some embodiments, the ambient condition unit 604 is fluidly coupled to the interior atmosphere on the interior side of the door 30 (e.g., through an aperture defined by the interior core plate 504). Accordingly, the ambient condition data from the ambient condition unit 604 varies based on an ambient condition of the environment surrounding the exterior side of the door 30 or the interior side of the door 30. In some embodiments, the ambient condition unit 604 includes a temperature sensor configured to provide temperature data indicating an ambient temperature on the exterior side of the door 30. In some embodiments, the ambient condition unit 604 includes a humidity sensor configured to provide humidity data indicating a humidity of the atmosphere on the exterior side of the door 30. Additionally or alternatively, the ambient condition unit 604 may measure a temperature and/or a humidity on the interior side of the door 30. In some embodiments, the door system 10 utilizes data from the ambient condition unit 604 to determine the current season (e.g., spring, summer, fall, winter).

The bridge controller 270 may control operation of the door system 10 based on the ambient condition data. By way of example, if the bridge controller 270 determines that the ambient temperature on the exterior side of the door 30 is above a threshold temperature, the bridge controller 270 may change the window 60 to the privacy state to mitigate the a temperature increase on the interior side of the door 30. By way of another example, if the bridge controller 270 determines that (a) the ambient temperature on the exterior side of the door 30 is above the ambient temperature on the interior side of the door 30 and (b) the ambient temperature on the interior side of the door 30 is below a user setpoint, the bridge controller 270 may change the window 60 to the viewing state to permit light to pass through the window 60 and increase the temperature within the home. By way of another example, if the bridge controller 270 determines that the humidity on the exterior side of the door 30 is above a threshold, the bridge controller 270 may provide a push notification to a user device 190 instructing the user to close their other windows and doors.

UWB Sensors

Referring to FIG. 39, the interactive unit 140 includes a plurality of ultra-wideband ("UWB") sensors (e.g., three UWB sensors), shown as UWB sensors 606. According to an exemplary embodiment, the UWB sensors 606 are disposed within the housing of the interactive unit 140 and spaced about the camera 520. In some embodiments, the UWB sensors 606 are otherwise positioned about the interactive unit 140. In some embodiments, the UWB sensors 606 are additionally or alternatively positioned about and/or within the door frame 20 and/or the door 30. According to an exemplary embodiment, the UWB sensors 606 are operatively coupled to the control system 100 (e.g., the bridge controller 270, the main controller 242, etc.).

According to an exemplary embodiment, the UWB sensors 606 are configured to transmit and receive short-range wireless signals to and from the user devices 190 (e.g., a smartphone, a key fob, etc.). The short-range wireless signals may be UWB signals in the UWB spectrum, which may be generally between 3.1 GHz and 10.6 GHz. Based on the transmission and receipt of the UWB signals via the UWB sensors 606, the control system 100 may configured to determine a distance of the user device 190 relative to the door 30 in three-dimensional coordinate space. More specifically, the control system 100 may be configured to provide angle of arrival technology and real-time locations services ("RTLS") using the UWB sensors 606 to detect and triangulate the location of the user device 190 to permit "hands free" authentication and unlock functionality (e.g., the user may only have to touch a touch capacitive portion of the door 30, the user does not need to touch any component of the door 30 for unlock function, etc.). By way of example, the control system 100 may be configured to analyze the UWB signals to determine whether the user device 190 is on the exterior side of the door 30, on the interior side of the door 30, to the side of the door 30 but inside a residence, to the side of the door 30 but outside of the residence, above the door 30 (e.g., on a second floor, on a balcony, on a deck, etc.), and/or below the door 30 (e.g., in a basement, on a lower level patio, etc.). The control system 100 may control operation of the door system 10 based on the UWB signals. By way of example, the control system 100 may unlock or lock the door 30 based at least partially on the UWB signals.

Radar Sensor

Referring to FIG. 39, the interactive unit 140 includes at least one radar sensor, shown as radar sensor 608. The radar sensor 608 may be coupled to or disposed within the exterior plate 500 of the interactive unit 140 and face in an outward, exterior direction. In some embodiments, the radar sensors 608 are additionally or alternatively positioned within and/or about the door frame 20 and/or the door 30. According to an exemplary embodiment, the radar sensor 608 is operatively coupled to the control system 100 (e.g., the bridge controller 270, the main controller 242, etc.).

The radar sensor 608 provides sensor data (e.g., a signal, information, etc.) indicating a distance between the radar sensor 608 and an object in the environment (e.g., a user/person, an animal, a box, a vehicle, etc.). Specifically, the radar sensor 608 provides (a) presence data indicating a presence of the object on the exterior side of the door 30 and/or (b) distance data indicating a distance between the radar sensor 608 and the object. In some embodiments, the radar sensor 608 is a 60 GHz millimeter wave radar detector with three-dimensional detection capabilities.

The control system 100 may control operation of the door system 10 based on the presence data and/or the distance data. By way of example, the control system 100 may active the camera 520 based on the presence data and/or the distance data. By way of another example, the control system 100 may active lights (e.g., the jamb lights 790, the handle light 792, etc.) based on the presence data and/or the distance data. By way of yet another example, the control system 100 may unlock the door 30 based at least partially on the presence data and/or the distance data.

Sliding Lock Control Interface

Referring to FIGS. 39 and 42-48, the interactive unit 140 includes a user interface, slider, sliding interface, lock control interface, input device, or output device, shown as lock control interface 620. The lock control interface 620 is coupled to the interior core plate 504 and accessible from the interior side of the door 30. The lock control interface 620 includes an interface member or interior slider, shown as slider 622, that is configured to move laterally between a locked position and an unlocked position offset from the locked position. The slider 622 is moved to the locked position to indicate that the door 30 is in the locked state. Similarly, the slider 622 is moved to the unlocked position to indicate that the door 30 is in the unlocked state.

The lock control interface 620 includes a pair of input devices or sensors, shown as lock switches 624, that detect the position of the slider 622. The lock switches 624 are both operatively coupled to the bridge controller 270. Specifically, a first lock switch 624 detects when the slider 622 is in the locked position. A second lock switch 624 detects when the slider 622 is in the unlocked position. A user positioned on the interior side of the door 30 may grab the slider 622 and push or drag the slider 622 between the locked position and the unlocked position. When the user moves the slider 622 to the locked position, the first lock switch 624 provides a signal to the bridge controller 270, and the bridge controller 270 changes the door 30 to the locked state (e.g., by commanding the deadbolt units 138 to extend the deadbolts 252). When the user moves the slider 622 to the unlocked position, the second lock switch 624 provides a signal to the bridge controller 270, the bridge controller 270 changes the door 30 to the unlocked state (e.g., by commanding the deadbolt units 138 to retract the deadbolts 252).

In some embodiments, the door system 10 permits a user to change the door 30 between the locked state and the unlocked state remotely (e.g., while positioned away from the door 30). By way of example, a user may choose to unlock the door 30 remotely using a user device 190 to permit a delivery service to deposit a package in the home. While locking or unlocking the door 30 can be accomplished through electronic control over the deadbolt units 138, the position of the slider 622 may not be physically tied to the operation of the deadbolt units 138. Accordingly, a situation could arise where the position of the slider 622 does not correspond to the current locked or unlocked state of the door 30. To avoid this situation, the lock control interface 620 includes an actuator or output device, shown as slider actuator 626, that can effect movement of the slider 622. The slider actuator 626 is operatively coupled to the bridge controller 270 and controlled by the bridge controller 270. When a command from a remote user changes the door 30 between the locked state and the unlocked state, the bridge controller 270 controls the slider actuator 626 to move the slider 622 to accurately reflect the current state of the door 30. Beneficially, the slider actuator 626 can mimic the operation of a traditional mechanical deadbolt without having to mechanically tie or link the position of the slider 622 to the operation of the deadbolt units 138.

Referring to FIGS. 44-49, the structure of the lock control interface 620 is shown according to an exemplary embodiment. The lock control interface 620 includes a frame or base, shown as slider plate 630. The slider plate 630 is fixedly coupled to the interior core plate 504. The slider plate 630 extends through an aperture defined by the interior core plate 504 and is exposed on the interior face of the interactive unit 140. The slider plate 630 defines a passage, shown as slot 632, extending through the slider plate 630. The slot 632 has a length oriented laterally. The slot 632 is sized to receive a protrusion 634 of the slider 622, such that the protrusion 634 extends from the back of the slider 622 and through the slot 632. The lateral orientation of the slot 632 permits the slider 622 to move laterally between the locked position and the unlocked position without interference between the protrusion 634 and the slider plate 630. The slider plate 630 further defines a groove, notch, or slot, shown as rail groove 636, extending partially into the slider plate 630 from the back side of the slider plate 630. The rail groove 636 is substantially vertically centered about the slot 632. A vertical height of the rail groove 636 is greater than a vertical height of the slot 632.

The slider plate 630 further includes a series of posts or protrusions, shown as locator posts 638, that extend rearward from a back surface of the slider plate 630. Each locator post 638 is sized to be received within a corresponding passage defined by one of the lock switches 624. Each lock switch 624 defines two passages, such that two of the locator posts 638 are received by each lock switch 624. The locator posts 638 facilitate fixedly coupling the lock switches 624 to the slider plate 630 and locating the lock switches 624 to detect when the slider 622 moves to the lock position and the unlock position.

The lock control interface 620 further includes a fixture, shown as carriage 640, that moves laterally with the slider 622. The carriage 640 includes a base, shown as rail 642, that extends laterally. The rail 642 is received within the rail groove 636, slidably coupling the carriage 640 to the slider plate 630. Specifically, the rail 642 is sized to slide laterally along the length of the rail groove 636 while the height of the rail groove 636 limits vertical movement of the rail 642. The rail 642 defines a longitudinal recess 644 that is sized to receive the protrusion 634 of the slider 622, coupling the slider 622 to the carriage 640. Accordingly, the carriage 640 slidably couples the slider 622 to the slider plate 630.

Referring to FIGS. 48-52, the lock control interface 620 includes a series of biasing elements or magnets that facilitate positioning the slider 622. As shown, the slider plate 630 and the carriage 640 define a series of apertures, passages, or recesses, shown as magnet apertures 650, each configured to receive a magnet. Specifically, the slider plate 630 defines three magnet apertures 650 that each receive either an end position magnet 652 or a center position magnet 654. The carriage 640 defines a single magnet aperture 650 that receives a carriage magnet 656.

The magnets of the lock control interface 620 are positioned to bias the carriage 640 and the slider 622 away from a center position and toward either the locked position or the unlocked position. When in the locked position or the unlocked position, the magnets hold the slider 622 in place, resisting movement toward the center position. This magnet arrangement mimics the feel of a two position, spring-based switch to a user while still permitting the slider 622 to be moved by the slider actuator 626 when the door 30 is remotely locked or unlocked.

Referring to FIG. 50, the magnets of the lock control interface 620 are shown with the slider 622 in the locked position. In the configuration of FIG. 50, the carriage magnet 656 is aligned with a first one of the end position magnets 652. The magnetic fields of the carriage magnet 656 and the first end position magnet 652 are arranged to generate an attractive biasing force. This biasing force holds the slider 622 in the locked position and resists movement toward the center position.

Referring to FIG. 51, the magnets of the lock control interface 620 are shown with the slider 622 in the center position. In the configuration of FIG. 51, the carriage magnet 656 is aligned with the center position magnet 654. The magnetic fields of the carriage magnet 656 and the center position magnet 654 are arranged to generate a repulsive biasing force. This biasing force resists the slider 622 remaining in the center position, instead forcing the slider 622 toward the locked position or the unlocked position, whichever is closer.

Referring to FIG. 52, the magnets of the lock control interface 620 are shown with the slider 622 in the unlocked position. In the configuration of FIG. 52, the carriage magnet 656 is aligned with a second one of the end position magnets 652. The magnetic fields of the carriage magnet 656 and the second end position magnet 652 are arranged to generate an attractive biasing force. This biasing force holds the slider 622 in the unlocked position and resists movement toward the center position.

Figure 48:
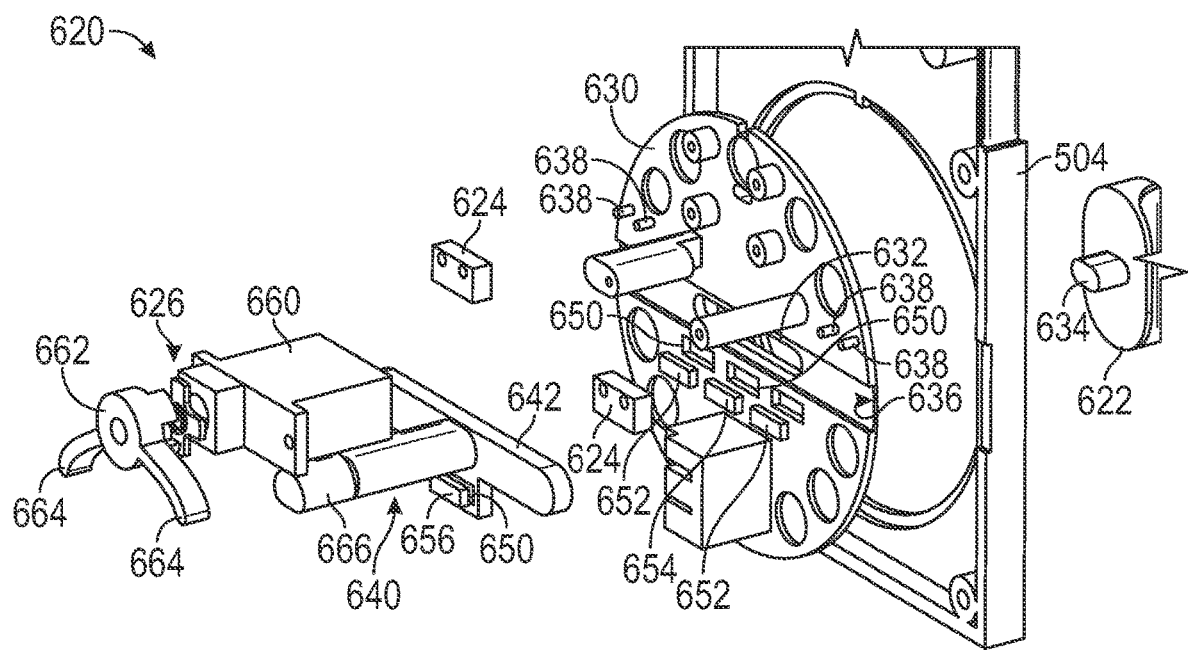
FIG. 48 is an exploded view of a lock control interface of the interactive unit of FIG. 39, according to an exemplary embodiment.
Figure 49:
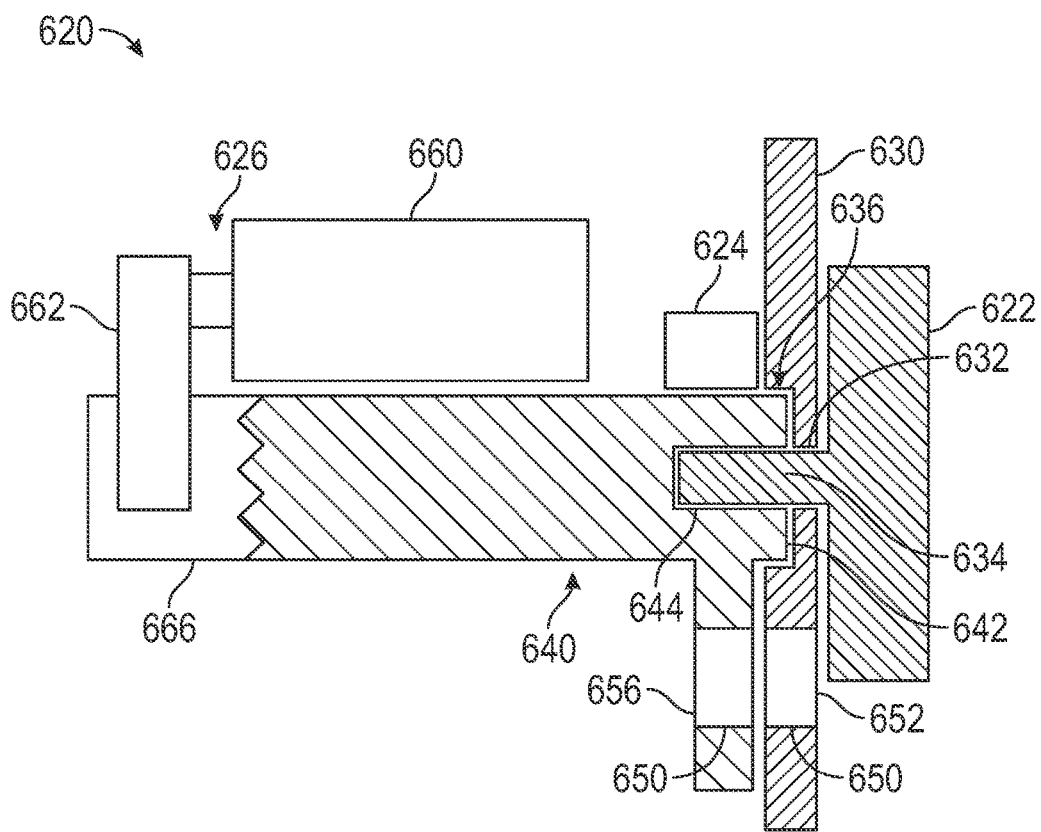
FIG. 49 is partial side section view of the lock control interface of FIG. 48, according to an exemplary embodiment.

Referring to FIGS. 48 and 49, the slider actuator 626 includes an electric motor, servomotor, actuator, or output device, shown as servo 660. The servo 660 is fixedly coupled to the slider plate 630. The slider actuator 626 further includes a lever assembly, shown as servo arm 662, including a pair of arms, shown as levers 664. The servo 660 is configured to cause the servo arm 662 to rotate about a substantially longitudinal axis. The carriage 640 includes a longitudinal protrusion, shown as post 666, that is positioned to be engaged by the levers 664 to cause lateral movement of the carriage 640 when the servo arm 662 is rotated.

The servo 660 is operatively coupled to the bridge controller 270 and controlled by the bridge controller 270. The bridge controller 270 may cause the servo 660 to rotate in a first direction or an opposing second direction. In some embodiments, the servo 660 includes a position sensor (e.g., an encoder or potentiometer) that provides positional feedback for closed-loop control over the position of the servo arm 662.

Referring to FIGS. 53-55, an example of the operation of the slider actuator 626 is shown according to an exemplary embodiment. As shown, the carriage 640 is moved from the locked position to the unlocked position. In other embodiments, the locked position and the unlocked position are switched (e.g., depending upon if the door is a right hand door or a left hand door), such that FIGS. 53-55 illustrate the carriage 640 moving from the unlocked position to the locked position.

In FIG. 53, the carriage 640 and the slider 622 are in an end position (e.g., the locked position) and held in place by the carriage magnet 656 and an end position magnet 652. The servo arm 662 is in a center or neutral position. In this neutral position, the levers 664 are spaced from the post 666 and do not contact the post 666. The servo arm 662 is shaped such that the carriage 640 can slide freely between the locked position and the unlocked position without the levers 664 contacting or otherwise interfering with the movement of the post 666. Accordingly, with the servo arm 662 in the neutral position, a user can freely slide the slider 622 between the locked position and the unlocked position without interference from the slider actuator 626.

Referring to FIG. 54, to move the carriage 640 and the slider 622 out of the locked position, the servo 660 rotates the servo arm 662 in a first direction. This rotation causes one of the levers 664 to engage the post 666. With further rotation of the servo arm 662, the lever 664 forces the carriage 640 toward, and subsequently beyond, the center position. As the carriage 640 moves beyond the center position, the magnetic biasing forces between the center position magnet 654 and the carriage magnet 656 move the carriage 640 to the unlocked position. The servo arm 662 is then moved back to the neutral position. To move the carriage 640 from the unlocked position to the locked position, the servo 660 may rotate the servo arm 662 in a second direction opposite the first direction. When the carriage 640 moves beyond the center position, the magnetic biasing forces between the center position magnet 654 and the carriage magnet 656 move the carriage 640 to the locked position.

Reconfigurable Interactive Unit

Figure 42:
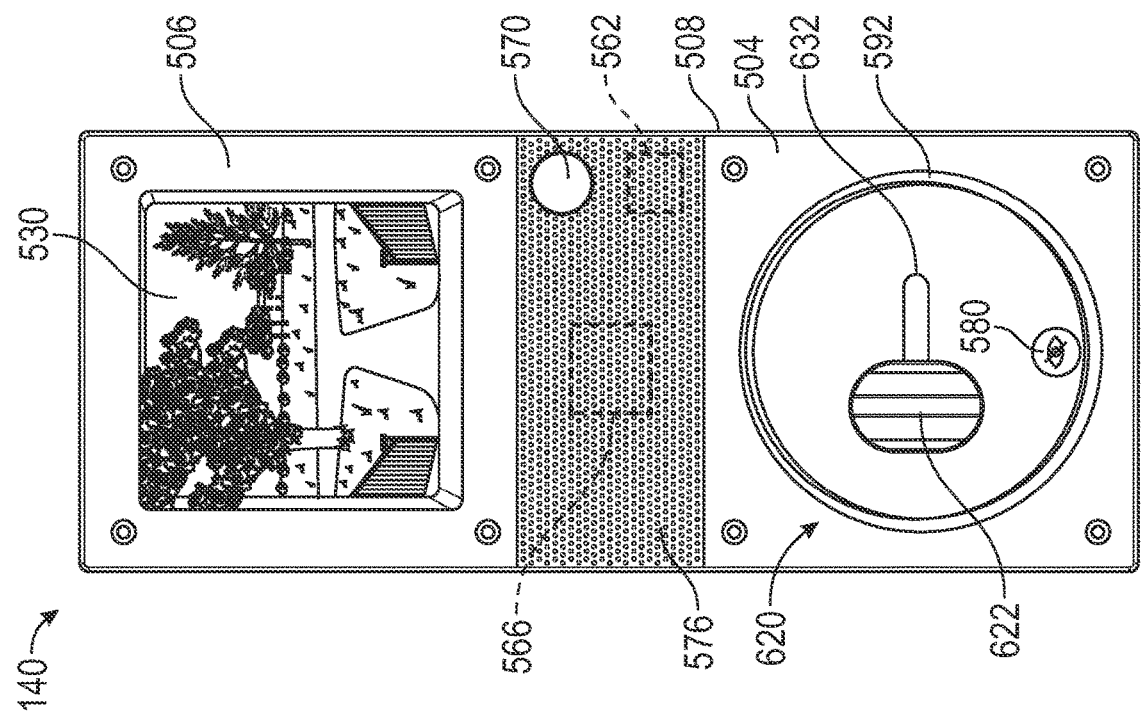
FIG. 42 is a rear view showing an interior side of the interactive unit of FIG. 39, according to an exemplary embodiment.
Figure 56:
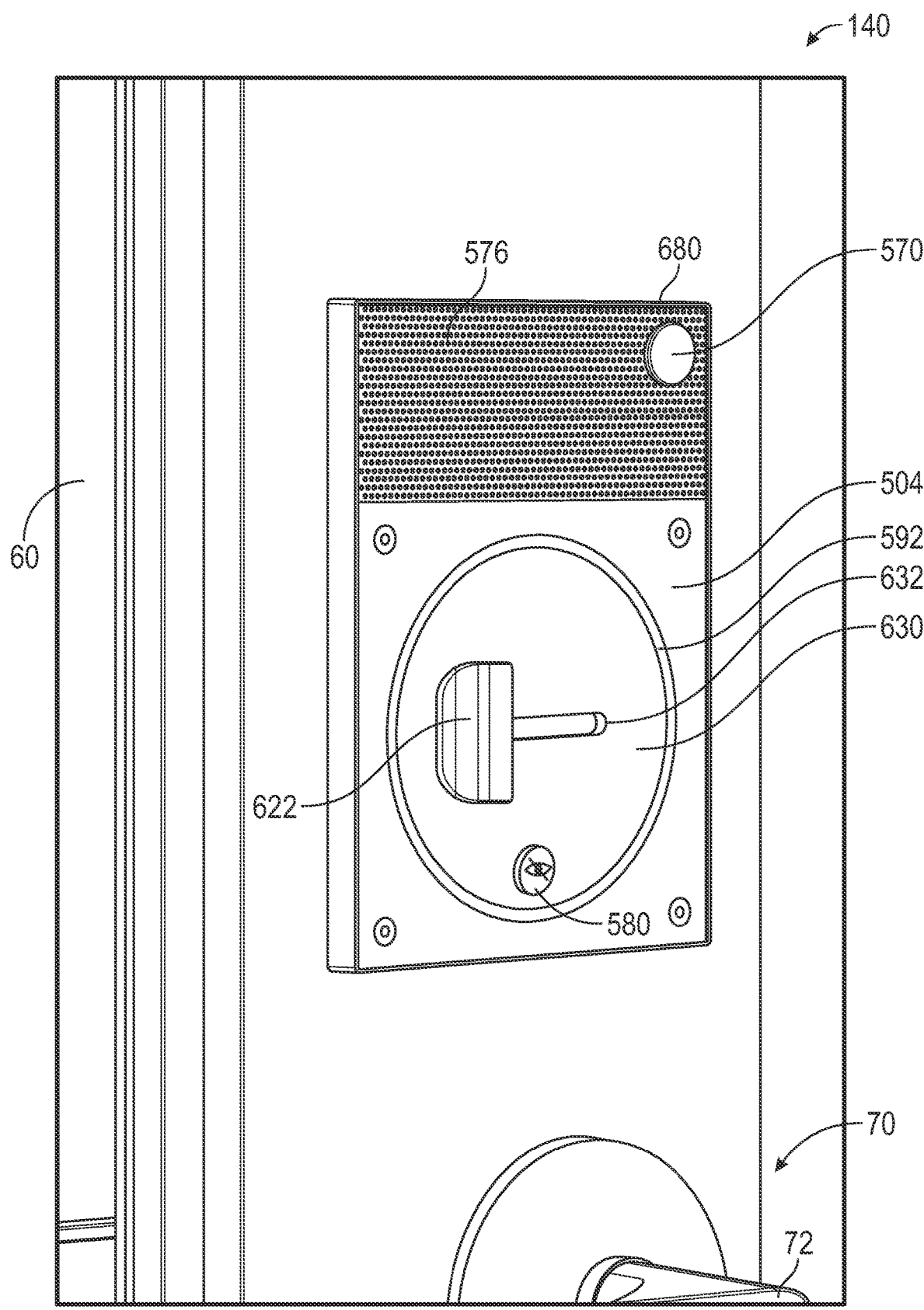
FIG. 56 is a bottom perspective showing the interior side of a reduced configuration of the interactive unit of FIG. 39, according to an exemplary embodiment.

Referring to FIGS. 42 and 56, the interactive unit 140 is reconfigurable between a first, expanded functionality, or elevated cost configuration (e.g., as shown in FIG. 42) and a second, reduced functionality, light, or reduced cost configuration (e.g., as shown in FIG. 56). The expanded configuration may include additional functionality relative to the reduced configuration. In contrast, the reduced configuration may remove one or more components relative to the expanded configuration, reducing the overall cost of the interactive unit 140. The expanded configuration or the reduced configuration may be selected during the initial production of the door 30. Additionally or alternatively, the interactive unit 140 may be reconfigurable between the expanded configuration and the reduced configuration by the end user. By way of example, a user may initially purchase a door 30 having the reduced configuration. The user may later decide to upgrade the interactive unit 140 to the expanded configuration by purchasing and adding upgrade components to the interactive unit 140.

FIG. 56 illustrates a reduced configuration of the interactive unit 140, according to an exemplary embodiment. In the reduced configuration, the interior top plate 506, the display 530, and the touch input 532 corresponding to the display 530 are omitted from the interactive unit 140. Accordingly, the interactive unit 140 does not include the touch display functionality of the display 530 and the touch input 532. However, by omitting the display 530 and the touch input 532, the overall cost of the interactive unit 140 is reduced. Instead of displaying images and/or video from the camera 520 on the display 530, the images and/or video may be transferred to the user device 190 and displayed by a screen of the user device 190. Similarly, instead of controlling the interactive unit 140 directly through the touch input 532, a user may instead provide commands to the interactive unit 140 through a user device 190.

To accommodate the loss of the interior top plate 506, the reduced configuration may utilize a new trim piece, shown as interior trim 680. The interior trim 680 is smaller than the interior trim 508 of the expanded configuration, facilitating a tight fit around the reduced footprint of the interactive unit 140. Apart from the size, the interior trim 680 may have a similar construction to the interior trim 508.

Figure 57:
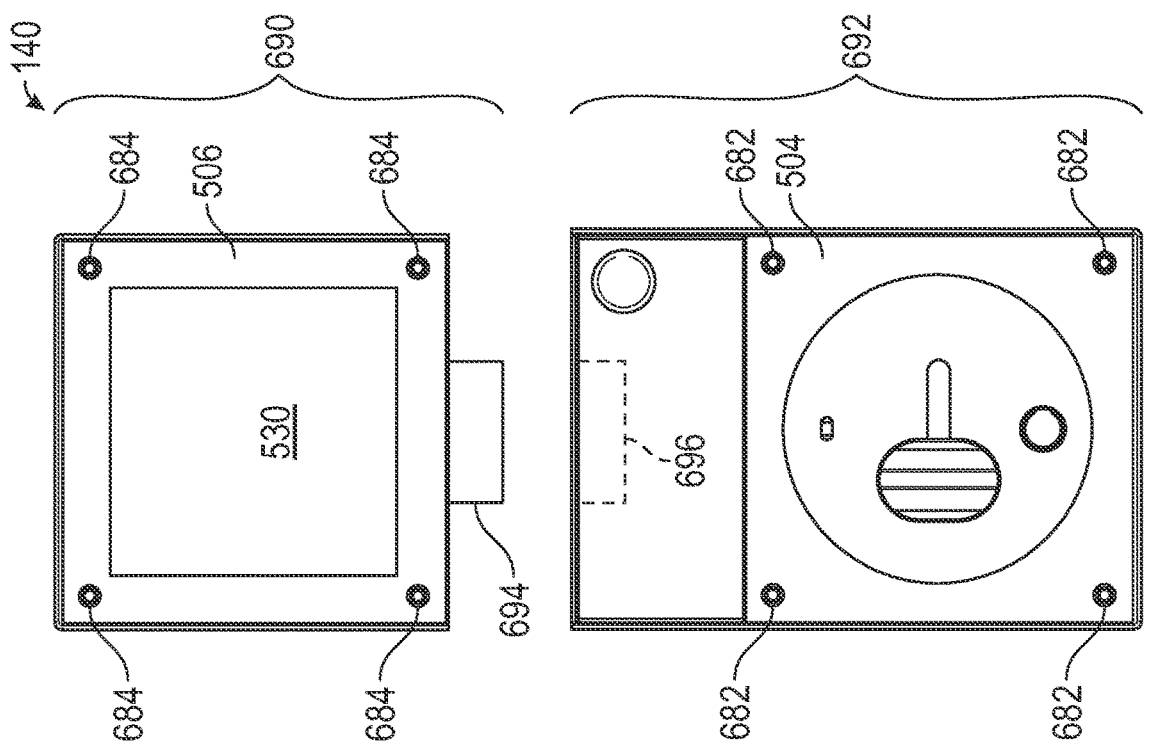
FIG. 57 is an exploded view showing the interior side of the interactive unit of FIG. 39, according to an exemplary embodiment.

In some embodiments, the interior core plate 504 and the interior top plate 506 are each coupled to the subframe 40 by a different set of fasteners, such that the interior top plate 506 can be added to or removed from the door 30 without removing the interior core plate 504. As shown in FIG. 57, the interior core plate 504 is coupled to the subframe 40 by a first set of fasteners, shown as fasteners 682. The fasteners 682 extend longitudinally through the interior core plate 504 and engage the subframe 40. The fasteners 682 may be removed to remove the interior core plate 504 from the subframe 40. The interior top plate 506 is coupled to the subframe 40 by a second set of fasteners, shown as fasteners 684. The fasteners 684 extend longitudinally through the interior top plate 506 and engage the subframe 40. The fasteners 686 may be removed to remove the interior top plate 506 from the subframe 40.

Figure 58:
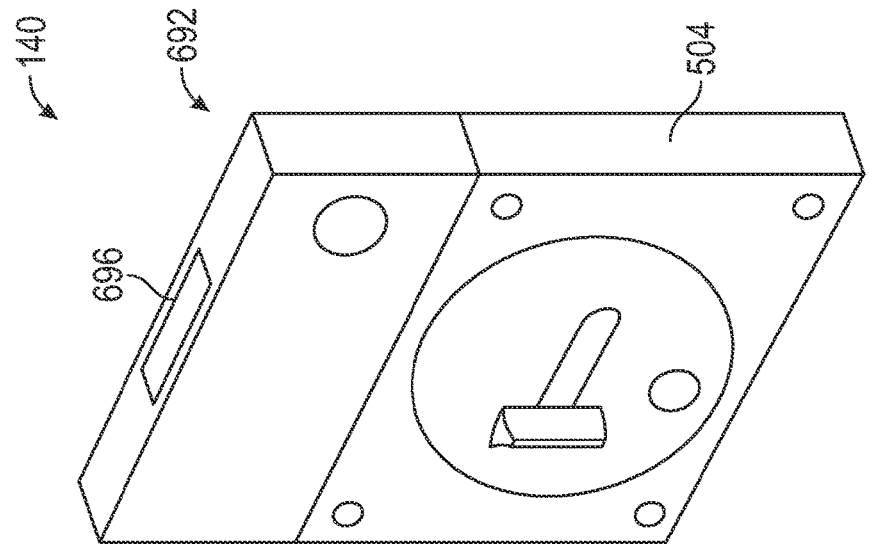
FIG. 58 is a top perspective view showing the interior side of the reduced configuration of the interactive unit shown in FIG. 39, according to an exemplary embodiment.

Referring to FIGS. 57 and 58, the interior portion of the interactive unit 140 includes an upper portion 690, containing the components coupled to the interior top plate 506, and a lower portion 692, containing the components coupled to the interior core plate 504. The components of the upper portion 690 (e.g., the display 530 and the touch input 532) are connected to components within the door 30 (e.g., the door wiring harness 170) to receive power and data. However, if a passage were to be formed directly through the interior skin 52 to route the wiring for the upper portion 690, the passage would be exposed when the upper portion 690 is removed to put the interactive unit 140 into the reduced configuration.

To avoid an exposed passage in the reduced configuration, the upper portion 690 connects with the internal components of the door 30 (e.g., the door wiring harness 170) through the lower portion 692. The wiring for both the upper portion 690 and the lower portion 692 may pass through a single passage through the interior skin 52 that is covered by the lower portion 692. As the lower portion 692 is present in both the expanded configuration and the reduced configuration, this passage may be covered in all configurations of the door 30.

As shown in FIGS. 57 and 58, the upper portion 690 includes a connector 694 extending downward from the upper portion 690. A top surface of the lower portion 692 defines an aperture or passage, shown as connector aperture 696, that receives the connector 694. By way of example, the connector 694 may include a series of wires or cables that are routed through the connector aperture 696. By way of another example, the connector 694 may include a male connector that is received within a female connector within the connector aperture 696.

As shown in FIG. 58, the connector aperture 696 is positioned along a top surface of the lower portion 692 (e.g., along a top surface of the interior core plate 504). When the interactive unit 140 is in the expanded configuration, the upper portion 690 abuts the lower portion 692, obscuring the connector 694 and the connector aperture 696 from view and preventing contaminants from entering the connector aperture 696. When the interactive unit 140 is in the reduced configuration, the interior trim 680 covers the connector aperture 696. The interior trim 680 obscures the connector 694 from view and prevents contaminants from entering the connector aperture 696.

Alternative Interactive Unit Configuration

Figure 60:
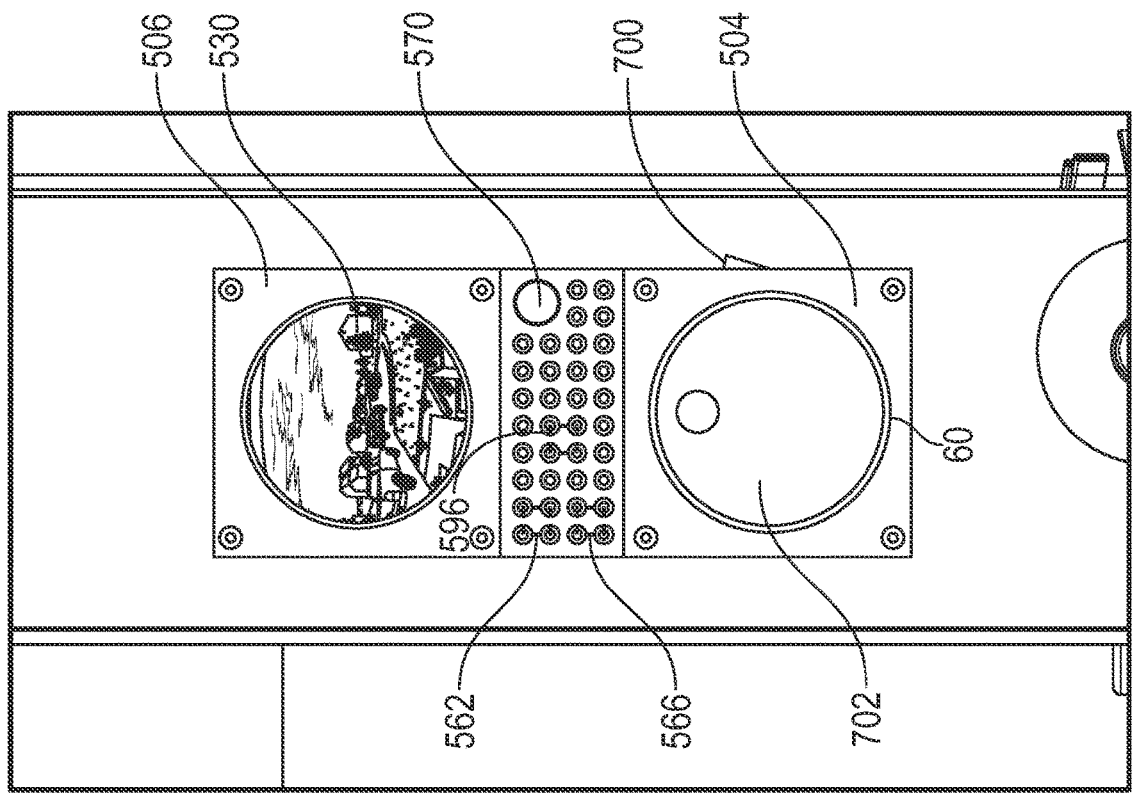
FIG. 60 is a rear view showing an interior side of the interactive unit of FIG. 59, according to an exemplary embodiment.
Figure 59:
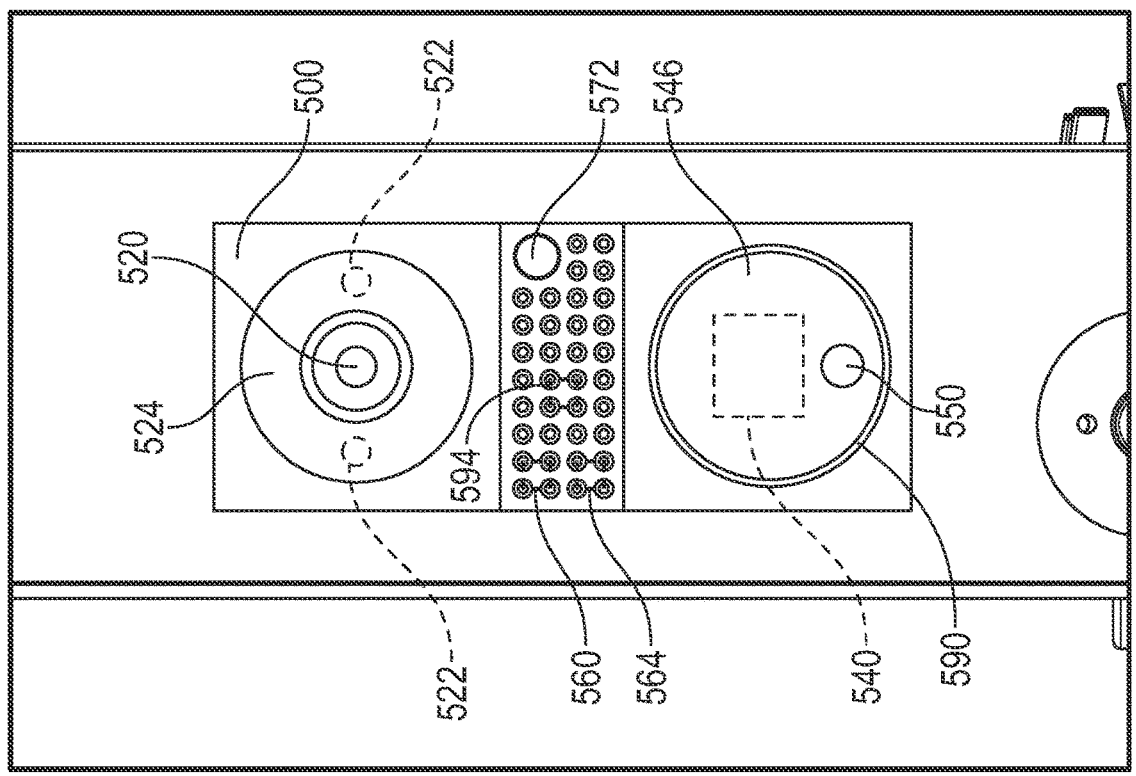
FIG. 59 is a front view showing an exterior side of an interactive unit of the control system of FIG. 9B, according to another exemplary embodiment.

Referring to FIGS. 59 and 60, another embodiment of the interactive unit 140 is shown. The interactive unit 140 of FIGS. 59 and 60 may be substantially similar to the interface unit of FIGS. 40 and 42, except as otherwise specified herein. The interactive unit 140 of FIGS. 59 and 60 may be utilized with any embodiment of the door system 10 described herein.

The interactive unit 140 of FIGS. 59 and 60 includes a fingerprint scanner 550 on the exterior side of the interactive unit 140. Specifically, the fingerprint scanner 550 is accessed through the NFC cover 546. The NFC cover 546 defines a dimple or recess above the fingerprint scanner 550 such that the fingerprint scanner 550 is positioned to read a user's fingerprint when the finger of the user is placed in the dimple.

The interactive unit 140 of FIGS. 59 and 60 omits the privacy button 580 and instead includes a two-position switch, shown as privacy switch 700, operatively coupled to the bridge controller 270. In some embodiments, the privacy switch 700 is a rocker switch. The privacy switch 700 serves a similar function as the privacy button 580, controlling the operating state of the window 60. The privacy switch 700 is repositionable between a first position or privacy position and a second position or viewing position. When the privacy switch 700 is switched to the privacy position, the bridge controller 270 commands the window 60 to change to the privacy state. When the privacy switch 700 is switched to the viewing position, the bridge controller 270 commands the window 60 to change to the viewing state.

The interactive unit 140 of FIGS. 59 and 60 omits the sliding lock control interface 620 and instead includes a two-position switch, shown as lock control interface 702, operatively coupled to the bridge controller 270. In some embodiments, the lock control interface 702 is a rocker switch. The lock control interface 702 serves a similar function as the lock control interface 620, controlling the locked/unlocked state of the door 30. The lock control interface 702 is repositionable between a first position or locked position and a second position or unlocked position. When the lock control interface 702 is switched to the locked position (e.g., by pressing on an upper portion of the lock control interface 702), the bridge controller 270 changes the door 30 to the locked state. When the lock control interface 702 is switched to the unlocked position (e.g., by pressing on a lower portion of the lock control interface 702), the bridge controller 270 changes the door 30 to the unlocked state.

Interface on User Device

Figure 61:
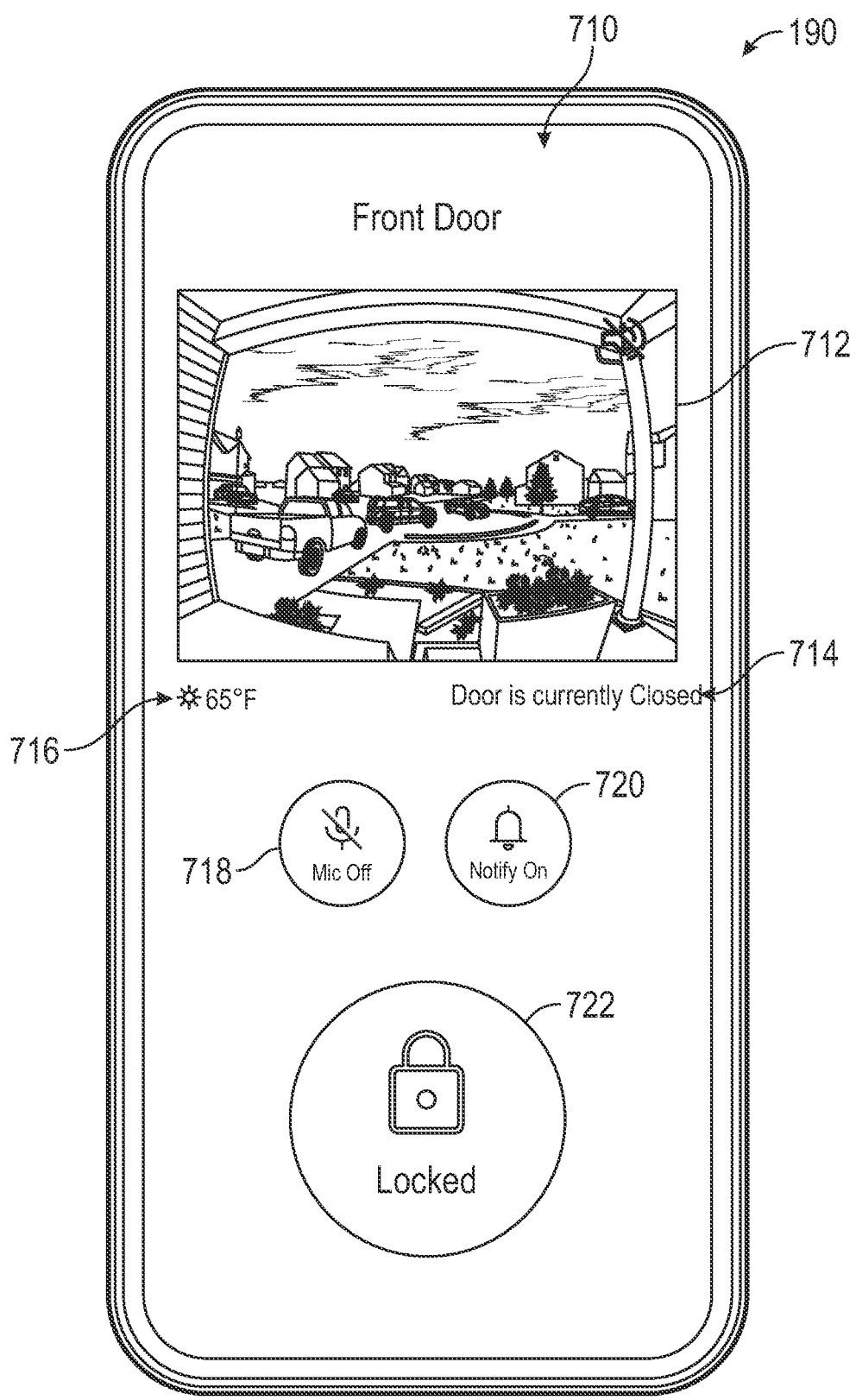
FIG. 61 is a screenshot of a graphical user interface provided by the control system of FIGS. 9A and 9B, according to an exemplary embodiment.

Referring to FIG. 61, a graphical user interface (GUI) 710 is shown on the user device 190, according to an exemplary embodiment. The elements of the GUI 710 may perform some or all of the functionality of the interactive unit 140. By way of example, the GUI 710 may provide information to a user and/or receive commands from a user. Operation of the GUI 710 may be controlled by the user device 190, a server 200, a module of the door system 10, and/or any other device.

The GUI 710 includes a first element, shown as camera feed 712. The camera feed 712 may provide a visual representation of image data captured by the camera 520. The camera feed 712 may display the image data in real time or image data that as previously captured by the camera 520.

The GUI 710 further includes a second element, shown as door status indicator 714. The door status indicator 714 may indicate whether the door 30 is currently open or closed. The deadbolt controller 266 may determine if the door 30 is open or closed based on data from the door close sensor 262.

The GUI 710 further includes a third element, shown as weather indicator 716. The weather indicator 716 may indicate a current ambient condition on the exterior side of the door 30. By way of example, the weather indicator 716 may indicate a current ambient temperature, a current humidity, a current light level (e.g., an outdoor light intensity), a current weather pattern (e.g., whether it is currently sunny, cloudy, rainy, etc.), and/or other ambient or weather conditions. The door system 10 may determine the current ambient conditions based on data from the lux sensor 602 or the ambient condition unit 604. Additionally or alternatively, the door system 10 may retrieve the ambient conditions from another source (e.g., a third party source accessed via the Internet).

The GUI 710 further includes a fourth element, shown as microphone button 718. When pressed, the microphone button 718 may toggle between (a) a recording mode in which a microphone of the user device 190 records sound for playback by the external speaker 564 of the door 30 and (b) a silent/mute mode in which the microphone is disabled. The microphone button 718 may provide a visual indication (e.g., color, images, text, etc.) indicating whether the user device 190 is in the recording mode or the silent mode.

The GUI 710 further includes a fifth element, shown as notification button 720. When pressed, the notification button 720 may toggle between (a) a notification mode in which the user device 190 provides audible notifications regarding the door system 10 and (b) a no-notifications mode in which the audible notifications are disabled. Such notifications may be triggered by an interaction with the doorbell button 572, the camera 520, or the external TOF sensor 594 detecting movement, the door close sensor 262 detecting that the door 30 has been opened, or other conditions. The notification button 720 may provide a visual indication (e.g., color, images, text, etc.) indicating whether the user device 190 is in the notification mode or the no-notifications mode.

The GUI 710 further includes a sixth element, shown as lock button 722. When pressed, the lock button 722 may toggle the door 30 between the locked state and the unlocked state. The lock button 722 may provide a visual indication (e.g., color, images, text, etc.) indicating whether the door 30 is in the locked state or the unlocked state.

Additional Door Features

Referring to FIGS. 9B, 62, and 63, the door system 10 may include various additional features that further enhance the user experience when operating the door 30. Although these additional features may have been omitted from FIGS. 1 and 2 to avoid overcrowding the image, it should be understood that FIGS. 1, 2, 62, and 63 may all represent a single embodiment. It should also be understood that the position and combination of features shown in FIGS. 62 and 63 is exemplary only and not intended to be limiting. The features of FIGS. 62 and 63 may be controlled by any of the controllers described herein (e.g., the bridge controller 270, the main controller 242, etc.). Additionally, the features of FIGS. 62 and 63 may be powered by the power source 102, the backup battery 222 of the door 30, or any other source of energy.

Motorized Door Actuator

Referring to FIGS. 9B and 62, the door system 10 includes an actuator (e.g., an electric actuator), shown as door actuator 750. The door actuator 750 is coupled to the door 30 and the wall 12. The door actuator 750 is configured to open and/or close the door 30 (e.g., move the door 30 between an open position and a closed position). By way of example, the door actuator 750 may include an electric motor that drives rotation of a lead screw to move the door 30. By way of another example, the door actuator 750 may include an electric motor that drives rotation of a linkage to move the door 30. The door actuator 750 may be used to remotely open or close the door 30 (e.g., in response to a user command through a user device 190). The door actuator 750 may be used to automatically open or close the door in response to certain conditions. By way of example, the door actuator 750 may automatically close the door at a certain time of day or when the ambient temperature (e.g., as measured by the ambient condition unit 604) falls below or exceeds a set temperature threshold. By way of another example, the door actuator 750 may automatically open the door 30 when the camera 520 detects a user approaching the door 30 (and carrying a user device 190 or fob that provides access to the door 30).

Motorized Screen

Referring to FIGS. 9B and 63, the door system 10 includes a door screen or motorized screen, shown as screen assembly 760. The screen assembly 760 includes a base or actuator, shown as screen motor 762, that is coupled to the wall 12. The screen assembly 760 further includes a screen, mesh, or rolled member, shown as screen 764, coupled to the screen motor 762. The screen 764 is actuated by the screen motor 762 to move the screen 764 between a first, raised, or retracted position, shown in FIG. 63, and a second, lowered, or extended position. In the retracted position, the screen 764 is moved away from the doorway 28 to permit free movement of users through the doorway 28. In the extended position, the screen 764 moves across the doorway 28. The screen 764 may be made from a perforated material that permits air to pass through the screen 764 but prevents insects and animals from passing through the screen 764. The screen 764 may seal against the door 30, the door frame 20, and/or the wall 12 such that any material passing through the doorway 28 forced to pass through the screen 764. Accordingly, with the screen 764 in the extended position, the screen 764 prevents undesirable organisms from entering the home while permitting the free flow of outdoor air through the doorway 28.

The screen motor 762 is configured to control movement of the screen 764. In some embodiments, the screen motor 762 includes a roller driven by an electric motor. The electric motor causes the screen motor 762 to rotate and retract or pay out the screen 764. In other embodiments, the screen 764 is otherwise moved. The screen motor 762 may be manually controlled (e.g., through a user device 190 or the touch input 532). Additionally or alternatively, the screen motor 762 may be used to automatically reposition the screen 764 in response to certain conditions. By way of example, the screen motor 762 may automatically lower the screen 764 to the extended position in response to the door 30 remaining in the open position for a threshold period of time. By way of another example, the screen motor 762 may automatically raise the screen 764 to the retracted position when the camera 520 detects a user approaching the door 30.

In some embodiments, the screen 764 is positioned to facilitate movement of the door 30 between the open position and the closed position while the screen 764 is in the extended position. The screen 764 may be positioned to offset the screen 764 from the door 30, such that there is no contact between the door 30 and the screen 764 when the screen 764 is in the extended position and the door 30 is moved.

In some embodiments, the screen 764 is embedded within the wall 12 and/or the door frame 20 such that the screen 764 moves within a plane that is coincident with the door frame 20. By way of example, a slot or groove may run vertically through the side jambs 22 and the head jambs 24, providing a path through which the screen 764 may pass. A pair of vertical guides may be received within the wall 12. The vertical guides may be slidably coupled to the screen 764 and may align the screen 764 with the grooves. In other embodiments, the screen 764 is positioned outside of the wall 12 (e.g., offset on the interior side or exterior side of the wall 12). The screen 764 may be positioned opposing the direction of movement of the door 30. By way of example, if the door 30 is configured to swing inward, the screen 764 may be positioned on the exterior side of the door 30. By way of another example, if the door 30 is configured to swing outward, the screen 764 may be positioned on the interior side of the door 30.

Motorized Blinds

Referring to FIGS. 9B and 63, the door system 10 includes a shade assembly or motorized blind, shown as blind assembly 770. The blind assembly 770 includes a base or actuator, shown as blind motor 772, that is coupled to the door 30. The blind assembly 770 further includes a blind, shade, shutter or rolled member, shown as blind 774, coupled to the blind motor 772. The blind 774 is actuated by the blind motor 772 to move the blind 774 between a first, raised, or retracted position, shown in FIG. 63, and a second, lowered, or extended position. In the retracted position, the blind 774 is moved away from the window 60 to permit light to freely pass through the window 60. In the extended position, the blind 774 covers the window 60 and obscures a line of sight through the window, limiting the passage of light through the window 60. In some embodiments, the blind 774 is used in place of electrochromic material of the window 60.

The blind motor 772 is configured to control movement of the blind 774. In some embodiments, the blind motor 772 is a roller driven by an electric motor. The electric motor causes the blind motor 772 to rotate and retract or pay out the blind 774. In other embodiments, the blind 774 is a series of slats suspended by lift cords. The electric motor extends or retracts the lift cords to lower or raise the slats. In other embodiments, the blind 774 is otherwise moved. The blind motor 772 may be manually controlled (e.g., through a user device 190 or the touch input 532). Additionally or alternatively, the blind motor 772 may be used to automatically reposition the blind 774 in response to certain conditions. By way of example, the blind motor 772 may automatically lower the blind 774 to the extended position in response to the light level detected by the lux sensor 602 exceeding a threshold. By way of another example, the blind motor 772 may automatically raise the blind 774 to the retracted position for a predetermined period of time each day (e.g., at nighttime).

Adjustable Door Seals

Referring to FIGS. 9B and 62, the door system 10 includes an adjustable door seal assembly, shown as door seal system 780. The door seal system 780 includes a series of adjustable door seals, shown as seals 782, and an actuator, shown as door seal actuator 784. The seals 782 each seal a portion of the doorway 28 between the door frame 20 and the door 30. Specifically, a first seal 782 extends between a first side jamb 22 and the door 30. A second seal 782 extends between a second side jamb 22 and the door 30. A third seal 782 extends between the head jamb 24 and the door 30. A fourth seal 782 extends between the sill 26 and the door 30. In other embodiments, one or more of these seals 782 are omitted. Together, the seals 782 prevent air, debris, and pests from passing between the door 30 and the door frame 20.

The door seal actuator 784 is configured to vary a thickness of the seals 782. In some embodiments, the seals 782 are inflatable (e.g., define a flexible, sealed volume). In such embodiments, the door seal actuator 784 may add or remove a working fluid (e.g., air) from the seals 782 to adjust a thickness of the seals 782. By way of example, the door seal actuator 784 may include a pump or compressor. In other embodiments, the seals 782 are flexible, and the door seal actuator 784 adjusts a thickness of the seals 782 by compressing the seals 782 in the longitudinal direction. Such a compression deflects material outward in the thickness direction. In such an embodiment, the door seal actuator 784 may include one or more electric motors that drive a press to compress the seals 782.

The door seal actuator 784 may be manually controlled (e.g., through a user device 190 or the touch input 532). Additionally or alternatively, the door seal actuator 784 may be used to automatically change the thickness of the seals 782 in response to certain conditions. By way of example, as the ambient temperature or humidity changes, components of the door system 10 may grow or shrink. The door seal actuator 784 may automatically expand or contract the seals 782 to maintain a consistent seal based on the humidity data and temperature data received from the ambient condition unit 604.

Exterior Lighting

Referring to FIGS. 9B and 62, the door system 10 includes a series of exterior lights, shown as jamb lights 790 and handle light 792. The jamb lights 790 and the handle light 792 may include LEDs or other types of lights. The jamb lights 790 and the handle light 792 may have variable colors, brightnesses, patterns, on/off states, or other properties. The jamb lights 790 are positioned along an inner surface of the door frame 20 and directed to illuminate the door 30. Alternatively, the jamb lights 790 may be positioned on the door 30. The handle light 792 is coupled to the door 30 and directed to illuminate the handle assembly 70 and the interactive unit 140. The jamb lights 790 and the handle light 792 may increase the visibility of the door 30 in dark conditions, improving ease of use and aesthetically highlighting the door 30. Additionally or alternatively, the jamb lights 790 and the handle light 792 may be used to signal information to a user.

The jamb lights 790 and the handle light 792 may be manually controlled (e.g., through a user device 190 or the touch input 532). Additionally or alternatively, the jamb lights 790 and the handle light 792 be operated automatically in response to certain conditions. By way of example, the jamb lights 790 and the handle light 792 may turn on automatically in response to the light level detected by the lux sensor 602 falling below a threshold. By way of another example, the jamb lights 790 and the handle light 792 may turn on automatically in response to sensors (e.g., the camera 520, the radar sensor 608, the external ToF sensor 594, etc.) detecting a user approaching. By way of another example, the jamb lights 790 and the handle light 792 may change color to indicate that the door 30 is in the locked state. Further details regarding the exterior lighting features are described in greater detail herein with respect to FIGS. 92-98.

Control Strategies

The door system 10 implements various control strategies to improve the performance and user experience of the door system 10. The control strategies described herein may be performed by any of the controllers and the control system 100 described herein (e.g., the power supply unit 130, the window control unit 132, the main control unit 134, the bridge module 136, the deadbolt units 138, the doorbell module 184, the user devices 190, the servers 200, etc.) alone or in combination with one another. Accordingly, any control strategies described herein may be performed by any component of the door system 10, unless specified otherwise.

Strategies for Energy Savings

In some situations, the door 30 may not receive a steady supply of electrical energy from the power source 102. By way of example, a municipal power grid may experience outages due to storms or maintenance. By way of another example, the door 30 may be installed without a connection to the power source 102. In such situations, the door 30 may be powered partially or entirely from the backup battery 222. In order to prolong the life of the backup battery 222, the door system 10 may change from a normal mode of operation to a power saving mode of operation in which various control processes reduce energy consumption. In some embodiments, the door system 10 automatically changes to the power saving mode in response to an indication that the power supply from the power source 102 is unavailable.

In some embodiments, the camera 520 operates continuously (e.g., 24 hours per day, every day) while in the normal mode of operation. This continuous operation may permit the camera 520 to capture more comprehensive image data and permit the door system 10 to react to situations quickly (e.g., by continuously processing image data to identify the triggers for one or more conditions). However, continuous operation of the camera 520 may increase energy consumption.

In the power saving mode, the camera 520 is shut off for periods of time. In some embodiments, the camera 520 runs on a predetermined schedule. By way of example, the camera 520 may operate for 10 seconds once every 30 seconds. In some embodiments, the camera 520 is activated in response to an input. By way of example, the camera 520 may be activated in response to the external TOF sensor 594, the internal TOF sensor 596, and/or the radar sensor 608 detecting motion. By way of another example, the camera 520 may be activated in response to a user interacting with the interactive unit 140 (e.g., by pressing the doorbell button 572, by communicating with the NFC radio 540, by contacting the fingerprint scanner 550, etc.). By way of another example, the camera 520 may be activated in response to the accelerometer unit 600 detecting movement of the door 30. By way of another example, the camera 520 may be activated in response to a user opening an application on a user device 190 that would utilize the image data.

In some embodiments where the door 30 includes multiple deadbolt units 138 or a main deadbolt of the handle assembly 70 and one or more deadbolt units 138, all of the deadbolt units 138 and/or the main deadbolt may be operated simultaneously while in the normal mode of operation. By way of example, in an embodiment that includes two deadbolt units 138 or the main deadbolt and one or more deadbolt units 138, both of the deadbolt units 138 or the main deadbolt and the one or more deadbolt units 138 may be in the same locked or unlocked state. Utilizing both of the deadbolt units 138 or the main deadbolt and one or more deadbolt units 138 increases the security of the door 30, but increases the power consumption required to shift the deadbolts and/or hold the deadbolts in place. In the power saving mode of operation, one or more of the deadbolt units 138 may be disabled to conserve power. The disabled deadbolt units 138 may remain in the unlocked state throughout operation, while the enabled deadbolt units 138 and/or main deadbolt may continue to lock or unlock as necessary. By disabling a subset of the deadbolt units 138 or only maintaining operation of the main deadbolt, a power savings is achieved while still permitting the remaining enabled deadbolt units 138 and/or the main deadbolt to lock the door 30.

In some embodiments, activation of the window 60 is disabled to conserve energy when the door 30 is cutoff from the power source 102. In some embodiments, the activation of window 60 is permitted until a state-of-charge threshold is reached and then activation is disabled. In some embodiments, activation of the door lighting features (e.g., the jamb lights 790, the handle light 792, etc.) is disabled to conserve energy when the door 30 is cutoff from the power source 102. In some embodiments, the activation of door lighting features is permitted until a state-of-charge threshold is reached and then activation is disabled. In some embodiments, Wi-Fi capabilities of the door system 10 are disabled to conserve energy when the door 30 is cutoff from the power source 102 (i.e., so that the door system 10 does not continually try to reconnect to Wi-Fi with the power to the residence and, therefore, the Wi-Fi being disabled).

In some embodiments, the user of the door system 10 can pre-define a hierarchy of which components they would like to remain active for the longest (e.g., the camera 520, the lights, the deadbolt units 138, etc.) and the door system 10 will begin disabling the components according to the pre-defined hierarchy. In some embodiments, the door system 10 may send a notification to the user device 190 requesting instructions from the user when the door 30 is cutoff from the power source 102. The user may respond to the notification via the user device 190 with various instructions. By way of example, the instructions may include an on-demand hierarchy for the components. By way of another example, the instructions may additionally or alternatively include a time limit for the door system 10 to remain functional using the backup battery 222. The door system 10 may then evaluate the remaining charge of the backup battery 222 and, based on the on-demand hierarchy and/or the user specified time limit, selectively disable certain functionality of the door 30 as necessary to achieve the user requested time of battery operation or favored component operation. For example, the user may know that the power will only be out for a certain period of time (e.g., an expected power outage). Rather than the door system 10 automatically disabling certain features when power is lost, the door system 10 can more intelligently determine if components even need to be disabled and whether they need to be disabled immediately or in the future to maintain complete or more complete functionality of the door system 10 for extended periods of time. In some embodiments, the door system 10 is configured to implement the predefined hierarchy until a response is received from the user device 190.

Camera Image Processing

In some embodiments, the door system 10 performs image processing (e.g., image recognition) on the image data captured by the camera 520. This processing may be performed locally by one or more edge devices (e.g., the power supply unit 130, the window control unit 132, the main control unit 134, the bridge module 136, the deadbolt units 138, the doorbell module 184, the user devices 190, etc.). Additionally or alternatively, the processing may be performed by one or more cloud devices (e.g., the servers 200). In some embodiments, the processing is performed as a hybrid edge/cloud process, where a first portion of the processing is performed by the edge devices (e.g., low intensity processing) and a second portion of the processing is performed by the cloud devices (e.g., higher intensity processing).

Using image processing, the door system 10 may identify one or more objects within the image data captured by the camera 520. The door system 10 may utilize machine learning or other types of image processing to perform the image recognition. The door system 10 may react in predetermined ways to detecting certain types of objects. By way of example, the door system 10 may identify or otherwise differentiate between humans (e.g., specific humans), animals (e.g., wildlife, pets of the homeowner, etc.), vehicles (e.g., mail delivery vehicles, a vehicle known to belong to a specific user, etc.), packages, or other objects.

In some embodiments, the door system 10 is configured to identify specific individuals. By way of example, the door system 10 may have a list of approved users, and facial recognition data regarding those approved users may be predetermined and stored (e.g., within the main control unit 134, on a server 200, etc.). Upon detecting a human within the image data, the door system 10 may perform facial recognition on the image data to determine if the image data matches an approved user. In response to such a determination, the door system 10 may automatically change the door 30 to the unlocked state, facilitating quick entry into the home. By way of another example, the door system 10 may have a list of blacklisted users that are barred from entry into the home. Facial recognition data regarding those blacklisted users may be predetermined and stored. Similarly, the door system 10 may use image recognition to determine if a human is intentionally obscuring their face (e.g., using a mask). Upon detecting a human within the image data, the door system 10 may perform facial recognition on the image data to determine if the image data matches a blacklisted user or a user that is obscuring their face. In response to such a determination, the door system 10 may automatically change the door 30 to the locked state, preventing unauthorized users from entering the home.

In some embodiments, the door system 10 is configured to identify packages, vehicles, and/or uniforms worn by a human. Such an embodiment may be utilized during a package delivery. A delivery vehicle may park in front of the door 30 when executing a package delivery. If the door system 10 identifies a delivery vehicle, the door system 10 may attempt to identify a company or delivery service associated with the delivery vehicle. If successful, the identified company or delivery service may be stored. After parking, a mail carrier may exit the delivery vehicle and walk toward the door 30 carrying a package. If the door system 10 identifies a human, the door system 10 may attempt to identify a company or delivery service associated with the uniform of the mail carrier. If successful, the identified company or delivery service may be stored. While the package is carried toward the door 30 and/or after the package is delivered, the package may be visible to the camera 520. If the door system 10 identifies a package, the door system 10 may attempt to read identifying information on the package, such as a shipping label or graphics on the exterior of the package.

In response to detecting a delivery, the door system 10 may provide a notification to a user. The door system 10 may provide the notification on the display 530, on a user device 190, as an audible tone through the doorbell system 180, or through another device. Along with the notification that a delivery has occurred, the door system 10 may provide additional information to the user that the door system 10 was able to identify from the image data. By way of example, the door system 10 may provide an image of the package. By way of another example, the door system 10 may provide the name of the company or delivery service that delivered the package, the time that the package was delivered, information contained in the shipping label, a name of a company that sent the package (e.g., based on the graphics on the exterior of the package), and/or other information.

In some embodiments, the door system 10 is configured to identify wildlife captured in the image data. A user may wish to know what types of wildlife pass by their home. If the door system 10 identifies wildlife, the door system 10 may attempt to identify a species of the wildlife. The door system 10 may designate different species of wildlife within different categories. By way of example, a low priority category may include animals, such as dogs or cats, that belong to nearby neighbors. By way of another example, a low priority category may include animals common to that particular area, such as squirrels, chipmunks, or birds. By way of another example, a high priority category may include predators that might night be desirable to have near a residence, such as bears, wolves, or mountain lions. By way of another example, a high priority category may include animals that are rare (e.g., endangered) or uncommon to the nearby area. By way of another example, a user may designate a certain species of animal as being high priority. When a high priority animal is detected, the door system 10 may provide a notification to the user. The notification may include a time stamp indicating when the sighting occurred, as well as an image of the animal.

Data Sharing

In some embodiments, the door system 10 is configured to communicate with other systems. The door system 10 may send information generated by the door system 10 to the other systems or receive information from the other systems. By way of example, a user may wish to share image data captured by the camera 520 on social media. In response to such a command, the door system 10 may send the image data to a third party social media website. By way of another example, the user may utilize a home security system that operates outside of the door system 10. The door system 10 may share image data from camera 520 with the home security system, or vice versa to replace or supplement the functionality of the camera 520. By way of example, the door system 10 may receive weather data describing the current and projected weather from a weather monitoring organization. The weather data may supplement or replace data supplied by the ambient condition unit 604.

Motion Activation

In some embodiments, the motion detection capabilities of the door system 10 can be up to twenty feet from the door 30. In some embodiments, the door system 10 is configured to control the window 60 based on motion detection (e.g., via the camera 520, the TOF sensors 594 and 596, the lux sensor 602, the radar sensor 608, etc.). By way of example, when motion is detected proximate the door 30 (on the inside and/or the outside thereof), the door system 10 may be configured to transition the window 60 from a first state to a second state. In some embodiments, the first state is the privacy state (e.g., a translucent state, an opaque state, a tinted state, etc.) and the second state may be the viewing state (e.g., a transparent state) such that a person can see through the window 60 when approaching the door 30 (e.g., from the inside). In some embodiments, the first state is the viewing state and the second state may be the privacy state such that a person cannot see through the window 60 when approaching the door 30 (e.g., from the outside). In some embodiments, the transition from the viewing state to the privacy state is automatically engaged in response to motion detection and determining that the person is unrecognized by the door system 10 or if the person is portraying odd behaviors such a peeping through the window 60.

In some embodiments, the door system 10 is configured to control lighting features of the door system 10 (e.g., external status light 590, internal status light 592, jamb lights 790, handle light 792, etc.) based on motion detection. By way of example, the door system 10 may be configured to activate one or more lights when a person approaches the door 30 (from the inside and/or the outside) to help guide the person to and interact with the door 30.

In some embodiments, the door system 10 is configured to control display features of the door system 10 (e.g., the display 530, etc.) based on motion detection. By way of example, the door system 10 may be configured to activate the camera 520 and provide a live display via the display 530 as a person approaches the door 30 from the inside (so a person on the inside can see to the other side of the door 30 if the window 60 is in a privacy state) and/or from the outside (to show a live view to a person inside showing a person is at/outside the door 30).

In some embodiments, the user can configure settings that may be implemented by the door system 10 in response to motion activation. By way of example, the configurable settings may include door light activation, brightness settings, and/or color settings; level of opacity or tint of the window 60; auto-activation of the camera 520 and/or the display 530; auto-lock or unlock; door auto-open and/or close (via the door actuator 750); auto-deployment or auto-retraction of the screen 764; and/or auto-deployment or auto-retraction of the blind 774; among other possible door functions and settings. Multiple different user profiles or user preferences for door settings may be pre-stored or preset.

User Identification/Authentication and Settings

In some embodiments, the door system 10 is configured to implement user specific settings that are preset or pre-stored (e.g., locally at the door 30, remotely at a server, etc.) based on user identification/authentication. In some embodiments, the door system 10 is configured to perform user identification/authentication by detecting an electronic device (e.g., a smartphone, a smartwatch, a key fob, the user device 190, etc.) carried by or on a user as the user approaches or reaches the door 30. By way of example, the electronic device may have a device identifier associated therewith or the electronic device may have a specific user identifier stored thereon that is detectable by the door system 10. The device identifier and/or the user identifier can be associated with the user specific settings that are preset or pre-stored such that they are implemented when the device identifier and/or the user identifier is acquired by the door system 10. In some embodiments, the door system 10 is configured to perform user identification/authentication using facial recognition (e.g., via image processing based on data acquired with the camera 520) or other biometric detection techniques (e.g., fingerprint scanning, voice analysis, etc.). By way of example, the user specific settings that may be implemented by the door system 10 in response to user identification may include door light activation, brightness settings, and/or color settings, activation and/or level of opacity or tint of the window 60, auto-lock or unlock, door auto-open and/or close (via the door actuator 750), auto-deployment or auto-retraction of the screen 764, and/or auto-deployment or auto-retraction of the blind 774, among other possible door functions and settings. Multiple different user profiles or user preferences for door settings may be pre-stored or preset.

Gesture/Presence Controls

As described above with respect to motion activation, various features of the door system 10 may be activated or controlled in response to detecting the presence of a person proximate the door 30. In some embodiments, the control system 100 is configured to activate or control various features of the door system 10 in response to motion/presence detection and gestures performed by the person (e.g., detected using one or more of the camera 520, the radar sensor 608, the external ToF sensor 594, etc.). By way of example, the gestures may include various hand/arm motions such as swiping left-to-right, swiping right-to-left, swiping left-right-left, swiping right-left-right, swiping down-up, swiping up-down, swiping down-up-down, swiping up-down-up, waving overhead back-and-forth, rotating in a clockwise direction, rotating in a counter-clockwise direction, etc. The gestures may be predefined or user customizable. The gestures may be used to perform various functions including light controls (e.g., on/off, color, pattern, etc.), lock controls (e.g., unlock, lock, etc.), glass controls (e.g., activate, deactivate, level of opacity/tint/privacy, etc.), door open/close functions (via the door actuator 750), deployment/retraction of the screen 764, deployment/retraction of the blind 774, among other possible functions.

In some embodiments, the control system 100 is configured to activate or control various features of the door system 10 in response to motion/presence detection, gesture detection, and user identification/authentication (as described herein) to provide user specific or personalized gesture controls. By way of example, a first user of the door system 10 (e.g., an adult, a parent, etc.) may be able to define first gestures that when performed by the first person causes the door system 10 to perform first functions and a second user of the door system (e.g., a spouse, a child, etc.) may be able to define second gestures that when performed by the second person causes the door system 10 to perform second functions. The first functions and the second functions may be the same, but he first gestures and the second gestures may be different.

Message Center

In some embodiments, the door system 10 and the control system 100 are configured to provide a message center via the interactive unit 140 (e.g., the display 530, the external speaker 564, the internal speaker 566, etc.), the window 60 (e.g., if the window 60 is a transparent display as described herein), and/or the user device 190. By way of example, the control system 100 may be configured to provide a message when a user opens the door 30. The user message may be generic or user customizable. For example, the message may be a text message and/or an audio message providing a salutation, a greeting, or an informative tidbit (e.g., "Welcome home.", "Have a good day.", "The weather outside today is 70 degrees and sunny.", etc.) provided via the interactive unit 140, the window 60, and/or the user device 190. The text message and/or the audio message may differ when entering through the door versus when exiting through the door. In some embodiments, the message is adaptive based on the user accessing the door (e.g., based on detecting the user device 190 on the user's person, facial recognition, tailored for a specific user, etc.). For example, a parent may leave a message for a child returning from school such as a list of tasks to complete before the parent returns from work (e.g., "clean your room"), reminders (e.g., "remember you have soccer at 5:00 pm today"), and the like such that when the child enters through the door, the message from the parent is provided to them. In some embodiments, the message is sent as a notification to a user that is not entering or exiting the door 30. By way of example, the message may be an application notification (e.g., associated with the door 30), a SMS message, or the like sent to the user device 190 of the user indicting that another person has come home and indicating who that person is (e.g., "Mom is home", tailored based on the user entering the door 30, etc.).

Haptics

In some embodiments, the handle assembly 70 includes haptic components (e.g., a vibration element, a motor, etc.) that facilitate providing haptic feedback (e.g., vibration patterns, profiles, etc.) to a user that grabs or grasps the doorknob or door handle of the handle assembly 70. The control system 100 may be configured to active the haptic components according to one or more haptic profiles to provide feedback or information to the user based on the current situation (e.g., sensors of the door system 10 detecting the presence of persons or animals proximate the door). By way of example, the control system 100 may be configured to cause the interior doorknob or handle to vibrate according to a first haptic feedback profile in response to a user attempting to open the door 30 from the inside with someone standing on the exterior side of the door 30 (e.g., without the doorbell having been rung recently such as within the last minute). Such functionality can, therefore, provide advanced warning to the user that someone is standing outside of the door 30 (and, possibly unbeknownst to the user). By way of another example, the control system 100 may be configured to cause the exterior doorknob or handle to vibrate according to a second haptic feedback profile in response to a user attempting to open the door 30 from the outside with some standing on the interior side of the door 30. Such functionality can, therefore, provide advanced warning to the user that someone is standing inside of the door 30 and to be cautious so that they do not hit the person on the inside. The first haptic feedback profile and the second haptic feedback profile may have the same or different vibratory patterns. By way of yet another example, the control system 100 may be configured to cause the interior doorknob or handle to vibrate according to a third haptic feedback profile in response to a user attempting to open the door 30 from the inside without their associated user device 190 nearby (i.e., on their person) to indicate that the user may have forgotten their user device 190. The third haptic feedback profile may have a different vibratory pattern than the first haptic feedback profile and the second haptic feedback profile. While only the first haptic feedback profile, the second haptic feedback profile, and the third haptic feedback profile have been described herein, it would be understood that additional or alternative haptic feedback profiles may be used when a different set of conditions apply (e.g., to indicate weather outside, etc.). Further, the user may be able to select which vibratory pattern applies to which situation, and define the parameters (e.g., selected from a predefined list, manually defined parameters, etc.) for which a respective haptic feedback profile applies/activates.

Access Control using UWB Sensors and/or Radar Sensors

Figure 100:
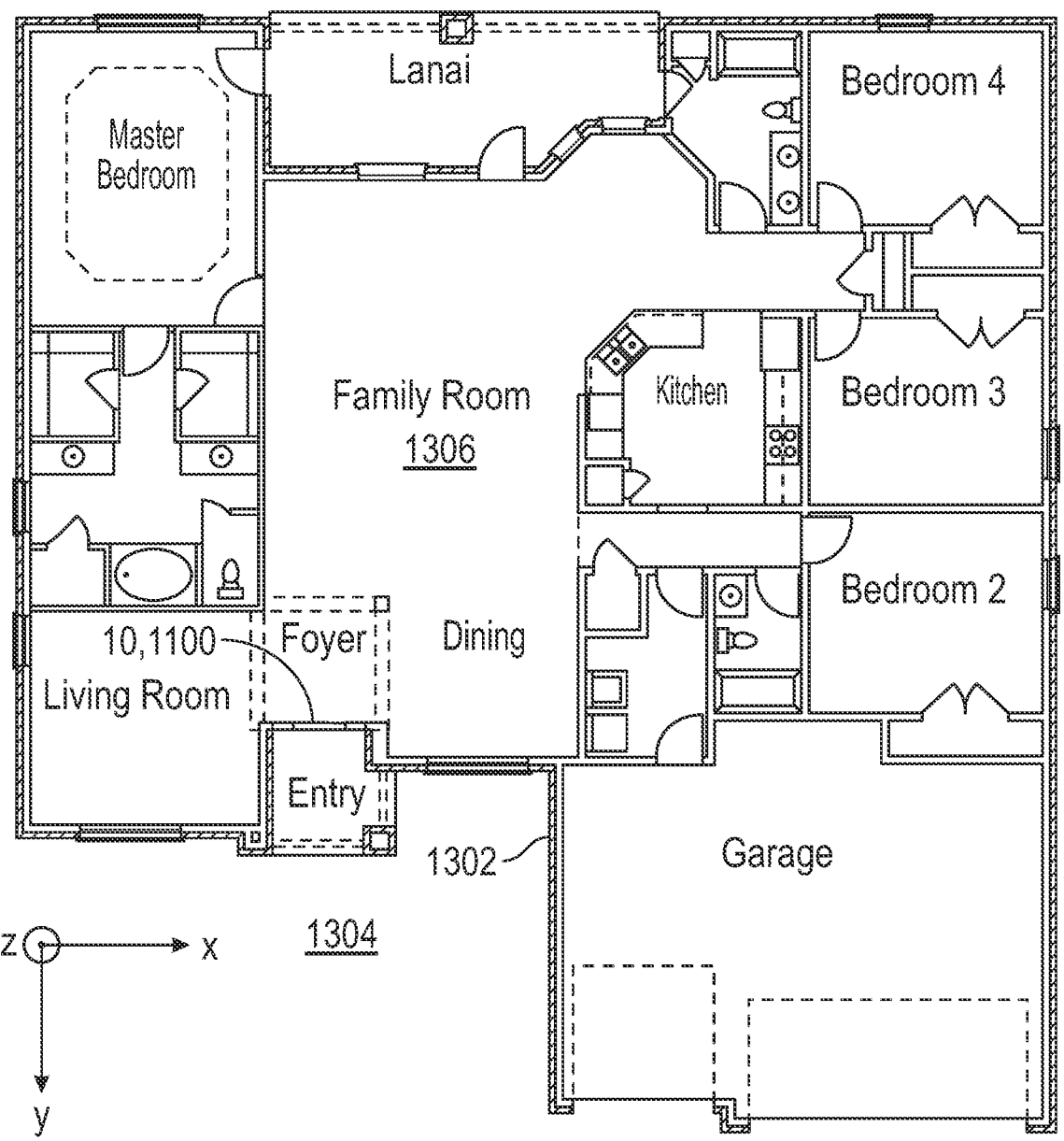
FIG. 100 is schematic view of a floor plan of a residence including the door system of FIGS. 1, 92, 97, and/or 99, according to an exemplary embodiment.

Referring to FIG. 100, a structure (e.g., a residence, a house, an apartment, a condominium, a commercial building, etc.), shown as building 1300, has perimeter walls, shown as exterior walls 1302, that define an exterior of the building 1300, shown as outside 1304, and an interior of the building 1300, shown as inside 1306. As shown in FIG. 100, the building 1300 includes the door system 10 (or the door system 1100) to permit selective access to the inside 1306 of the building 1300 from the outside 1304. The building 1300 may include one or more above-ground levels or stories (e.g., a first/main floor, a second floor, etc.) and/or one or more below-ground levels (e.g., a basement, a walkout basement, etc.).

According to an exemplary embodiment, the control system 100 is configured to (a) detect the presence of a user and/or a user device 190 proximate the building 1300, (b) determine a distance of the user and/or the user device 190 relative to the door 30, (c) determine whether the user and/or the user device 1900 is on the outside 1304 and/or on the inside 1306 of the building 1300, (d) determine user access intent, and/or (e) determine whether to permit "hands free" unlock the door 30 based at least on the presence, the distance, whether the user and/or the user device 190 is on the inside 1306 or on the outside 1304, and/or the user access intent.

According to an exemplary embodiment, the control system 100 is configured to facilitate distinguishing between whether a user is inside of the door 30 or outside of the door 30, or whether the user actually intends to open the door 30 or whether the user is just passing by the door 30. Without such capabilities, the control system 100 may otherwise inadvertently or unnecessarily activate "hands free" door unlocking events (e.g., not having to enter a code, not having to select unlock on a user device, etc.). For example, a user may enter the building 1300 from another entry point (e.g., a garage door, a rear door, a side door, etc.) and walk past the door 30. If the control system 100 does not distinguish between inside or outside, the control system 100 may otherwise recognize the user's returned presence (e.g., based on the user device 190 of the user being detected) and unlock the door 30 even though the user is on the inside 1306. As another example, a user may be in the garage or living room of the building 1300, which in FIG. 100 extends at least partially past an exterior side of the door 30 of the door system 10, or the user may be on a lower level or upper level of the building 1300 that extends past the exterior side of the door 30 of the door system 10. If the control system 100 were not capable of distinguishing between a user in front of the door 30 but inside of the building 1300, or identify position in a three-dimensional space, the control system 100 may unlock the door 30 even though the user is not outside of the building 1300 or in a location to access the door 30. As yet another example, a user may be outside of the building 1300 but not actually intend to enter the building 1300 through the door 30 (e.g., walking past the door 30 as they are doing yardwork, etc.). If the control system 100 does not take access intent into account, the control system 100 may simply unlock when the user's presence is detected nearby and, therefore, unlock in instances when the user is passing by the door 30 but not actually attempting to enter.

As described above, the control system 100 is configured to receive the UWB signals from the UWB sensors 606 to triangulate the user's position in two-dimensional or three-dimensional coordinate space. As such, the control system 100 can determine whether the user is on the inside 1306 or on the outside 1304 based on the UWB signals. In some embodiments, the control system 100 is configured to determine whether the user is inside 1306 or outside 1304 using different sensors (e.g., the camera 520, the radar sensor 608, the ToF sensor(s), etc.). For example, if the user is not detected outside 1306 with such sensor(s), the user may be determined to be inside 1304. In some embodiments, the control system 100 can additionally determine whether the user is above the door 30, below the door 30, and/or on the same level as the door 30 based on the UWB signals (or other sensor signals). In some embodiments, the perimeter of the exterior walls 1302 of the building 1300 are predefined within the control system 100 and/or the control system 100 is trained (e.g., by a user walking around the building 1300 with the user device 190 and setting a border) to understand which regions are considered eligible for unlock operations. Accordingly, the control system 100 can prevent inadvertent unlocking of the door 30 when the user is on the inside 1306, above the door 30, or below the door 30.

Though, when the control system 100 determines that the user is in front of the door 30 and on the outside 1304 of the building 1300, there still may be instances like described above where the user does not actually intend to access the building 1300 through the door 30. The control system 100 may be configured to determine whether the user intends to access the building 1300 through the door 30 based on a signal received from a capacitive touch component of the door 30 and/or the sensor data received from the radar sensor 608. By way of example, the doorknob or handle of the handle assembly 70 may have a capacitive touch sensing function that facilitates detecting a user's hand when grasped. Accordingly, the control system 100 may be configured to unlock the door 30 in response to detecting the user on the outside 1304 and in response to receiving the signal from the handle assembly 70 indicating a user has grabbed/grasped the doorknob or handle (i.e., indicating user access intent). By way of another example, the control system 100 may be configured to unlock the door 30 in response to the signals from the radar sensor 608 (and/or the camera 520) indicating that the user is reaching for the doorknob or handle (i.e., indicating user access intent).

Building Integration

In some embodiments, the door system 10 integrates or communicates with other building control systems within a building (e.g., a home, a residence, etc.) within which the door 30 is installed. The other building control systems may include systems such as a lighting control system, an alarm system, a heating, ventilation, and air conditioning ("HVAC") system (e.g., a thermostat), smart home systems (e.g., Google Home, Amazon Alexa, etc.), home water monitoring and control systems, and the like.

By way of example, the door system 10 may be set to an away mode (e.g., by a user or occupant, automatically, etc.). In the away mode, the door system 10 may not only lock the door 30, but may communicate with one or more other building control systems to control them, provide instructions thereto, and/or receive information therefrom. As an example, the door system 10 may communicate with the lighting controls of the building to instruct the lighting control system to turn off one or more lights within the building that may be on at the time of the away mode being activated. As another example, the door system 10 may communicate with the alarm system of the building to instruct the alarm system to enter into an active mode in response to the away mode being activated. As yet another example, the door system 10 may communicate with the HVAC system of the building to instruct the thermostat to enter the HVAC system into an away mode (e.g., operate the HVAC system to provide a certain preset temperature set by the user, engage away temperature control operations, etc.). As still yet another example, the door system 10 may communicate with the water monitoring and control system of the building to instruct the water monitoring and control system to enter the home water system into an away mode (e.g., engage away water monitoring and control operations such as closing a water supply valve to the building, entering the water monitoring and control system into a high alert state where water usage within the building sets off an alarm and/or pushes notifications to the user, etc.).

Advanced Controls and Artificial Intelligence

According to an exemplary embodiment, the control system 100 is configured to provide advanced control capabilities whether through advanced programming logic or through artificial intelligence ("AI") and machine learning. The advanced control capabilities may, for example, relate to weather/environment-based controls, schedule-based controls, and/or presence detection controls. According to various implementations, the control system 100 may be able to provide such advanced capabilities using any kind of AI/machine learning model or architecture, such as neural networks/advanced neural networks, reinforcement learning, Bayesian hierarchical analysis, generative AI models such as generative adversarial networks ("GANs") and/or transformer models, or any other type of machine learning model/AI model.

In some embodiments, the control system 100 is configured to detect or acquire weather/environmental characteristics (e.g., temperature, sky/cloud darkness, precipitation, directly with sensors, through weather reports accessed through a weather system, etc.) and provide various notifications and/or perform various functions based on the weather/environmental characteristics. By way of example, the control system 100 may detect rain and/or dark clouds approaching (e.g., via the camera 520, via the ambient condition unit 604, via weather reports from a weather system). The control system 100 may be configured to provide an alert or notification via the door system 10 and/or through the user device 190 to close any open screens or windows. In some instances, the door system 10 may have an internal or external camera to detect open windows of the building and/or a screened storm door, and provide such information to the user to close such windows. The control system may be trained using images of different weather conditions (e.g., sunny, rainy, snowy, etc.), images of open/closed windows, data that indicates inclement weather (e.g., pressure readings, temperature readings, etc.) and then be capable of evaluating whether current conditions indicate inclement weather and/or open windows. By way of another example, the control system 100 may detect or acquire external, ambient temperature (e.g., via the ambient condition unit 604, via weather reports from a weather system, etc.). In some embodiments, the control system 100 is configured to (a) provide an alert or notification via the door system 10 and/or through the user device 190 to shutoff a water supply to external water spickets in response to the temperature falling below a first temperature threshold and/or (b) communicate with the home water system to automatically turn off the water supply in response to the temperature falling below a second temperature threshold. The second temperature threshold may be the same or less than the first temperature threshold. In some embodiments, the control system 100 is configured to automatically transition the window 60 (and/or the panel windows 62 described herein below) from the transparent state to the opaque state, and vice versa. By way of example, the control system 100 may be configured to transition between the transparent state and the opaque state to prevent heat loss or maximize heat transfer based on the external temperature, the internal temperature, position of the sun relative to the door 30, etc.

In some embodiments, the control system 100 is configured to learn occupant schedules and/or schedules of external events over time and provide alerts when a schedule deviates from what is expected (e.g., by monitoring location of the user device 190 to identify that the user is entering/exiting the door 30, using facial recognition during entry and exit events, via sensors, via cameras, etc.). By way of example, the control system 100 may be configured to monitor the days and times at which a child typically leaves and returns from school (e.g., using facial recognition, monitoring the child's devices, etc.). For example, if the child does not leave by a certain time on a day of school (e.g., the camera feed has not captured the child leaving), the control system 100 may be configured to provide a notification to the user device 190 of the child and/or the parent of the child, sound the doorbell as an "alarm," or the like. As another example, if the child does not return by a certain time, the control system 100 may be configured to provide a notification to the user device 190 of the parent notifying them that the child has not returned home according to their usual schedule. By way of another example, the control system 100 may be configured to monitor events external to the door 30 (e.g., via the camera 520) such as refuse pickup schedules. For example, if the occupant puts refuse at the curb according to the learned refuse pickup schedule and the refuse is not picked up according to historical pickup times, the control system 100 may be configured to provide an alert to the occupant and/or contact the refuse pickup organization that the refuse pickup was missed. The control system 100 may be trained using images of refuse vehicle in various states of refuse collection and then be capable of evaluating whether refuse collection occurred by evaluating a camera feed over a range of time around the typical pickup schedule. As another example, if a child catches a school bus at a particular time and the school bus does not arrive according to historical pickup times, the control system 100 may be configured to provide an alert to the parent and/or contact the school that the child's bus stop was missed. The control system 100 may be trained using images of school buses and child pickup events and then be capable of evaluating whether a school pickup event occurred by evaluating a camera feed over a range of time around the typical pickup schedule. By way of still another example, the control system 100 may be configured to monitor snow removal timing by a snow removal service during snowfall and provide a notification to the occupant and/or contact the snow removal service if the timing deviates from historical response timing. The above examples may similarly apply to a cleaning service schedule, a lawn care schedule, a mail delivery schedule, and the like. The control system 100 may similarly be trained using images related to each scenario similar to outlined above.

In some embodiments, the control system 100 is configured to provide advanced presence detection capabilities. By way of example, the control system 100 may be configured to implement various filters when analyzing motion proximate the door 30 and eliminate false movements from activating door features (e.g., activation of the camera 520, the exterior lighting, etc.). For example, the control system may be configured to detect an object is swaying in the wind (e.g., a tree limb, a hanging light fixture, etc.) and prevent such movement from activating the features of the door 30. Such detection may be performed using data from the camera 520, the radar sensor 6008, the external ToF sensor 594, and/or other sensors.

By way of another example, the control system 100 may be configured to provide various advanced delivery features. For example, the control system 100 may be configured to detect that a delivery person is approaching the door 30 with a package or mail and perform one or more features. The control system 100 may be trained using images of delivery persons approaching a door with various types of packages and then be capable of evaluating whether a package delivery is occurring by evaluating a camera feed when presence at the door 30 is detected. One feature may include sending a notification to the user device 190 of the occupant regarding delivery. The notification may include various information regarding the time, the type of delivery service (e.g., UPS, USPS, DHL, FEDEX, Amazon, etc.) based on detected characteristics of the delivery person, their vehicle, and/or identifiers on the package, and/or characteristics of the packages (e.g., identifiers, dimensions, etc.). Another feature may include disabling the doorbell functionality and only sending a notification to the user device 190 of the occupant when a delivery is detected (e.g., so not to disturb the occupant, since the occupant may not need to go down immediately to get the package, etc.). The control system 100 may, however, detect that the delivery person has a signature device indicating that the occupant needs to sign for the delivery and, in such instance, may keep the doorbell function active. In such instances, the control system 100 may be trained using various images that do and do not include package deliveries where the delivery person has a signature device and, therefore, learn to detect such a scenario. Still another feature may include providing a "Do Not Disturb" visual on the outside of the door 30 to prevent the delivery person from ringing the doorbell or knocking. Yet another feature may include providing an indicator on the inside of the door 30 that a package and/or a person is on the outside of the door 30.

By way of still another example, the control system 100 may be configured to provide advanced pet functionality. For example, the control system 100 may be configured to detect that a pet (e.g., a dog) is at the door 30 and perform one or more features. One feature may include sending a notification to the user device 190 of the occupant regarding the pet being at the door. Another feature may be providing an alternative doorbell tone specific to the pet being present at the door. Still another feature may include opening the door 30 (e.g., via the door actuator 750). Yet another feature may include unlocking or opening a pet door within the door 30. In some embodiments, the control system 100 is configured to determine that the pet has an intent to come inside before performing the features outlined above. For example, the control system 100 may analyze audio data (e.g., via audio sensors of the door 30) to identify whether the pet has barked, whined, or emitted a certain tone consistent with wanting to be let in while standing next to the door 30. As another example, the control system 100 may analyze accelerometer data (e.g., from the accelerometer unit 600) to identify if the pet is scratching at the door 30. The control system 100 may also be configured to learn which animal is the pet associated with the building within which the door 30 is installed (e.g., based on frequently being captured by the camera 520, based on an identification device on the pet, etc.) and prevent all such pet functionality for other animals that are not the pet (e.g., wild animals, neighbors pets, etc.). In some embodiments, the control system 100 is configured to analyze visual data (e.g., from the camera 520) to detect whether a person other than the occupant can be seen in the frame. If a person is detected, the control system 100 may prevent the opening the door 30 or pet door thereof to prevent unwanted entry by such person.

By way of yet another example, the control system 100 may be configured to provide advanced lighting functionality. For example, the control system 100 may be configured to perform one or more lighting control features. One feature may include determining the intent of a person at the door and changing lighting features based on such intent. For example, the control system 100 may be configured to distinguish between a good intent (e.g., soft knocking) or a bad intent (e.g., hard knocking, shaking of the door, characteristics of a false entry attempt) based on accelerometer data (e.g., from the accelerometer unit 600). If a bad intent is identified, the control system 100 may be configured to change lighting color (e.g., from white to red, etc.), flash the lights, etc. to deter such bad intent. Another feature may include controlling the external lights to provide external notifications. For example, if the building alarm system has been tripped (e.g., fire alarm, home alarm, occupant fall alert, etc.), the lights may flash and/or change color(s) to catch the eye of response personnel.

By way of still yet another example, the control system 100 may be configured to provide automatic activation of the away mode. For example, the control system 100 may be configured to monitor building occupancy and ingress and egress through the door 30 by monitoring the location of the user devices 190, accessing data from in-building sensors (e.g., water use sensors, occupancy sensors, motion sensors, light sensors, vibration sensors, etc.), and/or accessing data acquired from the sensors of the door 30. If the control system 100 determines that all occupants are out of the building, the control system 100 may be configured to engage the away mode (or send a notification to the user device 190 to request activation of the away mode). In some instances, the control system 100 may active the away mode when it is apparent that the occupants will be gone for an extended period of time (e.g., more than a few hours, for a few days, etc.). For example, the occupants may leave with suitcases indicating that they are going on a trip. As another example, the occupants may leave with backpacks, briefcases, etc. indicating that they are going to school and work for the day.

With respect to the away mode and the control of the home water monitoring and control system, the control system 100 may be configured to vary the functions it performs based on confidence level. For example, if the control system 100 has a lower confidence that the building is completely empty when the away mode is active, the control system 100 may send a leak detection notification or alert to the user device 190 if water is being used. If, however, the confidence level is higher that the building is unoccupied, the control system 100 may shut of the water to the building if water use is detected (i.e., a leak).

By way of another example, the control system 100 may be configured to provide various advanced notification suppression features. For example, the control system 100 may detect continued or increased activity at the door 30 (e.g., indicating a party). One feature may include preventing continuous presence detection and/or doorbell notifications on the user device 190. Another feature may include suppressing critical water usage alert notifications and false shutoffs (until the guest leave), understanding that water usage will be higher than usual while more occupants are in the building.

Perimeter Wire Routing Channels

Figure 64:
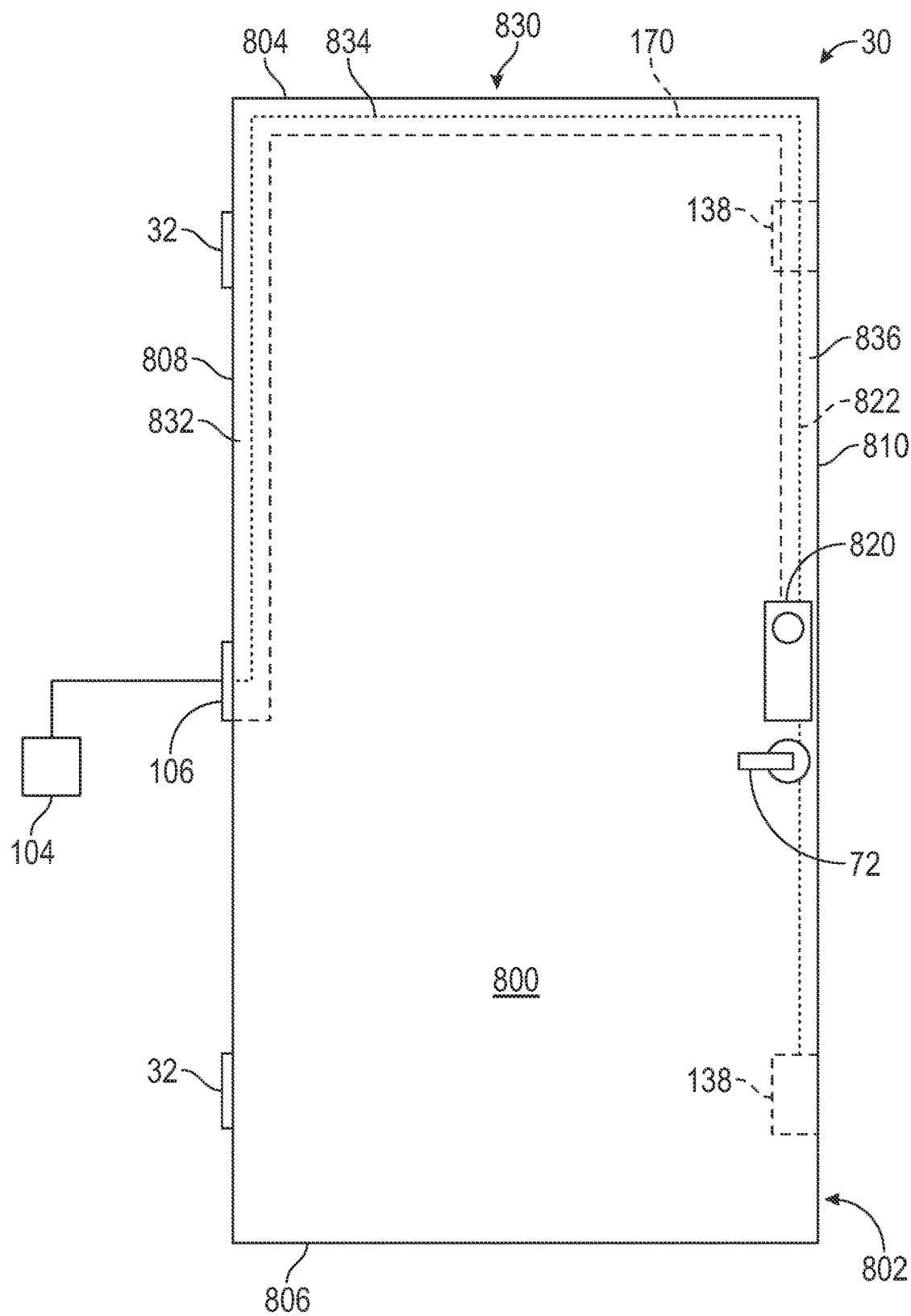
FIG. 64 is a front view showing an exterior side of a door of the door system of FIG. 1, according to another exemplary embodiment.

Referring to FIG. 64, a door 30 is shown as another embodiment to the door 30 of FIG. 3. The door 30 of FIG. 64 may be substantially similar to the door 30 of FIG. 3, except as otherwise specified herein. Accordingly, any description of the door 30 of FIG. 3 may apply to the door 30 of FIG. 64.

Referring to FIG. 64, the door 30 has a series of faces, surfaces, or sides. The door 30 has a front surface 800 and a rear surface 802 facing opposite directions. The door 30 may be configured such that the front surface 800 defines an exterior surface of the door 30, and the rear surface 802 defines an interior surface of the door 30. Alternatively, the door 30 may be configured such that the front surface 800 defines an interior surface of the door 30, and the rear surface 802 defines an exterior surface of the door 30. The door 30 has a top surface 804 facing upward and a bottom surface 806 facing downward. The door 30 has a hinge surface 808 along a hinge side of the door 30. The hinges 32 may be coupled to the hinge surface 808. The door 30 has a lock surface 810 opposite the hinge surface 808.

Referring still to FIG. 64, the door 30 includes a module, interface, controller, section, or control unit, shown as interactive unit 820. The interactive unit 820 may incorporate some or all of the functionality of the modules of the door 30 of FIG. 3. By way of example, the interactive unit 820 may include the components and/or functionality of the power supply unit 130, the window control unit 132, the main control unit 134, the bridge module 136, the deadbolt units 138, and/or the interactive unit 140. The interactive unit 820 may have a similar position to the interactive unit 140.

As shown, the door 30 includes a plurality of (e.g., two) deadbolt units 138 positioned along the lock surface 810. As shown, the deadbolt units 138 are electrically coupled to the interactive unit 820 through a secondary door bus, shown as secondary door wiring harness 822. The secondary door wiring harness 822 may pass power and/or data between the deadbolt units 138 and the interactive unit 820. In some embodiments, the deadbolt controllers 266 are omitted from the deadbolt units 138, and the interactive unit 820 directly controls operation of the deadbolt units 138 (e.g., actuation of the deadbolt actuators 260). In some embodiments, the deadbolt actuators 260 are omitted and the interactive unit 820 or a single deadbolt actuator is mechanically coupled to the deadbolt units 138 (e.g., by a linkage), such that the interactive unit 820 or the single deadbolt actuator provides mechanical energy to actuate each of the deadbolts 252 of the deadbolt units 138.

The door wiring harness 170 may supply electrical energy to power the interactive unit 820 and the deadbolt units 138. As shown, the interactive unit 820 is electrically coupled to the power converter 104 through the power transfer assembly 106, the door wiring harness 170, the uppermost deadbolt unit 138, and the secondary door wiring harness 822. Specifically, the door wiring harness 170 is directly connected to the power transfer assembly 106 and the uppermost deadbolt unit 138, and the secondary door wiring harness 822 is directly connected to the uppermost deadbolt unit 138 and the interactive unit 820. In other embodiments, the door wiring harness 170 is directly connected to the interactive unit 820 instead of electrically passing to the interactive unit 820 indirectly through the uppermost deadbolt unit 138 and the secondary door wiring harness.

The door 30 includes a series of grooves, recesses, or notches, or perimeter wire routing channels, shown as perimeter channels 830. Specifically, the perimeter channels 830 may be defined by the subframe 40 of the door 30. The perimeter channels 830 together define a continuous channel between the power transfer assembly 106 and the interactive unit 820 that receives the door wiring harness 170. The perimeter channels 830 facilitate containing the door wiring harness 170 within the door 30. The perimeter channels 830 extend around a periphery or perimeter (e.g., one or more sides) of the door 30 between (a) the power transfer assembly 106 and (b) the interactive unit 820 and/or a deadbolt unit 138. In some embodiments, the perimeter channels 830 are formed by removing material from (e.g., machining away) a portion of the door 30 (e.g., the subframe 40).

The perimeter channels 830 include (a) a first channel or hinge-side channel, shown as hinge channel 832, (b) a second channel or top-side channel, shown as top channel 834, and/or (c) a third channel or lock-side channel, shown as lock channel 836. The hinge channel 832 extends substantially vertically along and inward from the hinge surface 808. The top channel 834 extends substantially horizontally along and inward from the top surface 804. The lock channel 836 extends substantially vertically along and inward from the lock surface 810. The top channel 834 extends from the hinge channel 832 to the lock channel 836, forming a single continuous channel. In other embodiments, one or more of the hinge channel 832, the top channel 834, or the lock channel 836 are omitted from the door 30. By way of example, the lock channel 836 or a portion thereof may be omitted. In such an implementation, the lock channel 836 may be entirely omitted or the lock channel 836 may only extend to the location of the uppermost deadbolt unit 138. In such an embodiment, the door wiring harness 170 may pass from the top channel 834 to the uppermost deadbolt unit 138 with or without use of the lock channel 836, and the secondary door wiring harness 822 may pass from the uppermost deadbolt unit 138 to the interactive unit 820 without the use of the lock channel 836.

Figure 65:
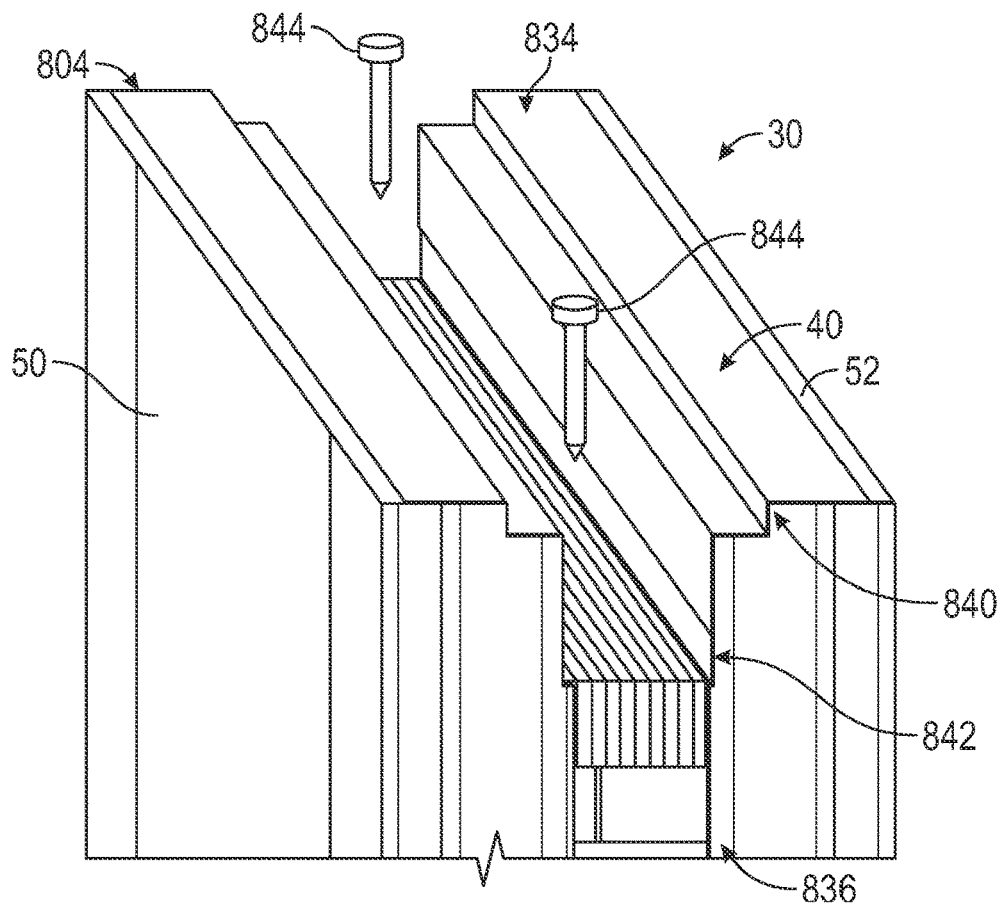
FIG. 65 is a top, right perspective view of the door of FIG. 64, according to an exemplary embodiment.
Figure 66:
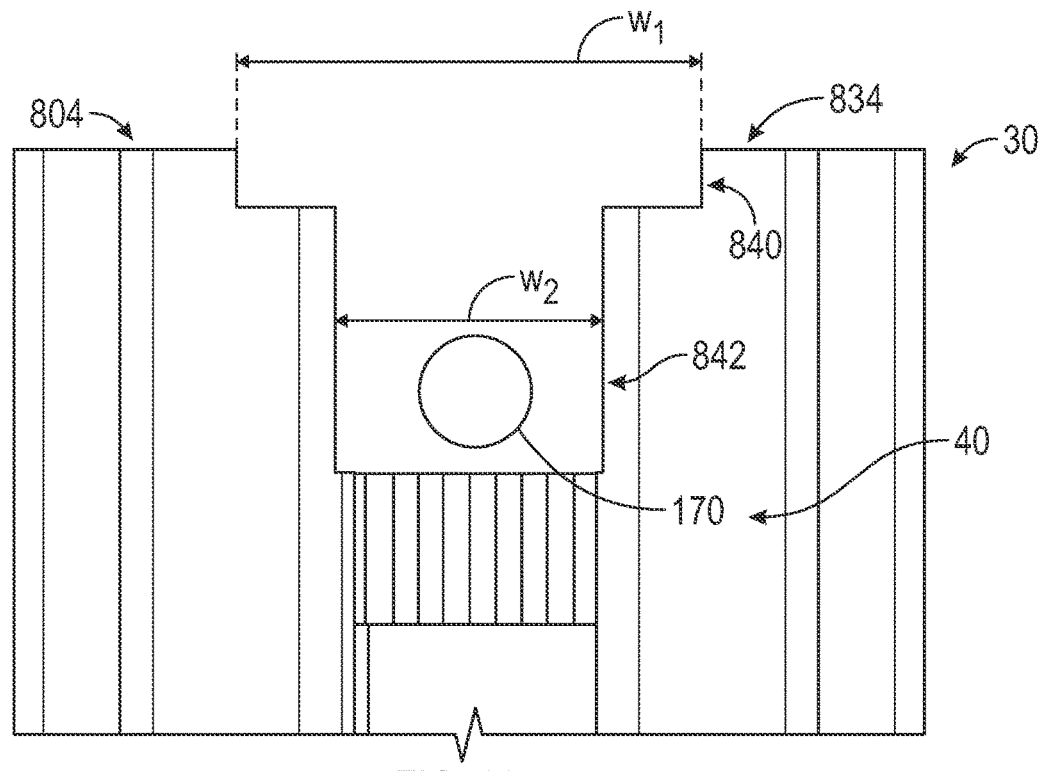
FIG. 66 is a right side view of the door of FIG. 64, according to an exemplary embodiment.

Referring to FIGS. 65 and 66, the top channel 834 is shown according to an exemplary embodiment. In some embodiments, the hinge channel 832 and/or the lock channel 836 have a similar shape and/or size to the top channel 834. The top channel 834 includes a first portion or outer portion, shown as cover portion 840, and a second portion or inner portion, shown as wire portion 842. The cover portion 840 extends between the wire portion 842 and the exterior surface of the door 30 (e.g., the top surface 804). The cover portion 840 has a first width $W_1$ measured perpendicular to the front surface 800, and the wire portion 842 has a second width $W_2$ measured perpendicular to the front surface 800. The first width Wi is greater than the second width $W_2$ such that the cover portion 840 extends beyond the wire portion 842.

FIGS. 67-77 illustrate various embodiments of covers that can be utilized with the door 30. The covers can be inserted within the cover portions 840 and/or wire portions 842 of the perimeter channels 830 such that the covers extend over the wire portions 842. The covers protect the door wiring harness 170 from contact with debris or other objects from outside of the door 30 and facilitate containing the door wiring harness 170 within the wire portions 842. In some embodiments, the covers are removably coupled to the subframe 40. When maintenance or upgrading of the door 30 is desired, a user may remove the cover to permit access to the door wiring harness 170. Placing the perimeter channels 830 along the exterior of the door 30 and making the covers removable facilitates assembly of the door 30 at a different time and/or location then when and where the subframe 40 and other components of the door 30 are produced.

The door 30 may include separate covers for each perimeter channel 830, or a single, continuous cover may extend along multiple of the perimeter channels 830. By way of example, a first cover may extend across the hinge channel 832 and the top channel 834, and a second cover may extend across the lock channel 836. Additionally, the door 30 may utilize any combination of the covers shown and described herein. By way of example, the door 30 may utilize the cover 850 of FIG. 68 to cover the hinge channel 832, the cover 880 of FIG. 61 to cover the top channel 834, and the cover 846 of FIG. 67 to cover the lock channel 836.

As shown in FIG. 65, the door 30 may include one or more fasteners 844 that engage (e.g., thread into, nail into, etc.) the subframe 40 of the door 30. The fasteners 844 may be screws, nails, bolts, or other types of fasteners. The fasteners 844 may facilitate coupling one or more of the covers (e.g., the cover 850, the cover 880, the raceway 890, the tubular cover 920, etc.) to the subframe 40. The fasteners 844 may extend through apertures defined by the covers and engage with the subframe 40 to removably couple the covers to the subframe 40. When maintenance or upgrading of the door 30 is desired, a user may remove the fasteners 844 to release the cover and permit access to the door wiring harness 170. The door 30 may include various features described herein that separate the fasteners 844 from the door wiring harness 170, preventing contact that could otherwise damage the door wiring harness 170.

Figure 67:
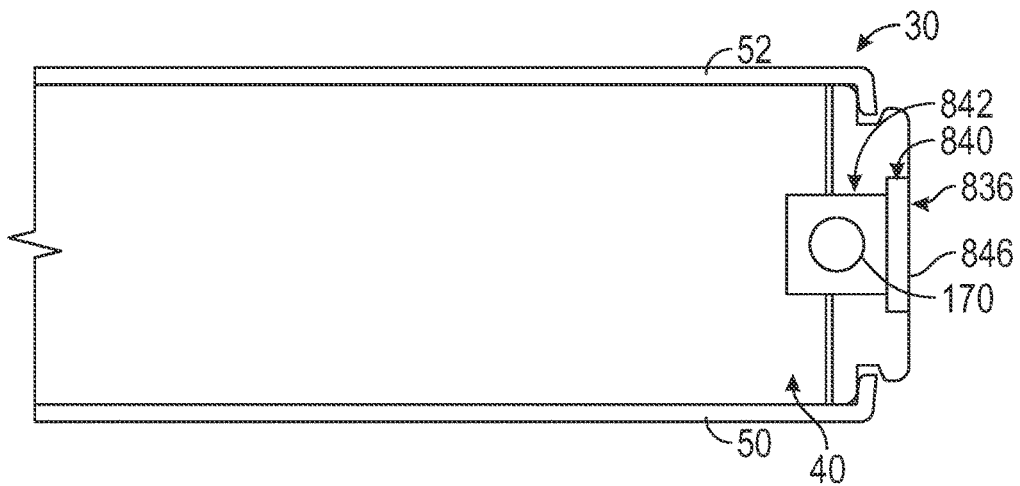
FIG. 67 is a top section view of the door of FIG. 64, according to an exemplary embodiment.

Referring to FIG. 67, the door 30 includes a cover, plate, or bracket, shown as cover 846. As shown, the cover 846 is received within the cover portion 840 of the lock channel 836. The cover 846 is elongate and flat, having a rectangular cross section that fits within the cover portion 840. The cover 846 may be held in place without the use of the fasteners 844. By way of example, the cover 846 may interlock with the subframe 40, may magnetically couple to the subframe 40, may be adhered to the subframe 40, or may be otherwise coupled to the subframe 40. As the fasteners 844 are omitted from this portion of the door 30, the door wiring harness 170 may be contained within the wire portion 842 of the lock channel 836 without the potential for contact between fasteners 844 and the door wiring harness 170.

Figure 68:
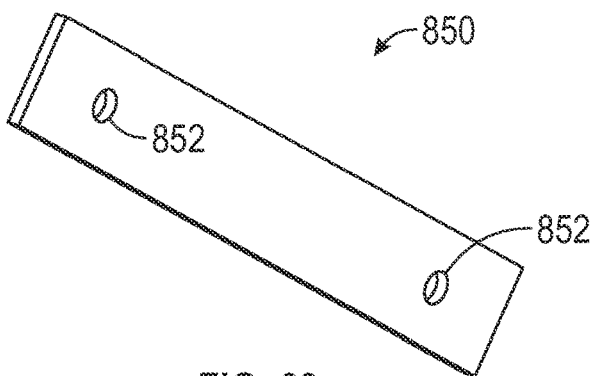
FIG. 68 is a perspective view of a cover of the door of FIG. 64, according to an exemplary embodiment.

Referring to FIG. 68, a cover or bracket, shown as cover 850, can be inserted within the cover portions 840 of the perimeter channels 830 to protect and contain the door wiring harness 170. The cover 850 is flat, elongated, and has a substantially rectangular cross section. The cover 850 defines one or more apertures, shown as fastener apertures 852, extending entirely through the cover 850. Specifically, FIG. 68 illustrates the cover 850 as defining two fastener apertures 852. In other embodiments, the cover 850 defines more or fewer fastener apertures 852. The fastener apertures 852 are each sized to receive a fastener 844 to couple the cover 850 to the subframe 40. As shown, the fastener apertures 852 are substantially laterally centered on the cover 850. Accordingly, when the cover 850 is inserted into a cover portion 840 of a perimeter channel 830, the fastener apertures 852 align with the wire portion 842. When installed, the fasteners 844 extend through the fastener apertures 852 and the wire portion 842 to reach the subframe 40.

Figure 69:
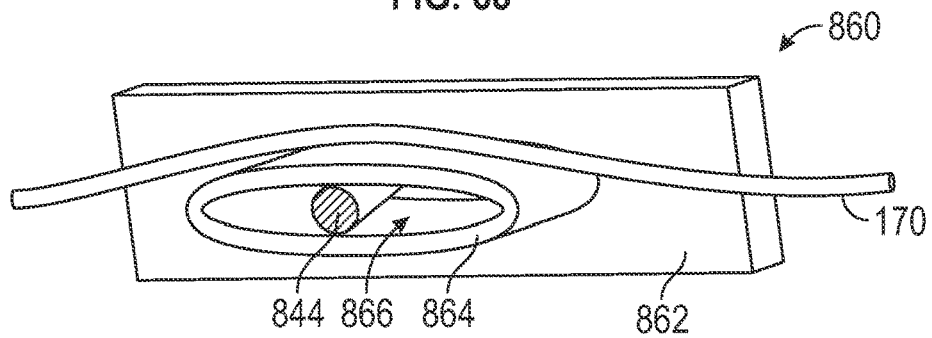
FIG. 69 is a perspective view of an insert of the door of FIG. 64, according to an exemplary embodiment.

Referring to FIG. 69, the door 30 may include one or more barriers or inserts 860 that prevent contact between the door wiring harness 170 and the fasteners 844 that couple the cover 850 to the subframe 40. The insert 860 includes a base or baseplate, shown as plate 862. The plate 862 is rectangular and may have a width that is slightly smaller than the width $W_2$ to facilitate insertion of the insert 860 into a wire portion 842. When inserted, the plate 862 may extend longitudinally along the wire portion 842. A rounded protrusion, shown as protrusion 864, extends outward from the plate 862. As shown, the protrusion 864 is elongated in the same longitudinal direction as the plate 862, facilitating routing of the door wiring harness 170 around the protrusion 864. The protrusion 864 may have a substantially elliptical cross section. In some embodiments, the protrusion 864 and the plate 862 are integrally formed as a single, continuous piece. An aperture or passage, shown as fastener aperture 866, extends entirely through the protrusion 864 and the plate 862. The fastener aperture 866 is sized to receive a fastener 844 therethrough.

To assemble the door 30, the insert 860 is inserted within a wire portion 842 approximately where a user intends to install a fastener 844. The insert 860 may be installed with the protrusion 864 facing outward from the perimeter channel 830 or inward into the perimeter channel 830, although an outward-facing orientation may facilitate installation of the door wiring harness 170. The door wiring harness 170 is then routed through the wire portion 842 and around the protrusion 864. The cover 850 is installed within the cover portion 840. A fastener 844 is inserted through both a fastener aperture 852 and the fastener aperture 866 and engaged with the subframe 40, coupling the cover 850 and the insert 860 to the subframe 40 and to one another. In an installed configuration, the door wiring harness 170 is positioned between the cover 850, the protrusion 864, the plate 862, and a wall of the wire portion 842. The insert 860 (e.g., the plate 862 and the protrusion 864) acts as a barrier, preventing contact between the fastener 844 and the door wiring harness 170. The door 30 may include one insert 860 for each of the fastener apertures 852.

Figure 70:
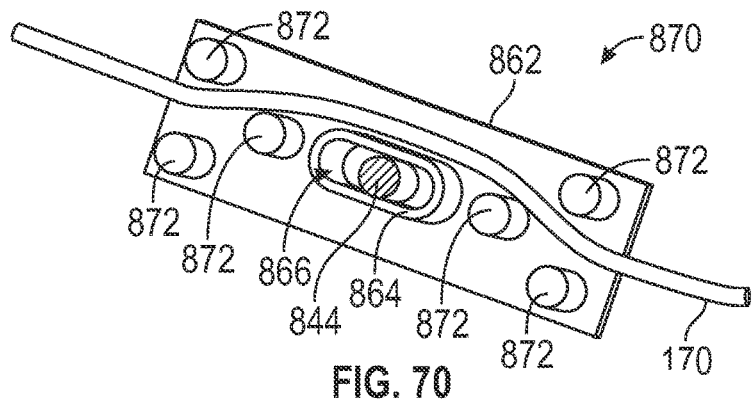
FIG. 70 is a perspective view of an insert of the door of FIG. 64, according to another exemplary embodiment.

Referring to FIG. 70, an insert or barrier, shown as insert 870, is as another embodiment of the insert 860. The insert 870 may be substantially similar to the insert 860 except as otherwise specified herein. The insert 870 further includes a series of protrusions, shown as wire guides 872, extending upward from the plate 862. The wire guides 872 are substantially cylindrical and spaced apart from one another. The wire guides 872 facilitate routing the door wiring harness 170. Specifically, a user can select one or more gaps between the wire guides 872 and route the door wiring harness 170 through those gaps, at which point the wire guides 872 will hold the door wiring harness 170 in that desired orientation.

Figure 71:
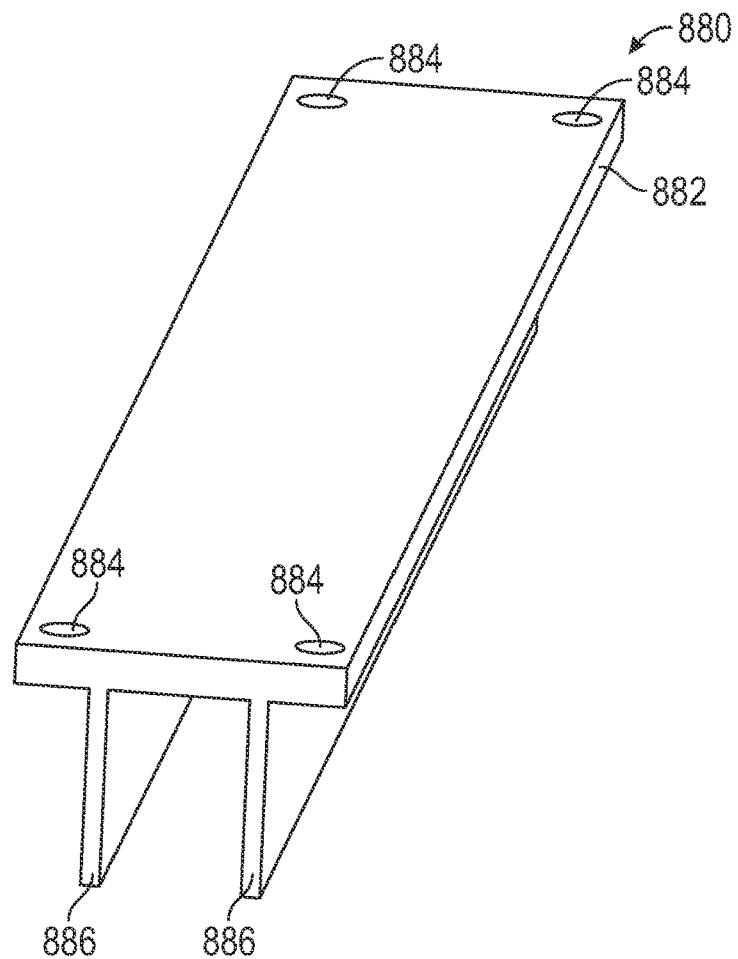
FIG. 71 is a perspective view of a cover of the door of FIG. 64, according to another exemplary embodiment.
Figure 72:
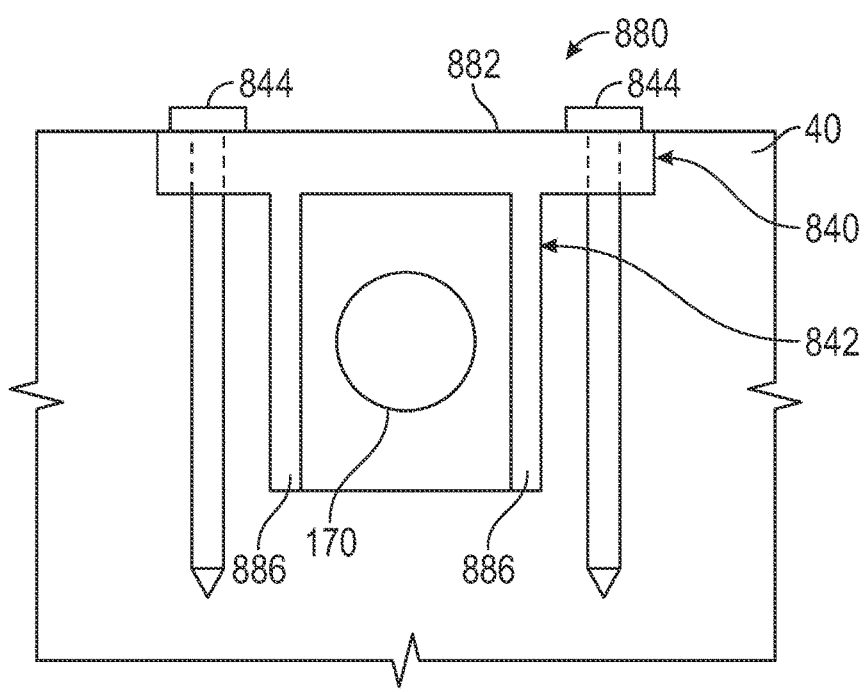
FIG. 72 is a front view of the cover of FIG. 71 installed in the door of FIG. 64, according to an exemplary embodiment.

Referring to FIGS. 71 and 72, a cover or bracket, shown as cover 880, can be inserted within the perimeter channels 830 to protect and contain the door wiring harness 170. The cover 880 includes a cover portion, shown as plate 882. The plate 882 is flat, elongated, and has a substantially rectangular cross section. The plate 882 defines one or more apertures, shown as fastener apertures 884, extending entirely through the plate 882. Specifically, FIG. 71 illustrates the plate 882 as defining four fastener apertures 884.

In other embodiments, the plate 882 defines more or fewer fastener apertures 884. The fastener apertures 884 are each sized to receive a fastener 844 to couple the cover 880 to the subframe 40. As shown, the fastener apertures 884 are laterally offset from the center of the plate 882. Specifically, the fastener apertures 884 are aligned with the portions of the subframe 40 where the perimeter channel 830 narrows from the width $W_1$ to the width $W_2$ to form a pair of inset shoulders. The cover 880 further includes a pair of protrusions, panels, or barriers, shown as flanges 886, that are fixedly coupled to the plate 882 and extend outward from the plate 882. The flanges 886 are laterally offset from one another to define a space that is sized to receive the door wiring harness 170. The flanges 886 and the plate 882 may be integrally formed as a single, continuous piece.

To install the cover 880, the door wiring harness 170 is inserted into the space between the flanges 886, and the cover 880 is inserted into the perimeter groove 330. Fasteners 844 are inserted through the fastener apertures 884 and engage the subframe 40. When the fasteners 844 are installed perpendicular to the plate 882, the fasteners 844 remain within the subframe 40 and do not enter the wire portion 842. However, if the user is imprecise when installing the fasteners 844, the fasteners 844 may extend inward at an angle and penetrate into the wire portion 842. The flanges 886 act as barriers in this situation, extending along the walls of the wire portion 842 and preventing the fasteners 844 from contacting the door wiring harness 170.

Figure 73:
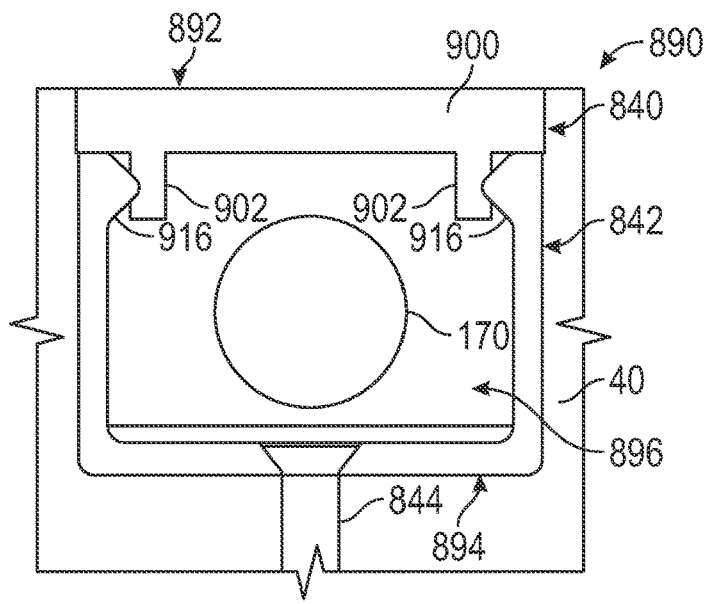
FIG. 73 is a front view of a raceway of the door of FIG. 64, according to an exemplary embodiment.
Figure 74:
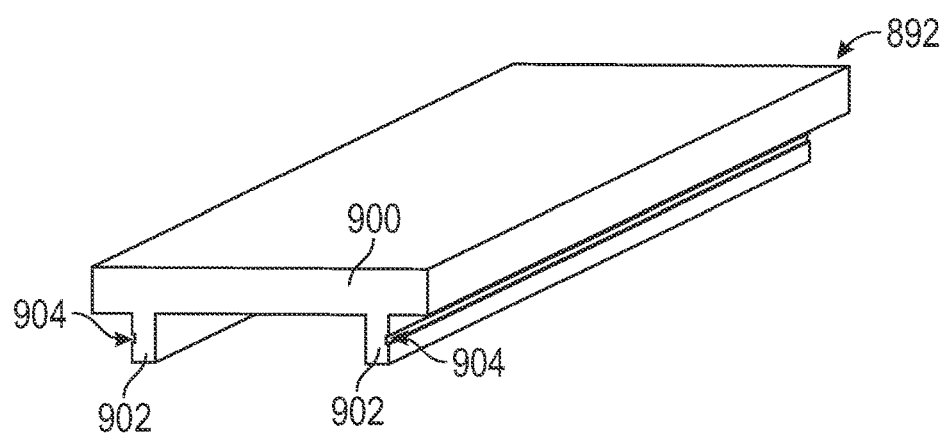
FIG. 74 is a perspective view of a cover of the raceway of FIG. 73, according to an exemplary embodiment.
Figure 75:
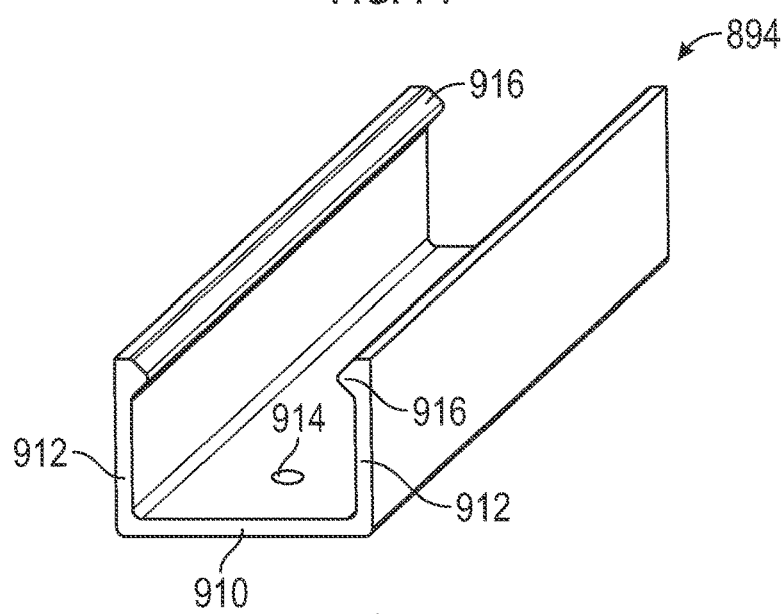
FIG. 75 is a perspective view of a body of the raceway of FIG. 73, according to an exemplary embodiment.

Referring to FIGS. 73-75, a cover or bracket assembly, shown as raceway 890, can be inserted within the perimeter channels 830 to protect and contain the door wiring harness 170. As shown, the raceway 890 includes a first, removable portion, shown as cover 892, and a second, fixed portion, shown as body 894. The body 894 is fixedly coupled to the subframe 40 and positioned within the wire portion 842. The cover 892 is removably coupled to the body 894 and positioned within the cover portion 840. A space, volume, or void, shown as wire volume 896, is defined between the body 894 and the cover 892 of the raceway 890. The wire volume 896 receives the door wiring harness 170.

The cover 892 includes a plate 900 that is flat, elongated, and has a substantially rectangular cross section. The cover 892 further includes a pair of protrusions, panels, or barriers, shown as flanges 902, that are fixedly coupled to the plate 900 and extend vertically outward from the plate 900. The flanges 902 are laterally offset from one another. The flanges 902 and the plate 900 may be integrally formed as a single, continuous piece. Each flange 902 defines a recess, shown as engagement groove 904, that extends along a length of the flange 902 and faces laterally outward. Each engagement groove 904 may have a tapered cross section.

The body 894 includes a plate 910 and a pair of walls 912 extending upward from the plate 910. The plate 910 defines one or more fastener apertures 914 that are each configured to receive a fastener 844 to couple the body 894 to the subframe 40. In some embodiments, the fastener apertures 914 are countersunk or counterbored to inset the heads of the fasteners 844. In other embodiments, the body 894 is otherwise coupled to the subframe 40 (e.g., adhered, press fit, etc.).

Positioned near a distal end of each of the walls 912 is a protrusion, shown as engagement flange 916. Each engagement flange 916 extends longitudinally along the corresponding wall 912 and laterally inward from the corresponding wall 912. The engagement flanges 916 may have tapered shapes that correspond to the engagement grooves 904. When installed, the engagement flanges 916 are each received within a corresponding engagement groove 904. The cover 892 may be made of an elastically-deformable material, such as plastic or steel, such that the flanges 902 can bend laterally inward. To install the cover 892, the cover 892 may be pressed down such that the tapered shapes of the engagement flanges 916 bend the flanges 902 inward, and the engagement flanges 916 are received within the engagement grooves 904. This engagement holds the cover 892 in place until an upward force is applied that is sufficient to reverse this process.

Figure 76:
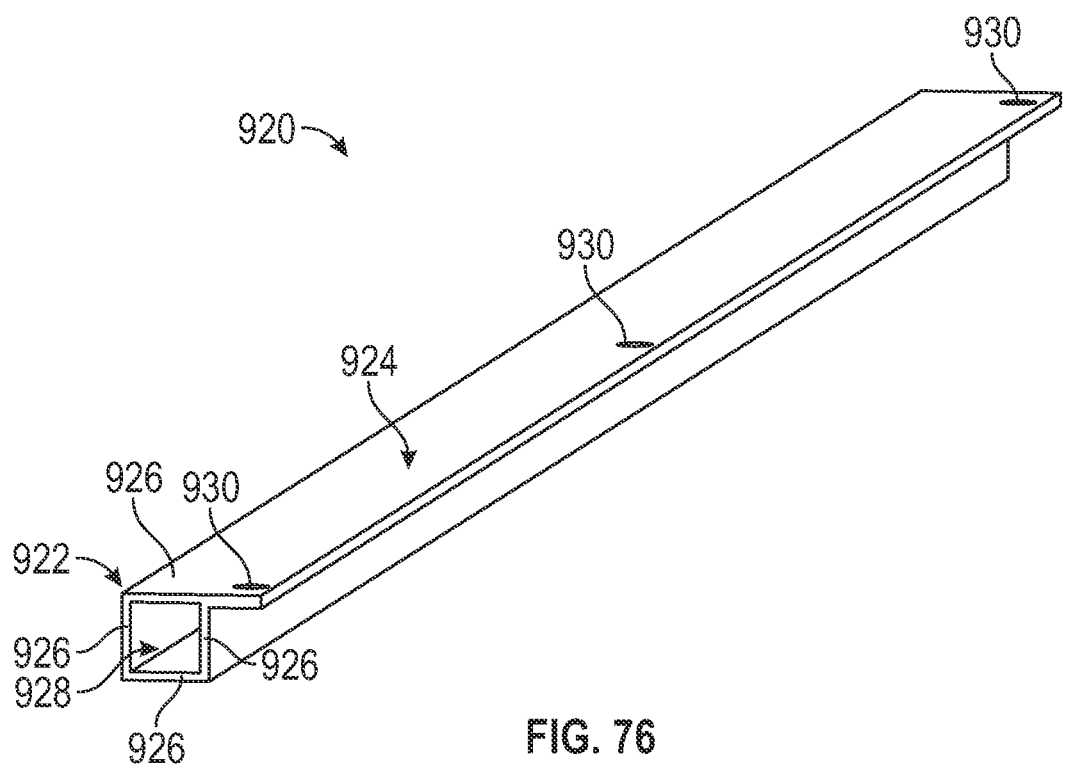
FIG. 76 is a perspective view of a tubular cover of the door of FIG. 64, according to an exemplary embodiment.
Figure 77:
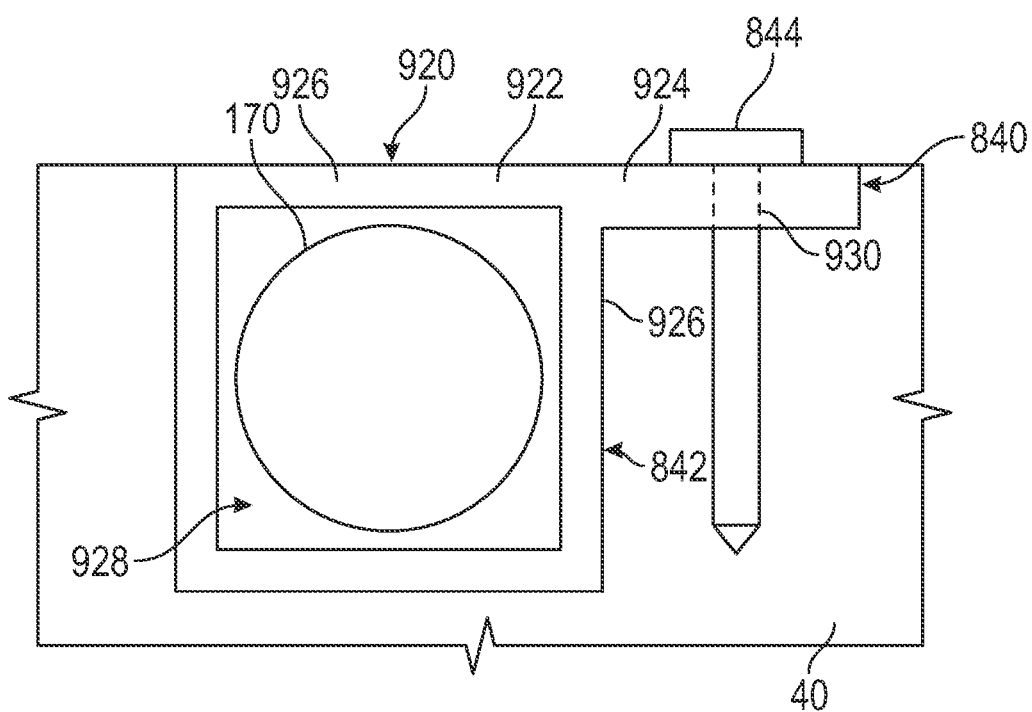
FIG. 77 is a front view of the tubular cover of FIG. 76 installed in the door of FIG. 64, according to an exemplary embodiment.

Referring to FIGS. 76 and 77, a cover or bracket, shown as tubular cover 920, can be inserted within the perimeter channels 830 to protect and contain the door wiring harness 170. The tubular cover 920 includes a first portion, shown as tube 922, coupled to a second portion, shown as mounting flange 924. The tube 922 includes a series of walls 926 that are arranged in a rectangular (e.g., square) pattern to form a tubular member. The walls 926 define a passage or aperture, shown as wire passage 928, therebetween, that receives the door wiring harness 170. The wire passage 928 extends longitudinally through the entirety of the tube 922, such that the door wiring harness 170 can extend beyond both ends of the tube 922.

The mounting flange 924 extends laterally outward from the tube 922. As shown, the mounting flange 924 extends laterally outward in only one direction. In other embodiments, the tubular cover 920 includes two mounting flanges 924 that extend in opposing lateral directions. The mounting flange 924 defines a series of apertures, shown as fastener apertures 930, that each extend through the entirety of the mounting flange 924. Each fastener aperture 930 is sized to receive a fastener 844.

To install the tubular cover 920, the door wiring harness 170 is inserted through the wire passage 928, and the tubular cover 920 is inserted into the perimeter channel 830. Once inserted, the wire portion 842 receives the tube 922, and the cover portion 840 receives the mounting flange 924. The fasteners 844 may be inserted through the fastener apertures 930 and engage the subframe 40, removably coupling the tubular cover 920 to the subframe 40. One of the walls 926 extends between the door wiring harness 170 and the fasteners 844, acting as a barrier to protect the door wiring harness 170 from the fasteners 844. Another of the walls 926 and the mounting flange 924 act as a cover to protect the door wiring harness 170 from contact with outside objects.

In some embodiments, the door wiring harness 170 and the cover are preassembled into a subassembly that can later be installed on the door 30 or removed from the door 30 as a single component. By way of example, one tubular cover 920 may be sized to extend from the power transfer assembly 106 to the uppermost deadbolt unit 138. The door wiring harness 170 may be inserted through the tubular cover 920 and fixedly coupled to the tubular cover 920 (e.g., by potting the door wiring harness 170 with a rubber or epoxy). In an embodiment where the door wiring harness 170 and the cover are formed as a subassembly, a user can easily install the subassembly by coupling the subassembly to the door 30 and electrically coupling the door wiring harness 170 to the power transfer assembly 106 and the deadbolt unit 138. This simplifies the installation process relative to an embodiment where the door wiring harness 170 is separate from the cover. The ends of the door wiring harness 170 may be provided with quick disconnect electrical connectors to facilitate installation and removal of the subassembly.

Figure 78:
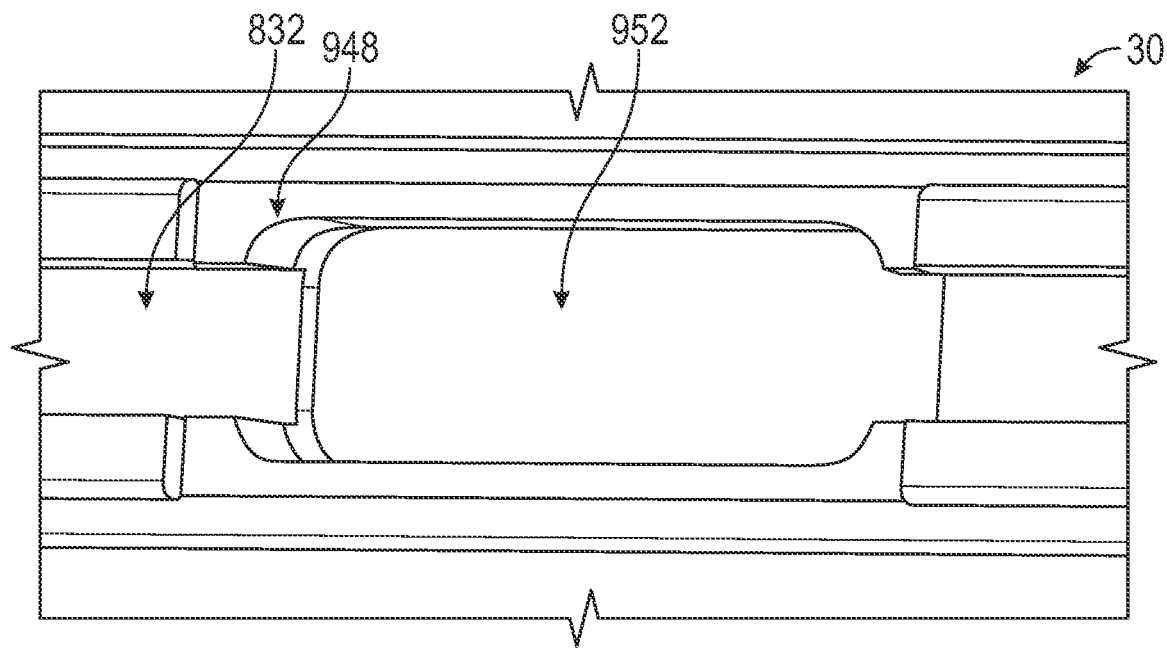
FIG. 78 is a perspective view of the door of FIG. 64, according to an exemplary embodiment.
Figure 79:
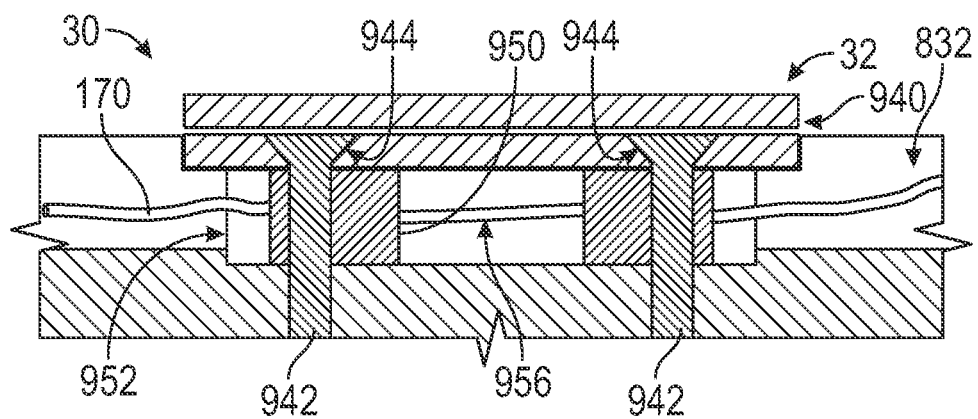
FIG. 79 is a front section view of a mounting arrangement for a hinge of the door of FIG. 64, according to an exemplary embodiment.

Referring to FIGS. 78 and 79, a mounting configuration for the hinges 32 is shown according to an exemplary embodiment. Each hinge 32 is received within a recess, shown as hinge recess 940, that is defined by the subframe 40. The hinge recess 940 defines the vertical position of the hinge 32 on the door 30. The hinges 32 are coupled to the subframe 40 by a series of fasteners, shown as hinge bolts 942. Each hinge 32 may define one or more apertures or passages, shown as fastener apertures 944, that each receive one of the hinge bolts 942. The power transfer assembly 106 may be coupled to the subframe 40 using a similar mounting configuration.

As shown, the hinges 32 are positioned along the hinge surface 808, such that a portion of the hinge channel 832 passes directly beneath at least one of the hinges 32. Due to the position of the hinges 32, one or more of the hinge bolts 942 may pass in proximity to the door wiring harness 170. Accordingly, it is desirable to protect the door wiring harness 170 from contact with the hinge bolts 942 and prevent damage to the door wiring harness 170. To accomplish this, the door 30 includes an insert or spacer, shown as hinge insert 950, that extends between the hinge 32 and the subframe 40 and guides the door wiring harness 170 around the hinge bolts 942.

As shown, the subframe 40 defines a recess, shown as insert recess 952, that receives the hinge insert 950. The insert recess 952 is positioned beneath the hinge recess 940, such that the subframe 40 captures the hinge insert 950 in a position directly beneath the hinge 32. The hinge insert 950 defines a series of passages or apertures, shown as fastener apertures 954, through which the hinge bolts 942 may pass. The fastener apertures 954 may be positioned to align with the fastener apertures 954 of the hinge 32.

The hinge insert 950 further defines a passage, shown as wire passage 956, through which the door wiring harness 170 passes. The wire passage 956 is positioned to be continuous with the hinge channel 832 when the hinge insert 950 is installed. The wire passage 956 guides the door wiring harness 170 around the fastener apertures 954 such that the hinge insert 950 acts as a barrier between the door wiring harness 170 and the hinge bolts 942.

Figure 80:
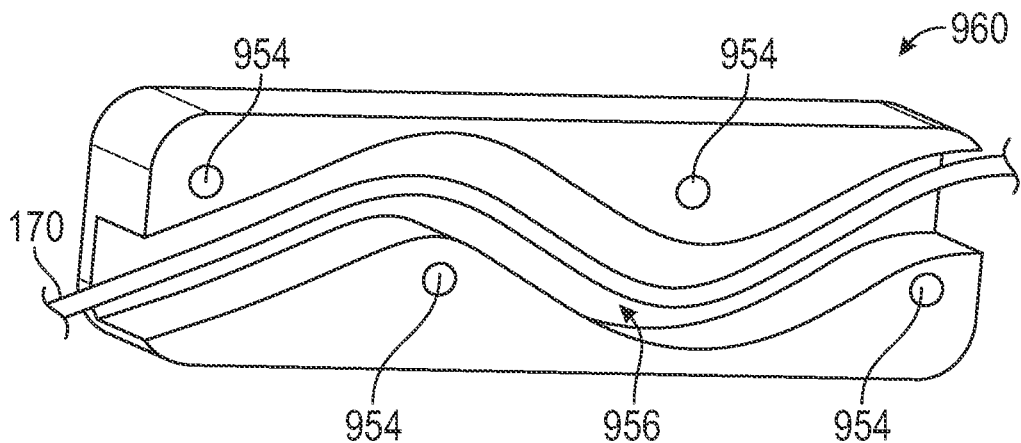
FIG. 80 is a perspective view of a hinge insert of the mounting arrangement of FIG. 79, according to an exemplary embodiment.

FIG. 80 illustrates a hinge insert 960 an exemplary embodiment of the hinge insert 950. The wire passage 956 of the hinge insert 960 is a channel that extends through the hinge insert 960. The channel is inset into the hinge insert 960, such that the hinge insert 960 separates the hinge 32 away from the door wiring harness 170. The wire passage 956 oscillates throughout the thickness of the door 30 to avoid intersecting the wire passage 956 with the fastener apertures 954.

Figure 81:
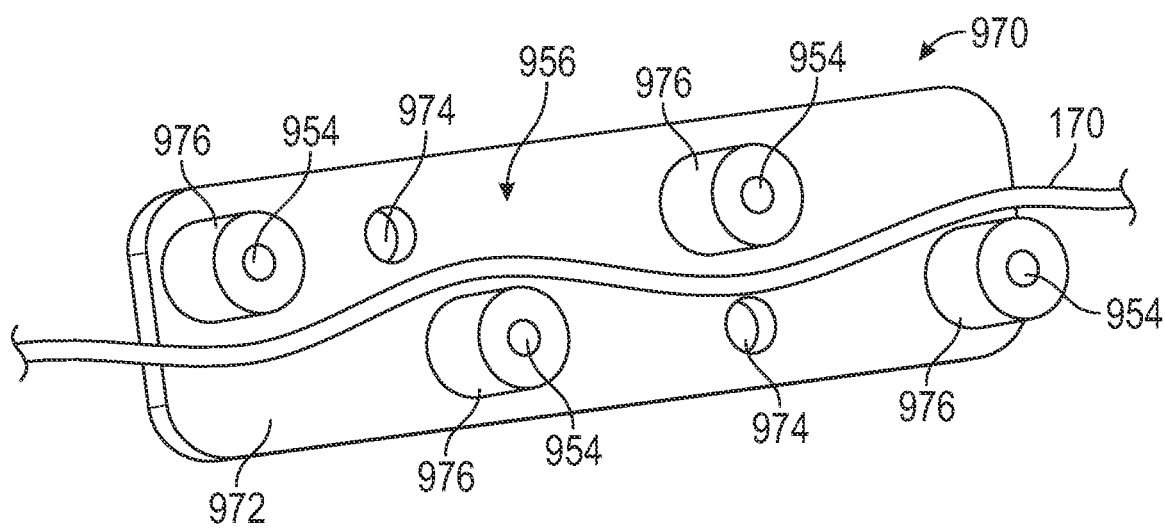
FIG. 81 is a perspective view of a hinge insert of the mounting arrangement of FIG. 79, according to another exemplary embodiment.

FIG. 81 illustrates a hinge insert 970 as another exemplary embodiment of the hinge insert 950. The hinge insert 970 includes a base member, shown as base plate 972. The base plate 972 defines a series of passages or apertures, shown as fastener apertures 974, that are each configured to receive a fastener to couple the hinge insert 970 to the subframe 40. A series of protrusions, shown as hinge standoffs 976, extend upward from the base plate 972, spacing the hinge 32 away from the base plate 972. The hinge standoffs 976 are each substantially cylindrical. The hinge standoffs 976 are each substantially centered about one of the fastener apertures 954. Accordingly, the hinge standoffs 976 act as a barrier between the hinge bolts 942 and the door wiring harness 170. The wire passage 956 of the hinge insert 970 is defined between the hinge standoffs 976.

Window Connection

As shown in FIGS. 82-91, the door 30 includes a plurality of components that can be assembled to form an assembly, shown as door assembly 1000. Any description of the door 30 of FIGS. 3 and 64 may apply to the door 30 and the door assembly 1000 of FIGS. 82-91. The door assembly 1000 includes the subframe 40 (i.e., the hinge stile 42, the top rail 44, the lock stile 46, and the bottom rail 48), the exterior skin 50, the interior skin 52, the window 60, a first wiring portion of the door wiring harness 170 including a first portion, shown as upper window wiring 174, and a second portion, shown as lower window wiring 176, an electrical connector, shown as window connector 1020, connecting the upper window wiring 174 to the lower window wiring 176, and a plug, shown as wire grommet 1030. In some embodiments, the door assembly 1000 does not include the window connector 1020 and the upper window wiring 174 and the lower window wiring 176 are integrally connected (i.e., continuous wiring).

Figure 82:
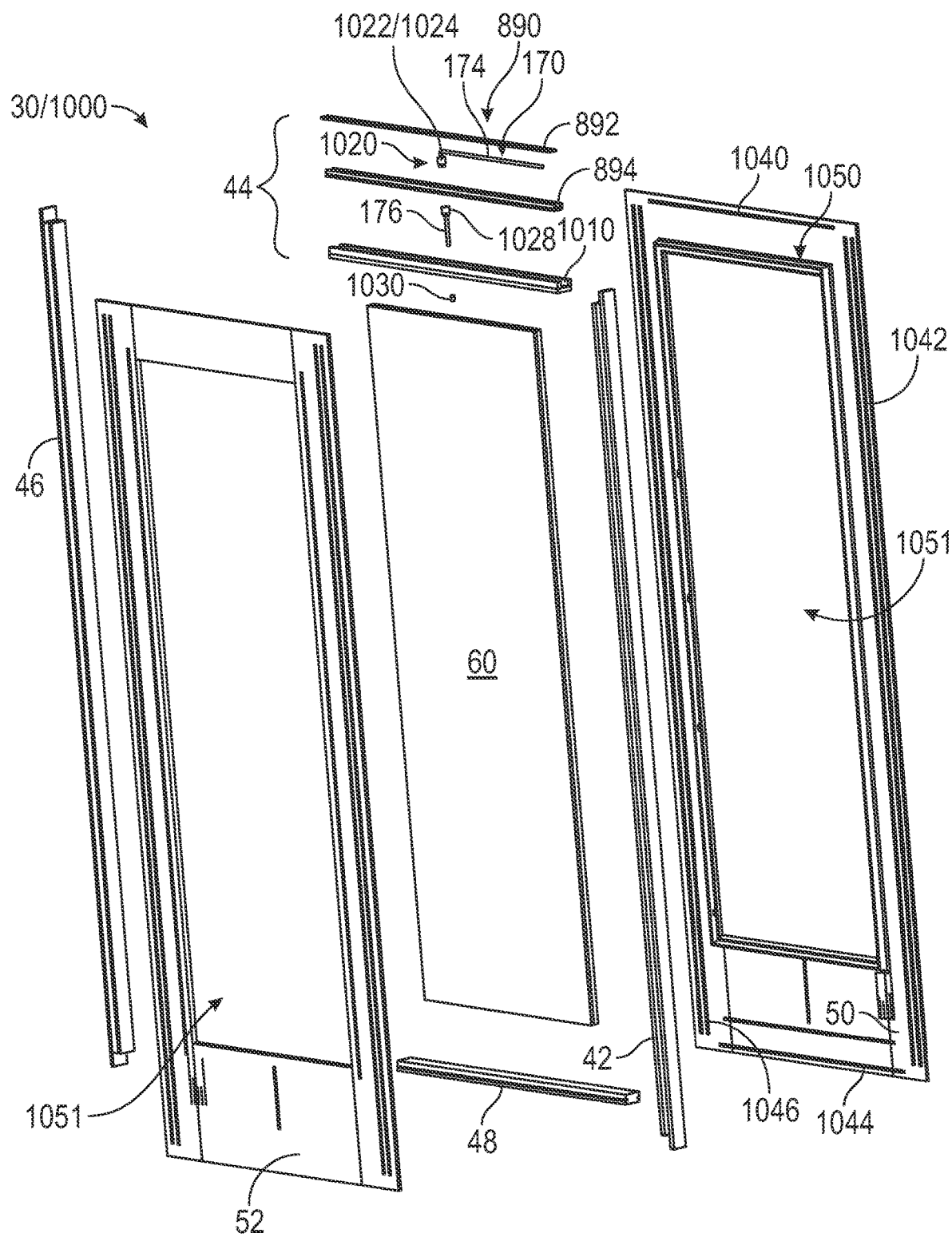
FIG. 82 is an exploded view of a door assembly of the door of FIG. 64, according to an exemplary embodiment.
Figure 85:
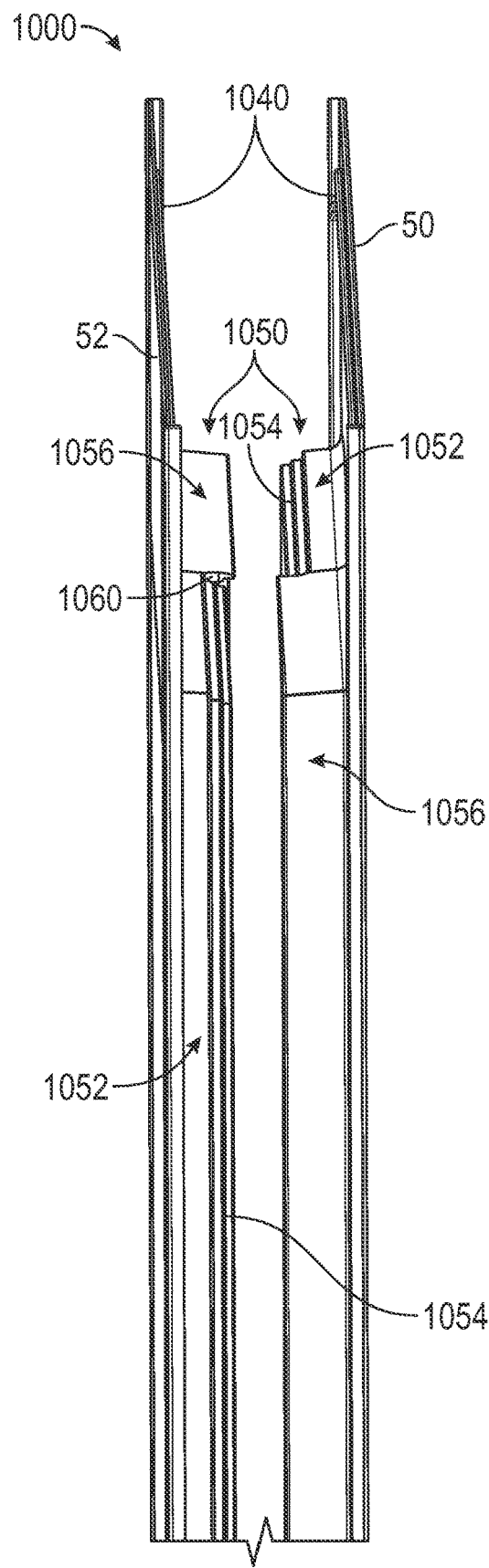
FIGS. 85-88 are various detailed views of door skins of the door assembly of FIG. 82, according to an exemplary embodiment.
Figure 86:
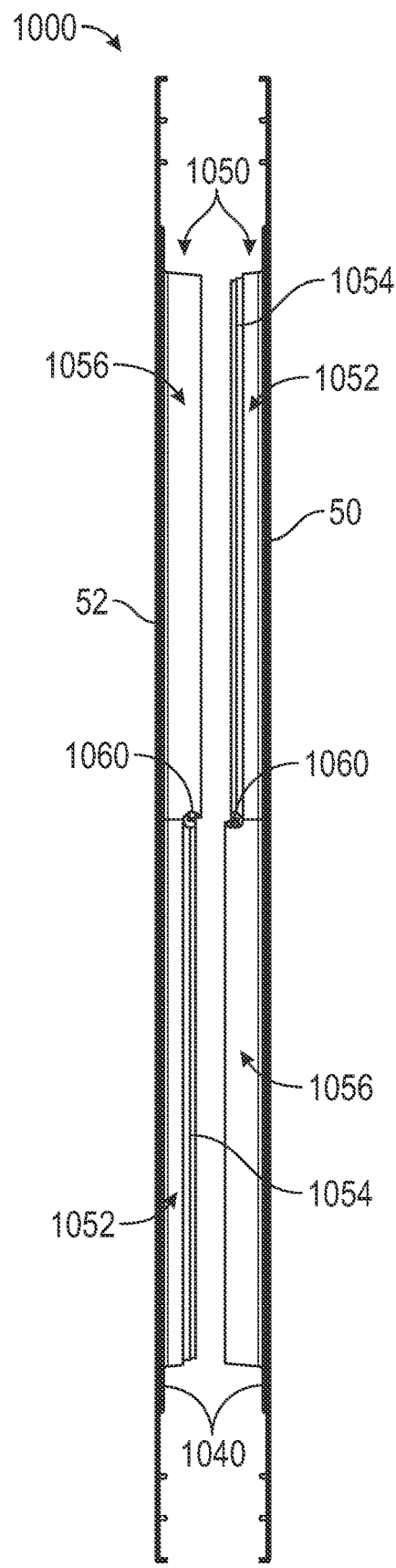
Figures 87, 88:
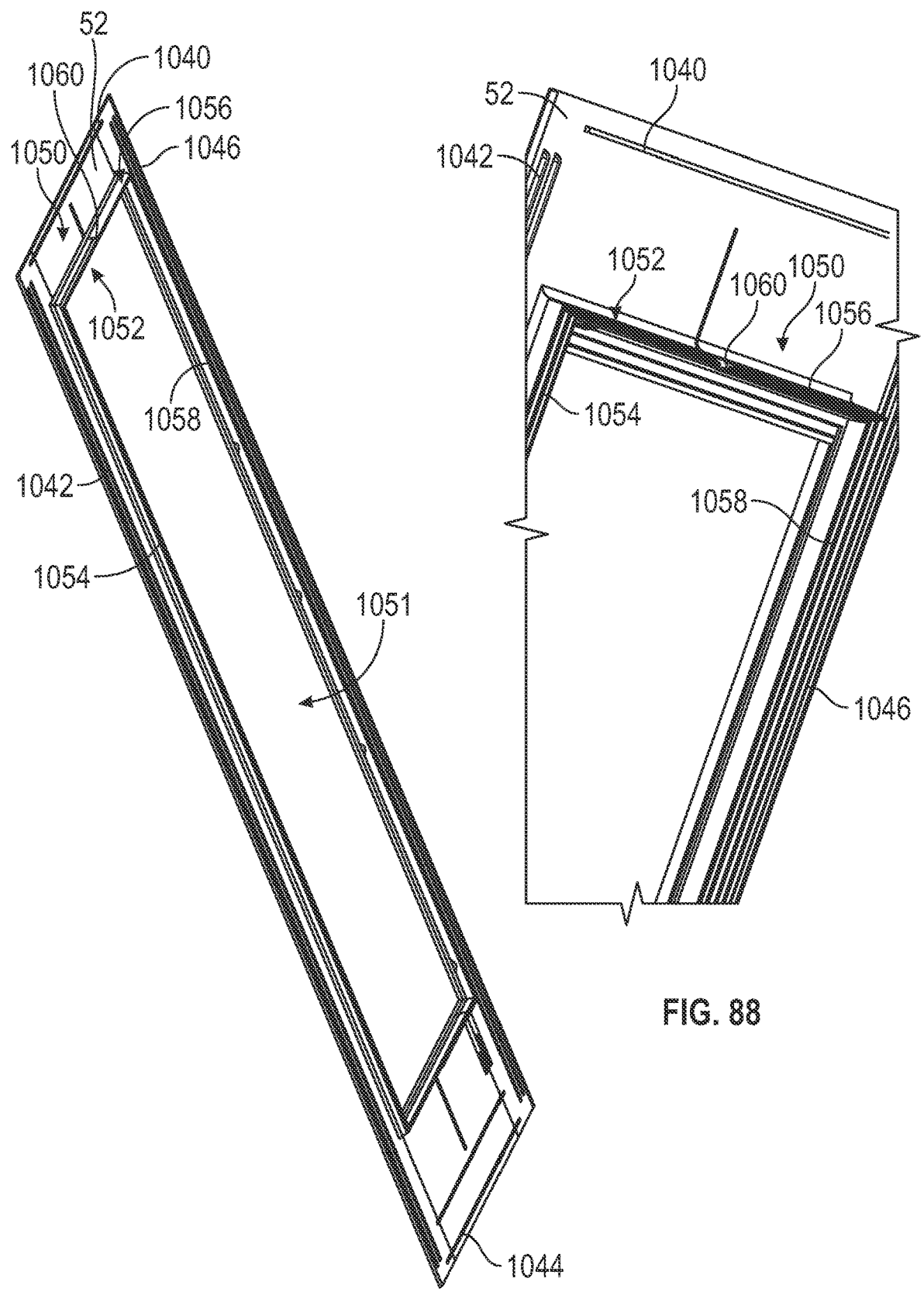

As shown in FIGS. 82 and 90, the top rail 44 includes (a) the raceway 890 including the cover 892 and the body 894 and (b) a support, shown as top rail support 1010. While shown herein as including the raceway 890, in other embodiments, the top rail 44 alternatively includes the cover 850, the cover 880, or the tubular cover 920. Further, any description of the top rail 44 disclosed herein may similarly apply to the hinge stile 42 and the lock stile 46. As shown in FIGS. 83 and 90, the top rail support 1010 has an elongated base, shown as support base 1012, with protrusions, shown as side supports 1014, extending along and upward from opposing lateral edges of the support base 1012. The support base 1012 and the side supports 1014 cooperatively define a pair of recesses, shown as slots 1016, along each lateral side thereof. The top rail support 1010 defines a cavity, shown as raceway cavity 1018, positioned between the top rail support 1010 and the side supports 1014. The support base 1012 defines an aperture, shown as window wiring aperture 1019.

As shown in FIGS. 82, 84, and 90, the window connector 1020 includes a first component, shows as connector base 1022, a second component, shown as upper quick connect 1024, and a third component, shown as lower quick connect 1026. As shown in FIG. 90, the upper quick connect 1024 is configured to couple to the upper window wiring 174, the lower quick connect 1026 is configured to couple to the lower window wiring 176, and the connector base 1022 is configured to receive the upper quick connect 1024 and the lower quick connect 1026 such that the upper quick connect 1024 and the lower quick connect 1026 releasably engage and electrically couple the upper window wiring 174 and the lower window wiring 176 together and, thereby, electrically couple the window 60 to the door wiring harness 170.

As shown in FIGS. 85-88, the inner facing side or surface of each of the exterior skin 50 and the interior skin 52 defines (a) one or more first protrusions, shown as top rail guide 1040, extending therefrom laterally along and proximate the upper or top end thereof, (b) one or more second protrusions, shown as hinge stile guide 1042, extending therefrom vertically along and proximate the hinge end/side thereof, (c) one or more third protrusions, shown as bottom rail guide 1044, extending therefrom laterally along and proximate the lower or bottom end thereof, (d) one or more fourth protrusions, shown as lock stile guide 1048, extending therefrom vertically along and proximate the lock end/side thereof, and (e) central framing, shown as window framing 1050, extending therefrom and defining an aperture therein, shown as window aperture 1051.

As shown in FIG. 90, (a) the top rail 44 is disposed between the exterior skin 50 and the interior skin 52 where the slots 1016 of the top rail support 1010 engage with the top rail guides 1040 to secure the top rail 44 in position vertically between the exterior skin 50 and the interior skin 52 and (b) the raceway 890 is received within the raceway cavity 1018 of the top rail support 1010. As shown in FIG. 91, the bottom rail 48 is disposed between the exterior skin 50 and the interior skin 52 where a pair of recesses, shown as slots 49, thereof engage with the bottom rail guides 1044 to secure the bottom rail 48 in position vertically between the exterior skin 50 and the interior skin 52. While not shown, the hinge stile 46 and the lock stile 48 may define slots similar to the slots 1016 and the slots 49, and similarly engage with the hinge stile guides 1046 and the lock stile guides 1048, respectively, to secure the hinge stile 46 and the lock stile 48 in position horizontally between the exterior skin 50 and the interior skin 52.

As shown in FIGS. 85-88, the window framing 1050 of each of the exterior skin 50 and the interior skin 52 includes a first portion, shown as inward tapering framing 1052, extending along a first portion (e.g., a first half, a left half, a right half, a lower half, an upper half, etc.) of the window aperture 1051 and a second portion, shown as outward tapering framing 1056, extending along a second portion (e.g., a second half, a right half, a left half, an upper half, a lower half, etc.) of the window aperture 1051. More specifically, (a) the inward tapering framing 1052 has a substantially flat interior surface and a tapered exterior surface having a first profile, shown as exterior stepped profile 1054, and (b) the outward tapering framing 1056 has a substantially flat exterior surface and a tapered interior surface having a second profile, shown as interior stepped profile 1058. As shown in FIGS. 90 and 91, the window framing 1050 of the exterior skin 50 and the interior skin 52 engage with each other to secure the window 60 therebetween such that the window 60 extends across the window apertures 1051 thereof. According to an exemplary embodiment, (a) the exterior stepped profile 1054 of the inward tapering framing 1052 of the exterior skin 50 is configured to engage with the interior stepped profile 1058 of the outward tapering framing 1056 of the interior skin 52 and (b) the exterior stepped profile 1054 of the inward tapering framing 1052 of the interior skin 52 is configured to engage with the interior stepped profile 1058 of the outward tapering framing 1056 of the exterior skin 50 to provide a secure fit and engagement between the window framing 1050 of the exterior skin 50 and the interior skin 52.

As shown in FIGS. 85-88 and 90, the upper portions of the window framing 1050 of the exterior skin 50 and the interior skin 52 cooperatively define an aperture (i.e., each at least partially defines a portion of the aperture), shown as window wiring aperture 1060, that receives the wire grommet 1030. As shown in FIG. 90, the body 894 of the raceway 890 defines an aperture, shown as window wiring aperture 918. As shown in FIGS. 89 and 90, the door assembly 1000 defines (a) a first chamber, cavity, or passageway, shown as upper insulation chamber 1062, between the top rail support 1010 of the top rail 44, the window framing 1050 of the exterior skin 50 and the interior skin 52, and the inner facing sides or surfaces of the exterior skin 50 and the interior skin 52 and (b) a second chamber, cavity, or passageway, shown as lower insulation chamber 1064, between the bottom rail 48, the window framing 1050 of the exterior skin 50 and the interior skin 52, and the inner facing sides or surfaces of the exterior skin 50 and the interior skin 52. Similar chambers or passages (e.g., a hinge stile insulation chamber, a lock stile insulation chamber, etc.) may be defined between the hinge stile 42, the lock stile 46, the window framing 1050 of the exterior skin 50 and the interior skin 52, and the inner facing sides or surfaces of the exterior skin 50 and the interior skin 52.

According to an exemplary embodiment, the arrangement/configuration of the top rail 44 (e.g., the raceway 890, the top rail support 1010, etc.), the exterior skin 50 and the interior skin 52 (e.g., the window framing 1050 thereof, etc.), and the door wiring harness 170 facilitates electrically connecting the window 60 to the door wiring harness 170 and, therefore, the power transfer assembly 106, with relative ease during manufacture, during assembly, and/or during on-site installation. As shown in FIG. 90, the upper window wiring 174 extends (a) through the wire volume 896 of the raceway 890 and (b) through the window wiring aperture 918 of the body 894 of the raceway 890 where the upper window wiring 174 terminates with the upper quick connect 1024 of the window connector 1020. The window connector 1020 is at least partially received by and extends through the window wiring aperture 1019 of the support base 1012 of the top rail support 1010. In some embodiments, the connector base 1022 is received by and secured within the window wiring aperture 1019 of the support base 1012. As shown in FIG. 90, the lower window wiring 176 extends (a) from the lower quick connect 1026 of the window connector 1020, (b) through the upper insulation chamber 1062, (c) through the wire grommet 1030 and the window wiring aperture 1060 of the window framing 1050, and (d) to the window 60 to electrically connect the window 60 to the door wiring harness 170.

As shown in FIGS. 90 and 91, the door assembly 1000 includes an insulating material (e.g., foam, injection foam, etc.), shown as insulation 1070, disposed within the upper insulation chamber 1062 and the lower insulation chamber 1064. According to an exemplary embodiment, the connector base 1022 and the lower quick connect 1026 substantially seal the window wiring aperture 1019 of the support base 1012 and the wire grommet 1030 and the lower window wiring 176 substantially seal the window wiring aperture 1060 of the window framing 1050 such that, when assembled, the interior chambers or passages (e.g., the upper insulation chamber 1062, the lower insulation chamber 1064, the hinge stile insulation chamber, the lock stile insulation chamber, etc.) of the door assembly 1000 may be foam filled with a flowable and/or expandable insulation or foam.

Door System with Access Panel and Lights with Integrated Control Circuitry

Figure 92:
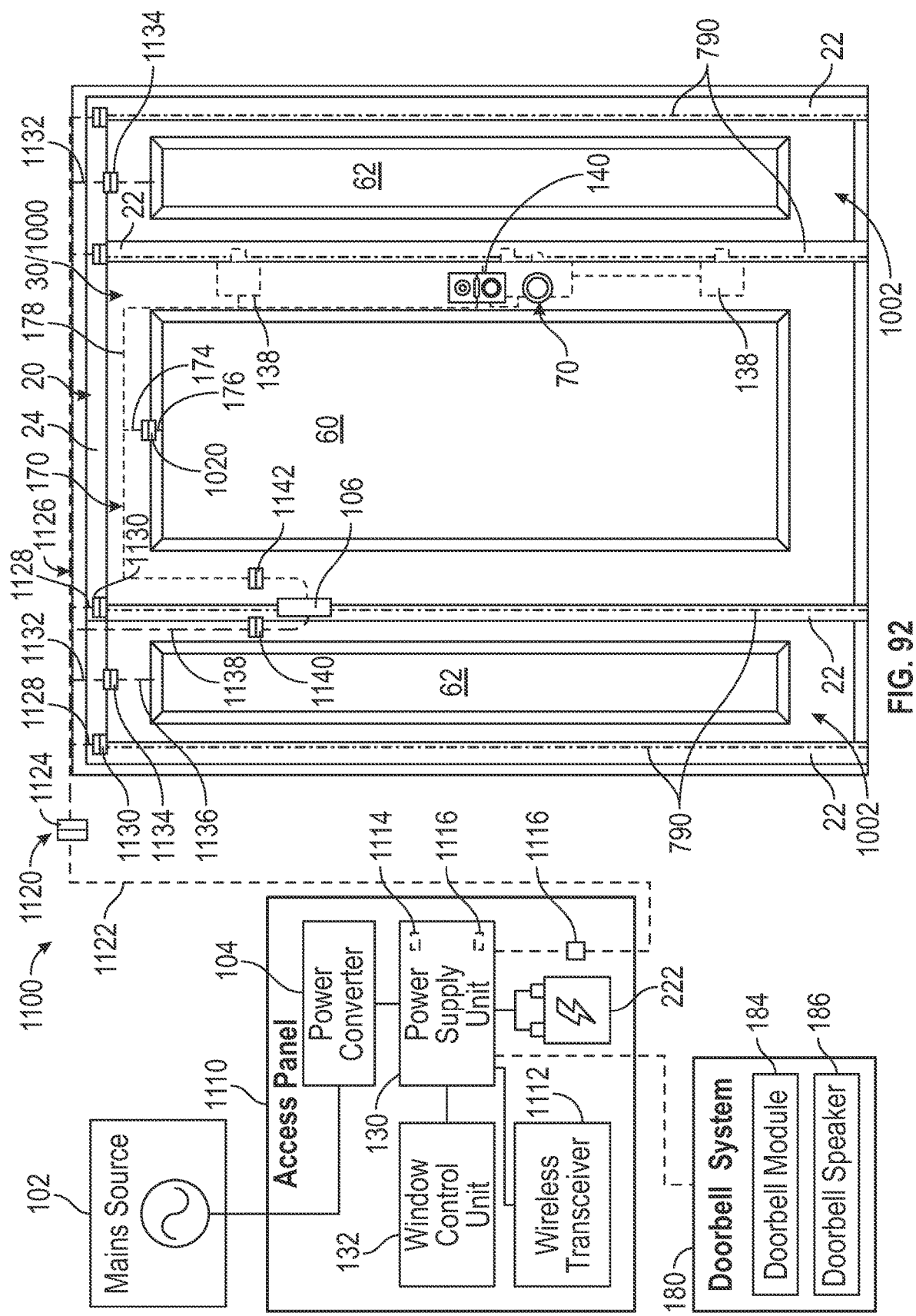
FIG. 92 is a front view showing an exterior side of a door system, according to another exemplary embodiment.

Referring to FIGS. 92-99, a door system 1100 is shown as another embodiment to the door system 10. The door system 1100 may be substantially similar to the door system 10, except as otherwise specified herein. Accordingly, any description of the door system 10 may apply to the door system 1100. As shown in FIG. 92, the door system 1100 includes the door frame 20, the door 30/the door assembly 1000, the power source 102, the doorbell system 180, the jamb lights 790, a pair of side panels, shown as panels 1002, an external panel, shown as access panel 1110, and a second power distribution system or bus, shown as wiring harness 1120.

As shown in FIG. 92, the panels 1002 are disposed along the right side and the left side of the door 30. In other embodiments, the door system 1100 includes only one of the panels 1002 along the right side of the door 30 or the left side of the door 30. In still other embodiments, the door system 1100 does not include the panels 1002. As shown in FIG. 92, each of the panels 1002 includes a pane of transparent material (e.g., glass, polycarbonate, etc.) or privacy window, shown as panel window 62, embedded within the panels 1002. In some embodiments, the panel windows 62 are operable (e.g., electrically) to vary a visibility level through the panel windows 62. By way of example, the panel windows 62 may be made from and/or coated with an electrochromic material that changes opacity in response to an applied voltage. In some embodiments, the visibility level of the panel windows 62 is varied in response to a user input, permitting the user to control the visibility level of the panel windows 62. Additionally or alternatively, the panel windows 62 include privacy elements embedded therein or integrated therewith. In some embodiments, the privacy elements are or include electrically-controllable shades/blinds disposed within the panel windows 62 or disposed along an interior side of the panel windows 62. In some embodiments, the window 60 and/or the panel windows 62 are transparent displays. Such transparent displays can be controlled to provide messages, pictures, videos, etc. thereon and provide similar privacy functionality as described elsewhere herein (e.g., transition from a transparent to an opaque state).

As shown in FIG. 92, the access panel 1110 includes a housing, electric box, etc. that receives the power converter 104 (which is coupled to the power source 102), the power supply unit 130 (e.g., power management unit, power management controller, main door controller, etc.), the window control unit 132, the backup battery 222, a wireless communications device, shown as wireless transceiver 1112, a reset interface, shown as hard reset interface 1114, and one or more switches, shown as electronic hardware disconnect switches 1116. The power supply unit 130 is coupled to the power converter 104, the window control unit 132, the doorbell system 180, the backup battery 222, the wireless transceiver 1112, the hard reset interface 1114, and the electronic hardware disconnect switches 1116.

As shown in FIG. 92, the wiring harness 1120 includes (a) a first portion, shown as access panel wiring harness 1122, extending from power supply unit 130 of the access panel 1110 to an electrical connector, shown as frame connector 1124, and (b) a second portion, shown as frame wiring harness 1126, extending from the frame connector 1124 into and through the door frame 20 (e.g., the head jamb 24, the side jambs 22, etc.) of the door system 1100, thereby electrically coupling the access panel 1110 to the door frame 20. The frame connector 1124 may include a quick connect coupled to each of the access panel wiring harness 1122 and the frame wiring harness 1126 to facilitate easily connecting the two together during installation of the door system 1100. According to an exemplary embodiment, the access panel wiring harness 1122 is configured to facilitate positioning the access panel 1110 external from and remote from the door frame 20 and the door 30 (e.g., up to 100 feet away, in a different room of a residence or building such as a garage or a basement or an attic, etc.). According to an exemplary embodiment, the access panel wiring harness 1122 and the frame wiring harness 1126 are configured to facilitate providing power and data communication (e.g., serial communication) from the access panel 1110 to the door frame 20 and, ultimately, the door 30.

The wireless transceiver 1112 may be configured to communicate via one or more short-range and/or long-range wireless communications protocols including, but not limited to, Wi-Fi, Bluetooth, NFC, cellular, and the like. In some embodiments, the wireless transceiver 1112 is configured to facilitate wireless communication between (a) the door 30 and the access panel 1110 (e.g., the power supply unit 130) and (b) external devices. By way of example, the external devices may include a wireless router within the building communicating over a building Wi-Fi network. By way of another example, the external devices may include a user device 190 communicating via a short-range communications protocol (e.g., Bluetooth, NFC, etc.) and/or a long-range communications protocol (e.g., cellular). In some embodiments, at least a portion of the data communication between the access panel 1110 (e.g., the power supply unit 13, the wireless transceiver 1112, etc.) and the door 30 (e.g., the interactive unit 140, the deadbolt units 138, the window 60, the panel windows 62, the handle assembly 70, etc.) is performed wirelessly, rather than through hard-wired data communication.

As shown in FIG. 92, the frame wiring harness 1126 includes first portions, shown as jamb light wiring 1128, second portions, shown as upper panel window wiring 1132, and a third portion, shown as power transfer assembly wiring 1138. The jamb light wiring 1128 is coupled to the jamb lights 790 via electrical connectors (e.g., pluggable connections, quick connectors, etc.), shown as jamb light connectors 1130. The upper panel window wiring 1132 is coupled to lower panel window wiring 1136 of the panels 1002 and, thereby, the panel windows 62, via electrical connectors (e.g., pluggable connections, quick connectors, etc.), shown as panel window connectors 1134. The power transfer assembly wiring 1138 is coupled to the power transfer assembly 106 via an electrical connector (e.g., a pluggable connection, a quick connector, etc.), shown as power transfer assembly connector 1140. In some embodiments (e.g., embodiments where the camera 520 is separate from the interactive unit 140 and disposed along the door frame 20), the frame wiring harness 1126 includes camera wiring extending through the door frame 20 to the camera 520. An electrical quick connector may be disposed between the camera 520 and the camera wiring.

As shown in FIG. 92, the door wiring harness 170 is coupled to the power transfer assembly 106 via an electrical connector (e.g., a pluggable connection, a quick connector, etc.), shown as power transfer assembly connector 1142. The door wiring harness 170 is coupled to (a) the window 60 via the upper window wiring 174, the window connector 1020, and the lower window wiring 176 (as described above) and (b) the various door components including the interactive unit 140, the handle assembly 70, and/or the deadbolt units 138 via third portions, shown as door component wiring 178. In some embodiments, the door component wiring 178 only provides power to the interactive unit 140, and not data. In such embodiments, the interactive unit 140 may perform data communications wirelessly with the power supply unit 130 of the access panel 1110 (e.g., directly, through the wireless transceiver 1112, etc.). In some embodiments, the window 60 and the panel windows 62 operate at a higher voltage than the other electrically-operated components of the door system 1100 (e.g., the jamb lights 790. In such embodiments, (a) the jamb light wiring 1128 and the door component wiring 178 provide electricity to the jamb lights 790 and the door components (e.g., the interactive unit 140, the handle assembly 70, and/or the deadbolt units 138), respectively, at a first, lower voltage (e.g., 5V, 12V, etc.), (b) the upper panel window wiring 1132 and the upper window wiring 174 provide electricity to the panel windows 62 and the window 60, respectively, at a second, higher voltage (e.g., 24V, 50V, etc.), and (c) the power transfer assembly wiring 1138 provides electricity to the power transfer assembly 106 at both the first, lower voltage and the second, higher voltage.

The doorbell system 180 may be configured to supplement or replace the doorbell functionality provided by the interactive unit 140. By way of example, when the doorbell button 572 of the interactive unit 140 is pressed, the interactive unit 140 may (a) activate the internal speaker 566 thereof to provide a doorbell chime function, (b) send a signal to the doorbell module 184 to activate the doorbell speaker 186, and/or (c) send a notification to a user device 190. The signal provided to the doorbell module 184 may be either (a) sent using wireless communication from the interactive unit 140 directly to the doorbell module 184, (b) sent using wireless communication from the interactive unit 140 to the power supply unit 130 and then sent using wireless communication from the power supply unit 130 to the doorbell module 184, (c) sent using wireless communication from the interactive unit 140 to the power supply unit 130 and then sent using wired communication from the power supply unit 130 to the doorbell module 184, (d) sent using wired communication from the interactive unit 140 to the power supply unit 130 and then sent using wireless communication from the power supply unit 130 to the doorbell module 184, or (e) sent using wired communication from the interactive unit 140 to the power supply unit 130 and then sent using wired communication from the power supply unit 130 to the doorbell module 184.

According to an exemplary embodiment, the hard reset interface 1114 and the electronic hardware disconnect switches 1116 facilitate initiating a hard reset process for one or more electronic hardware components coupled to or integrated into the door 30, the door frame 20, and/or the access panel 1110 (e.g., the power supply unit 130, the window control unit 132, the interactive unit 140, an electronic lock of the handle assembly 70, the deadbolt units 138, the camera 520, the window 60, the jamb lights 790, the video doorbell 1118, etc.). The hard reset interface 1114 may include one or more buttons disposed within the access panel 1110 and coupled to the power supply unit 130. In one embodiment, the hard reset interface 1114 includes a master reset button that facilitates resetting all of the connected electronic hardware components. In some embodiments, the hard reset interface 1114 includes a reset button associated with individual electronic hardware components or sets of electronic hardware components and, therefore, may include more than one reset button. Each of the electronic hardware disconnect switches 1116 may be positioned and configured to disconnect one or more of the electronic hardware components from power (e.g., the backup battery 222, the power source 102, etc.) to initiate a hard reset of the associated electronic hardware components connected thereto. In some embodiments, all of the electronic hardware components of the door 30 and the door frame 20 are connected to a single electronic hardware disconnect switch 1116. In some embodiments, individual electronic hardware components or sets of electronic hardware components of the door 30 and the door frame 20 are connected to respective electronic hardware disconnect switches 1116 (e.g., the door components are connected to a first switch, the door frame components are connected to a second switch, etc.). In some embodiments, the power supply unit 130 has one of the electronic hardware disconnect switches 1116 integrated therewith or coupled thereto to facilitate disconnecting the power supply unit 130 from power.

A user can engage with the hard reset process by applying a momentary (e.g., less than one second, less than two seconds, etc.) button press to the hard reset interface 1114. Then, the power supply unit 130 may be configured to send a disconnect signal to one or more of the electronic hardware disconnect switches 1116 associated with the reset button pressed by the user. In response to the disconnect signal, the one or more electronic hardware disconnect switches 1116 are configured to open (i.e., stop power flow therethrough). According to an exemplary embodiment, the electronic hardware disconnect switches 1116 include a time delay relay circuit that is configured to maintain the electronic hardware disconnect switches 1116 in the open state for a certain period of time (e.g., ten second, fifteen seconds, twenty seconds, thirty seconds, etc.) and then automatically close once the certain period of time has elapsed to reinstate power to the electronic hardware components. Accordingly, the user can perform a hard reset on one or more electronic hardware components of the door system 1100 with a simple button press (e.g., rather than having to manually unplug components for a period of time and then plugging them back in, rather than having to disconnect the entire door system 1100 from the power source 102, etc.).

Figure 93:
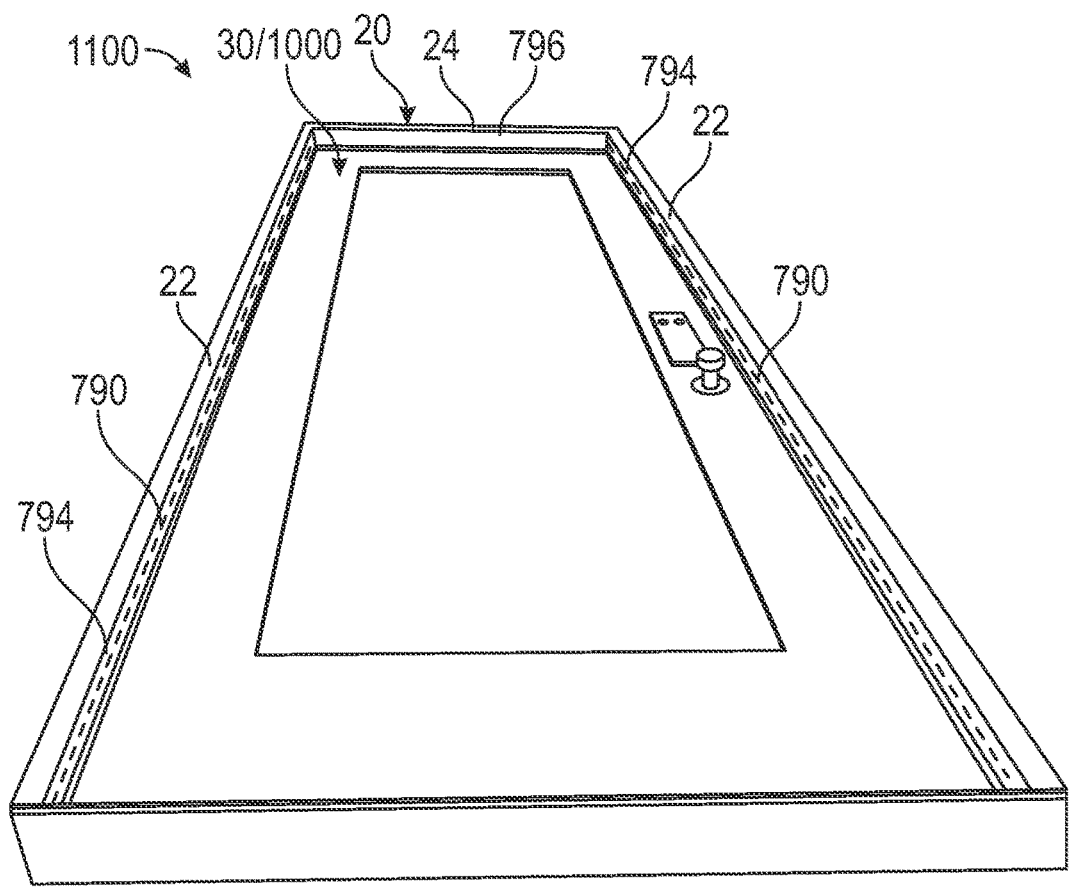
FIGS. 93 and 94 are various views of a door of the door system of FIG. 92, according to an exemplary embodiment.
Figure 94:
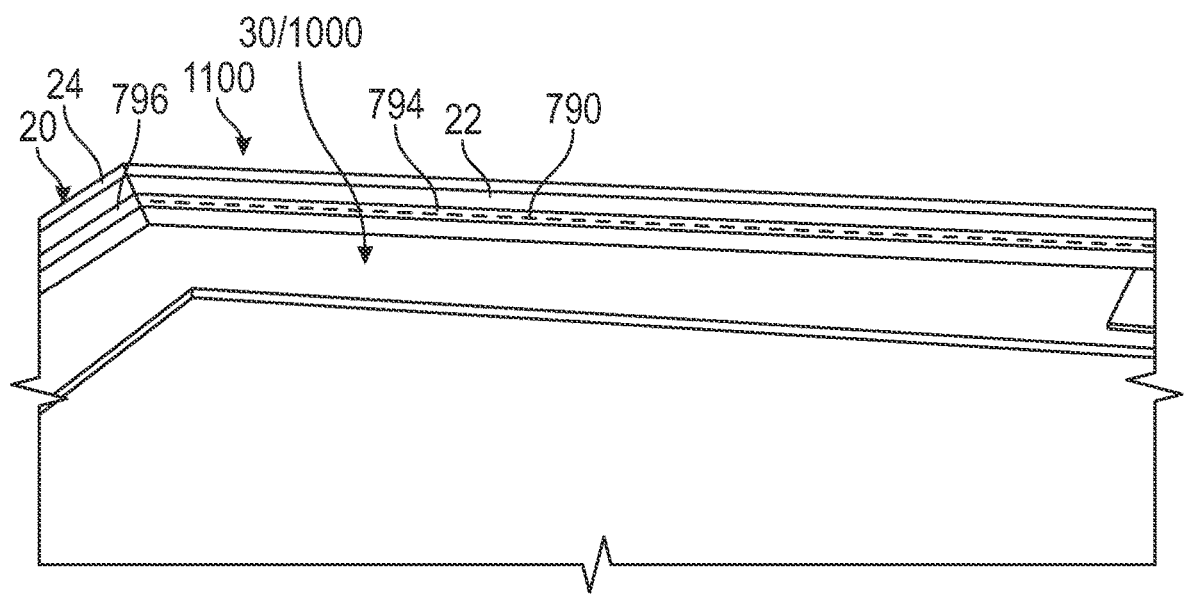

As shown in FIGS. 93 and 94, the jamb lights 790 are disposed within and along a longitudinal channel defined by and extending along substantially an entire longitudinal length the side jambs 22. The door assembly 1000 includes first jamb covers, shown as side jamb light covers 794, positioned to enclose the channels and the jamb lights 790 of the side jambs 22. The side jamb light covers 794 may be at least partially transparent such that light emitted by the jamb lights 790 shine therethough. In some embodiments, the side jamb light covers 794 are partially frosted to obscure or hide the jamb lights 790 from being visible (e.g., when off). As shown in FIGS. 93 and 94, the door assembly 1000 includes a second jamb cover, shown as head jamb cover 796, positioned to enclose a channel defined in the head jamb 24. In some embodiments, the head jamb 24 does not include the jamb lights 790. Rather, the head jamb cover 796 is included in the door assembly 1000 to provide a seamless appearance along the door frame 20 when the jamb lights 790 are off. In some embodiments, the head jamb 24 includes the jamb lights 790.

Figure 95:
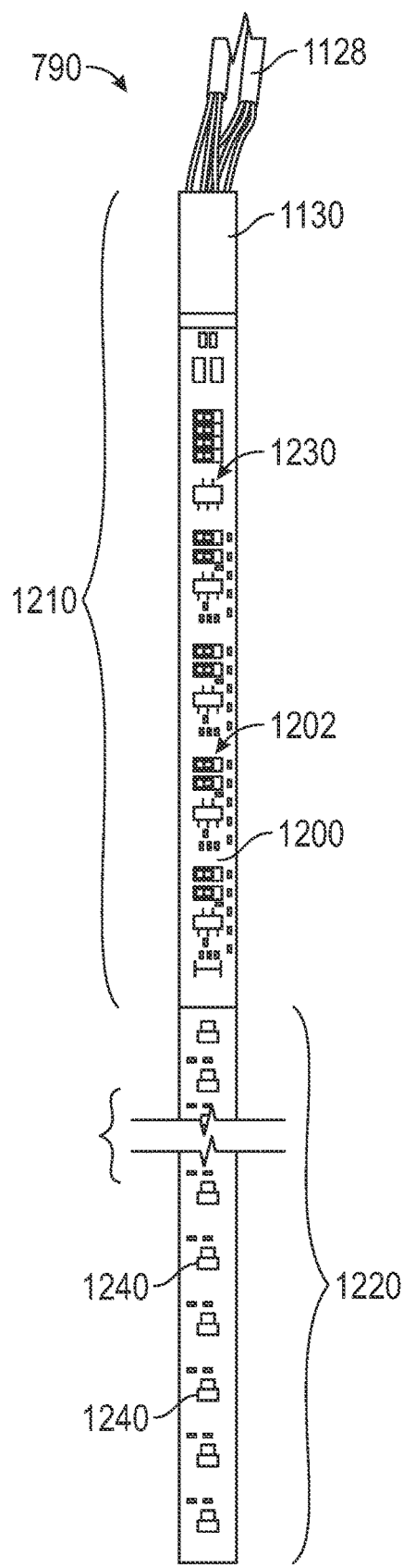
FIG. 95 is a detailed view of a light strip of the door system of FIG. 92, according to an exemplary embodiment.
Figure 96:
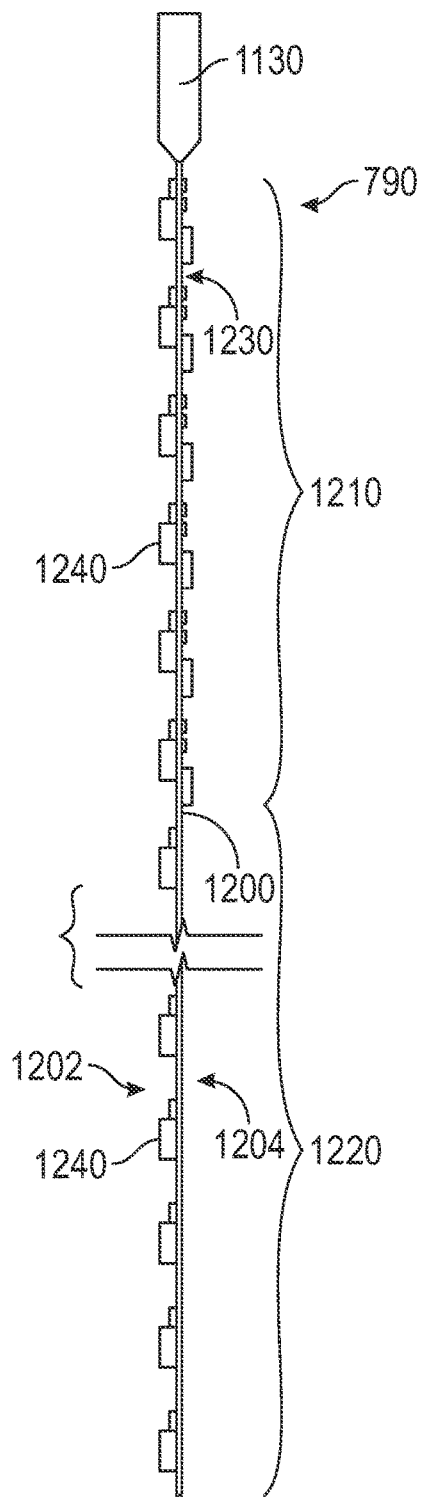
FIG. 96 is a detailed view of a light strip of the door system of FIG. 92, according to another exemplary embodiment.
Figure 98:
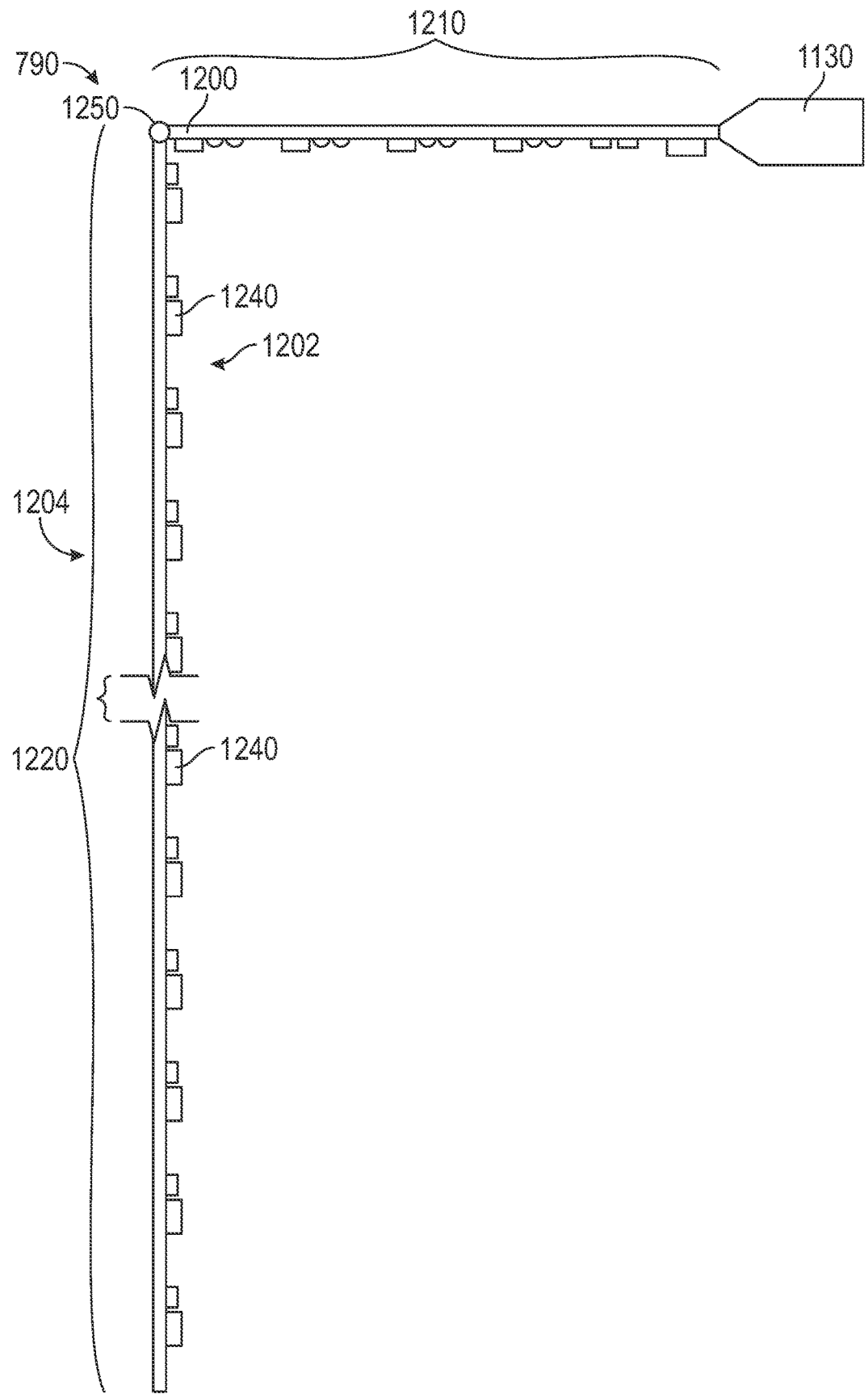
FIG. 98 is a detailed view of a light strip of the door system of FIG. 97, according to an exemplary embodiment.

As shown in FIGS. 95, 96, and 98, the jamb lights 790 include a base or substrate, shown as light strip 1200, having a first side, shown as side 1202, and an opposing second side, shown as side 1204, with a respective jamb light connector 1130 disposed at an end thereof to facilitate electrically coupling the light strip 1200 to the jamb light wiring 1128. According to an exemplary embodiment, the light strip 1200 is a flexible printed circuit board. In some embodiments, the flexible printed circuit board includes a stiff or rigid backer element (e.g., polyethylene terephthalate ("PET"), a plastic material, etc.). As shown in FIGS. 95, 96, and 98, the light strip 1200 has a first or upper portion, shown as control circuitry portion 1210, and a second or lower portion, shown as light portion 1220.

As shown in FIG. 95, (a) the control circuitry portion 1210 of the light strip 1200 includes control circuitry (e.g., resistors, transistors, switches, capacitors, diodes, integrated circuits, fuses, etc.), shown as light control circuitry 1230, disposed and spaced along the side 1202 thereof and (b) the light portion 1220 includes a plurality of light elements, shown as lights 1240, disposed and spaced along the side 1202 thereof. Because the control circuitry portion 1210 does not include any of the lights 1240, the control circuitry portion 1210 of the light strip 1200 will be dark when the lights 1240 of the light strip 1200 are on or activated. Accordingly, to prevent a dark spot from being visible through the side jamb light covers 794, the control circuitry portion 1210 may be inserted and retained within the head jamb 24 (e.g., about 4 to 8 inches, 6 inches, etc.) until the dark spot is no longer visible. Then, to maintain the light strip 1200, a user would need to pull thereon until the jamb light connector 1130 becomes accessible to disconnect the light strip 1200 from the frame wiring harness 1126.

As shown in FIG. 95, (a) the control circuitry portion 1210 of the light strip 1200 includes the light control circuitry 1230 disposed and spaced along the side 1204 thereof and the lights 1240 disposed and spaced along the side 1202 thereof and (b) the light portion 1220 includes the lights 1240 disposed and spaced along the side 1202 thereof. Accordingly, with the lights 1240 disposed along both the control circuitry portion 1210 and the light portion 1220, the dark spot provided by the light strip 1200 of FIG. 95 is substantially eliminated. Accordingly, the control circuitry portion 1210 may only need to be minimally inserted and retained within the head jamb 24 (e.g., about 1 to 2 inches).

Figure 97:
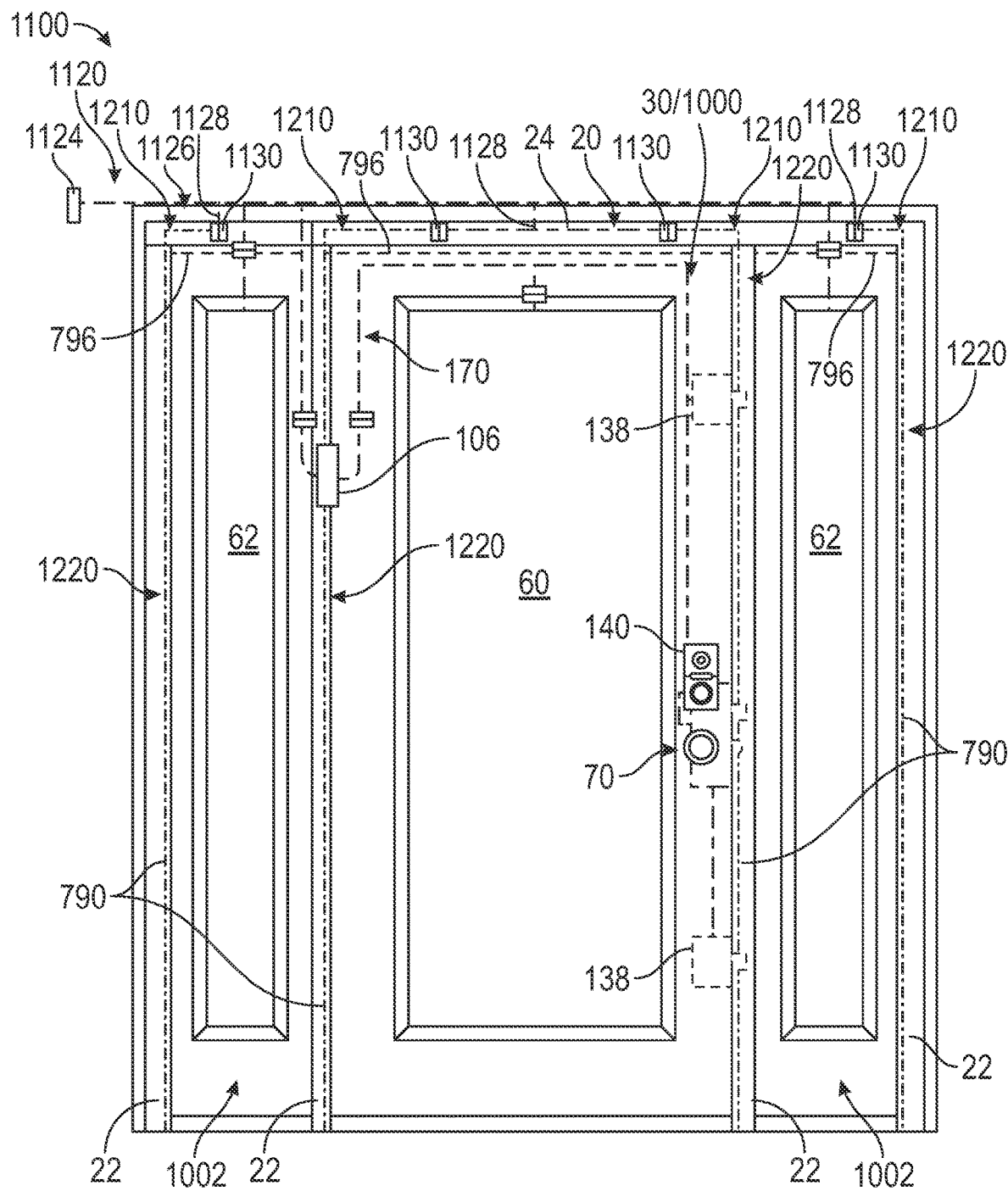
FIG. 97 is a front view showing the exterior side of the door system of FIG. 92, according to another exemplary embodiment.

As shown in FIGS. 97 and 98, the control circuitry portion 1210 is bent at an angle (e.g., 90 degrees) relative to the light portion 1220 at a flexion point, shown as hinge point 1250. While shown with the light control circuitry 1230 disposed along the side 1202 of the light strip 1200 (similar to the light strip 1200 shown in FIG. 95), in some embodiments, the light control circuitry 1230 is disposed along the side 1204 of the light strip 1200. In such embodiments, the light strip 1200 may include the lights 1240 disposed along the side 1202 of the control circuitry portion 1210 (similar to the light strip 1200 shown in FIG. 96). As shown in FIG. 97, the control circuitry portion 1210 extends along the head jamb 24 such that the jamb light connector 1130 is readily accessible through the head jamb cover 796 for easy installation, maintenance, and replacement.

Figure 99:
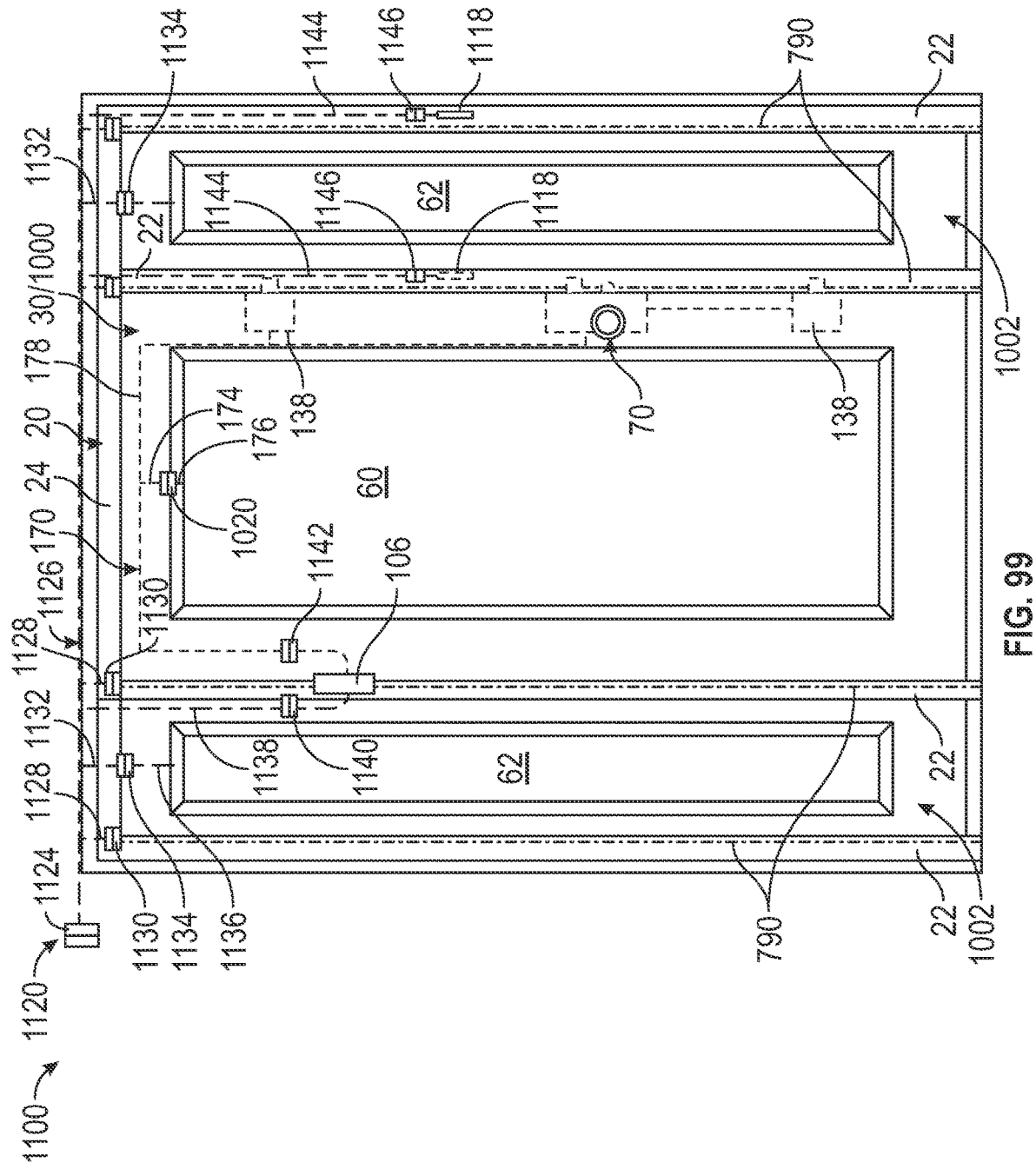
FIG. 99 is a front view showing the exterior side of the door system of FIG. 92, according to another exemplary embodiment.

As shown in FIG. 99, the door assembly 1000 does not include at least the exterior portion of the interactive unit 140. Rather, the exterior portion of the interactive unit 140 is replaced with a second user interface, a second operator interface, a second interface module, or a second interactive unit, shown as video doorbell 1118. The video doorbell 1118 may include be a smart doorbell device having a doorbell button, an integrated camera, a speaker, a microphone, and various sensors (e.g., a light sensor, a motion sensor, a temperature sensor, radar sensor, UWB sensors, etc.). As shown in FIG. 99, in embodiments that include the panels 1002, the video doorbell 1118 can be installed along the side jamb 22 of one of the panels 1002. In embodiments that do not include the panels 1002, the video doorbell 1118 can be installed along the side jamb 22 of the door frame 20. Alternatively, the video doorbell 1118 may be mounted to the door 30 similar to the interactive unit 140. As shown in FIG. 99, the frame wiring harness 1126 includes a fourth portion, shown as video doorbell wiring 1144. The video doorbell wiring 1144 is coupled to the video doorbell 1118 via an electrical connector (e.g., pluggable connections, quick connectors, etc.), shown as video doorbell connector 1146. The video doorbell 1118 may be configured to communicate with the doorbell system 180 similar to the interactive unit 140 described herein.

Manufacture/Assembly/Install Process

According to an exemplary embodiment, the door systems, components, and assemblies disclosed herein (e.g., the door system 10, the door 30, the door assembly 1000, the door system 1100, etc.) are manufactured, assembled, and installed into a building to provide "smart door" functionalities in a seamless manner. The processes by which the door systems, components, and assemblies are manufactured, assembled, and installed are described in greater detail herein.

As step A1, a plurality of components of a door system (e.g., the door system 10, the door system 1100) are manufactured and/or acquired. By way of example, the plurality of components may include the door frame 20 (i.e., the side jambs 22, the head jamb 24, and the sill 26), the hinges 32, the subframe 40 (i.e., the hinge stile 42, the top rail 44, the lock stile 46, and the bottom rail 48), the exterior skin 50, the interior skin 52, the window 60, the handle assembly 70, the power converter 104, the power transfer assembly 106, the power supply unit 130, the window control unit 132, the deadbolt unit(s) 138, the interactive unit 140, the door wiring harness 170, the doorbell system 180, the backup battery 222, the jamb lights 790, the side jamb light covers 794 and/or the head jamb cover 796, the raceway 890, the access panel 1110, the wireless transceiver 1112, the hard reset interface 1114, the electronic hardware disconnect switches 1116, the video doorbell 1118, the access panel wiring harness 1122, and/or the frame wiring harness 1126.

Now, the assembly of the door 30 (e.g., the door assembly 1000) will be described. As step B1, the exterior skin 50 and the interior skin 52 undergo further processing. More specifically, the window wiring aperture 1060 is machined into the window framing 1050. As step B2, the window 60, the wire grommet 1030, and the lower window wiring 176 of the door wiring harness 170 are installed between the exterior skin 50 and the interior skin 52 such that the window 60 is disposed within the window aperture 1051, the wire grommet 1030 is received by the window wiring aperture 1060, and the lower window wiring 176 extends through the wire grommet 1030. As step B3, the subframe 40 is installed between the exterior skin 50 and the interior skin 52, along the periphery thereof. As step B4, the exterior skin 50, the interior skin 52, and the subframe 40 undergo further processing. More specifically, various bores, apertures, and peripheral channels (e.g., the raceway cavity 1018, the hinge channel 832, the top channel 834, the lock channel 836, the handle bore 74, the interface bores 164, etc.) are machined into the exterior skin 50, the interior skin 52, and the subframe 40 to accommodate the hinges 32, the handle assembly 70 (e.g., the interior doorknob or door handle, the exterior doorknob or door handle, the main latch, the main deadbolt, etc.), the power transfer assembly 106, the deadbolt units 138, the interactive unit 140, the door wiring harness 170, the raceway 890, and/or the video doorbell 1118. As step B5, the body 894 of the raceway 890 is installed into one or more of the peripheral channels machined into the subframe 40. As step B6, the upper window wiring 174 of the door wiring harness 170 is routed through the body 894 of the raceway 890 and connected to the lower window wiring 176 through the window wiring aperture 1019 of the top rail support 1010 of the top rail 44 of the subframe 40 and the window wiring aperture 918 of the body 894 of the raceway 890 via the window connector 1020. As step B7, the door component wiring 178 of the door wiring harness 170 is installed and routed through the body 894 of the raceway 890. As step B8, the cover(s) 892 are installed to enclose the body/bodies 894 of the raceway 890. As step B9, the interior chambers of the assembled door between (a) the exterior skin 50 and the interior skin 52 and (b) the subframe 40 are filled with the insulation 1070 (e.g., foam injection through a fill port or gap). In some embodiments, the insulation 1070 is installed prior to the subframe 40 (e.g., a non-foam injection insulation). Further, it should be understood that the order of steps B1-B9 is only for explanation purposes. One or more of steps B1-B9 may be performed in a different order or simultaneously. Further, steps B1-B9 described herein refer to a door assembly including the subframe 40, the exterior skin 50, and the interior skin 52, however, in some embodiments, the door 30 is configured as a solid core door.

Now, the assembly of the door frame 20 will be described. As step C1, the side jambs 22, the head jamb 24, and the sill 26 are coupled together to provide the door frame 20. As step C2, the door frame 20 undergoes further processing. More specifically, the channels of the side jambs 22 (i.e., for the jamb lights 790) and, in some embodiments, the channel of the head jamb 24 are machined into the side jambs 22 and the head jamb 24, respectively. As step C3, various bores, apertures, and channels are machined into the door frame 20 to accommodate the frame wiring harness 1126. As step C4, the frame wiring harness 1126 is routed through the bores, apertures, and channels of the door frame 20. It should be understood that the order of steps C1-C4 is only for explanation purposes. One or more of steps C1-C4 may be performed in a different order or simultaneously.

Now, the assembly of the door frame 20 and the door 30 will be described. As step D1, portions of the hinges 32 are coupled to each of (a) the hinge stile 42 of the door 30 and (b) one of the side jambs 22 of the door frame 20. As step D2, portions of the power transfer assembly 106 are coupled to each of (a) the hinge stile 42 of the door 30 and (b) one of the side jambs 22 of the door frame 20. While coupling a first portion of the power transfer assembly 106 to the door 30, the power transfer assembly 106 is connected to the door wiring harness 170 (e.g., the upper window wiring 174, the door component wiring 178). While coupling a second portion of the power transfer assembly 106 to the door frame 20, the power transfer assembly 106 is connected to the frame wiring harness 1126 (e.g., the upper window wiring 174, the door component wiring 178). As step D3, the door 30 is pivotably mounted to the door frame 20 through engagement of the portions of the hinges 32, and the door wiring harness 170 is electrically coupled the frame wiring harness 1126 through engagement of the first and second portions of the power transfer assembly 106.

Now, the installation and assembly of the access panel 1110 will be described. As step E1, a location within a building for installation/mounting of the access panel 1110 is prepared (e.g., drywall cut to provide a hole into which the access panel 1110 can be inserted). The location may be, for example, up to one hundred feet from the rough opening ("RO") within which the door frame 20 and door 30 will be installed. As step E2, the power source 102 is routed to the location. As step E3, the access panel wiring harness 1122 is routed from the location for the access panel 1110 to a location proximate the RO for the door frame 20 and the door 30. As step E4, the access panel 1110 is installed at the location, and the power source 102 and the access panel wiring harness 1122 are connected thereto. As step E5, the power converter 104 is inserted into the access panel 1110 and coupled to the power source 102. As step E6, the power supply unit 130 is inserted into the access panel 1110, and connected to the power converter 104 and the access panel wiring harness 1122. As step E7, the window control unit 132, the wireless transceiver 1112, and the backup battery 222 are inserted into the access panel 1110 and connected to the power supply unit 130. As step E8, the doorbell system 180 is installed within the building and connected to the access panel 1110 (e.g., wirelessly, with a wired connection, etc.). In some embodiments, the doorbell system 180 is an existing doorbell system within the building and does not need to be installed. It should be understood that the order of steps E1-E8 is only for explanation purposes. One or more of steps E1-E8 may be performed in a different order or simultaneously.

Now, the installation of the assembly of the door frame 20 and the door 30 into the RO of the building will be described. As step F1, a bore hole is bored in the RO. As step F2, a free end of the frame wiring harness 1126 is inserted through the bore hole. As step F3, the assembly of the door frame 20 and the door 30 are inserted into the RO and the door frame 20 is secured thereto (e.g., shimmed, nailed, caulked, etc.). As step F4, the door finishes and electronic devices are installed. More specifically, (a) the handle assembly 70 is installed within and to the door 30 and coupled to the door component wiring 178, (b) the deadbolt units 138 are installed in the door 30 and coupled to the door component wiring 178, (c) the interactive unit 140 is installed on the door 30 and coupled to the door component wiring 178 and/or the video doorbell 1118 is installed on the door frame 20 are coupled to the video doorbell wiring 1144 of the frame wiring harness 1126, (d) the jamb lights 790 are installed within the channels of the side jambs 22 and/or the head jamb 24, and coupled to the jamb light wiring 1128 of the frame wiring harness 1126, and (e) the side jamb light covers 794 and/or the head jamb cover 796 are installed. As step F5, the access panel wiring harness 1122 and the frame wiring harness 1126 are coupled together to couple the assembly of the door frame 20 and the door 30 to the access panel 1110. It should be understood that the order of steps F1-F5 is only for explanation purposes. One or more of steps F1-F5 may be performed in a different order or simultaneously. Further, one or more of the components outlined in step F4 may be installed earlier in the process described herein (e.g., such as during the assembly of the door frame 20, during the assembly of the door 30, etc.).

As utilized herein with respect to numerical ranges, the terms "approximately," "about," "substantially," and similar terms generally mean +/−10% of the disclosed values. When the terms "approximately," "about," "substantially," and similar terms are applied to a structural feature (e.g., to describe its shape, size, orientation, direction, etc.), these terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the door system 10 and the door system 1100 as shown in the various exemplary embodiments are illustrative only. Additionally, any element disclosed in one embodiment may be incorporated or utilized with any other embodiment disclosed herein. For example, any element of the door system 10 can be incorporated into the door system 1100, or vice versa. Although only one example from one embodiment that can be incorporated or utilized in another embodiment has been described above, it should be appreciated that other elements of the various embodiments may be incorporated or utilized with any of the other embodiments disclosed herein.

The invention claimed is:

1. An electronic door system comprising:
 a door frame including a first side jamb, a second side jamb, a head jamb, and a sill, and wherein at least one of the first side jamb or the second side jamb defines a light channel extending substantially along an entire longitudinal length thereof;
 a frame wiring harness extending through the door frame;
 a light strip disposed within and extending along the light channel, a portion of the light strip extending into the head jamb and connected to the frame wiring harness; and
 a light cover enclosing the light strip within the light channel;
 a door hingedly coupled to the door frame, the door defining a channel extending along at least a portion of a peripheral edge thereof;
 an electrically-controllable component coupled to or disposed within the door;
 a door wiring harness including a wire extending along and within the channel, the wire coupled to the electrically-controllable component;
 a power transfer assembly positioned between the door frame and the door, the power transfer assembly electrically coupling the frame wiring harness to the door wiring harness; and
 a cover extending along the peripheral edge and covering the channel.

2. The electronic door system of claim 1, wherein the door defines a window aperture, further comprising a window disposed within the window aperture, wherein the window is the electrically-controllable component, and wherein the window is a controllable privacy glass or a transparent display.

3. The electronic door system of claim 2, wherein the channel defines a wire aperture that connects the channel to the window aperture, and wherein the wire extends through the wire aperture to the window.

4. The electronic door system of claim 3, further comprising a raceway disposed within the channel, wherein the raceway includes a base secured within the channel and the cover, wherein the wire aperture is a first wire aperture, wherein the base defines a wire volume and a second wire aperture that aligns with the first wire aperture, wherein the wire extends though the wire volume, the second wire aperture, and the first wire aperture to the window, and wherein the cover releasably engages with the base to enclose the wire volume.

5. The electronic door system of claim 1, further comprising:
one or more sensors configured to facilitate determining a location of a user relative to the door; and
a controller configured to make a door access decision at least partially based on the location of the user indicating that the user is outside and not inside of a building within which the electronic door system is installed.

6. The electronic door system of claim 5, wherein the one or more sensors include a plurality of ultra-wideband sensors configured to facilitate triangulating a device location of a user device carried by the user and, thereby, the location of the user.

7. The electronic door system of claim 5, wherein the controller is configured to make the door access decision based on (a) the location indicating that the user is outside and not inside of the building and (b) an access intent of the user.

8. The electronic door system of claim 7, further comprising at least one of (a) a radar sensor or (b) a capacitive touch doorknob or handle, wherein the controller is configured to determine the access intent of the user based on a signal received from the at least one of (a) the radar sensor or (b) the capacitive touch doorknob or handle.

9. The electronic door system of claim 1, further comprising:
a doorknob or handle coupled to the door, the doorknob or handle including a haptic component; and
a controller configured to activate the haptic component according to one or more haptic profiles to provide feedback or information to a user based on a current situation proximate the door.

10. The electronic door system of claim 1, further comprising:
one or more sensors; and
a controller configured to:
detect a presence of a user proximate the door via the one or more sensors;
detect a gesture performed by the user via the one or more sensors; and
control a function of the electronic door system based at least on the presence and the gesture.

11. The electronic door system of claim 1, wherein the electrically-controllable component is a first electrically-controllable component, further comprising:
a second electrically-controllable component coupled to or disposed within the door frame or the door;
a backup battery configured to power the first electrically-controllable component and the second electrically-controllable component in response to a mains power outage; and
a controller configured to:
provide a notification to a user device associated with the electronic door system in response to the mains power outage;
receive a response from the user device based on the notification, the response including at least one of (a) a hierarchy for the first electrically-controllable component and the second electrically-controllable component or (b) a time limit for the electronic door system to remain at least partially functional using the backup battery; and
evaluate a remaining charge of the backup battery; and
selectively deactivate the first electrically-controllable component and the second electrically-controllable component based on the at least one of the hierarchy or the time limit.

12. The electronic door system of claim 1, wherein:
the electronic door system is configured to integrate with a building system of a building within which the electronic door system is installed;
the building system includes at least one of a lighting control system, an alarm system, a heating, ventilation, and air conditioning (HVAC) system, or a water monitoring and control system; and
in response to the electronic door system entering an away mode, a controller of the electronic door system is configured to at least one of:
communicate with the lighting control system to turn off one or more lights within the building that are on when the away mode is activated;
communicate with the alarm system to enter the alarm system into an active mode;
communicate with the HVAC system to engage away temperature control operations; or
communicate with the water monitoring and control system to engage away water monitoring and control operations.

13. The electronic door system of claim 1, further comprising a controller configured to control the electrically-operated component to provide a visual or audible message tailored for a specific user when the specific a user walks through the door.

14. The electronic door system of claim 1, further comprising a controller configured to provide a notification to a user device associated with a user when another user walks through the door where the notification is tailored based on the other user.

15. The electronic door system of claim 1, further comprising a controller configured to:
acquire temperature data regarding an ambient environment; and
at least one of (a) provide a notification a user to turn off a water supply to water spickets of a building in which the electronic door system is installed or (b) automatically turn off the water supply in response to the temperature being less than a temperature threshold.

16. The electronic door system of claim 1, further comprising a controller configured to:
detect inclement weather; and
provide a notification to a user to close any open windows of a building in which the electronic door system is installed.

17. The electronic door system of claim 1, further comprising a controller configured to:
monitor and learn a schedule of a user; and
provide a notification to the user or another user in response to the schedule deviating.

18. The electronic door system of claim 1, further comprising a controller configured to:
monitor an event external to the door over time to learn a schedule for the event; and
at least one of (a) provide a notification to a user regarding a deviation from the schedule or (b) contact an organization associated with the event in response to the deviation.

19. The electronic door system of claim 1, further comprising a controller configured to:
monitor an area outside of the door;
detect a delivery person delivering a package; and
disable a doorbell chime function in response to detecting the delivery person delivering the package.

20. The electronic door system of claim 19, wherein the controller is configured to maintain the doorbell chime function in response to detecting the delivery person with a signature device indicating that the package needs to be signed for.

21. The electronic door system of claim 1, further comprising a controller configured to open the door, open a pet door of the door, or provide a notification to an owner of a pet in response to detecting the pet at the door and determining that the pet desires to be let inside through an action other than being present at the door.

22. The electronic door system of claim 1, further comprising:
external lights; and
a controller configured to:
detect knocking at the door or movement of the door; and
alter a lighting characteristic of the external lights based on a characteristic of the knocking or the movement.

23. The electronic door system of claim 1, further comprising a control configured to:
identify that all occupants of a building within which the electronic door system is installed have left the building; and
automatically engage an away mode in response to the identification.

24. An electronic door system comprising:
a door frame;
a frame wiring harness extending through the door frame;
a door hingedly coupled to the door frame, the door defining a channel extending along at least a portion of a peripheral edge thereof;
an electrically-controllable component coupled to or disposed within the door;
a door wiring harness including a wire extending along and within the channel, the wire coupled to the electrically-controllable component;
a power transfer assembly positioned between the door frame and the door, the power transfer assembly electrically coupling the frame wiring harness to the door wiring harness;
a cover extending along the peripheral edge and covering the channel;
an access panel configured to be positioned in a location spaced from the door and the door frame;
a power converter disposed within the access panel and configured to receive AC power from a mains power source and convert the AC power to DC power;
a wireless transceiver disposed within the access panel;
a backup battery disposed within the access panel; and
a controller disposed within the access panel, the controller coupled to the power converter, the wireless transceiver, the backup battery, and the frame wiring harness.

25. The electronic door system of claim 24, further comprising a user interface (a) coupled to the door frame and electrically coupled to the frame wiring harness or (b) coupled to the door and electrically coupled to the door wiring harness.

26. The electronic door system of claim 25, wherein the user interface includes an external charge port to facilitate powering the user interface if the mains power source is unavailable and the backup battery is depleted.

27. The electronic door system of claim 24, further comprising:
a reset interface disposed within the access panel; and
one or more switches positioned to disconnect at least one of the controller or the electrically-controllable component from the mains power source and the backup battery, the one or more switches configured to open for a period of time in response to receiving an open signal;
wherein the controller is configured to send the open signal to the one or more switches in response to a user engaging the reset interface.

28. An electronic door system comprising:
a door frame including a first side jamb, a second side jamb, a head jamb, and a sill, wherein at least one of the first side jamb or the second side jamb defines a light channel extending substantially along an entire longitudinal length thereof;
a frame wiring harness extending through the door frame;
a light strip disposed within and extending along the light channel, a portion of the light strip extending into the head jamb and connected to the frame wiring harness;
a light cover enclosing the light strip within the light channel;
a door hingedly coupled to the door frame, the door defining a wire channel extending along at least a portion of a peripheral edge thereof;
an electrically-controllable component coupled to or disposed within the door;
a door wiring harness including one or more wires extending along and within the wire channel, the door wiring harness coupled to the frame wiring harness and the electrically-controllable component;
a channel cover extending along the peripheral edge and covering the channel;
an access panel configured to be positioned in a location spaced from the door and the door frame;
a power converter disposed within the access panel, the power converter configured to receive AC power from a mains power source and convert the AC power to DC power;
a backup battery disposed within the access panel;
a power management controller disposed within the access panel, the power management controller coupled to the power converter and the backup battery; and
an access panel wiring harness coupled to the power management controller and the frame wiring harness.

\* \* \* \* \*